US012608079B2

(12) United States Patent
DeDonato et al.

(10) Patent No.: US 12,608,079 B2
(45) Date of Patent: Apr. 21, 2026

(54) DEVICES, METHODS, AND GRAPHICAL USER INTERFACES FOR USER ENROLLMENT AND AUTHENTICATION

(71) Applicant: Apple Inc., Cupertino, CA (US)

(72) Inventors: Amy E. DeDonato, San Francisco, CA (US); Jay Moon, San Francisco, CA (US); Joseph Y. Chan, San Francisco, CA (US); Danielle M. Price, Los Gatos, CA (US); Jonathan R. Dascola, San Francisco, CA (US); Stephen O. Lemay, Palo Alto, CA (US); William A. Sorrentino, III, Mill Valley, CA (US); Richard D. Lyons, London (GB); Lee S. Broughton, Santa Cruz, CA (US); Katherine W. Kolombatovich, San Francisco, CA (US); Hugo D. Verweij, Portola Valley, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/597,275

(22) Filed: Mar. 6, 2024

(65) Prior Publication Data

US 2024/0353922 A1      Oct. 24, 2024

Related U.S. Application Data

(60) Provisional application No. 63/470,552, filed on Jun. 2, 2023, provisional application No. 63/460,838, filed on Apr. 20, 2023.

(51) Int. Cl.
*G06F 3/01* (2006.01)
*G06F 21/32* (2013.01)
(Continued)

(52) U.S. Cl.
CPC .............. *G06F 3/013* (2013.01); *G06F 21/32* (2013.01); *G06F 21/36* (2013.01); *G06T 13/80* (2013.01); *G06T 19/006* (2013.01)

(58) Field of Classification Search
CPC .......... G06F 3/013; G06F 21/32; G06F 21/36; G06T 13/80; G06T 19/006
See application file for complete search history.

(56) References Cited

U.S. PATENT DOCUMENTS

| | | | |
|---|---|---|---|
| 6,677,932 B1 | 1/2004 | Westerman | |
| 6,922,147 B1 | 7/2005 | Viksnins et al. | |

(Continued)

FOREIGN PATENT DOCUMENTS

| | | |
|---|---|---|
| CN | 103763327 A | 4/2014 |
| CN | 103853328 A | 6/2014 |

(Continued)

OTHER PUBLICATIONS

Action received for U.S. Appl. No. 17/479,974, mailed on May 6, 2024, 4 pages.

(Continued)

*Primary Examiner* — Lixi C Simpson
(74) *Attorney, Agent, or Firm* — YHE Law LLP

(57) ABSTRACT

The present disclosure generally relates to techniques and user interfaces for user enrollment, user authentication, user representation, and transitioning a device from a first state to a second state.

58 Claims, 68 Drawing Sheets

(51) Int. Cl.
    *G06F 21/36*      (2013.01)
    *G06T 13/80*      (2011.01)
    *G06T 19/00*      (2011.01)

(56)             References Cited

U.S. PATENT DOCUMENTS

| | | | |
|---|---|---|---|
| 7,081,905 B1 | 7/2006 | Raghunath | |
| 8,392,259 B2 | 3/2013 | Macgillivray et al. | |
| 8,473,748 B2 | 6/2013 | Sampas | |
| 8,594,374 B1 | 11/2013 | Bozarth | |
| 8,826,415 B2 | 9/2014 | Last | |
| 9,098,931 B2 | 8/2015 | Shpunt et al. | |
| 9,208,492 B2 | 12/2015 | Hoyos | |
| 9,323,912 B2 | 4/2016 | Schultz et al. | |
| 9,549,323 B2 | 1/2017 | Lee et al. | |
| 9,876,788 B1 | 1/2018 | Ziraknejad et al. | |
| 9,922,317 B2 | 3/2018 | Bak et al. | |
| 9,965,039 B2 | 5/2018 | Kwon | |
| 10,057,227 B1 | 8/2018 | Hess et al. | |
| 10,096,015 B2 | 10/2018 | Bak et al. | |
| 10,163,105 B1 | 12/2018 | Ziraknejad et al. | |
| 10,440,574 B2 | 10/2019 | Ledvina et al. | |
| 10,701,067 B1 | 6/2020 | Ziraknejad et al. | |
| 10,762,716 B1* | 9/2020 | Paul | G06F 3/165 |
| 10,802,582 B1 | 10/2020 | Clements | |
| 11,026,085 B2 | 6/2021 | Grange et al. | |
| 11,106,280 B1 | 8/2021 | Bigham et al. | |
| 11,751,053 B2 | 9/2023 | Lee et al. | |
| 11,907,421 B1 | 2/2024 | Clements | |
| 2002/0120867 A1 | 8/2002 | Mitchell et al. | |
| 2003/0076298 A1 | 4/2003 | Rosenberg | |
| 2004/0046638 A1 | 3/2004 | Kawasaki | |
| 2004/0059590 A1 | 3/2004 | Mercredi et al. | |
| 2005/0074126 A1 | 4/2005 | Stanko | |
| 2005/0117752 A1 | 6/2005 | Iima et al. | |
| 2005/0177867 A1 | 8/2005 | Toutonghi | |
| 2005/0190059 A1 | 9/2005 | Wehrenberg | |
| 2006/0017692 A1 | 1/2006 | Wehrenberg et al. | |
| 2006/0120707 A1* | 6/2006 | Kusakari | A61B 3/145 |
| | | | 348/78 |
| 2006/0161870 A1 | 7/2006 | Hotelling et al. | |
| 2006/0161871 A1 | 7/2006 | Hotelling et al. | |
| 2006/0224882 A1 | 10/2006 | Chin | |
| 2006/0250578 A1 | 11/2006 | Pohl et al. | |
| 2007/0075965 A1 | 4/2007 | Huppi et al. | |
| 2007/0162963 A1 | 7/2007 | Penet et al. | |
| 2007/0180492 A1 | 8/2007 | Hassan et al. | |
| 2007/0226778 A1 | 9/2007 | Pietruszka | |
| 2007/0229221 A1 | 10/2007 | Saotome | |
| 2008/0017721 A1 | 1/2008 | Zehnacker | |
| 2008/0027947 A1 | 1/2008 | Pritchett et al. | |
| 2008/0040786 A1 | 2/2008 | Chang et al. | |
| 2008/0140868 A1 | 6/2008 | Kalayjian et al. | |
| 2008/0167834 A1 | 7/2008 | Herz et al. | |
| 2008/0201454 A1 | 8/2008 | Soffer | |
| 2008/0320391 A1 | 12/2008 | Lemay et al. | |
| 2009/0006846 A1 | 1/2009 | Rosenblatt | |
| 2010/0075656 A1 | 3/2010 | Howarter et al. | |
| 2010/0122327 A1 | 5/2010 | Linecker et al. | |
| 2010/0178873 A1 | 7/2010 | Lee et al. | |
| 2011/0010470 A1 | 1/2011 | Hulbert et al. | |
| 2011/0202988 A1 | 8/2011 | Otranen et al. | |
| 2011/0215921 A1 | 9/2011 | Ben et al. | |
| 2011/0225426 A1 | 9/2011 | Agarwal et al. | |
| 2012/0036556 A1 | 2/2012 | Lebeau et al. | |
| 2012/0189273 A1 | 7/2012 | Folgner et al. | |
| 2012/0284297 A1 | 11/2012 | Aguera-Arcas et al. | |
| 2013/0024932 A1 | 1/2013 | Toebes et al. | |
| 2013/0060687 A1 | 3/2013 | Bak et al. | |
| 2013/0114043 A1 | 5/2013 | Balan et al. | |
| 2013/0124855 A1 | 5/2013 | Varadarajan et al. | |
| 2013/0127854 A1 | 5/2013 | Shpunt et al. | |
| 2013/0227596 A1 | 8/2013 | Pettis et al. | |
| 2013/0231127 A1 | 9/2013 | Kildal et al. | |
| 2013/0244615 A1 | 9/2013 | Miller | |
| 2013/0254574 A1 | 9/2013 | Zacchio et al. | |
| 2013/0254858 A1 | 9/2013 | Giardina et al. | |
| 2013/0262857 A1 | 10/2013 | Neuman et al. | |
| 2013/0263211 A1 | 10/2013 | Neuman et al. | |
| 2013/0283208 A1 | 10/2013 | Bychkov et al. | |
| 2014/0026188 A1 | 1/2014 | Gubler | |
| 2014/0058860 A1 | 2/2014 | Roh et al. | |
| 2014/0068751 A1 | 3/2014 | Last | |
| 2014/0104178 A1 | 4/2014 | Jo | |
| 2014/0155031 A1 | 6/2014 | Lee et al. | |
| 2014/0189829 A1 | 7/2014 | Mclachlan et al. | |
| 2014/0226131 A1 | 8/2014 | Lopez et al. | |
| 2014/0247229 A1 | 9/2014 | Cho et al. | |
| 2014/0283018 A1 | 9/2014 | Dadu et al. | |
| 2014/0337634 A1 | 11/2014 | Johnson et al. | |
| 2014/0354539 A1 | 12/2014 | Skogo et al. | |
| 2014/0359454 A1 | 12/2014 | Lee et al. | |
| 2014/0365904 A1 | 12/2014 | Kim et al. | |
| 2015/0020081 A1 | 1/2015 | Cho et al. | |
| 2015/0051913 A1 | 2/2015 | Choi | |
| 2015/0074615 A1 | 3/2015 | Han et al. | |
| 2015/0111559 A1 | 4/2015 | Leaver et al. | |
| 2015/0179008 A1 | 6/2015 | Sung et al. | |
| 2015/0205353 A1 | 7/2015 | Feng et al. | |
| 2015/0212681 A1 | 7/2015 | Shinozaki et al. | |
| 2015/0271175 A1 | 9/2015 | Je et al. | |
| 2015/0304330 A1 | 10/2015 | Soamboonsrup et al. | |
| 2015/0341717 A1 | 11/2015 | Song et al. | |
| 2015/0347738 A1 | 12/2015 | Ulrich et al. | |
| 2015/0348001 A1 | 12/2015 | Van Os et al. | |
| 2015/0362977 A1 | 12/2015 | Doniwa | |
| 2016/0006745 A1 | 1/2016 | Furuichi et al. | |
| 2016/0025993 A1 | 1/2016 | Mor et al. | |
| 2016/0036965 A1 | 2/2016 | Kim | |
| 2016/0037345 A1 | 2/2016 | Margadoudakis | |
| 2016/0048705 A1 | 2/2016 | Yang | |
| 2016/0132840 A1 | 5/2016 | Bowles et al. | |
| 2016/0189451 A1 | 6/2016 | Yoo et al. | |
| 2016/0191506 A1 | 6/2016 | Wang | |
| 2016/0224966 A1 | 8/2016 | Van Os et al. | |
| 2016/0224973 A1 | 8/2016 | Van Os et al. | |
| 2016/0259936 A1 | 9/2016 | Mukherjee et al. | |
| 2016/0261581 A1 | 9/2016 | Wang et al. | |
| 2016/0294837 A1 | 10/2016 | Turgeman | |
| 2016/0306533 A1 | 10/2016 | Agarwal et al. | |
| 2017/0032168 A1 | 2/2017 | Kim | |
| 2017/0039358 A1 | 2/2017 | Yuen et al. | |
| 2017/0039567 A1 | 2/2017 | Stern et al. | |
| 2017/0142584 A1 | 5/2017 | Oh et al. | |
| 2017/0148010 A1 | 5/2017 | Bak et al. | |
| 2017/0161750 A1 | 6/2017 | Yao et al. | |
| 2017/0213211 A1 | 7/2017 | Sibert et al. | |
| 2017/0235926 A1 | 8/2017 | Fyke et al. | |
| 2017/0264608 A1 | 9/2017 | Moore et al. | |
| 2017/0286648 A1 | 10/2017 | Yamaguchi et al. | |
| 2017/0286656 A1 | 10/2017 | Kohli | |
| 2017/0318019 A1 | 11/2017 | Gordon et al. | |
| 2017/0336867 A1 | 11/2017 | Wilairat et al. | |
| 2017/0339151 A1 | 11/2017 | Van Os et al. | |
| 2017/0357788 A1 | 12/2017 | Ledvina et al. | |
| 2017/0357973 A1 | 12/2017 | Van Os et al. | |
| 2018/0012070 A1* | 1/2018 | Shin | G06V 40/19 |
| 2018/0013769 A1 | 1/2018 | Robinson et al. | |
| 2018/0018514 A1 | 1/2018 | Azam et al. | |
| 2018/0075439 A1 | 3/2018 | Bak et al. | |
| 2018/0131721 A1 | 5/2018 | Jones et al. | |
| 2018/0198909 A1 | 7/2018 | Milstein | |
| 2018/0357631 A1 | 12/2018 | Bak et al. | |
| 2019/0020483 A1 | 1/2019 | Meng | |
| 2019/0033965 A1 | 1/2019 | Raghunath et al. | |
| 2019/0053739 A1 | 2/2019 | Inoue et al. | |
| 2019/0080189 A1 | 3/2019 | Van Os et al. | |
| 2019/0138092 A1 | 5/2019 | Song | |
| 2019/0228140 A1 | 7/2019 | Arroyo et al. | |
| 2019/0235247 A1 | 8/2019 | Norden | |
| 2019/0272363 A1 | 9/2019 | Suwald | |
| 2019/0278900 A1 | 9/2019 | Yang et al. | |
| 2019/0347389 A1 | 11/2019 | Kawakita et al. | |
| 2019/0364020 A1 | 11/2019 | Wardell et al. | |

(56) References Cited

U.S. PATENT DOCUMENTS

| | | | |
|---|---|---|---|
| 2019/0392129 | A1 | 12/2019 | Tsai et al. |
| 2019/0394649 | A1 | 12/2019 | Ledvina et al. |
| 2020/0042083 | A1 | 2/2020 | Min |
| 2020/0052905 | A1 | 2/2020 | Mathias et al. |
| 2020/0225746 | A1 | 7/2020 | Bar-Zeev et al. |
| 2020/0280446 | A1 | 9/2020 | Matsumoto |
| 2020/0367827 | A1 | 11/2020 | Min et al. |
| 2020/0387686 | A1 | 12/2020 | Jhang et al. |
| 2020/0401686 | A1 | 12/2020 | Duchastel |
| 2021/0014070 | A1 | 1/2021 | Gopalakrishnan et al. |
| 2021/0105277 | A1 | 4/2021 | Epstein et al. |
| 2021/0203506 | A1 | 7/2021 | Edwards et al. |
| 2021/0255269 | A1 | 8/2021 | Lv et al. |
| 2021/0286502 | A1 | 9/2021 | Lemay et al. |
| 2021/0374750 | A1 | 12/2021 | Miller et al. |
| 2022/0012323 | A1 | 1/2022 | Moriwaki et al. |
| 2022/0100270 | A1* | 3/2022 | Pastrana Vicente .. G06F 3/0481 |
| 2022/0100841 | A1 | 3/2022 | Yang et al. |
| 2022/0214743 | A1 | 7/2022 | Dascola et al. |
| 2022/0229524 | A1 | 7/2022 | McKenzie et al. |
| 2022/0229895 | A1 | 7/2022 | Ranjan et al. |
| 2022/0237274 | A1 | 7/2022 | Paul et al. |
| 2022/0237660 | A1 | 7/2022 | Balondona |
| 2022/0245888 | A1* | 8/2022 | Singh ...................... G06F 3/011 |
| 2022/0277063 | A1 | 9/2022 | Arroyo et al. |
| 2022/0284084 | A1 | 9/2022 | Deng |
| 2022/0342972 | A1* | 10/2022 | Van Os ................ G06V 40/172 |
| 2022/0382839 | A1 | 12/2022 | Vargas et al. |
| 2022/0413605 | A1 | 12/2022 | Liu et al. |
| 2023/0019250 | A1 | 1/2023 | Lee et al. |
| 2023/0071037 | A1 | 3/2023 | Kim et al. |
| 2023/0089689 | A1 | 3/2023 | Pons Bordes et al. |
| 2023/0259598 | A1 | 8/2023 | Arroyo et al. |
| 2023/0326144 | A1 | 10/2023 | Insley |
| 2024/0028110 | A1 | 1/2024 | Aurongzeb et al. |
| 2024/0085707 | A1 | 3/2024 | Schowengerdt |
| 2024/0103616 | A1 | 3/2024 | Yerkes et al. |
| 2024/0103617 | A1 | 3/2024 | Yerkes et al. |
| 2024/0118746 | A1 | 4/2024 | Yerkes et al. |
| 2024/0152244 | A1* | 5/2024 | DeDonato ............... G06F 1/163 |
| 2024/0220009 | A1 | 7/2024 | Dryer et al. |
| 2024/0427869 | A1 | 12/2024 | Paul |
| 2025/0148066 | A1 | 5/2025 | Lee et al. |
| 2025/0156516 | A1 | 5/2025 | Deng et al. |
| 2025/0217466 | A1 | 7/2025 | Pons Bordes et al. |
| 2025/0350945 | A1 | 11/2025 | Yang et al. |

FOREIGN PATENT DOCUMENTS

| | | | |
|---|---|---|---|
| CN | 105100123 | A | 11/2015 |
| CN | 105703909 | A | 6/2016 |
| CN | 105827624 | A | 8/2016 |
| CN | 105844462 | A | 8/2016 |
| CN | 106487754 | A | 3/2017 |
| CN | 106961415 | A | 7/2017 |
| EP | 1708116 | A2 | 10/2006 |
| EP | 2568693 | A2 | 3/2013 |
| EP | 2632193 | A2 | 8/2013 |
| EP | 2981115 | A2 | 2/2016 |
| EP | 2568693 | A3 | 7/2016 |
| EP | 2632193 | B1 | 10/2018 |
| EP | 2568693 | B1 | 12/2019 |
| EP | 3633963 | A1 | 4/2020 |
| JP | 2004-104813 | A | 4/2004 |
| JP | 2007-304854 | A | 11/2007 |
| JP | 2010-503082 | A | 1/2010 |
| JP | 2010-198341 | A | 9/2010 |
| JP | 2011-65590 | A | 3/2011 |
| JP | 2011-237857 | A | 11/2011 |
| JP | 2014-110638 | A | 6/2014 |
| JP | 2014-131359 | A | 7/2014 |
| JP | 2018-136886 | A | 8/2018 |
| TV | 201137722 | A | 11/2011 |
| TW | 201316247 | A | 4/2013 |
| TW | 201324310 | A | 6/2013 |
| TW | 201409345 | A | 3/2014 |
| WO | 2004/104813 | A1 | 12/2004 |
| WO | 2013/097882 | A1 | 7/2013 |
| WO | 2013/137503 | A1 | 9/2013 |
| WO | 2014/057795 | A1 | 4/2014 |
| WO | 2014/078965 | A1 | 5/2014 |
| WO | 2014/105274 | A1 | 7/2014 |
| WO | 2014/115605 | A1 | 7/2014 |
| WO | 2016/029853 | A1 | 3/2016 |
| WO | 2016/123309 | A1 | 8/2016 |
| WO | 2018/125563 | A1 | 7/2018 |
| WO | 2019/033129 | A2 | 2/2019 |
| WO | 2021/216044 | A1 | 10/2021 |

OTHER PUBLICATIONS

Alexandridis et al., "Forthroid on Android: A QR-code based Information Access System for Smart Phones", 18th IEEE Workshop on Local & Metropolitan Area Networks (LANMAN)., 2011, 6 pages.

Applicant-Initiated Interview Summary received for U.S. Appl. No. 17/685,039, mailed on May 16, 2024, 4 pages.

Applicant-Initiated Interview Summary received for U.S. Appl. No. 17/900,734, mailed on Feb. 3, 2025, 4 pages.

Corrected Notice of Allowance received for U.S. Appl. No. 17/900,734, mailed on Mar. 10, 2025, 3 pages.

Decision to Grant received for European Patent Application No. 21166718.3, mailed on Aug. 8, 2024, 2 pages.

Decision to Refuse received for Japanese Patent Application No. 2023-077990, mailed on Dec. 13, 2024, 6 pages (3 pages of English Translation and 3 pages of Official Copy).

Emilio Di Paolom. , "CES 2021: Wearable Device with Biometric Authentication", Available online at: https://www.eetimes.eu/ces-2021-wearable-device-with-biometric-authentication/ , EE Times Europe, Jan. 11, 2021, 6 pages.

Examiner's Answer to Appeal Brief received for U.S. Appl. No. 17/479,974, mailed on Oct. 24, 2024, 18 pages.

Extended European Search Report received for European Patent Application No. 24197852.7, mailed on Dec. 5, 2024, 11 pages.

Final Office Action received for U.S. Appl. No. 18/137,985, mailed on Dec. 4, 2024, 14 pages.

International Search Report and Written Opinion received for PCT Patent Application No. PCT/US2004/025526, mailed on Aug. 5, 2024, 19 pages.

Invitation to Pay Additional Fees received for PCT Patent Application No. PCT/US2024/025526, mailed on Jun. 14, 2024, 12 pages.

Non-Final Office Action received for U.S. Appl. No. 17/900,734, mailed on Jan. 16, 2025, 7 pages.

Non-Final Office Action received for U.S. Appl. No. 18/137,985, mailed on Jun. 5, 2024, 9 pages.

Notice of Allowance received for U.S. Appl. No. 17/587,558, mailed on Aug. 5, 2024, 10 pages.

Notice of Allowance received for U.S. Appl. No. 17/685,039, mailed on Aug. 28, 2024, 31 pages.

Notice of Allowance received for U.S. Appl. No. 17/685,039, mailed on Dec. 4, 2024, 5 pages.

Notice of Allowance received for U.S. Appl. No. 17/732,222, mailed on Jul. 3, 2024, 14 pages.

Notice of Allowance received for U.S. Appl. No. 17/900,734, mailed on Feb. 26, 2025, 8 pages.

Office Action received for Australian Patent Application No. 2022218517, mailed on Apr. 24, 2024, 4 pages.

Office Action received for Chinese Patent Application No. 201980009669.8, mailed on Jan. 9, 2025, 24 pages (1 page of English Translation and 23 pages of Official Copy).

Office Action received for Chinese Patent Application No. 201980009669.8, mailed on Oct. 14, 2024, 18 pages (10 pages of English Translation and 8 pages of Official Copy).

Office Action received for European Patent Application No. 22785826.3, mailed on Aug. 1, 2024, 7 pages.

Office Action received for European Patent Application No. 22785826.3, mailed on Jan. 9, 2025, 9 pages.

(56) References Cited

OTHER PUBLICATIONS

Office Action received for Japanese Patent Application No. 2023-077990, mailed on Jul. 12, 2024, 8 pages (4 pages of English Translation and 4 pages of Official Copy).
Ohbuchi et al., "Barcode Readers using the Camera Device in Mobile Phones", International Conference on Cyberworlds IEEE, 2004, 6 pages.
Sanchez-Reillo et al., "Strengths, Weaknesses and Recommendations in Implementing Biometrics in Mobile Devices", 2014 International Carnahan Conference on Security Technology (ICCST), IEEE., Oct. 2014, 6 pages.
Supplemental Notice of Allowance received for U.S. Appl. No. 17/732,222, mailed on Nov. 1, 2024, 2 pages.
International Preliminary Report on Patentability received for PCT Patent Application No. PCT/US2023/033540, mailed on Apr. 3, 2025, 18 pages.
Advisory Action received for U.S. Appl. No. 16/422,736, mailed on Mar. 12, 2021, 3 pages.
Advisory Action received for U.S. Appl. No. 17/479,974, mailed on Apr. 25, 2024, 4 pages.
Advisory Action received for U.S. Appl. No. 17/900,734, mailed on Mar. 21, 2024, 5 pages.
Applicant-Initiated Interview Summary received for U.S. Appl. No. 16/422,736, mailed on Feb. 24, 2021, 3 pages.
Applicant-Initiated Interview Summary received for U.S. Appl. No. 16/422,736, mailed on Sep. 28, 2020, 3 pages.
Applicant-Initiated Interview Summary received for U.S. Appl. No. 17/479,974, mailed on Apr. 4, 2023, 2 pages.
Applicant-Initiated Interview Summary received for U.S. Appl. No. 17/479,974, mailed on Jul. 21, 2023, 2 pages.
Applicant-Initiated Interview Summary received for U.S. Appl. No. 17/479,974, mailed on Mar. 14, 2024, 2 pages.
Applicant-Initiated Interview Summary received for U.S. Appl. No. 17/479,974, mailed on Nov. 1, 2023, 2 pages.
Applicant-Initiated Interview Summary received for U.S. Appl. No. 17/900,734, mailed on Feb. 22, 2024, 3 pages.
Applicant-Initiated Interview Summary received for U.S. Appl. No. 17/900,734, mailed on Nov. 20, 2023, 4 pages.
Board Decision received for Chinese Patent Application No. 201580043701.6, mailed on Aug. 19, 2021, 2 pages (1 page of English Translation and 1 page of Official Copy).
Brumberg et al., "The Unlock Project: A Python-based framework for practical brain-computer interface communication "app" development", Conf Proc IEEE Eng Med Biol Soc. 2012, doi:10.1109/EMBC.2012.6346473, Institute of Electrical and Electronics Engineers, 2012, 11 pages.
Corrected Notice of Allowance received for U.S. Appl. No. 14/719,217, mailed on Apr. 22, 2019, 2 pages.
Corrected Notice of Allowance received for U.S. Appl. No. 14/719,217, mailed on Mar. 20, 2019, 2 pages.
Corrected Notice of Allowance received for U.S. Appl. No. 16/241,199, mailed on Sep. 13, 2021, 5 pages.
Corrected Notice of Allowance received for U.S. Appl. No. 16/422,736, mailed on Jul. 9, 2021, 2 pages.
Corrected Notice of Allowance received for U.S. Appl. No. 17/498,557, mailed on Feb. 15, 2023, 4 pages.
Corrected Notice of Allowance received for U.S. Appl. No. 17/498,557, mailed on Jan. 11, 2023, 2 pages.
Corrected Notice of Allowance received for U.S. Appl. No. 17/498,557, mailed on Mar. 15, 2023, 2 pages.
Corrected Notice of Allowance received for U.S. Appl. No. 17/587,558, mailed on Apr. 16, 2024, 2 pages.
Decision to Grant received for European Patent Application No. 15719347.5, mailed on Jun. 24, 2021, 2 pages.
Decision to Grant received for European Patent Application No. 19716254.8, mailed on Oct. 6, 2023, 2 pages.
Weiss, et al., Smartphone and Smartwatch-Based Biometrics using Activities of Daily Living, IEEE Access, DOI: 10.1109/Access.2019.2940729, vol. XX, 2017, 13 pages.

Zhang, et al.,"WristUnlock: Secure and Usable Smartphone Unlocking with Wrist Wearables", IEEE Conference on Communications and Network Security (CNS), 2019, 9 pages.
Extended European Search Report received for European Patent Application No. 21166718.3, mailed on Jul. 6, 2021, 11 pages.
Extended European Search Report received for European Patent Application No. 23199594.5, mailed on Nov. 28, 2023, 11 pages.
Final Office Action received for U.S. Appl. No. 14/719,217, mailed on Feb. 23, 2017., 37 pages.
Final Office Action received for U.S. Appl. No. 16/422,736, mailed on Jan. 11, 2021, 39 pages.
Final Office Action received for U.S. Appl. No. 17/479,974, mailed on Jan. 19, 2024, 16 pages.
Final Office Action received for U.S. Appl. No. 17/479,974, mailed on Jun. 28, 2023, 32 pages.
Final Office Action received for U.S. Appl. No. 17/900,734, mailed on Jan. 19, 2024, 11 pages.
Han Hailing, "Research on Testing Method on Computer Interlocking Software", "Electronic World" vol. 2012 No. 17, Key Laboratory of Optoelectronic Technology and Intelligent Control of Ministry of Education, Lanzhou Jiaotong University, Sep. 2012, 2 pages (Official Copy only). See Communication Under Rule 37 CFR § 1.98(a)(3).
Intention to Grant received for European Patent Application No. 15719347.5, mailed on Dec. 8, 2020, 7 pages.
Intention to Grant received for European Patent Application No. 15719347.5, mailed on Jun. 8, 2021, 7 pages.
Intention to Grant received for European Patent Application No. 15719347.5, mailed on May 11, 2021, 8 pages.
Intention to Grant received for European Patent Application No. 19716254.8, mailed on May 16, 2023, 9 pages.
Intention to Grant received for European Patent Application No. 21166718.3, mailed on Mar. 25, 2024, 8 pages.
International Preliminary Report on Patentability received for PCT Patent Application No. PCT/US2015/025188, mailed on Mar. 2, 2017, 8 pages.
International Preliminary Report on Patentability received for PCT Patent Application No. PCT/US2019/012571, mailed on Aug. 6, 2020, 10 pages.
International Preliminary Report on Patentability received for PCT Patent Application No. PCT/US2022/013730, mailed on Aug. 3, 2023, 15 pages.
International Preliminary Report on Patentability received for PCT Patent Application No. PCT/US2022/042978, mailed on Apr. 4, 2024, 12 pages.
International Search Report and Written Opinion received for PCT Patent Application No. PCT/US2015/025188, mailed on Jun. 23, 2015, 11 pages.
International Search Report and Written Opinion received for PCT Patent Application No. PCT/US2019/012571, mailed on May 6, 2019, 15 pages.
International Search Report and Written Opinion received for PCT Patent Application No. PCT/US2022/013730, mailed on Apr. 8, 2022, 19 pages.
International Search Report and Written Opinion received for PCT Patent Application No. PCT/US2022/042978, mailed on Nov. 29, 2022, 15 pages.
International Search Report and Written Opinion received for PCT Patent Application No. PCT/US2023/033540, mailed on Feb. 6, 2024, 25 pages.
Invitation to Pay Additional Fees and Partial International Search Report received for PCT Patent Application No. PCT/US2023/033540, mailed on Dec. 12, 2023, 17 pages.
Kormann et al., "Risks of the Passport Single Signon Protocol", IEEE Computer Networks, Jul. 2000, 12 pages.
Non-Final Office Action received for U.S. Appl. No. 14/719,217, mailed on Jul. 26, 2018, 40 pages.
Non-Final Office Action received for U.S. Appl. No. 14/719.217, mailed on Jul. 28, 2016, 28 pages.
Non-Final Office Action received for U.S. Appl. No. 16/241,199, mailed on Aug. 20, 2020, 11 pages.
Non-Final Office Action received for U.S. Appl. No. 16/422,736, mailed on Jun. 23, 2020, 24 pages.

(56) References Cited

OTHER PUBLICATIONS

Non-Final Office Action received for U.S. Appl. No. 17/479,974, mailed on Feb. 22, 2023, 30 pages.

Non-Final Office Action received for U.S. Appl. No. 17/479,974, mailed on Oct. 10, 2023, 20 pages.

Non-Final Office Action received for U.S. Appl. No. 17/685,039, mailed on Mar. 26, 2024, 40 pages.

Non-Final Office Action received for U.S. Appl. No. 17/900,734, mailed on Oct. 24, 2023, 12 pages.

Non-Final Office Action received for U.S. Appl. No. 18/137,985, mailed on Dec. 21, 2023, 8 pages.

Notice of Acceptance received for Australian Patent Application No. 2018229544, mailed on May 4, 2020, 3 pages.

Notice of Acceptance received for Australian Patent Application No. 2020207785, mailed on May 4, 2022, 3 pages.

Notice of Acceptance received for Australian Patent Application No. 2022235545, mailed on Jun. 27, 2023, 3 pages.

Notice of Allowance received for Chinese Patent Application No. 201580043701.6, mailed on Jan. 26, 2022, 2 pages (1 page of English Translation and 1 page of Official Copy).

Notice of Allowance received for Japanese Patent Application No. 2017-507413, mailed on Jul. 22, 2019, 4 pages (1 page of English Translation and 3 pages of Official Copy),.

Notice of Allowance received for Japanese Patent Application No. 2019-116580, mailed on Oct. 2, 2020, 4 pages (1 page of English Translation and 3 pages of Official Copy).

Notice of Allowance received for Japanese Patent Application No. 2020-183773, mailed on Dec. 23, 2021, 4 pages (1 page of English Translation and 3 pages of Official Copy).

Notice of Allowance received for Japanese Patent Application No. 2022-007217, mailed on Apr. 10, 2023, 4 pages (1 page of English Translation and 3 pages of Official Copy).

Notice of Allowance received for Taiwanese Patent Application No. 104114953, mailed on Oct. 17, 2017, 3 pages (Official Copy only) See Communication Under Rule 37 CFR § 1.98(a)(3).

Notice of Allowance received for U.S. Appl. No. 14/719,217, mailed on Feb. 13, 2019, 13 pages.

Notice of Allowance received for U.S. Appl. No. 16/241,199, mailed on May 13, 2021, 9 pages.

Notice of Allowance received for U.S. Appl. No. 16/422,736, mailed on Apr. 20, 2021, 12 pages.

Notice of Allowance received for U.S. Appl. No. 16/422,736, mailed on Jun. 15, 2021, 13 pages.

Notice of Allowance received for U.S. Appl. No. 17/498,557, mailed on Dec. 2, 2022, 9 pages.

Notice of Allowance received for U.S. Appl. No. 17/587,558, mailed on Apr. 3, 2024, 19 pages.

Notice of Allowance received for U.S. Appl. No. 17/732,222, mailed on Mar. 5, 2024, 14 pages.

Office Action received for Australian Patent Application No. 2015302298, mailed on Apr. 4, 2018, 3 pages.

Office Action received for Australian Patent Application No. 2015302298, mailed on Jul. 20, 2018, 3 pages.

Office Action received for Australian Patent Application No. 2015302298, mailed on Sep. 14, 2017, 3 pages.

Office Action received for Australian Patent Application No. 2015302298, mailed on Sep. 4, 2018, 5 pages.

Office Action received for Australian Patent Application No. 2018229544, mailed on Nov. 15, 2019, 4 pages.

Office Action received for Australian Patent Application No. 2020207785, mailed on Dec. 14, 2021, 5 pages.

Office Action received for Australian Patent Application No. 2020207785, mailed on Jul. 13, 2021, 3 pages.

Office Action received for Australian Patent Application No. 2022218517, mailed on Apr. 27, 2023, 7 pages.

Office Action received for Australian Patent Application No. 2022218517, mailed on Dec. 21, 2023, 5 pages.

Office Action received for Australian Patent Application No. 2022218517, mailed on Jul. 24, 2023, 6 pages.

Office Action received for Australian Patent Application No. 2022235545, mailed on May 11, 2023, 3 pages.

Office Action received for Chinese Patent Application No. 201580043701.6, mailed on Dec. 24, 2018, 20 pages (5 pages of English Translation and 15 pages of Official copy).

Office Action received for Chinese Patent Application No. 201580043701.6, mailed on May 8, 2021, 10 pages (1 page of English Translation and 9 pages of Official Copy).

Office Action received for Chinese Patent Application No. 201580043701.6, mailed on Nov. 4, 2019, 20 pages (6 pages of English Translation and 14 pages of Official Copy).

Office Action received for Chinese Patent Application No. 201580043701.6, mailed on Oct. 12, 2020, 22 pages (5 pages of English Translation and 17 pages of Official Copy).

Office Action received for Chinese Patent Application No. 201580043701.6, mailed on Sep. 10, 2021, 10 pages (5 pages of English Translation and 5 pages of Official Copy).

Office Action received for Chinese Patent Application No. 201980009669.8, mailed on Aug. 3, 2022, 19 pages (12 pages of English Translation and 7 pages of Official Copy).

Office Action received for Chinese Patent Application No. 201980009669.8. mailed on Dec. 3, 2021, 26 pages (12 pages of English Translation and 14 pages of Official Copy).

Office Action received for Chinese Patent Application No. 201980009669.8, mailed on Mar. 1, 2023, 19 pages (11 pages of English Translation and 8 pages of Official Copy).

Office Action received for Chinese Patent Application No. 201980009669.8, mailed on Nov. 22, 2022, 16 pages (10 pages of English Translation and 6 pages of Official Copy).

Office Action received for Danish Patent Application No. PA202270438, mailed on Jul. 10, 2023, 4 pages.

Office Action received for European Patent Application No. 15719347.5, mailed on Apr. 9, 2020, 4 pages.

Office Action received for European Patent Application No. 15719347.5, mailed on Jun. 17, 2019, 4 pages.

Office Action received for European Patent Application No. 19716254.8, mailed on Aug. 9, 2021, 8 pages.

Office Action received for European Patent Application No. 21166718.3, mailed on Feb. 20, 2023, 7 pages.

Office Action received for Japanese Patent Application No. 2017-507413, mailed on Feb. 22, 2019, 11 pages (5 pages of English Translation and 6 pages of Official Copy).

Office Action received for Japanese Patent Application No. 2017-507413, mailed on May 25, 2018, 14 pages (7 pages of English Translation and 7 pages of Official Copy).

Office Action received for Taiwanese Patent Application No. 104114953, issued on Feb. 18, 2017, 9 pages (4 pages of English Translation and 5 pages of Official copy).

Office Action received for Taiwanese Patent Application No. 104114953, mailed on Jun. 8, 2016, 11 pages (5 pages of English Translation and 6 pages of Official copy).

Schürmann et al., "BANDANA—Body Area Network Device-to-Device Authentication Using Natural gAit", Ambient Intelligence, Comnet, Aalto University, DOI: 10.1109/PERCOM.2017.7917865, Dec. 11, 2016, 11 pages.

Search Report received for Danish Patent Application No. PA202270438, mailed on Dec. 5, 2022, 9 pages.

Office Action received for Australian Patent Application No. 2023233133, mailed on May 23, 2025, 5 pages.

Office Action received for European Patent Application No. 22785826.3, mailed on May 8, 2025, 7 pages.

Corrected Notice of Allowance received for U.S. Appl. No. 17/900,734, mailed on Mar. 17, 2025, 2 pages.

Office Action received for European Patent Application No. 22703812.2, mailed on Mar. 10, 2025, 5 pages.

Intention to Grant received for European Patent Application No. 22785826.3, mailed on Oct. 2, 2025, 9 pages.

Office Action received for Australian Patent Application No. 2024202748, mailed on Oct. 1, 2025, 3 pages.

Corrected Notice of Allowance received for U.S. Appl. No. 18/371,403, mailed on Nov. 12, 2025, 2 pages.

(56) References Cited

OTHER PUBLICATIONS

International Preliminary Report on Patentability received for PCT Patent Application No. PCT/US2024/025526, mailed on Oct. 30, 2025, 13 pages.

Notice of Allowance received for U.S. Appl. No. 18/371,403, mailed on Oct. 28, 2025, 8 pages.

Office Action received for European Patent Application No. 23199594.5, mailed on Oct. 28, 2025, 8 pages.

Applicant-Initiated Interview Summary received for U.S. Appl. No. 18/371,403, mailed on Sep. 18, 2025, 4 pages.

Applicant-Initiated Interview Summary received for U.S. Appl. No. 18/371,406, mailed on Sep. 19, 2025, 2 pages.

Decision on Appeal received for U.S. Appl. No. 17/479,974, mailed on Jul. 8, 2025, 14 pages.

Intention to Grant received for European Patent Application No. 22703812.2, mailed on Jul. 29, 2025, 9 pages.

Non-Final Office Action received for U.S. Appl. No. 18/371,403, mailed on Jul. 21, 2025, 23 pages.

Non-Final Office Action received for U.S. Appl. No. 18/371,406, mailed on Jul. 15, 2025, 15 pages.

Notice of Allowance received for Japanese Patent Application No. 2023-077990, mailed on Jul. 7, 2025, 4 pages (1 page of English Translation and 3 pages of Official Copy).

Office Action received for Australian Patent Application No. 2024202748, mailed on Jul. 4, 2025, 4 pages.

Record of Oral Hearing received for U.S. Appl. No. 17/479,974, mailed on Jul. 3, 2025, 17 pages.

Decision to Grant received for European Patent Application No. 22703812.2, mailed on Nov. 27, 2025, 2 pages.

Notice of Allowance received for U.S. Appl. No. 18/371,406, mailed on Dec. 3, 2025, 9 pages.

* cited by examiner

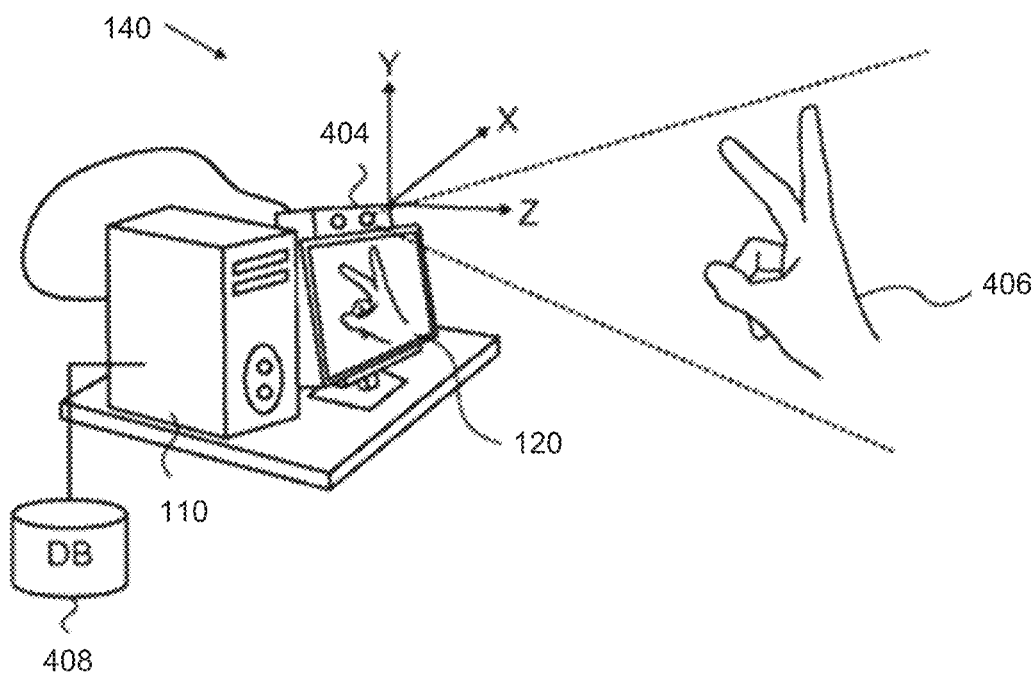
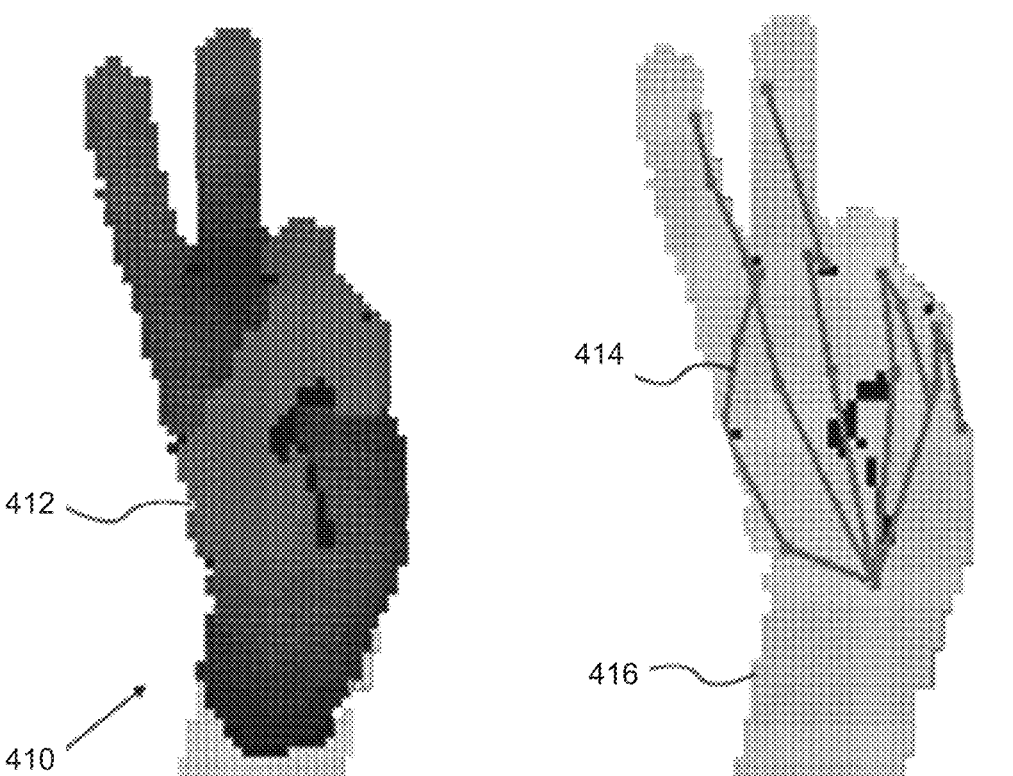
*FIG. 4*

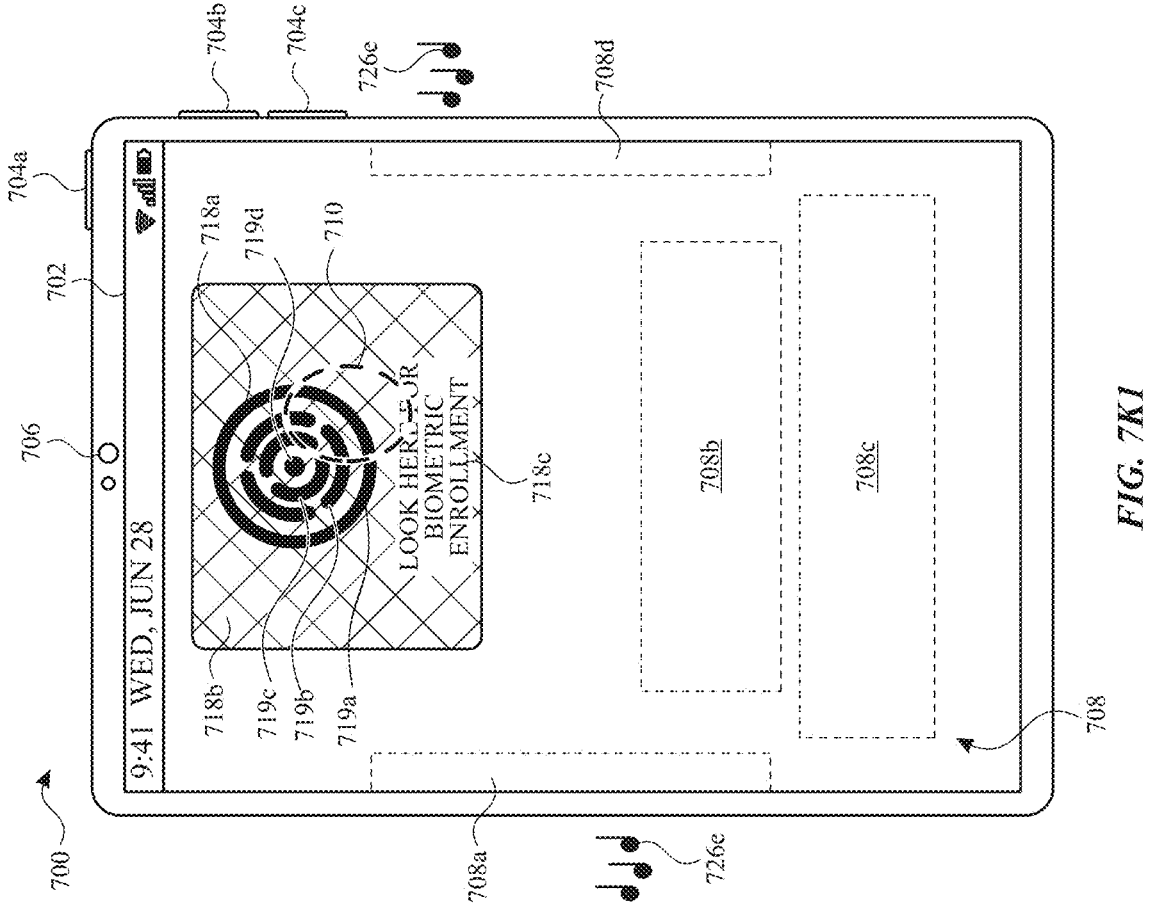
*FIG. 7K1*

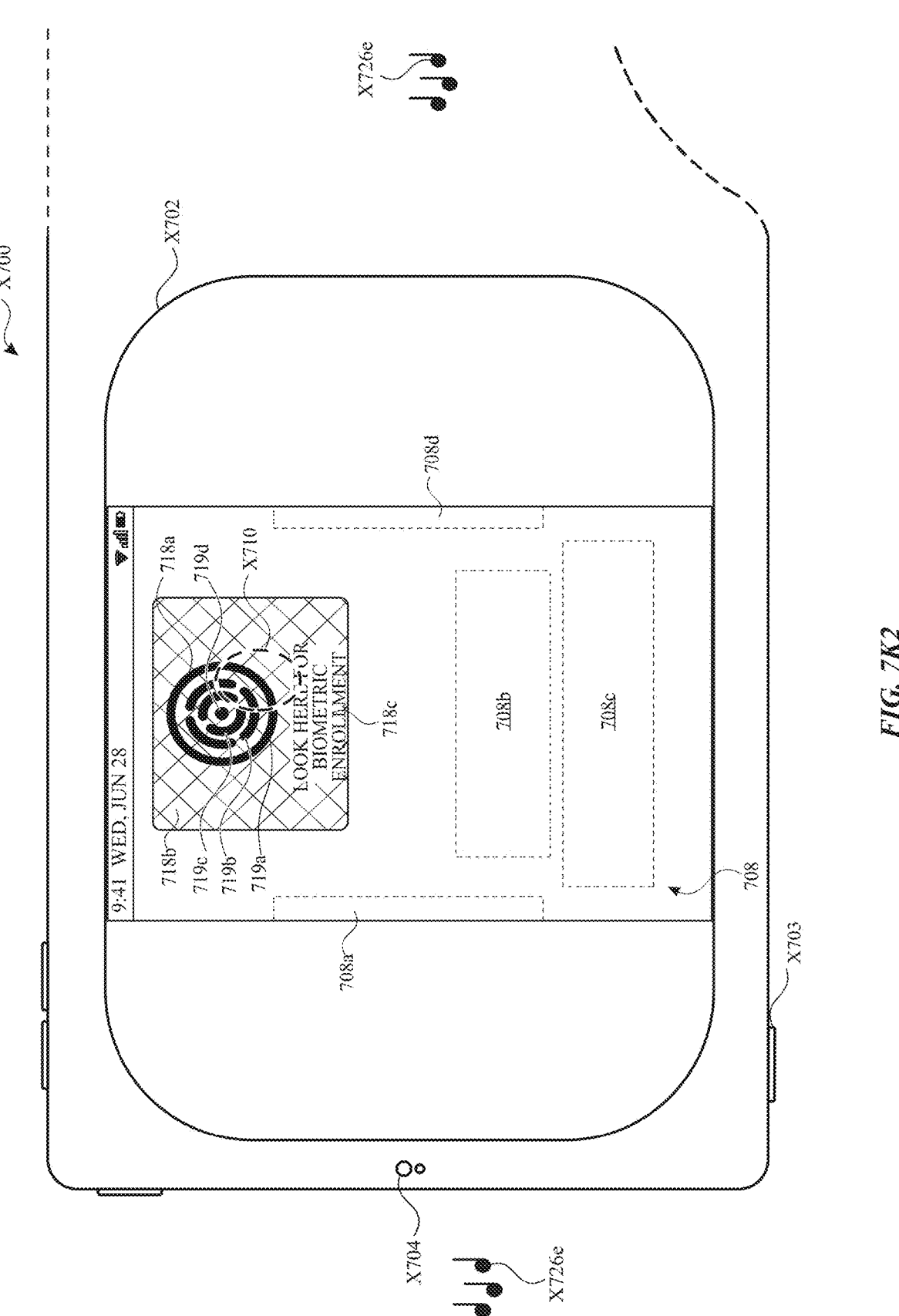
FIG. 7K2

800 ⟍

```
┌─────────────────────────────────────────────────────────────────────┐
│                                 802                                   │
│  Display, via the one or more display generation components, as part  │
│      of enrolling one or more eyes of a person, a first user          │
│                        interface object.                             │
└─────────────────────────────────────────────────────────────────────┘
                                    │
                                    ▼
┌─────────────────────────────────────────────────────────────────────┐
│                                 804                                   │
│            While displaying the first user interface object:          │
│  ┌─────────────────────────────────────────────────────────────────┐ │
│  │                             806                                   │ │
│  │   Detect, via the one or more input devices, a gaze of the one    │ │
│  │                       or more eyes.                               │ │
│  └─────────────────────────────────────────────────────────────────┘ │
└─────────────────────────────────────────────────────────────────────┘
                                    │
                                    ▼
┌─────────────────────────────────────────────────────────────────────┐
│                                 808                                   │
│         In response to detecting the gaze of the one or more eyes:    │
│  ┌─────────────────────────────────────────────────────────────────┐ │
│  │                             810                                   │ │
│  │  In accordance with a determination that the gaze of the one or   │ │
│  │        more eyes is moving towards the first user interface       │ │
│  │                           object:                                 │ │
│  │  ┌───────────────────────────────────────────────────────────┐   │ │
│  │  │                         812                               │   │ │
│  │  │                 Output first feedback.                    │   │ │
│  │  └───────────────────────────────────────────────────────────┘   │ │
│  └─────────────────────────────────────────────────────────────────┘ │
│  ┌─────────────────────────────────────────────────────────────────┐ │
│  │                             814                                   │ │
│  │  In accordance with a determination that the gaze of the one or   │ │
│  │       more eyes is moving away from the first user interface      │ │
│  │                           object:                                 │ │
│  │  ┌───────────────────────────────────────────────────────────┐   │ │
│  │  │                         816                               │   │ │
│  │  │   Output second feedback different from the first feedback.│   │ │
│  │  └───────────────────────────────────────────────────────────┘   │ │
│  └─────────────────────────────────────────────────────────────────┘ │
└─────────────────────────────────────────────────────────────────────┘
```

*FIG. 8*

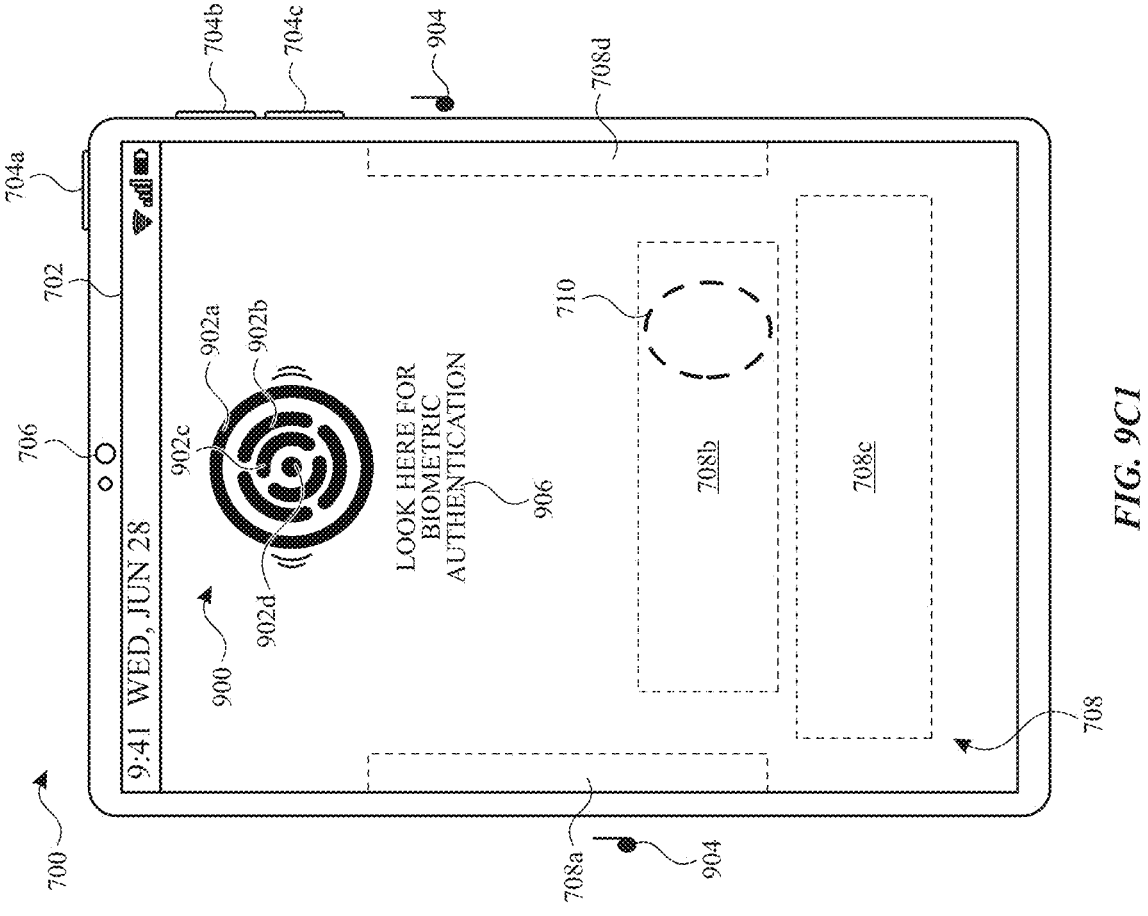
FIG. 9C1

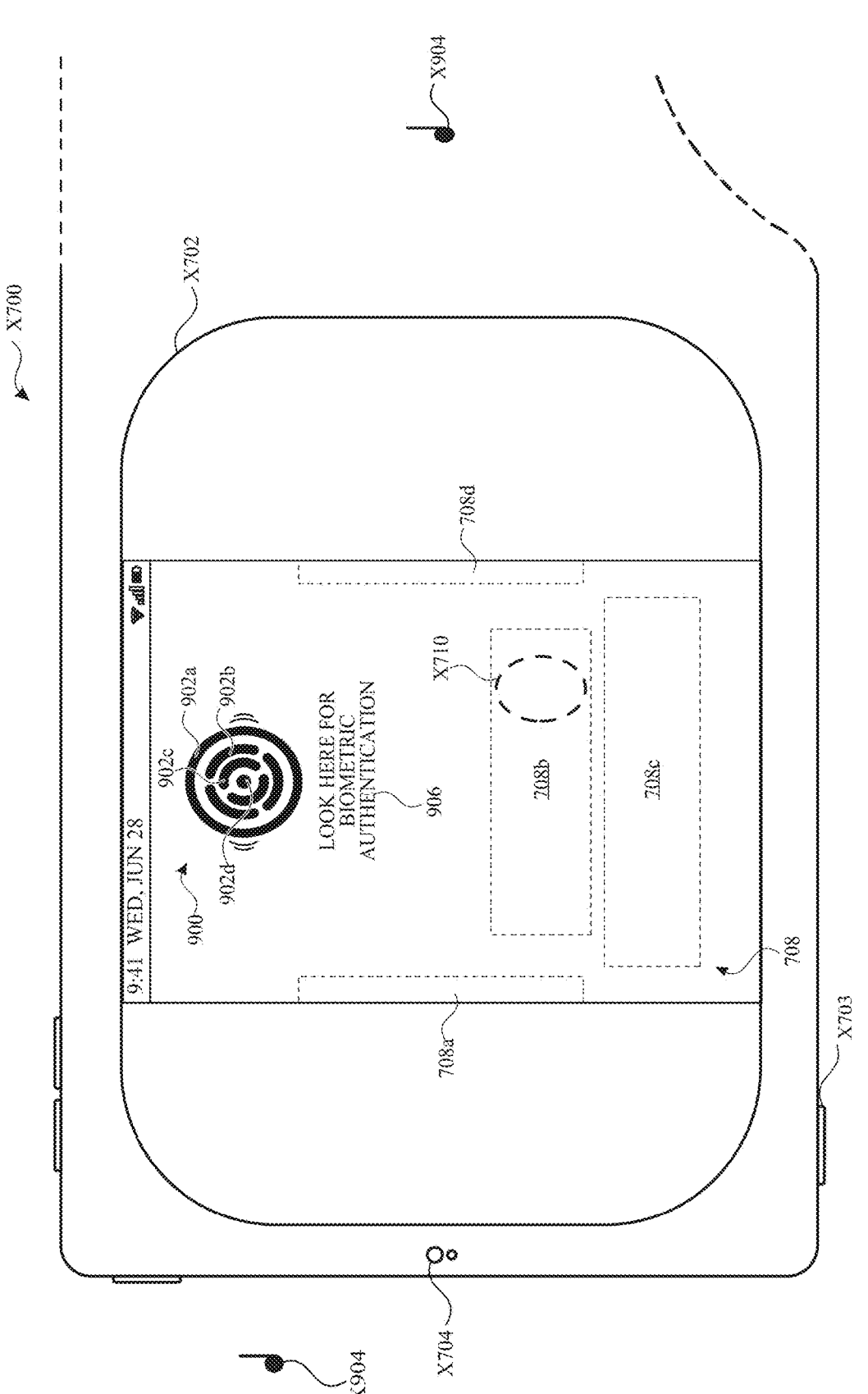
*FIG. 9C2*

Figure 10:
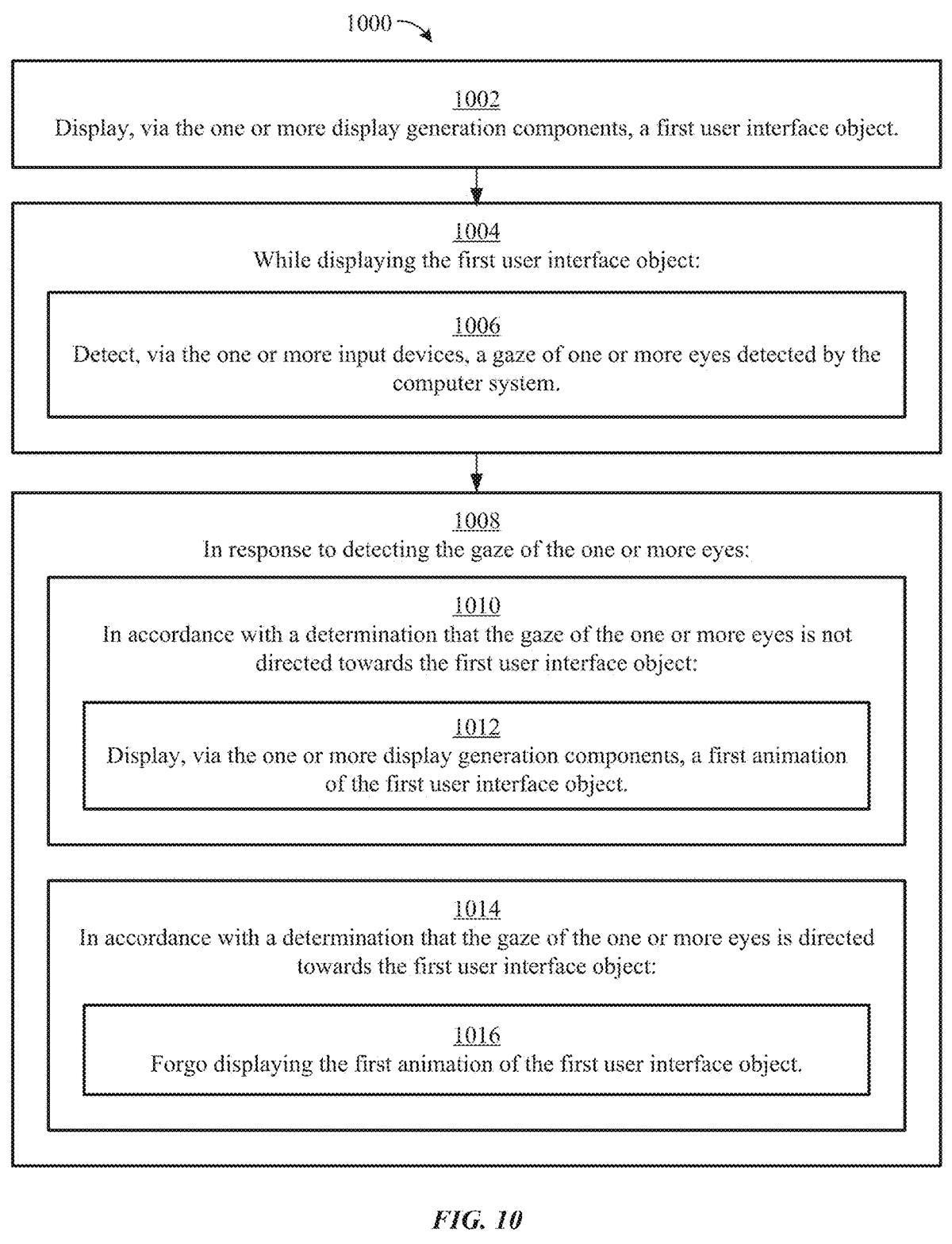

1000 —↘

---

1002
Display, via the one or more display generation components, a first user interface object.

↓

1004
While displaying the first user interface object:

> 1006
> Detect, via the one or more input devices, a gaze of one or more eyes detected by the computer system.

↓

1008
In response to detecting the gaze of the one or more eyes:

> 1010
> In accordance with a determination that the gaze of the one or more eyes is not directed towards the first user interface object:
>
> > 1012
> > Display, via the one or more display generation components, a first animation of the first user interface object.

> 1014
> In accordance with a determination that the gaze of the one or more eyes is directed towards the first user interface object:
>
> > 1016
> > Forgo displaying the first animation of the first user interface object.

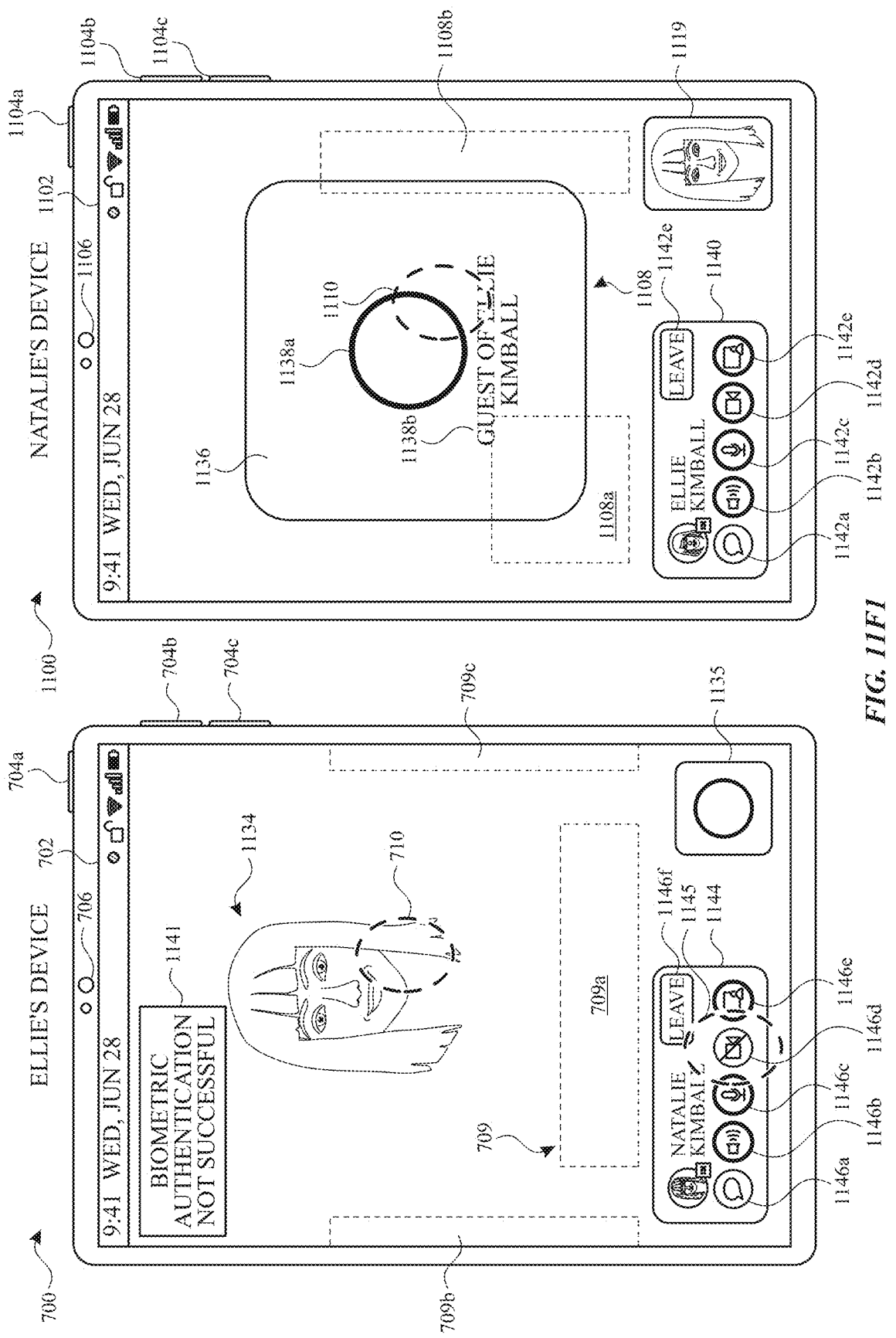
*FIG. 11F1*

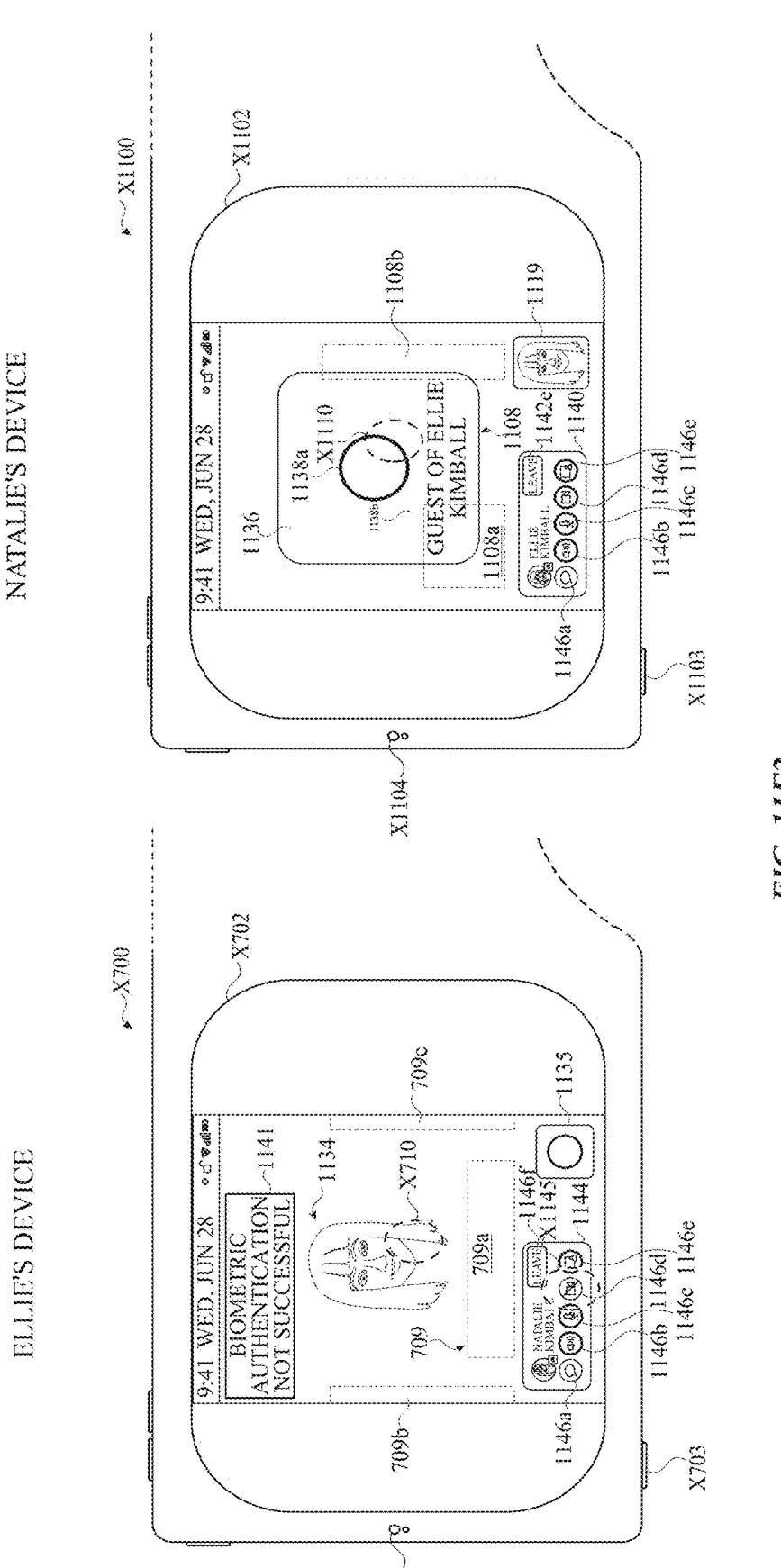
*FIG. 11F2*

1200

---

1202
Detect, via the one or more input devices, a request to use a first virtual representation of a user to represent the user to other people with whom the user is communicating.

---

1204
In response to detecting the request to use the first virtual representation of the user to represent the user to other people with whom the user is communicating:

1206
In accordance with a determination that the user is authenticated on the computer system:

1208
Proceed with using the first virtual representation of the user to represent the user to other people with whom the user is communicating.

1210
In accordance with a determination that the user is not authenticated on the computer system:

1212
Forgo proceeding with using the first virtual representation of the user to represent the user to other people with whom the user is communicating.

*FIG. 12*

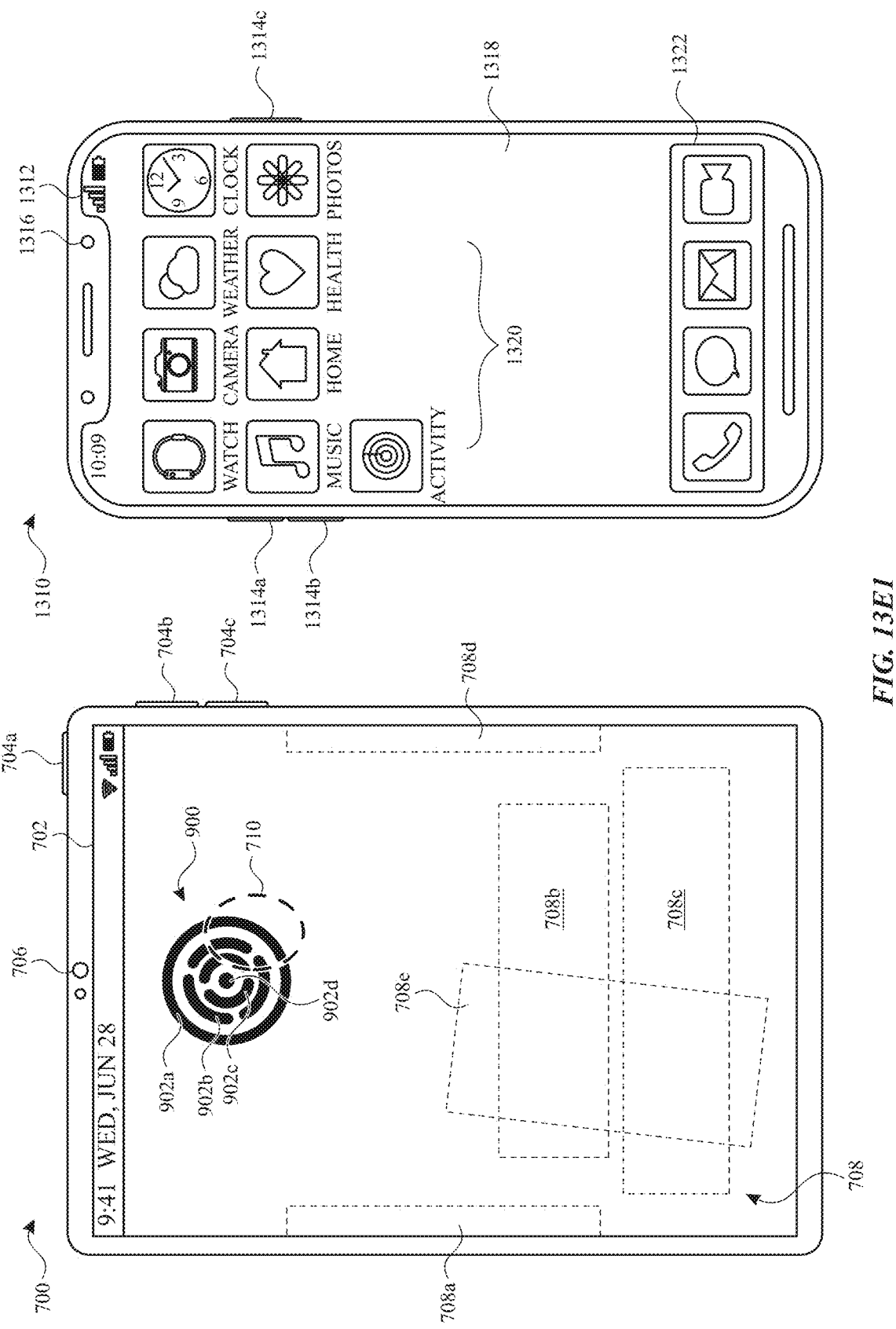
*FIG. 13E1*

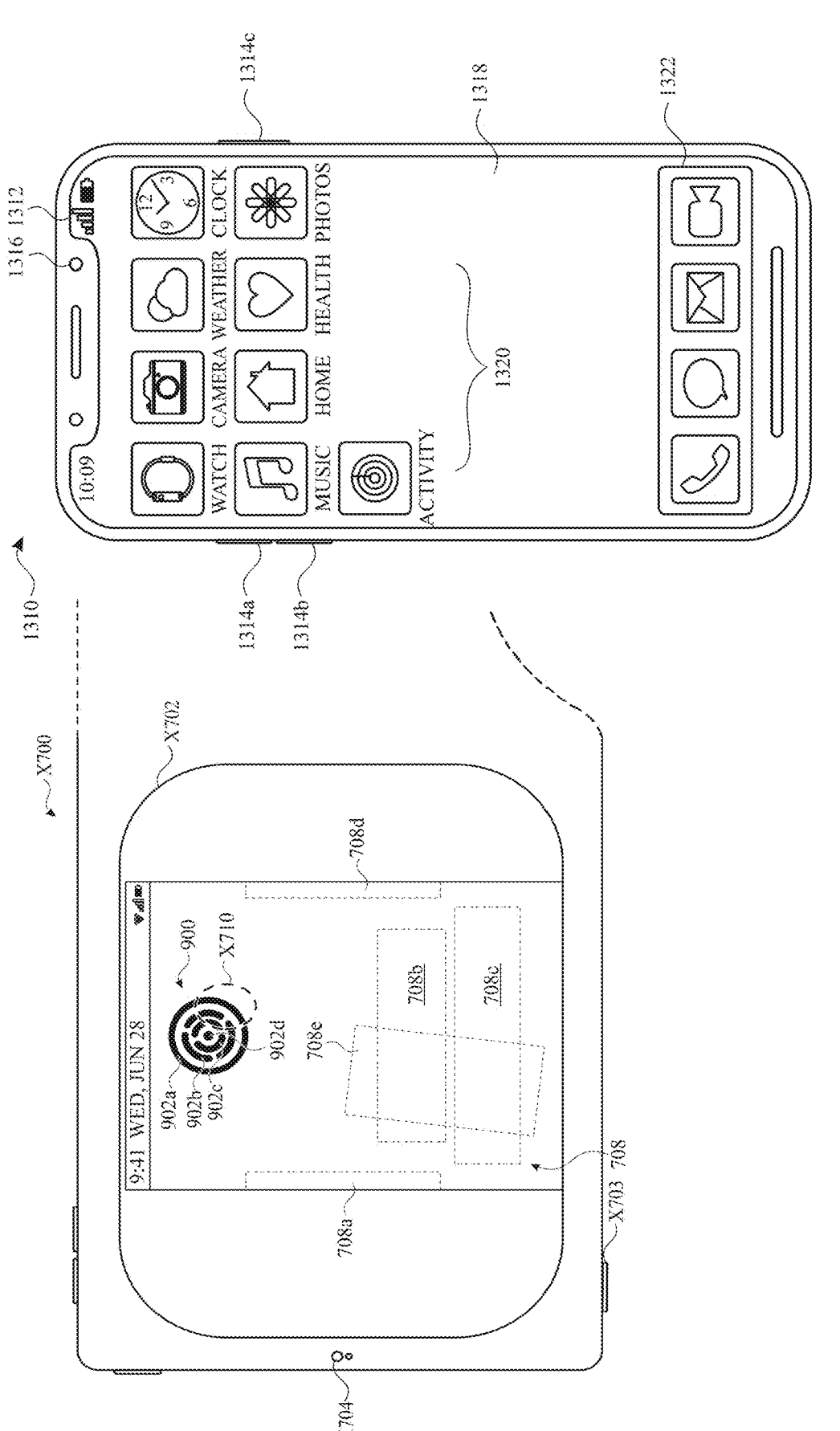
FIG. 13E2

1400

---

1402
While the computer system is in a locked state:

> 1404
> Detect, via the one or more input devices, a request to transition the computer system from the locked state to an unlocked state.

↓

1406
In response to detecting the request to transition the computer system from the locked state to the unlocked state:

> 1408
> In accordance with a determination that the computer system satisfies a first set of criteria related to unlocking and that the computer system has detected a companion device separate from the computer system that satisfies distance threshold criteria relative to the computer system and satisfies unlock criteria:
>
> > 1410
> > Attempt, using the one or more input devices, biometric authentication of the user.

> 1412
> In accordance with a determination that the computer system satisfies the first set of criteria related to unlocking and that the computer system has not detected a companion device separate from the computer system that satisfies both the distance threshold criteria relative to the computer system and the unlock criteria:
>
> > 1414
> > Forgo attempting, using the one or more input devices, biometric authentication of the user.

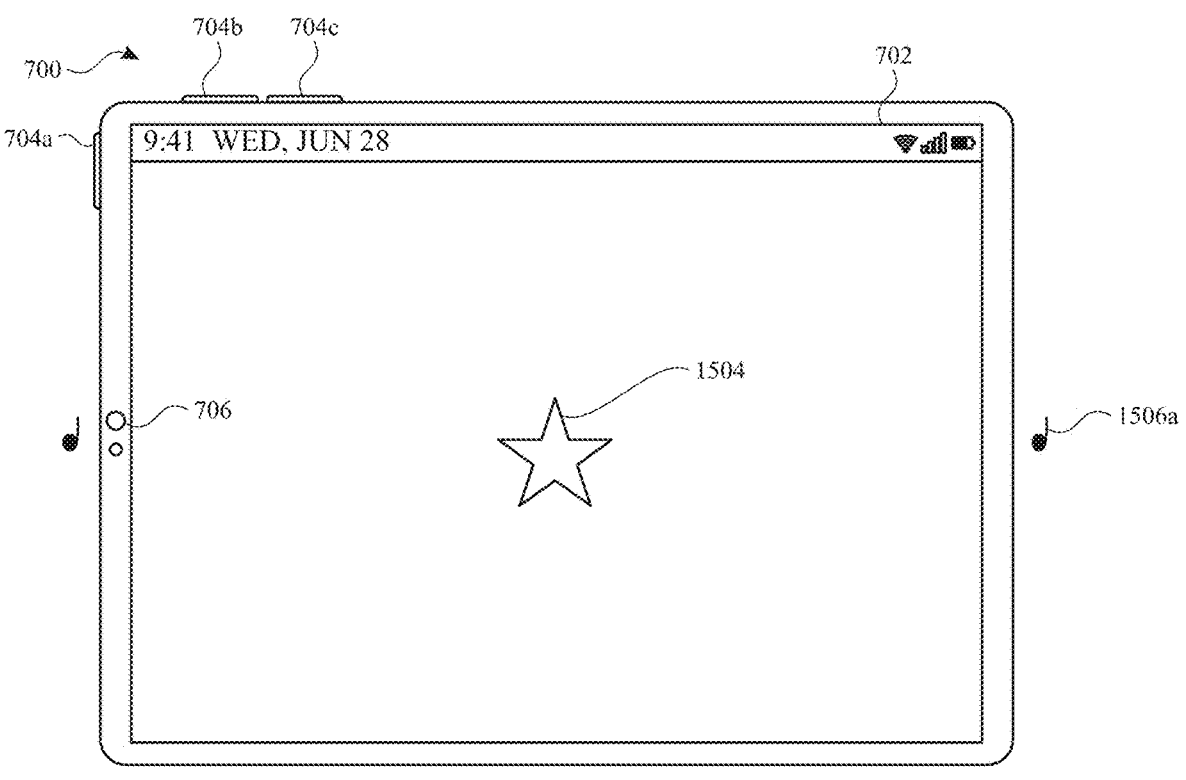
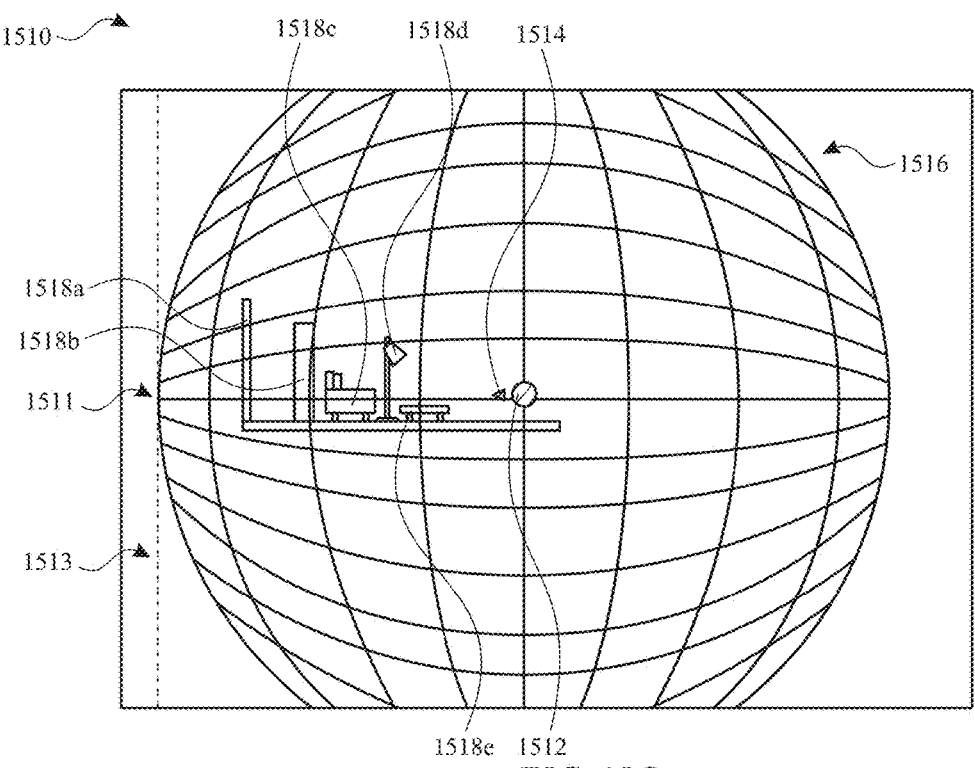
*FIG. 15C*

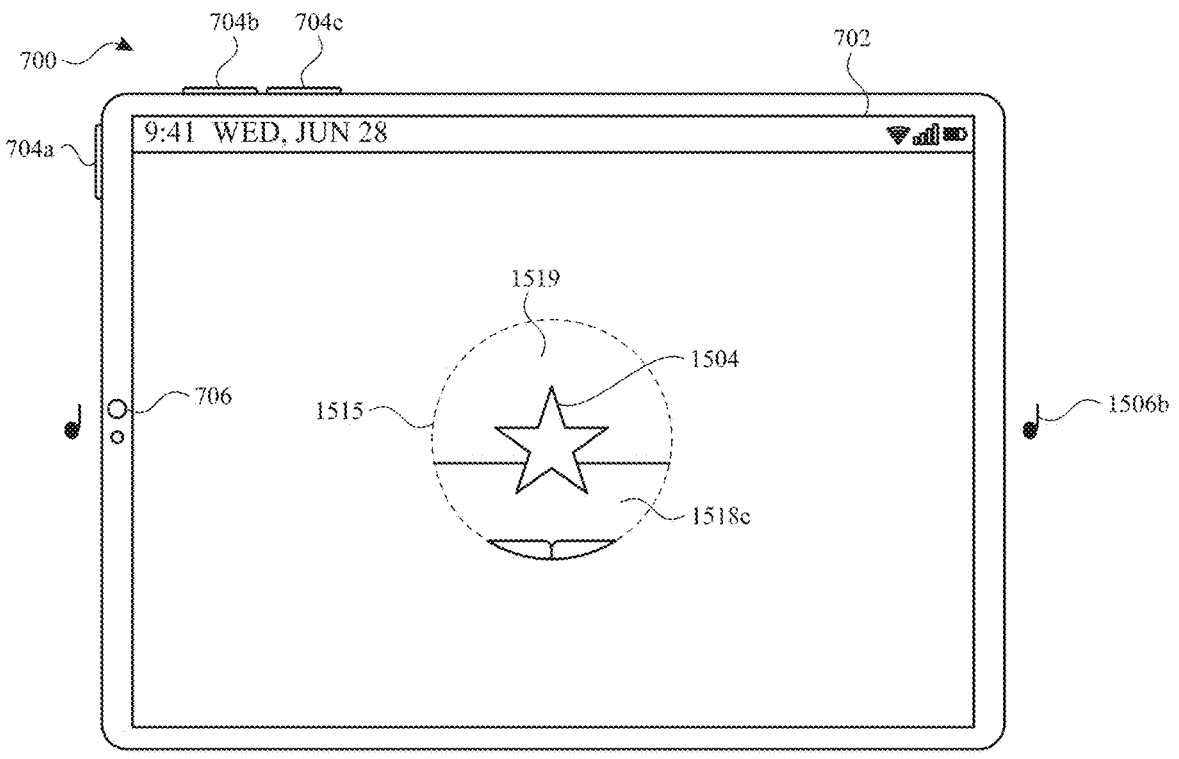
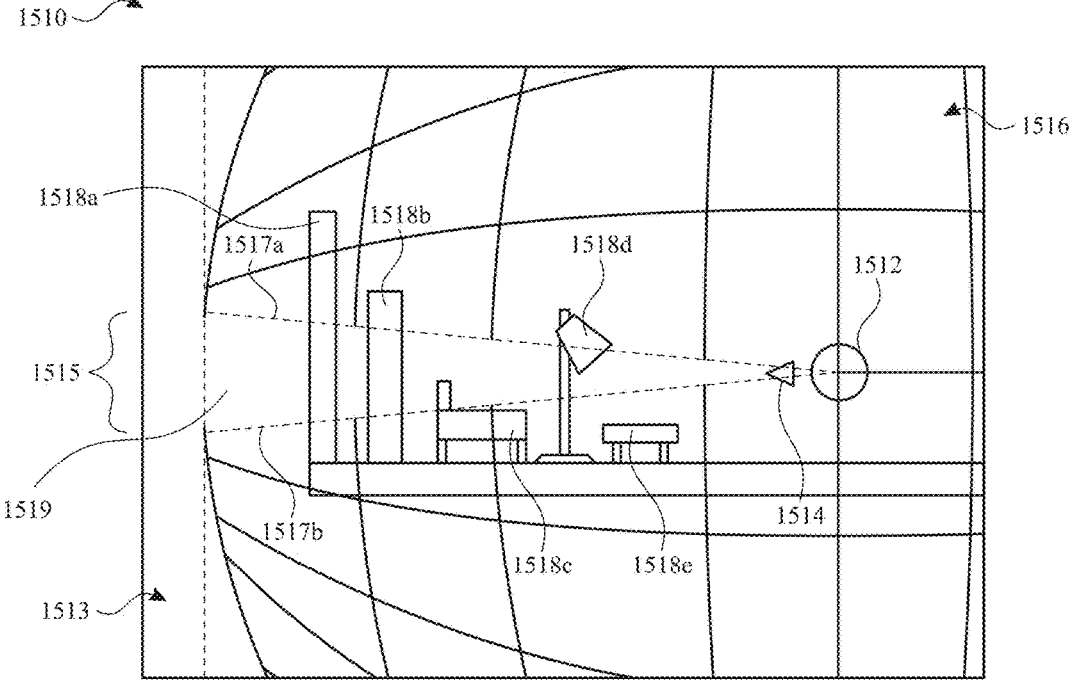
*FIG. 15D1*

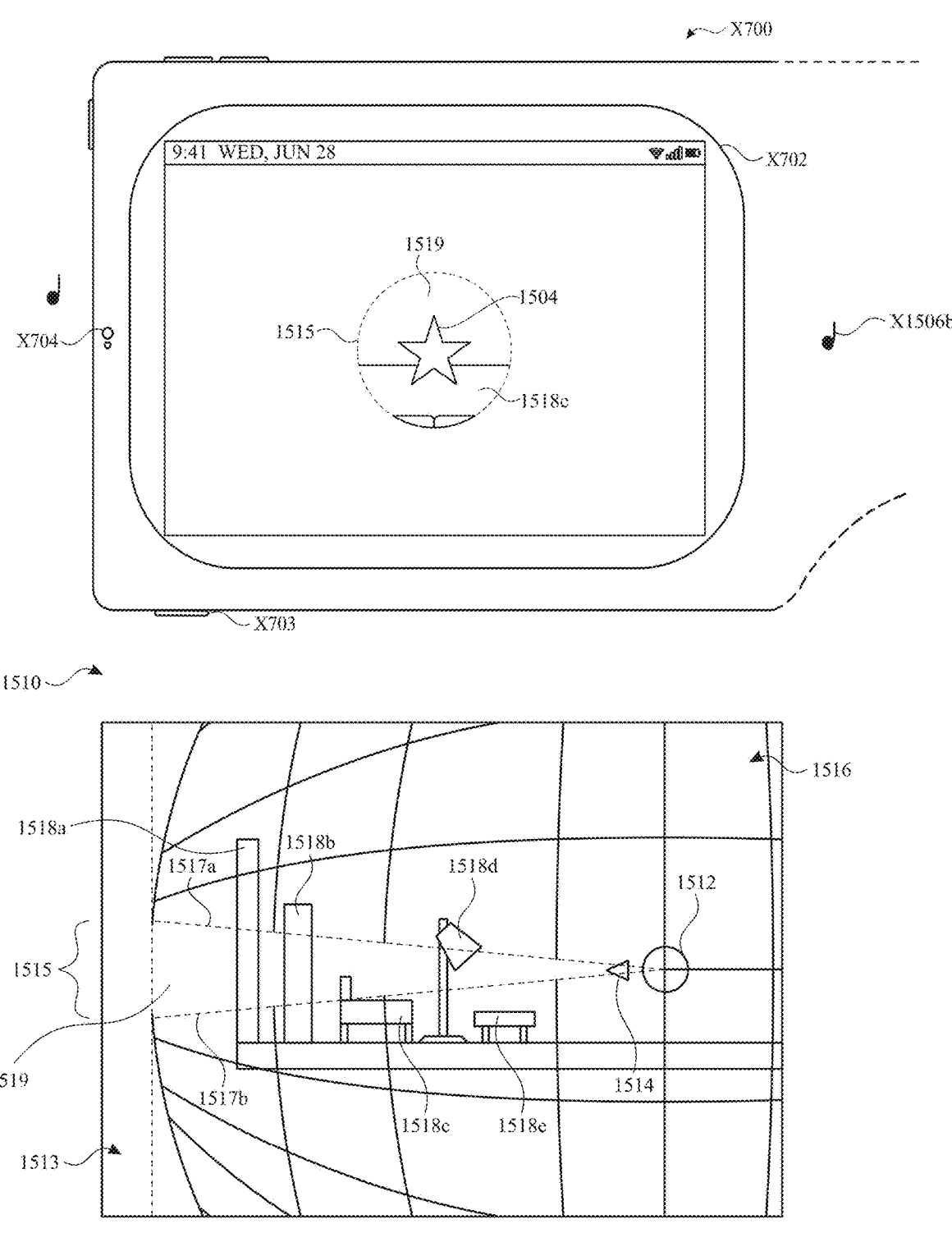
*FIG. 15D2*

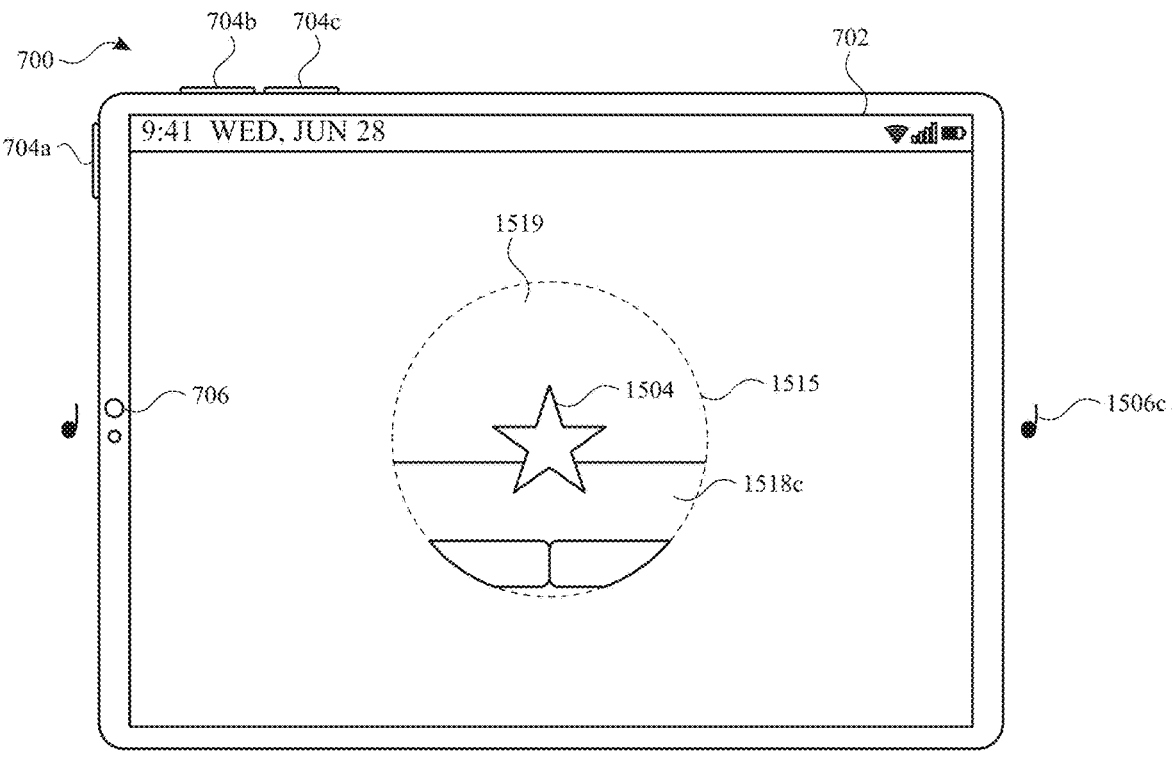
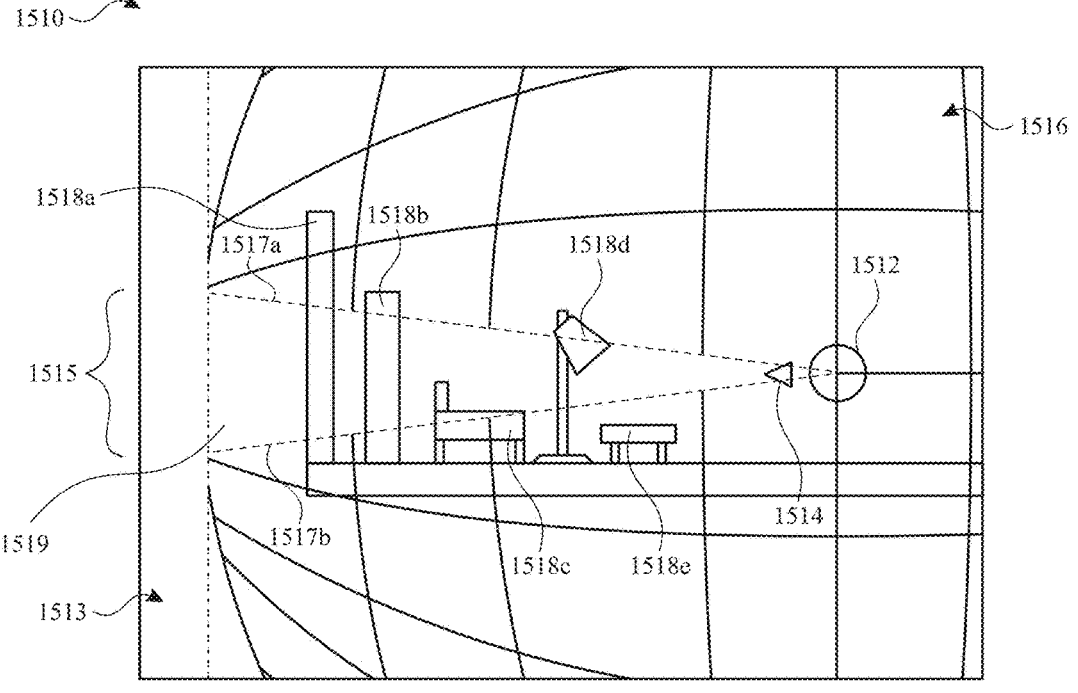
*FIG. 15E*

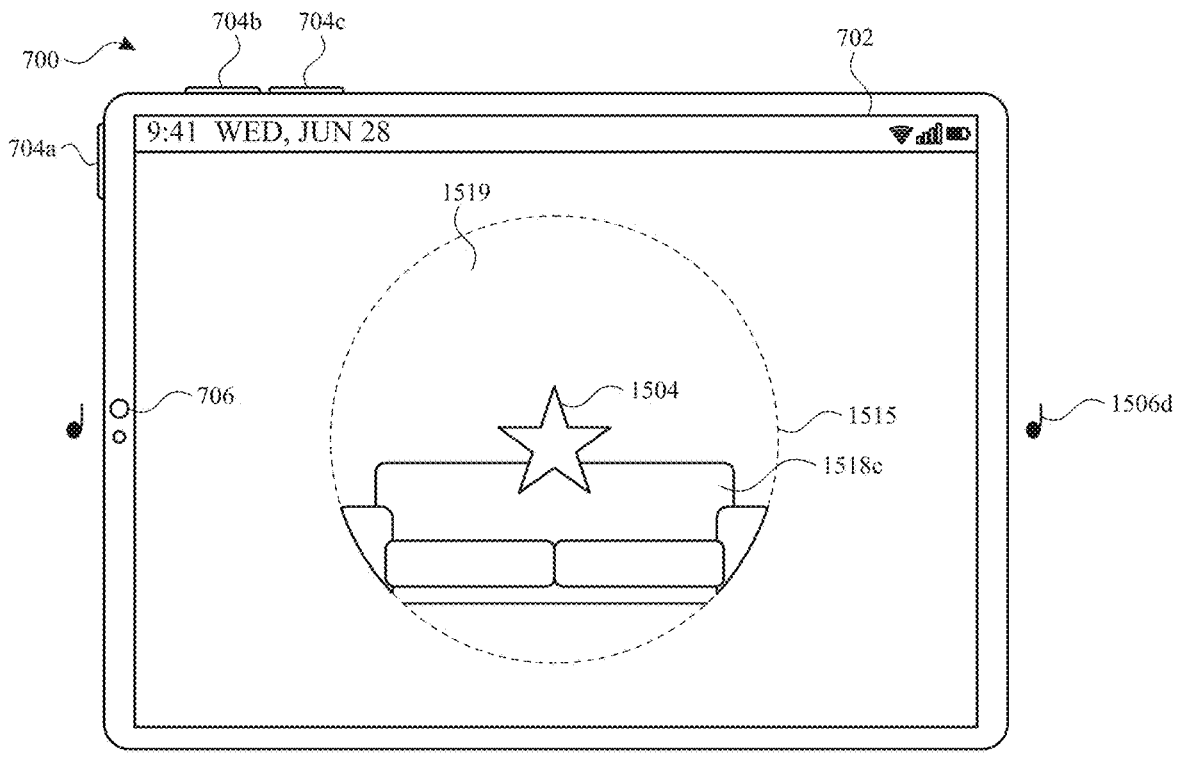
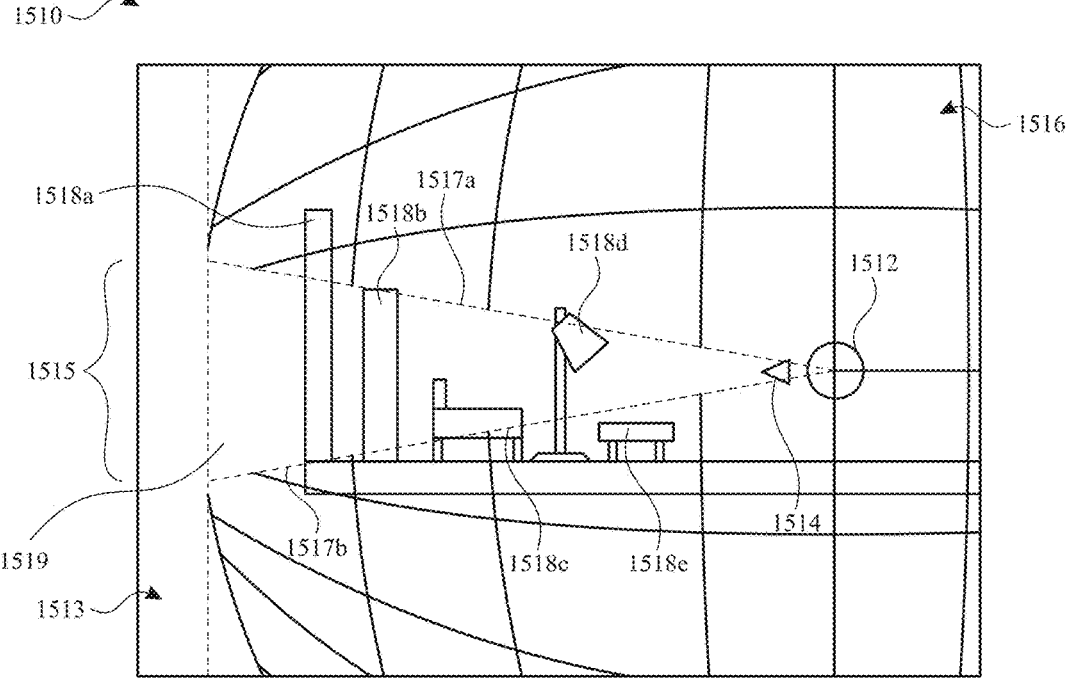
*FIG. 15F*

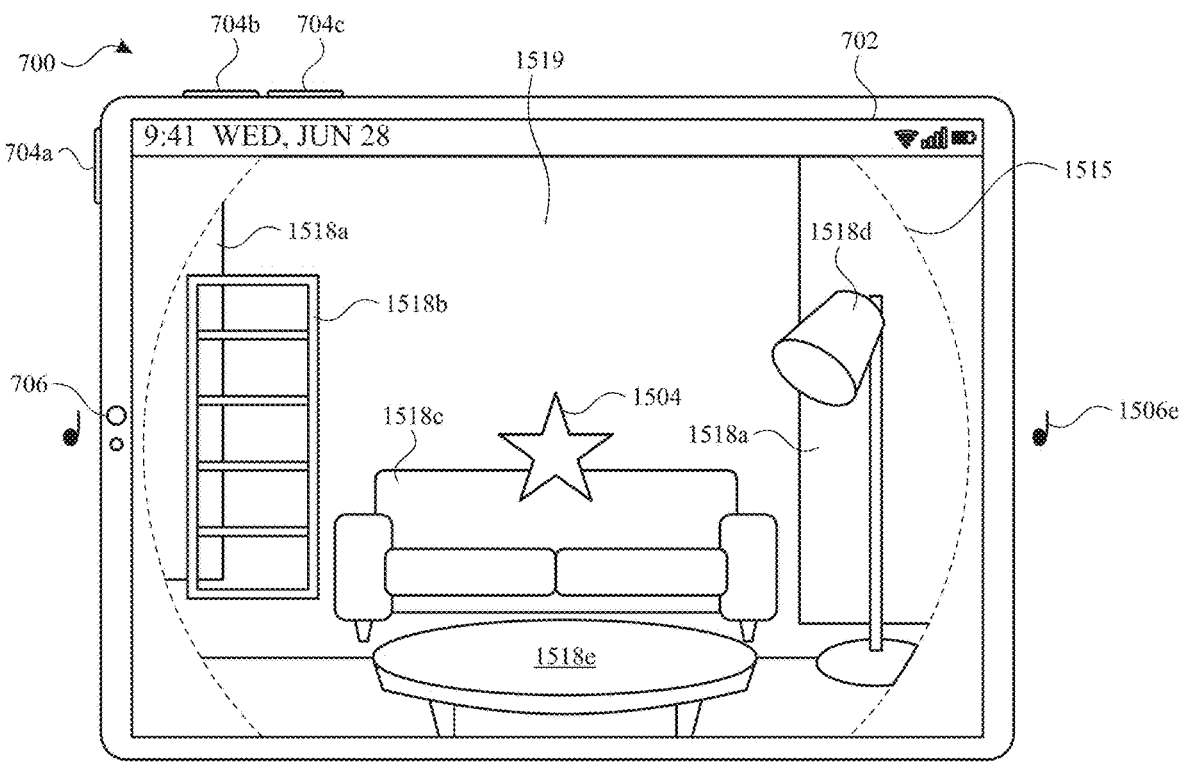
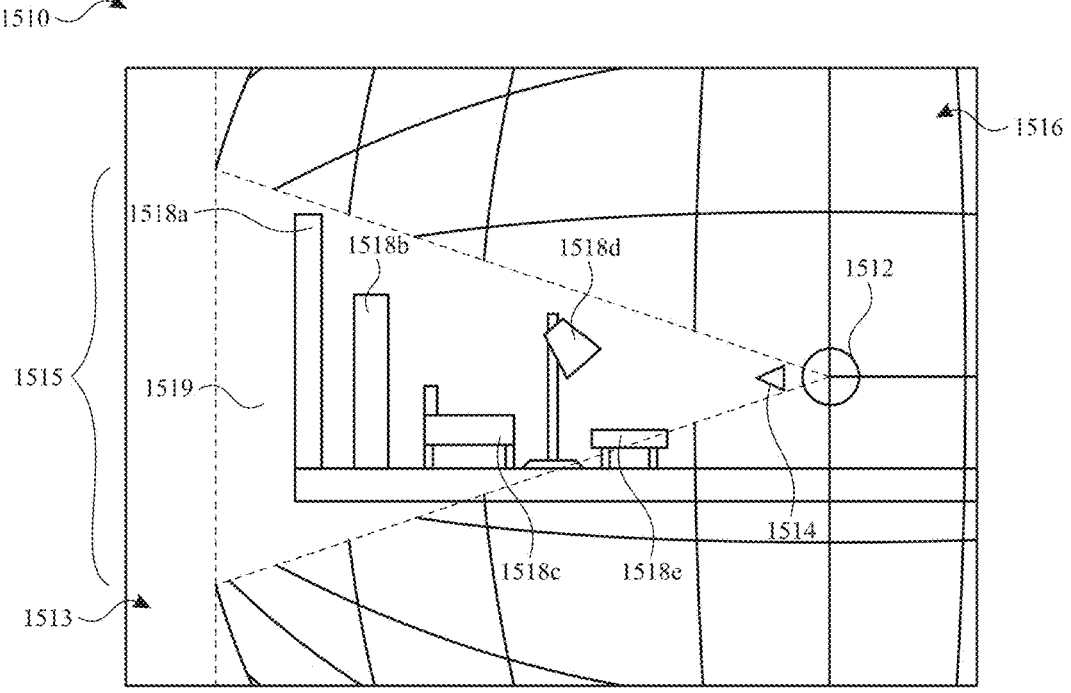
*FIG. 15G*

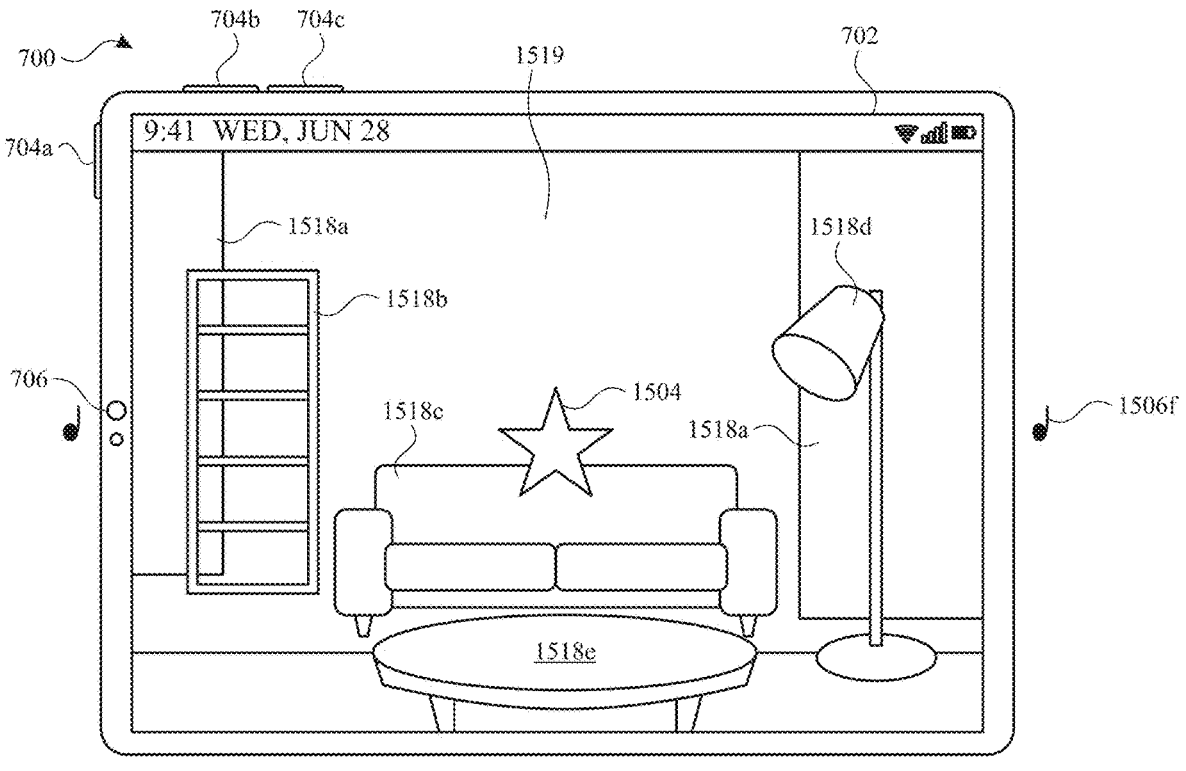
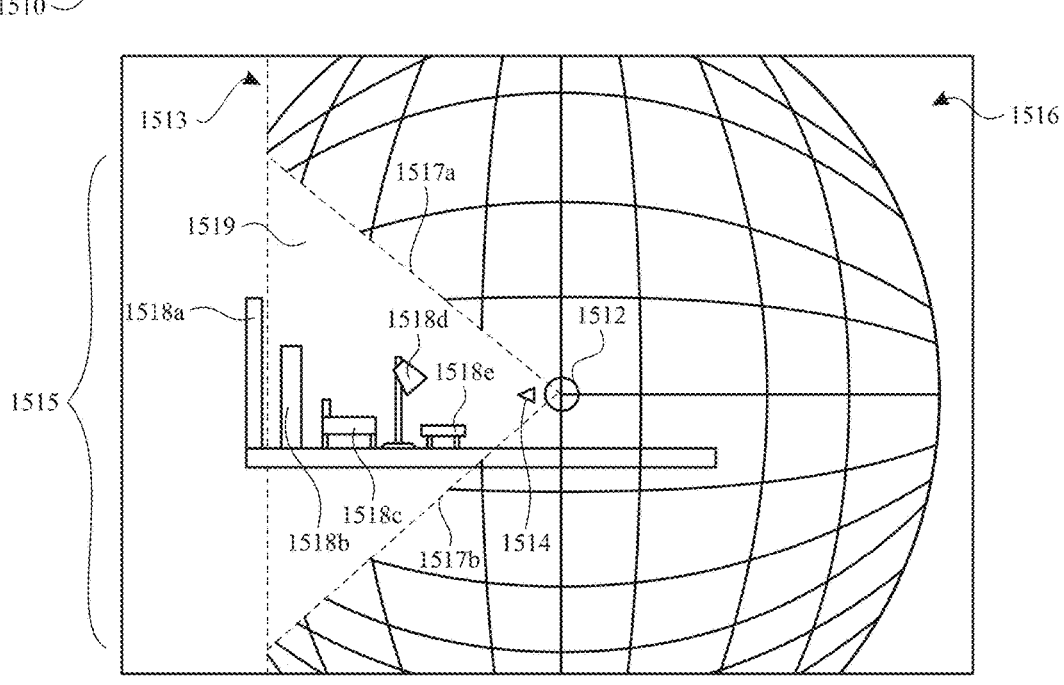
*FIG. 15H*

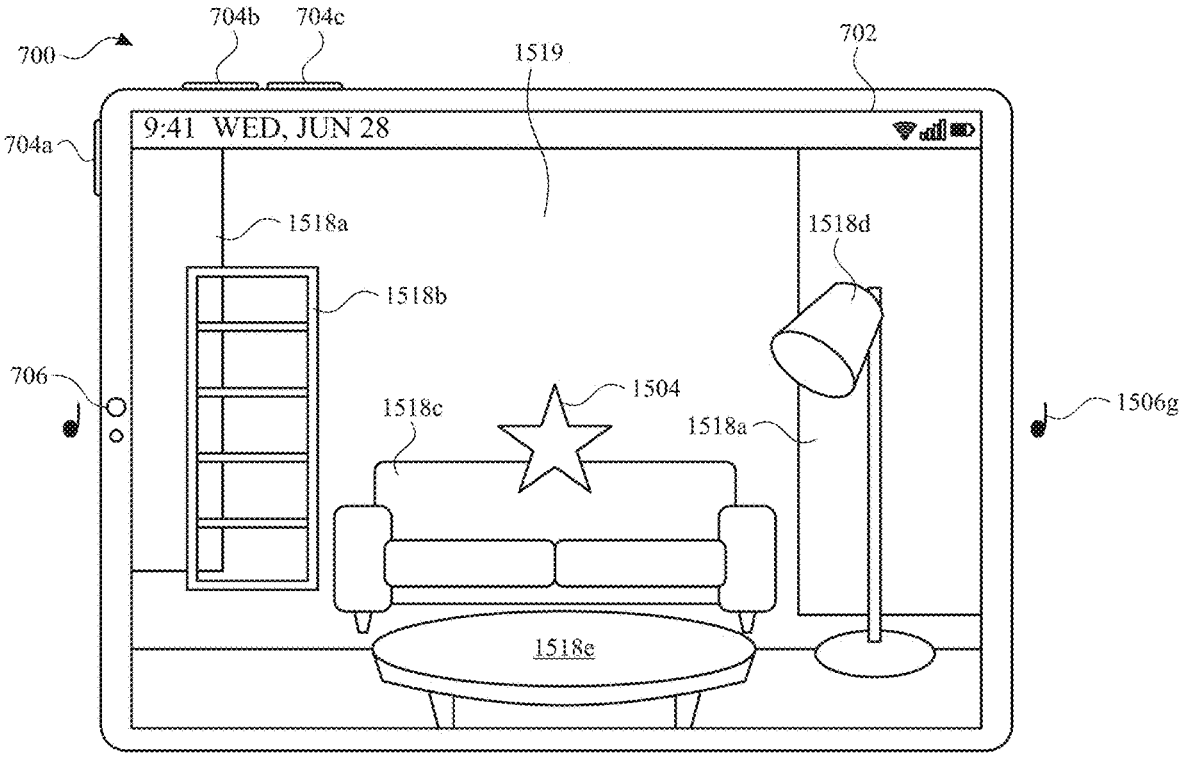
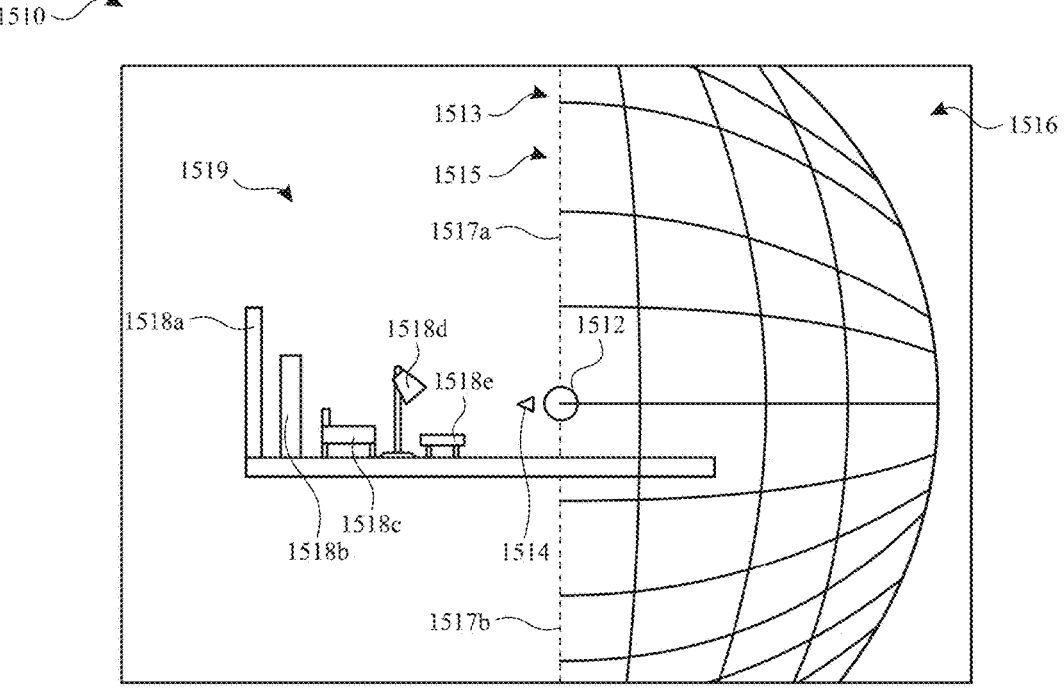
*FIG. 15I*

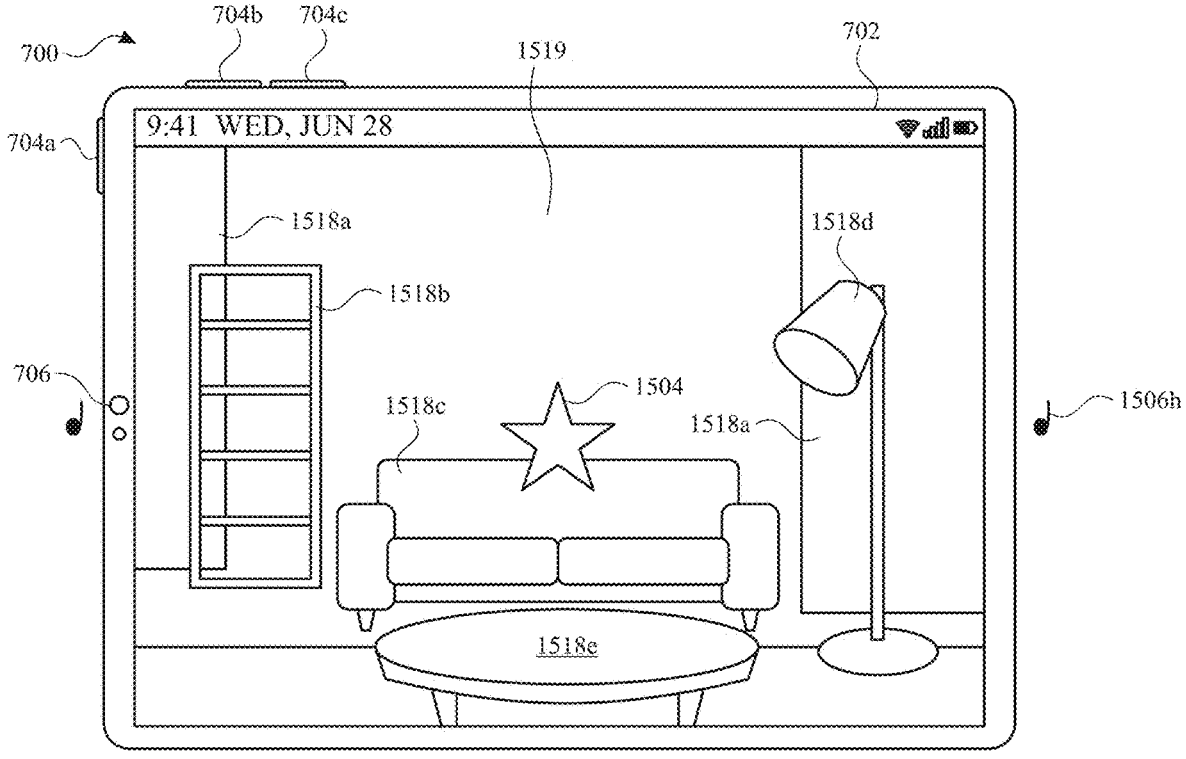
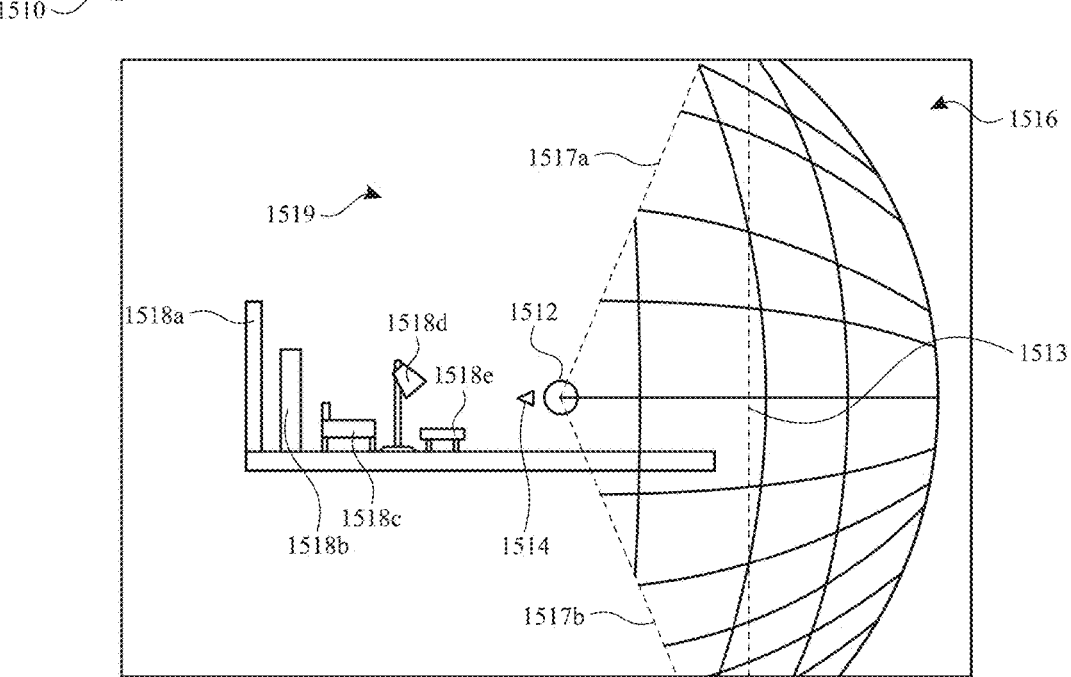
*FIG. 15J*

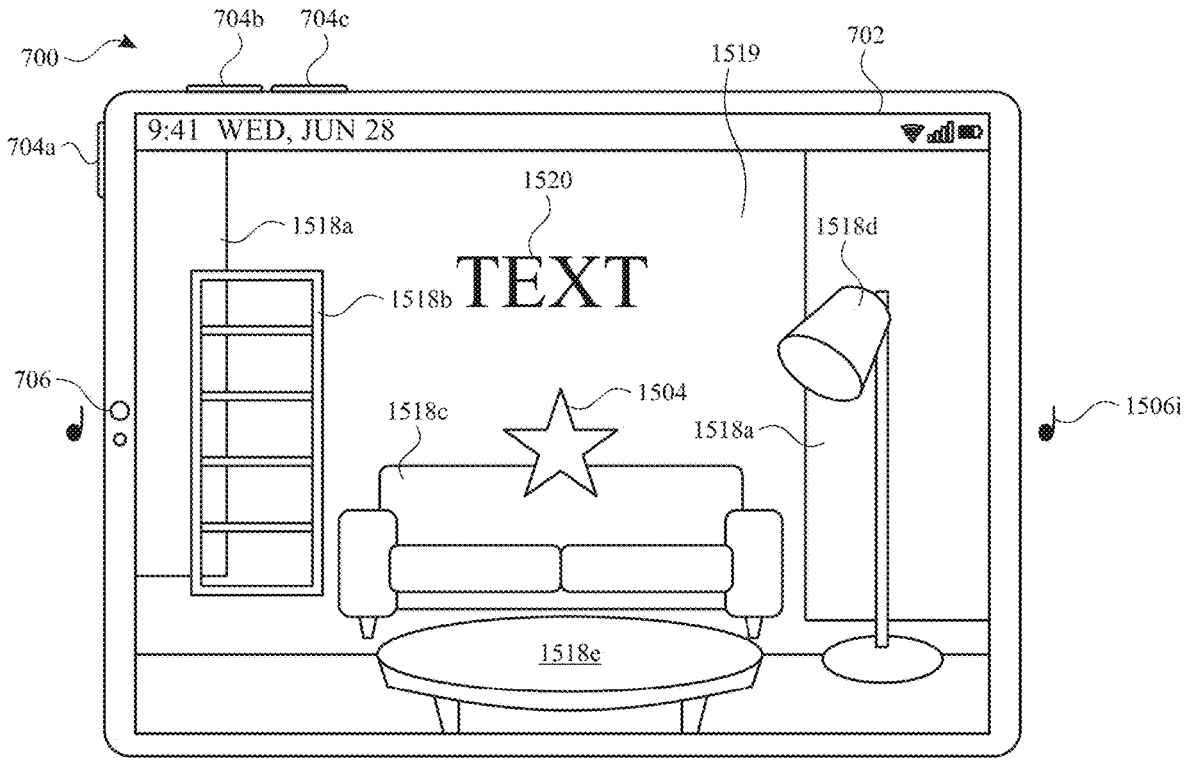
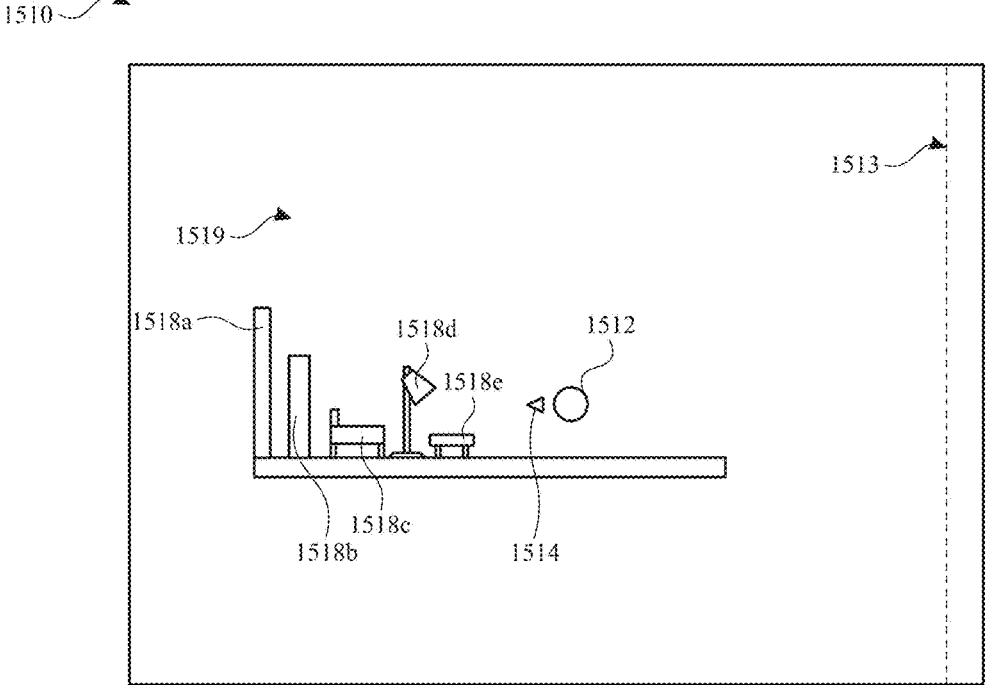
*FIG. 15K*

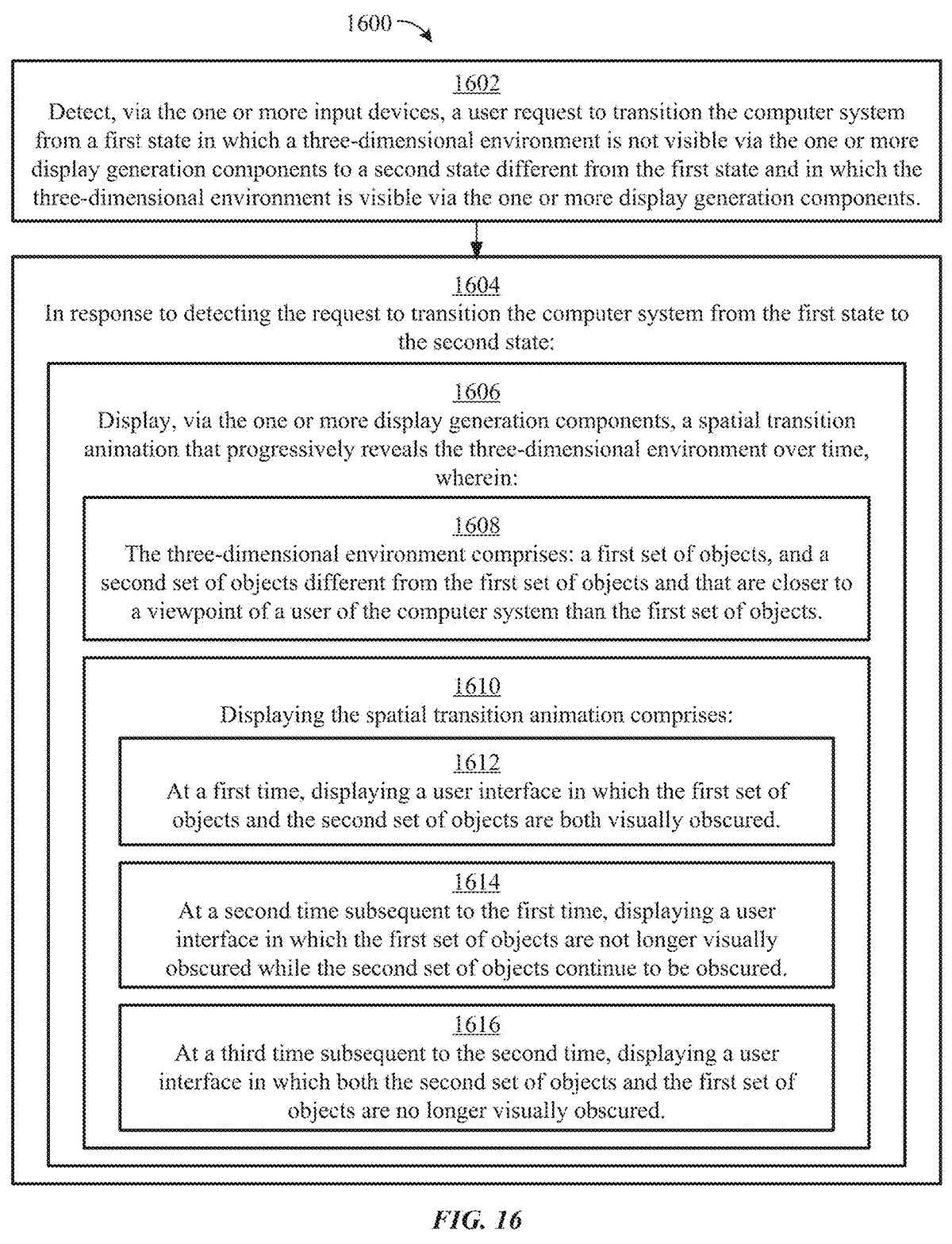

1600 ⟍

1602
Detect, via the one or more input devices, a user request to transition the computer system from a first state in which a three-dimensional environment is not visible via the one or more display generation components to a second state different from the first state and in which the three-dimensional environment is visible via the one or more display generation components.

1604
In response to detecting the request to transition the computer system from the first state to the second state:

1606
Display, via the one or more display generation components, a spatial transition animation that progressively reveals the three-dimensional environment over time, wherein:

1608
The three-dimensional environment comprises: a first set of objects, and a second set of objects different from the first set of objects and that are closer to a viewpoint of a user of the computer system than the first set of objects.

1610
Displaying the spatial transition animation comprises:

1612
At a first time, displaying a user interface in which the first set of objects and the second set of objects are both visually obscured.

1614
At a second time subsequent to the first time, displaying a user interface in which the first set of objects are not longer visually obscured while the second set of objects continue to be obscured.

1616
At a third time subsequent to the second time, displaying a user interface in which both the second set of objects and the first set of objects are no longer visually obscured.

*FIG. 16*

DEVICES, METHODS, AND GRAPHICAL USER INTERFACES FOR USER ENROLLMENT AND AUTHENTICATION

CROSS-REFERENCE TO RELATED APPLICATIONS

This application claims priority to U.S. Provisional Application Ser. No. 63/470,552, entitled "DEVICES, METHODS, AND GRAPHICAL USER INTERFACES FOR USER ENROLLMENT AND AUTHENTICATION," filed Jun. 2, 2023; and claims priority to U.S. Provisional Application Ser. No. 63/460,838, entitled "DEVICES, METHODS, AND GRAPHICAL USER INTERFACES FOR USER ENROLLMENT AND AUTHENTICATION," filed Apr. 20, 2023. The contents of each application are hereby incorporated by reference in their entirety.

TECHNICAL FIELD

The present disclosure relates generally to computer systems that are in communication with a display generation component and, optionally, one or more input devices that provide computer-generated experiences, including, but not limited to, electronic devices that provide virtual reality and mixed reality experiences via a display.

BACKGROUND

The development of computer systems for augmented reality has increased significantly in recent years. Example augmented reality environments include at least some virtual elements that replace or augment the physical world. Input devices, such as cameras, controllers, joysticks, touch-sensitive surfaces, and touch-screen displays for computer systems and other electronic computing devices are used to interact with virtual/augmented reality environments. Example virtual elements include virtual objects, such as digital images, video, text, icons, and control elements such as buttons and other graphics.

SUMMARY

Some methods and interfaces for interacting with environments that include at least some virtual elements (e.g., applications, augmented reality environments, mixed reality environments, and virtual reality environments) are cumbersome, inefficient, and limited. For example, systems that provide insufficient feedback for performing actions associated with virtual objects, systems that require a series of inputs to achieve a desired outcome in an augmented reality environment, and systems in which manipulation of virtual objects are complex, tedious, and error-prone, create a significant cognitive burden on a user, and detract from the experience with the virtual/augmented reality environment. In addition, these methods take longer than necessary, thereby wasting energy of the computer system. This latter consideration is particularly important in battery-operated devices.

Accordingly, there is a need for computer systems with improved methods and interfaces for providing computer-generated experiences to users that make interaction with the computer systems more efficient and intuitive for a user. Such methods and interfaces optionally complement or replace conventional methods for providing extended reality experiences to users. Such methods and interfaces reduce the number, extent, and/or nature of the inputs from a user by helping the user to understand the connection between provided inputs and device responses to the inputs, thereby creating a more efficient human-machine interface.

The above deficiencies and other problems associated with user interfaces for computer systems are reduced or eliminated by the disclosed systems. In some embodiments, the computer system is a desktop computer with an associated display. In some embodiments, the computer system is portable device (e.g., a notebook computer, tablet computer, or handheld device). In some embodiments, the computer system is a personal electronic device (e.g., a wearable electronic device, such as a watch, or a head-mounted device). In some embodiments, the computer system has a touchpad. In some embodiments, the computer system has one or more cameras. In some embodiments, the computer system has a touch-sensitive display (also known as a "touch screen" or "touch-screen display"). In some embodiments, the computer system has one or more eye-tracking components. In some embodiments, the computer system has one or more hand-tracking components. In some embodiments, the computer system has one or more output devices in addition to the display generation component, the output devices including one or more tactile output generators and/or one or more audio output devices. In some embodiments, the computer system has a graphical user interface (GUI), one or more processors, memory and one or more modules, programs or sets of instructions stored in the memory for performing multiple functions. In some embodiments, the user interacts with the GUI through a stylus and/or finger contacts and gestures on the touch-sensitive surface, movement of the user's eyes and hand in space relative to the GUI (and/or computer system) or the user's body as captured by cameras and other movement sensors, and/or voice inputs as captured by one or more audio input devices. In some embodiments, the functions performed through the interactions optionally include image editing, drawing, presenting, word processing, spreadsheet making, game playing, telephoning, video conferencing, e-mailing, instant messaging, workout support, digital photographing, digital videoing, web browsing, digital music playing, note taking, and/or digital video playing. Executable instructions for performing these functions are, optionally, included in a transitory and/or non-transitory computer readable storage medium or other computer program product configured for execution by one or more processors.

There is a need for electronic devices with improved methods and interfaces for interacting with a three-dimensional environment. Such methods and interfaces may complement or replace conventional methods for interacting with a three-dimensional environment. Such methods and interfaces reduce the number, extent, and/or the nature of the inputs from a user and produce a more efficient human-machine interface. For battery-operated computing devices, such methods and interfaces conserve power and increase the time between battery charges. Furthermore, such methods and interfaces improve device security by ensuring that unauthorized users are not able to access sensitive and/or private information.

In some embodiments, a computer system displays a set of controls associated with controlling playback of media content (e.g., transport controls and/or other types of controls) in response to detecting a gaze and/or gesture of the user. In some embodiments, the computer system initially displays a first set of controls in a reduced-prominence state (e.g., with reduced visual prominence) in response to detecting a first input, and then displays a second set of controls (which optionally includes additional controls) in an increased-prominence state in response to detecting a second input. In this manner, the computer system optionally provides feedback to the user that they have begun to invoke display of the controls without unduly distracting the user from the content (e.g., by initially displaying controls in a less visually prominent manner), and then, based on detecting a user input indicating that the user wishes to further interact with the controls, displaying the controls in a more visually prominent manner to allow for easier and more-accurate interactions with the computer system.

In accordance with some embodiments, a method is described. The method comprises: at a computer system that is in communication with one or more display generation components and one or more input devices: displaying, via the one or more display generation components, as part of enrolling one or more eyes of a person, a first user interface object; while displaying the first user interface object, detecting, via the one or more input devices, a gaze of the one or more eyes; and in response to detecting the gaze of the one or more eyes: in accordance with a determination that the gaze of the one or more eyes is moving towards the first user interface object, outputting first feedback; and in accordance with a determination that the gaze of the one or more eyes is moving away from the first user interface object, outputting second feedback different from the first feedback.

In accordance with some embodiments, a non-transitory computer-readable storage medium is described. The non-transitory computer-readable storage medium stores one or more programs configured to be executed by one or more processors of a computer system that is in communication with one or more display generation components and one or more input devices, the one or more programs including instructions for: displaying, via the one or more display generation components, as part of enrolling one or more eyes of a person, a first user interface object; while displaying the first user interface object, detecting, via the one or more input devices, a gaze of the one or more eyes; and in response to detecting the gaze of the one or more eyes: in accordance with a determination that the gaze of the one or more eyes is moving towards the first user interface object, outputting first feedback; and in accordance with a determination that the gaze of the one or more eyes is moving away from the first user interface object, outputting second feedback different from the first feedback.

In accordance with some embodiments, a transitory computer-readable storage medium is described. The transitory computer-readable storage medium stores one or more programs configured to be executed by one or more processors of a computer system that is in communication with one or more display generation components and one or more input devices, the one or more programs including instructions for: displaying, via the one or more display generation components, as part of enrolling one or more eyes of a person, a first user interface object; while displaying the first user interface object, detecting, via the one or more input devices, a gaze of the one or more eyes; and in response to detecting the gaze of the one or more eyes: in accordance with a determination that the gaze of the one or more eyes is moving towards the first user interface object, outputting first feedback; and in accordance with a determination that the gaze of the one or more eyes is moving away from the first user interface object, outputting second feedback different from the first feedback.

In accordance with some embodiments, a computer system is described. The computer system is configured to communicate with one or more display generation components and one or more input devices, and comprises: one or more processors; and memory storing one or more programs configured to be executed by one or more processors, the one or more programs including instructions for: displaying, via the one or more display generation components, as part of enrolling one or more eyes of a person, a first user interface object; while displaying the first user interface object, detecting, via the one or more input devices, a gaze of the one or more eyes; and in response to detecting the gaze of the one or more eyes: in accordance with a determination that the gaze of the one or more eyes is moving towards the first user interface object, outputting first feedback; and in accordance with a determination that the gaze of the one or more eyes is moving away from the first user interface object, outputting second feedback different from the first feedback.

In accordance with some embodiments, a computer system is described. The computer system is configured to communicate with one or more display generation components and one or more input devices, and comprises: means for displaying, via the one or more display generation components, as part of enrolling one or more eyes of a person, a first user interface object; means for, while displaying the first user interface object, detecting, via the one or more input devices, a gaze of the one or more eyes; and means for, in response to detecting the gaze of the one or more eyes: in accordance with a determination that the gaze of the one or more eyes is moving towards the first user interface object, outputting first feedback; and in accordance with a determination that the gaze of the one or more eyes is moving away from the first user interface object, outputting second feedback different from the first feedback.

In accordance with some embodiments, a computer program product is described. The computer program comprises one or more programs configured to be executed by one or more processors of a computer system that is in communication with one or more display generation components and one or more input devices, the one or more programs including instructions for: displaying, via the one or more display generation components, as part of enrolling one or more eyes of a person, a first user interface object; while displaying the first user interface object, detecting, via the one or more input devices, a gaze of the one or more eyes; and in response to detecting the gaze of the one or more eyes: in accordance with a determination that the gaze of the one or more eyes is moving towards the first user interface object, outputting first feedback; and in accordance with a determination that the gaze of the one or more eyes is moving away from the first user interface object, outputting second feedback different from the first feedback.

In accordance with some embodiments, a method is described. The method comprises: at a computer system that is in communication with one or more display generation components and one or more input devices: displaying, via the one or more display generation components, a first user interface object; while displaying the first user interface object, detecting, via the one or more input devices, a gaze of one or more eyes detected by the computer system; and in response to detecting the gaze of the one or more eyes: in accordance with a determination that the gaze of the one or more eyes is not directed towards the first user interface object, displaying, via the one or more display generation components, a first animation of the first user interface object; and in accordance with a determination that the gaze of the one or more eyes is directed towards the first user interface object, forgoing displaying the first animation of the first user interface object.

In accordance with some embodiments, a non-transitory computer-readable storage medium is described. The non-transitory computer-readable storage medium stores one or more programs configured to be executed by one or more processors of a computer system that is in communication with one or more display generation components and one or more input devices, the one or more programs including instructions for: displaying, via the one or more display generation components, a first user interface object; while displaying the first user interface object, detecting, via the one or more input devices, a gaze of one or more eyes detected by the computer system; and in response to detecting the gaze of the one or more eyes: in accordance with a determination that the gaze of the one or more eyes is not directed towards the first user interface object, displaying, via the one or more display generation components, a first animation of the first user interface object; and in accordance with a determination that the gaze of the one or more eyes is directed towards the first user interface object, forgoing displaying the first animation of the first user interface object.

In accordance with some embodiments, a transitory computer-readable storage medium is described. The transitory computer-readable storage medium stores one or more programs configured to be executed by one or more processors of a computer system that is in communication with one or more display generation components and one or more input devices, the one or more programs including instructions for: displaying, via the one or more display generation components, a first user interface object; while displaying the first user interface object, detecting, via the one or more input devices, a gaze of one or more eyes detected by the computer system; and in response to detecting the gaze of the one or more eyes: in accordance with a determination that the gaze of the one or more eyes is not directed towards the first user interface object, displaying, via the one or more display generation components, a first animation of the first user interface object; and in accordance with a determination that the gaze of the one or more eyes is directed towards the first user interface object, forgoing displaying the first animation of the first user interface object.

In accordance with some embodiments, a computer system is described. The computer system is configured to communicate with one or more display generation components and one or more input devices, and comprises: one or more processors; and memory storing one or more programs configured to be executed by one or more processors, the one or more programs including instructions for: displaying, via the one or more display generation components, a first user interface object; while displaying the first user interface object, detecting, via the one or more input devices, a gaze of one or more eyes detected by the computer system; and in response to detecting the gaze of the one or more eyes: in accordance with a determination that the gaze of the one or more eyes is not directed towards the first user interface object, displaying, via the one or more display generation components, a first animation of the first user interface object; and in accordance with a determination that the gaze of the one or more eyes is directed towards the first user interface object, forgoing displaying the first animation of the first user interface object.

In accordance with some embodiments, a computer system is described. The computer system is configured to communicate with one or more display generation components and one or more input devices, and comprises: means for displaying, via the one or more display generation components, a first user interface object; means for, while displaying the first user interface object, detecting, via the one or more input devices, a gaze of one or more eyes detected by the computer system; and means for, in response to detecting the gaze of the one or more eyes: in accordance with a determination that the gaze of the one or more eyes is not directed towards the first user interface object, displaying, via the one or more display generation components, a first animation of the first user interface object; and in accordance with a determination that the gaze of the one or more eyes is directed towards the first user interface object, forgoing displaying the first animation of the first user interface object.

In accordance with some embodiments, a computer program product is described. The computer program product comprises one or more programs configured to be executed by one or more processors of a computer system that is in communication with one or more display generation components and one or more input devices, the one or more programs including instructions for: displaying, via the one or more display generation components, a first user interface object; while displaying the first user interface object, detecting, via the one or more input devices, a gaze of one or more eyes detected by the computer system; and in response to detecting the gaze of the one or more eyes: in accordance with a determination that the gaze of the one or more eyes is not directed towards the first user interface object, displaying, via the one or more display generation components, a first animation of the first user interface object; and in accordance with a determination that the gaze of the one or more eyes is directed towards the first user interface object, forgoing displaying the first animation of the first user interface object.

In accordance with some embodiments, a method is described. The method comprises, at a computer system that is in communication with one or more display generation components and one or more input devices: detecting, via the one or more input devices, a request to use a first virtual representation of a user to represent the user to other people with whom the user is communicating; and in response to detecting the request to use the first virtual representation of the user to represent the user to other people with whom the user is communicating: in accordance with a determination that the user is authenticated on the computer system, proceeding with using the first virtual representation of the user to represent the user to other people with whom the user is communicating; and in accordance with a determination that the user is not authenticated on the computer system, forgoing proceeding with using the first virtual representation of the user to represent the user to other people with whom the user is communicating.

In accordance with some embodiments, a non-transitory computer-readable storage medium is described. The non-transitory computer-readable storage medium stores one or more programs configured to be executed by one or more processors of a computer system that is in communication with one or more display generation components and one or more input devices, the one or more programs including instructions for: detecting, via the one or more input devices, a request to use a first virtual representation of a user to represent the user to other people with whom the user is communicating; and in response to detecting the request to use the first virtual representation of the user to represent the user to other people with whom the user is communicating: in accordance with a determination that the user is authenticated on the computer system, proceeding with using the first virtual representation of the user to represent the user to other people with whom the user is communicating; and in accordance with a determination that the user is not authenticated on the computer system, forgoing proceeding with using the first virtual representation of the user to represent the user to other people with whom the user is communicating.

In accordance with some embodiments, a transitory computer-readable storage medium is described. The transitory computer-readable storage medium stores one or more programs configured to be executed by one or more processors of a computer system that is in communication with one or more display generation components and one or more input devices, the one or more programs including instructions for: detecting, via the one or more input devices, a request to use a first virtual representation of a user to represent the user to other people with whom the user is communicating; and in response to detecting the request to use the first virtual representation of the user to represent the user to other people with whom the user is communicating: in accordance with a determination that the user is authenticated on the computer system, proceeding with using the first virtual representation of the user to represent the user to other people with whom the user is communicating; and in accordance with a determination that the user is not authenticated on the computer system, forgoing proceeding with using the first virtual representation of the user to represent the user to other people with whom the user is communicating.

In accordance with some embodiments, a computer system is described. The computer system is configured to communicate with one or more display generation components and one or more input devices, and comprises: one or more processors; and memory storing one or more programs configured to be executed by one or more processors, the one or more programs including instructions for: detecting, via the one or more input devices, a request to use a first virtual representation of a user to represent the user to other people with whom the user is communicating; and in response to detecting the request to use the first virtual representation of the user to represent the user to other people with whom the user is communicating: in accordance with a determination that the user is authenticated on the computer system, proceeding with using the first virtual representation of the user to represent the user to other people with whom the user is communicating; and in accordance with a determination that the user is not authenticated on the computer system, forgoing proceeding with using the first virtual representation of the user to represent the user to other people with whom the user is communicating.

In accordance with some embodiments, a computer system is described. The computer system is configured to communicate with one or more display generation components and one or more input devices, and comprises: means for detecting, via the one or more input devices, a request to use a first virtual representation of a user to represent the user to other people with whom the user is communicating; and means for, in response to detecting the request to use the first virtual representation of the user to represent the user to other people with whom the user is communicating: in accordance with a determination that the user is authenticated on the computer system, proceeding with using the first virtual representation of the user to represent the user to other people with whom the user is communicating; and in accordance with a determination that the user is not authenticated on the computer system, forgoing proceeding with using the first virtual representation of the user to represent the user to other people with whom the user is communicating.

In accordance with some embodiments, a computer program product is described. The computer program product comprises one or more programs configured to be executed by one or more processors of a computer system that is in communication with one or more display generation components and one or more input devices, the one or more programs including instructions for: detecting, via the one or more input devices, a request to use a first virtual representation of a user to represent the user to other people with whom the user is communicating; and in response to detecting the request to use the first virtual representation of the user to represent the user to other people with whom the user is communicating: in accordance with a determination that the user is authenticated on the computer system, proceeding with using the first virtual representation of the user to represent the user to other people with whom the user is communicating; and in accordance with a determination that the user is not authenticated on the computer system, forgoing proceeding with using the first virtual representation of the user to represent the user to other people with whom the user is communicating.

In accordance with some embodiments, a method is described. The method comprises: at a computer system that is in communication with one or more display generation components and one or more input devices: while the computer system is in a locked state, detecting, via the one or more input devices, a request to transition the computer system from the locked state to an unlocked state; and in response to detecting the request to transition the computer system from the locked state to the unlocked state: in accordance with a determination that the computer system satisfies a first set of criteria related to unlocking and that the computer system has detected a companion device separate from the computer system that satisfies distance threshold criteria relative to the computer system and satisfies unlock criteria, attempting, using the one or more input devices, biometric authentication of a user; and in accordance with a determination that the computer system satisfies the first set of criteria related to unlocking and that the computer system has not detected a companion device separate from the computer system that satisfies both the distance threshold criteria relative to the computer system and the unlock criteria, forgoing attempting, using the one or more input devices, biometric authentication of a user.

In accordance with some embodiments, a non-transitory computer-readable storage medium is described. The non-transitory computer-readable storage medium stores one or more programs configured to be executed by one or more processors of a computer system that is in communication with one or more display generation components and one or more input devices, the one or more programs including instructions for: while the computer system is in a locked state, detecting, via the one or more input devices, a request to transition the computer system from the locked state to an unlocked state; and in response to detecting the request to transition the computer system from the locked state to the unlocked state: in accordance with a determination that the computer system satisfies a first set of criteria related to unlocking and that the computer system has detected a companion device separate from the computer system that satisfies distance threshold criteria relative to the computer system and satisfies unlock criteria, attempting, using the one or more input devices, biometric authentication of a user; and in accordance with a determination that the computer system satisfies the first set of criteria related to unlocking and that the computer system has not detected a companion device separate from the computer system that satisfies both the distance threshold criteria relative to the computer system and the unlock criteria, forgoing attempting, using the one or more input devices, biometric authentication of a user.

In accordance with some embodiments, a transitory computer-readable storage medium is described. The transitory computer-readable storage medium stores one or more programs configured to be executed by one or more processors of a computer system that is in communication with one or more display generation components and one or more input devices, the one or more programs including instructions for: while the computer system is in a locked state, detecting, via the one or more input devices, a request to transition the computer system from the locked state to an unlocked state; and in response to detecting the request to transition the computer system from the locked state to the unlocked state: in accordance with a determination that the computer system satisfies a first set of criteria related to unlocking and that the computer system has detected a companion device separate from the computer system that satisfies distance threshold criteria relative to the computer system and satisfies unlock criteria, attempting, using the one or more input devices, biometric authentication of a user; and in accordance with a determination that the computer system satisfies the first set of criteria related to unlocking and that the computer system has not detected a companion device separate from the computer system that satisfies both the distance threshold criteria relative to the computer system and the unlock criteria, forgoing attempting, using the one or more input devices, biometric authentication of a user.

In accordance with some embodiments, a computer system is described. The computer system is configured to communicate with one or more display generation components and one or more input devices, and comprises: one or more processors; and memory storing one or more programs configured to be executed by one or more processors, the one or more programs including instructions for: while the computer system is in a locked state, detecting, via the one or more input devices, a request to transition the computer system from the locked state to an unlocked state; and in response to detecting the request to transition the computer system from the locked state to the unlocked state: in accordance with a determination that the computer system satisfies a first set of criteria related to unlocking and that the computer system has detected a companion device separate from the computer system that satisfies distance threshold criteria relative to the computer system and satisfies unlock criteria, attempting, using the one or more input devices, biometric authentication of a user; and in accordance with a determination that the computer system satisfies the first set of criteria related to unlocking and that the computer system has not detected a companion device separate from the computer system that satisfies both the distance threshold criteria relative to the computer system and the unlock criteria, forgoing attempting, using the one or more input devices, biometric authentication of a user.

In accordance with some embodiments, a computer system is described. The computer system is configured to communicate with one or more display generation components and one or more input devices, and comprises: means for, while the computer system is in a locked state, detecting, via the one or more input devices, a request to transition the computer system from the locked state to an unlocked state; and means for, in response to detecting the request to transition the computer system from the locked state to the unlocked state: in accordance with a determination that the computer system satisfies a first set of criteria related to unlocking and that the computer system has detected a companion device separate from the computer system that satisfies distance threshold criteria relative to the computer system and satisfies unlock criteria, attempting, using the one or more input devices, biometric authentication of a user; and in accordance with a determination that the computer system satisfies the first set of criteria related to unlocking and that the computer system has not detected a companion device separate from the computer system that satisfies both the distance threshold criteria relative to the computer system and the unlock criteria, forgoing attempting, using the one or more input devices, biometric authentication of a user.

In accordance with some embodiments, a computer program product is described. The computer program product comprises one or more programs configured to be executed by one or more processors of a computer system that is in communication with one or more display generation components and one or more input devices, the one or more programs including instructions for: while the computer system is in a locked state, detecting, via the one or more input devices, a request to transition the computer system from the locked state to an unlocked state; and in response to detecting the request to transition the computer system from the locked state to the unlocked state: in accordance with a determination that the computer system satisfies a first set of criteria related to unlocking and that the computer system has detected a companion device separate from the computer system that satisfies distance threshold criteria relative to the computer system and satisfies unlock criteria, attempting, using the one or more input devices, biometric authentication of a user; and in accordance with a determination that the computer system satisfies the first set of criteria related to unlocking and that the computer system has not detected a companion device separate from the computer system that satisfies both the distance threshold criteria relative to the computer system and the unlock criteria, forgoing attempting, using the one or more input devices, biometric authentication of a user.

In accordance with some embodiments, a method is described. The method comprises: at a computer system that is in communication with one or more display generation components and one or more input devices: detecting, via the one or more input devices, a user request to transition the computer system from a first state in which a three-dimensional environment is not visible via the one or more display generation components to a second state in which the three-dimensional environment is visible via the one or more display generation components different from the first state; and in response to detecting the user request to transition the computer system from the first state to the second state, displaying, via the one or more display generation components, a spatial transition animation that progressively reveals the three-dimensional environment over time, wherein: the three-dimensional environment comprises: a first set of objects, and a second set of objects different from the first set of objects and that are closer to a viewpoint of a user of the computer system than the first set of objects; and displaying the spatial transition animation comprises: at a first time, displaying a user interface in which the first set of objects and the second set of objects are both visually obscured; at a second time subsequent to the first time, displaying a user interface in which the first set of objects are no longer visually obscured while the second set of objects continue to be visually obscured; and at a third time subsequent to the second time, displaying a user interface in which both the second set of objects and the first set of objects are no longer visually obscured.

In accordance with some embodiments, a non-transitory computer-readable storage medium is described. The non-transitory computer-readable storage medium stores one or more programs configured to be executed by one or more processors of a computer system that is in communication with one or more display generation components and one or more input devices, the one or more programs including instructions for: detecting, via the one or more input devices, a user request to transition the computer system from a first state in which a three-dimensional environment is not visible via the one or more display generation components to a second state in which the three-dimensional environment is visible via the one or more display generation components different from the first state; and in response to detecting the user request to transition the computer system from the first state to the second state, displaying, via the one or more display generation components, a spatial transition animation that progressively reveals the three-dimensional environment over time, wherein: the three-dimensional environment comprises: a first set of objects, and a second set of objects different from the first set of objects and that are closer to a viewpoint of a user of the computer system than the first set of objects; and displaying the spatial transition animation comprises: at a first time, displaying a user interface in which the first set of objects and the second set of objects are both visually obscured; at a second time subsequent to the first time, displaying a user interface in which the first set of objects are no longer visually obscured while the second set of objects continue to be visually obscured; and at a third time subsequent to the second time, displaying a user interface in which both the second set of objects and the first set of objects are no longer visually obscured.

In accordance with some embodiments, a transitory computer-readable storage medium is described. The transitory computer-readable storage medium stores one or more programs configured to be executed by one or more processors of a computer system that is in communication with one or more display generation components and one or more input devices, the one or more programs including instructions for: detecting, via the one or more input devices, a user request to transition the computer system from a first state in which a three-dimensional environment is not visible via the one or more display generation components to a second state in which the three-dimensional environment is visible via the one or more display generation components different from the first state; and in response to detecting the user request to transition the computer system from the first state to the second state, displaying, via the one or more display generation components, a spatial transition animation that progressively reveals the three-dimensional environment over time, wherein: the three-dimensional environment comprises: a first set of objects, and a second set of objects different from the first set of objects and that are closer to a viewpoint of a user of the computer system than the first set of objects; and displaying the spatial transition animation comprises: at a first time, displaying a user interface in which the first set of objects and the second set of objects are both visually obscured; at a second time subsequent to the first time, displaying a user interface in which the first set of objects are no longer visually obscured while the second set of objects continue to be visually obscured; and at a third time subsequent to the second time, displaying a user interface in which both the second set of objects and the first set of objects are no longer visually obscured.

In accordance with some embodiments, a computer system is described. The computer system is configured to communicate with one or more display generation components and one or more input devices, and comprises: one or more processors; and memory storing one or more programs configured to be executed by one or more processors, the one or more programs including instructions for: detecting, via the one or more input devices, a user request to transition the computer system from a first state in which a three-dimensional environment is not visible via the one or more display generation components to a second state in which the three-dimensional environment is visible via the one or more display generation components different from the first state; and in response to detecting the user request to transition the computer system from the first state to the second state, displaying, via the one or more display generation components, a spatial transition animation that progressively reveals the three-dimensional environment over time, wherein: the three-dimensional environment comprises: a first set of objects, and a second set of objects different from the first set of objects and that are closer to a viewpoint of a user of the computer system than the first set of objects; and displaying the spatial transition animation comprises: at a first time, displaying a user interface in which the first set of objects and the second set of objects are both visually obscured; at a second time subsequent to the first time, displaying a user interface in which the first set of objects are no longer visually obscured while the second set of objects continue to be visually obscured; and at a third time subsequent to the second time, displaying a user interface in which both the second set of objects and the first set of objects are no longer visually obscured.

In accordance with some embodiments, a computer system is described. The computer system is configured to communicate with one or more display generation components and one or more input devices, and comprises: means for detecting, via the one or more input devices, a user request to transition the computer system from a first state in which a three-dimensional environment is not visible via the one or more display generation components to a second state in which the three-dimensional environment is visible via the one or more display generation components different from the first state; and means for, in response to detecting the user request to transition the computer system from the first state to the second state, displaying, via the one or more display generation components, a spatial transition animation that progressively reveals the three-dimensional environment over time, wherein: the three-dimensional environment comprises: a first set of objects, and a second set of objects different from the first set of objects and that are closer to a viewpoint of a user of the computer system than the first set of objects; and displaying the spatial transition animation comprises: at a first time, displaying a user interface in which the first set of objects and the second set of objects are both visually obscured; at a second time subsequent to the first time, displaying a user interface in which the first set of objects are no longer visually obscured while the second set of objects continue to be visually obscured; and at a third time subsequent to the second time, displaying a user interface in which both the second set of objects and the first set of objects are no longer visually obscured.

In accordance with some embodiments, a computer program product is described. The computer program product comprises one or more programs configured to be executed by one or more processors of a computer system that is in communication with one or more display generation components and one or more input devices, the one or more programs including instructions for: detecting, via the one or more input devices, a user request to transition the computer system from a first state in which a three-dimensional environment is not visible via the one or more display generation components to a second state in which the three-dimensional environment is visible via the one or more display generation components different from the first state; and in response to detecting the user request to transition the computer system from the first state to the second state, displaying, via the one or more display generation components, a spatial transition animation that progressively reveals the three-dimensional environment over time, wherein: the three-dimensional environment comprises: a first set of objects, and a second set of objects different from the first set of objects and that are closer to a viewpoint of a user of the computer system than the first set of objects; and displaying the spatial transition animation comprises: at a first time, displaying a user interface in which the first set of objects and the second set of objects are both visually obscured; at a second time subsequent to the first time, displaying a user interface in which the first set of objects are no longer visually obscured while the second set of objects continue to be visually obscured; and at a third time subsequent to the second time, displaying a user interface in which both the second set of objects and the first set of objects are no longer visually obscured.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIG. 4 is a block diagram illustrating a hand tracking unit of a computer system that is configured to capture gesture inputs of the user in some embodiments.

FIG. 8 is a flow diagram of methods of user enrollment, in some embodiments.

FIGS. 9A-9M illustrate example techniques for user authentication, in some embodiments.

FIG. 10 is a flow diagram of methods of user authentication, in some embodiments.

FIGS. 11A-11I illustrate example techniques for representing a user, in some embodiments.

FIG. 12 is a flow diagram of methods of representing a user, in some embodiments.

FIGS. 13A-13H illustrate example techniques for user authentication, in some embodiments.

FIG. 14 is a flow diagram of methods of user authentication, in some embodiments.

FIG. 16 is a flow diagram of methods of transitioning a device, in some embodiments.

DESCRIPTION OF EMBODIMENTS

Figure 1A:
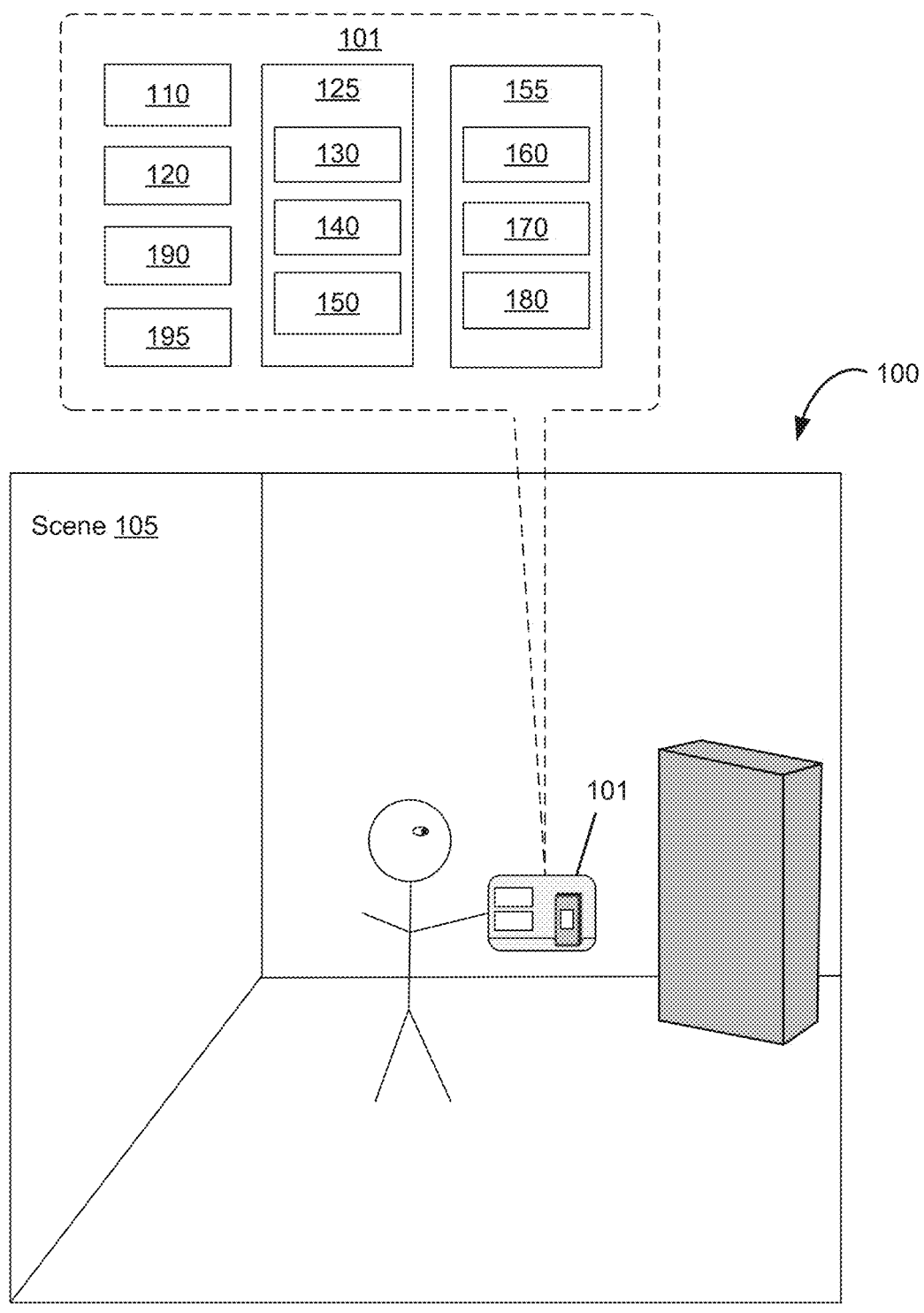
FIG. 1A is a block diagram illustrating an operating environment of a computer system for providing XR experiences in some embodiments.

The present disclosure relates to user interfaces for providing an extended reality (XR) experience to a user, in some embodiments.

The systems, methods, and GUIs described herein improve user interface interactions with virtual/augmented reality environments in multiple ways.

In some embodiments, a computer system displays a user interface object as part of enrolling one or more eyes of a person (for example, to perform future eye-based biometric authentication of the person). The computer system detects the gaze of the one or more eyes of the person. When the person's gaze moves toward the user interface object, the computer system outputs first feedback, such as audio, visual and/or haptic feedback; and when the person's gaze moves away from the user interface object, the computer system outputs second feedback, such as audio, visual, and/or haptic feedback, that is different from the first feedback. In this way, the computer system directs the person to look at the user interface object so that the computer system can enroll the one or more eyes of the person.

In some embodiments, a computer system displays a first user interface object. For example, in some embodiments, the first user interface object is a gaze target that is used for biometric authentication (e.g., eye-based biometric authentication) of a user. The computer system detects the gaze of the user. When the gaze of the user is not directed towards the first user interface object, the computer system displays a first animation of the first user interface object. When the gaze of the user is directed towards the first user interface object, the computer system ceases display and/or forgoes display of the first animation of the first user interface object. In this way, the computer system directs the user to look at the first user interface object (e.g., so that the computer system can perform eye-based biometric authentication of the user).

In some embodiments, a computer system detects a request (e.g., a user request) to use a first virtual representation of a user to represent the user to other people with whom the user is communicating. For example, the computer system detects a request to user a first virtual avatar to represent the user within a real-time communication session. When the user has been authenticated on the computer system, the computer system proceeds with using the first virtual representation of the user to represent the user. However, when the user is not authenticated on the computer system, the computer system does not use and/or forgoes using the first virtual representation of the user to represent the user. For example, the computer system uses a different representation to represent the user (e.g., a representation that indicates that the user has not been authenticated on the computer system). Accordingly, the first virtual representation of the user can indicate to other users participating in a communication session that the user has been authenticated on the computer system.

In some embodiments, while a computer system is in a locked state, the computer system detects a request to transition the computer system from the locked state to an unlocked state. In some embodiments, biometric authentication is disabled on the computer system when certain criteria are met. For example, in some embodiments, biometric authentication is disabled (e.g., the computer system is not permitted to perform biometric authentication) immediately after the computer system has been powered on (e.g., for the first user authentication after the computer system has been powered on); and/or when the computer system has not been unlocked for a threshold duration of time. However, it may be more convenient for users if they are able to unlock the computer system using biometric authentication. Accordingly, in some embodiments, even in scenarios in which biometric authentication would be disabled on the computer system, biometric authentication can be enabled on the computer system based on a nearby companion device being in an unlocked state. For example, in some embodiments, even in scenarios in which biometric authentication would be disabled on the computer system, when a nearby companion device is detected that is in an unlocked state, the computer system performs biometric authentication of the user. However, in some embodiments, when biometric authentication is disabled on the computer system and the computer system does not detect a nearby companion device that is in an unlocked state, the computer system forgoes performing biometric authentication of the user.

In some embodiments, a computer system detects a user request to transition the computer system from a first state (e.g., an inactive state) in which a three-dimensional environment is not visible to a second state (e.g., an active state) in which the three-dimensional environment is visible. In response to the user request to transition a computer system from the first state to the second state, the computer system displays a spatial transition animation that progressively reveals the three-dimensional environment over time. For example, in some embodiments, the spatial transition animation reveals objects in the three-dimensional environment that are farther away from the viewpoint of the user before revealing objects in the three-dimensional environment that are closer to the viewpoint of the user. In some embodiments, the computer system gradually reveals the three-dimensional environment by initially displaying a virtual object that visually obscures and/or hides the three-dimensional environment, and then, during the spatial transition animation, decreasing the volume of the virtual object so that more of the three-dimensional environment becomes visible over time.

In some embodiments, a computer system displays content in a first region of a user interface. In some embodiments, while the computer system is displaying the content and while a first set of controls are not displayed in a first state, the computer system detects a first input from a first portion of a user. In some embodiments, in response to detecting the first input, and in accordance with a determination that a gaze of the user is directed to a second region of the user interface when the first input is detected, the computer system displays, in the user interface, the first set of one or more controls in the first state, and in accordance with a determination that the gaze of the user is not directed to the second region of the user interface when the first input is detected, the computer system forgoes displaying the first set of one or more controls in the first state.

In some embodiments, a computer system displays content in a user interface. In some embodiments, while displaying the content, the computer system detects a first input based on movement of a first portion of a user of the computer system. In some embodiments, in response to detecting the first input, the computer system displays, in the user interface, a first set of one or more controls, where the first set of one or more controls are displayed in a first state and are displayed within a first region of the user interface. In some embodiments, while displaying the first set of one or more controls in the first state: in accordance with a determination that one or more first criteria are satisfied, including a criterion that is satisfied when attention of the user is directed to the first region of the user interface based on a movement of a second portion of the user that is different from the first portion of the user, the computer system transitions from displaying the first set of one or more controls in the first state to displaying a second set of one or more controls in a second state, where the second state is different from the first state.

Figure 15A:
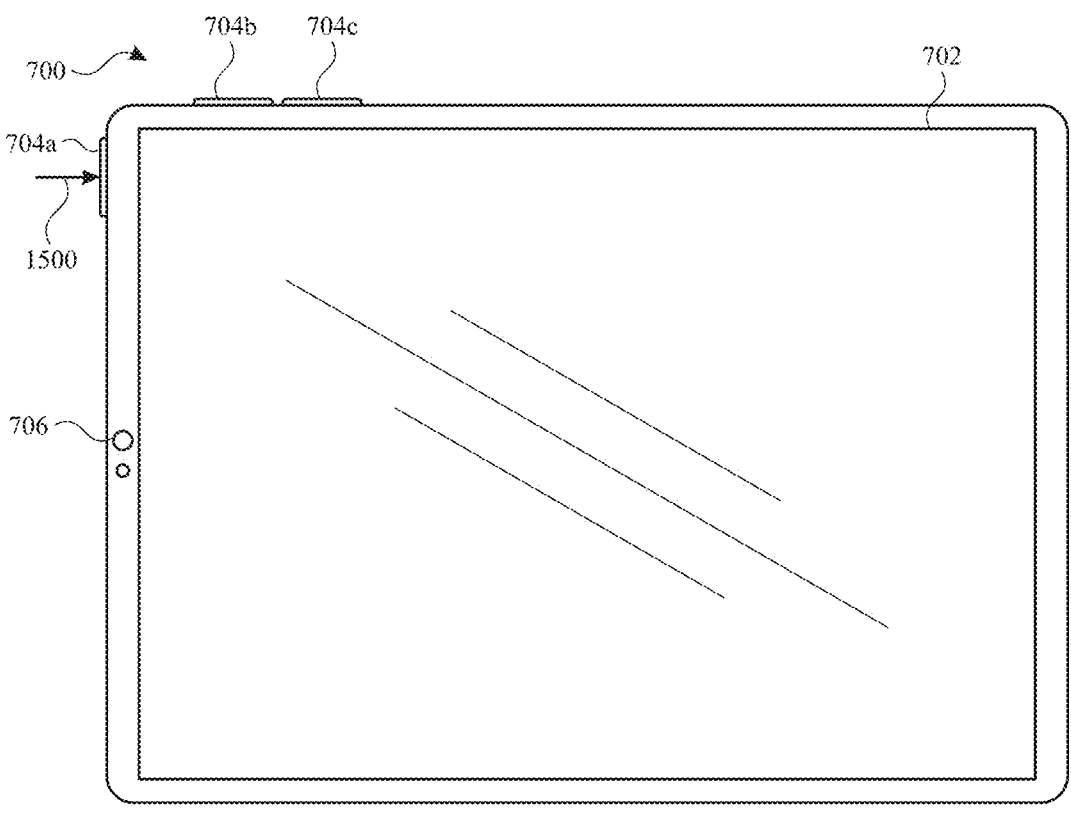
FIGS. 15A-15N illustrate example techniques for transitioning a device, in some embodiments.

FIGS. 1A-6 provide a description of example computer systems for providing XR experiences to users. FIGS. 7A-7N illustrate example techniques for user enrollment, in some embodiments. FIG. 8 is a flow diagram of methods of user enrollment, in some embodiments. The user interfaces in FIGS. 7A-7N are used to illustrate the processes in FIG. 8. FIGS. 9A-9M illustrate example techniques for user authentication, in some embodiments. FIG. 10 is a flow diagram of methods of user authentication, in some embodiments. The user interfaces in FIGS. 9A-9M are used to illustrate the processes in FIG. 10. FIGS. 11A-11I illustrate example techniques for representing a user, in some embodiments. FIG. 12 is a flow diagram of methods of representing a user, in some embodiments. The user interfaces in FIGS. 11A-11I are used to illustrate the processes in FIG. 12. FIGS. 13A-13H illustrate example techniques for user authentication, in some embodiments. FIG. 14 is a flow diagram of methods of user authentication, in some embodiments. The user interfaces in FIGS. 13A-13H are used to illustrate the processes in FIG. 14. FIGS. 15A-15N illustrate example techniques for transitioning a device, in some embodiments. FIG. 16 is a flow diagram of methods of transitioning a device, in some embodiments. The user interfaces in FIGS. 15A-15N are used to illustrate the processes in FIG. 16.

The processes described below enhance the operability of the devices and make the user-device interfaces more efficient (e.g., by helping the user to provide proper inputs and reducing user mistakes when operating/interacting with the device) through various techniques, including by providing improved visual feedback to the user, reducing the number of inputs needed to perform an operation, providing additional control options without cluttering the user interface with additional displayed controls, performing an operation when a set of conditions has been met without requiring further user input, improving privacy and/or security, providing a more varied, detailed, and/or realistic user experience while saving storage space, and/or additional techniques. These techniques also reduce power usage and improve battery life of the device by enabling the user to use the device more quickly and efficiently. Saving on battery power, and thus weight, improves the ergonomics of the device. These techniques also enable real-time communication, allow for the use of fewer and/or less precise sensors resulting in a more compact, lighter, and cheaper device, and enable the device to be used in a variety of lighting conditions. These techniques reduce energy usage, thereby reducing heat emitted by the device, which is particularly important for a wearable device where a device well within operational parameters for device components can become uncomfortable for a user to wear if it is producing too much heat.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

In some embodiments, as shown in FIG. 1A, the XR experience is provided to the user via an operating environment 100 that includes a computer system 101. The computer system 101 includes a controller 110 (e.g., processors of a portable electronic device or a remote server), a display generation component 120 (e.g., a head-mounted device (HMD), a display, a projector, a touch-screen, etc.), one or more input devices 125 (e.g., an eye tracking device 130, a hand tracking device 140, other input devices 150), one or more output devices 155 (e.g., speakers 160, tactile output generators 170, and other output devices 180), one or more sensors 190 (e.g., image sensors, light sensors, depth sensors, tactile sensors, orientation sensors, proximity sensors, temperature sensors, location sensors, motion sensors, velocity sensors, etc.), and optionally one or more peripheral devices 195 (e.g., home appliances, wearable devices, etc.). In some embodiments, one or more of the input devices 125, output devices 155, sensors 190, and peripheral devices 195 are integrated with the display generation component 120 (e.g., in a head-mounted device or a handheld device).

When describing a XR experience, various terms are used to differentially refer to several related but distinct environments that the user may sense and/or with which a user may interact (e.g., with inputs detected by a computer system 101 generating the XR experience that cause the computer system generating the XR experience to generate audio, visual, and/or tactile feedback corresponding to various inputs provided to the computer system 101). The following is a subset of these terms:

Physical environment: A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

Extended reality: In contrast, an extended reality (XR) environment refers to a wholly or partially simulated environment that people sense and/or interact with via an electronic system. In XR, a subset of a person's physical motions, or representations thereof, are tracked, and, in response, one or more characteristics of one or more virtual objects simulated in the XR environment are adjusted in a manner that comports with at least one law of physics. For example, a XR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a XR environment may be made in response to representations of physical motions (e.g., vocal commands). A person may sense and/or interact with a XR object using any one of their senses, including sight, sound, touch, taste, and smell. For example, a person may sense and/or interact with audio objects that create a 3D or spatial audio environment that provides the perception of point audio sources in 3D space. In another example, audio objects may enable audio transparency, which selectively incorporates ambient sounds from the physical environment with or without computer-generated audio. In some XR environments, a person may sense and/or interact only with audio objects.

Examples of XR include virtual reality and mixed reality.

Virtual reality: A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

Mixed reality: In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end. In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationary with respect to the physical ground.

Examples of mixed realities include augmented reality and augmented virtuality.

Augmented reality: An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment. An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

Augmented virtuality: An augmented virtuality (AV) environment refers to a simulated environment in which a virtual or computer-generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

In an augmented reality, mixed reality, or virtual reality environment, a view of a three-dimensional environment is visible to a user. The view of the three-dimensional environment is typically visible to the user via one or more display generation components (e.g., a display or a pair of display modules that provide stereoscopic content to different eyes of the same user) through a virtual viewport that has a viewport boundary that defines an extent of the three-dimensional environment that is visible to the user via the one or more display generation components. In some embodiments, the region defined by the viewport boundary is smaller than a range of vision of the user in one or more dimensions (e.g., based on the range of vision of the user, size, optical properties or other physical characteristics of the one or more display generation components, and/or the location and/or orientation of the one or more display generation components relative to the eyes of the user). In some embodiments, the region defined by the viewport boundary is larger than a range of vision of the user in one or more dimensions (e.g., based on the range of vision of the user, size, optical properties or other physical characteristics of the one or more display generation components, and/or the location and/or orientation of the one or more display generation components relative to the eyes of the user). The viewport and viewport boundary typically move as the one or more display generation components move (e.g., moving with a head of the user for a head mounted device or moving with a hand of a user for a handheld device such as a tablet or smartphone). A viewpoint of a user determines what content is visible in the viewport, a viewpoint generally specifies a location and a direction relative to the three-dimensional environment, and as the viewpoint shifts, the view of the three-dimensional environment will also shift in the viewport. For a head mounted device, a viewpoint is typically based on a location an direction of the head, face, and/or eyes of a user to provide a view of the three-dimensional environment that is perceptually accurate and provides an immersive experience when the user is using the head-mounted device. For a handheld or stationed device, the viewpoint shifts as the handheld or stationed device is moved and/or as a position of a user relative to the handheld or stationed device changes (e.g., a user moving toward, away from, up, down, to the right, and/or to the left of the device). For devices that include display generation components with virtual passthrough, portions of the physical environment that are visible (e.g., displayed, and/or projected) via the one or more display generation components are based on a field of view of one or more cameras in communication with the display generation components which typically move with the display generation components (e.g., moving with a head of the user for a head mounted device or moving with a hand of a user for a handheld device such as a tablet or smartphone) because the viewpoint of the user moves as the field of view of the one or more cameras moves (and the appearance of one or more virtual objects displayed via the one or more display generation components is updated based on the viewpoint of the user (e.g., displayed positions and poses of the virtual objects are updated based on the movement of the viewpoint of the user)). For display generation components with optical passthrough, portions of the physical environment that are visible (e.g., optically visible through one or more partially or fully transparent portions of the display generation component) via the one or more display generation components are based on a field of view of a user through the partially or fully transparent portion(s) of the display generation component (e.g., moving with a head of the user for a head mounted device or moving with a hand of a user for a handheld device such as a tablet or smartphone) because the viewpoint of the user moves as the field of view of the user through the partially or fully transparent portions of the display generation components moves (and the appearance of one or more virtual objects is updated based on the viewpoint of the user).

In an augmented reality, mixed reality, or virtual reality environment, a view of a three-dimensional environment is visible to a user. The view of the three-dimensional environment is typically visible to the user via one or more display generation components (e.g., a display or a pair of display modules that provide stereoscopic content to different eyes of the same user) through a virtual viewport that has a viewport boundary that defines an extent of the three-dimensional environment that is visible to the user via the one or more display generation components. In some embodiments, the region defined by the viewport boundary is smaller than a range of vision of the user in one or more dimensions (e.g., based on the range of vision of the user, size, optical properties or other physical characteristics of the one or more display generation components, and/or the location and/or orientation of the one or more display generation components relative to the eyes of the user). In some embodiments, the region defined by the viewport boundary is larger than a range of vision of the user in one or more dimensions (e.g., based on the range of vision of the user, size, optical properties or other physical characteristics of the one or more display generation components, and/or the location and/or orientation of the one or more display generation components relative to the eyes of the user). The viewport and viewport boundary typically move as the one or more display generation components move (e.g., moving with a head of the user for a head mounted device or moving with a hand of a user for a handheld device such as a tablet or smartphone). A viewpoint of a user determines what content is visible in the viewport, a viewpoint generally specifies a location and a direction relative to the three-dimensional environment, and as the viewpoint shifts, the view of the three-dimensional environment will also shift in the viewport. For a head mounted device, a viewpoint is typically based on a location an direction of the head, face, and/or eyes of a user to provide a view of the three-dimensional environment that is perceptually accurate and provides an immersive experience when the user is using the head-mounted device. For a handheld or stationed device, the viewpoint shifts as the handheld or stationed device is moved and/or as a position of a user relative to the handheld or stationed device changes (e.g., a user moving toward, away from, up, down, to the right, and/or to the left of the device). For devices that include display generation components with virtual passthrough, portions of the physical environment that are visible (e.g., displayed, and/or projected) via the one or more display generation components are based on a field of view of one or more cameras in communication with the display generation components which typically move with the display generation components (e.g., moving with a head of the user for a head mounted device or moving with a hand of a user for a handheld device such as a tablet or smartphone) because the viewpoint of the user moves as the field of view of the one or more cameras moves (and the appearance of one or more virtual objects displayed via the one or more display generation components is updated based on the viewpoint of the user (e.g., displayed positions and poses of the virtual objects are updated based on the movement of the viewpoint of the user)). For display generation components with optical passthrough, portions of the physical environment that are visible (e.g., optically visible through one or more partially or fully transparent portions of the display generation component) via the one or more display generation components are based on a field of view of a user through the partially or fully transparent portion(s) of the display generation component (e.g., moving with a head of the user for a head mounted device or moving with a hand of a user for a handheld device such as a tablet or smartphone) because the viewpoint of the user moves as the field of view of the user through the partially or fully transparent portions of the display generation components moves (and the appearance of one or more virtual objects is updated based on the viewpoint of the user).

In some embodiments a representation of a physical environment (e.g., displayed via virtual passthrough or optical passthrough) can be partially or fully obscured by a virtual environment. In some embodiments, the amount of virtual environment that is displayed (e.g., the amount of physical environment that is not displayed) is based on an immersion level for the virtual environment (e.g., with respect to the representation of the physical environment). For example, increasing the immersion level optionally causes more of the virtual environment to be displayed, replacing and/or obscuring more of the physical environment, and reducing the immersion level optionally causes less of the virtual environment to be displayed, revealing portions of the physical environment that were previously not displayed and/or obscured. In some embodiments, at a particular immersion level, one or more first background objects (e.g., in the representation of the physical environment) are visually de-emphasized (e.g., dimmed, blurred, and/or displayed with increased transparency) more than one or more second background objects, and one or more third background objects cease to be displayed. In some embodiments, a level of immersion includes an associated degree to which the virtual content displayed by the computer system (e.g., the virtual environment and/or the virtual content) obscures background content (e.g., content other than the virtual environment and/or the virtual content) around/behind the virtual content, optionally including the number of items of background content displayed and/or the visual characteristics (e.g., colors, contrast, and/or opacity) with which the background content is displayed, the angular range of the virtual content displayed via the display generation component (e.g., 60 degrees of content displayed at low immersion, 120 degrees of content displayed at medium immersion, or 180 degrees of content displayed at high immersion), and/or the proportion of the field of view displayed via the display generation component that is consumed by the virtual content (e.g., 33% of the field of view consumed by the virtual content at low immersion, 66% of the field of view consumed by the virtual content at medium immersion, or 100% of the field of view consumed by the virtual content at high immersion). In some embodiments, the background content is included in a background over which the virtual content is displayed (e.g., background content in the representation of the physical environment). In some embodiments, the background content includes user interfaces (e.g., user interfaces generated by the computer system corresponding to applications), virtual objects (e.g., files or representations of other users generated by the computer system) not associated with or included in the virtual environment and/or virtual content, and/or real objects (e.g., pass-through objects representing real objects in the physical environment around the user that are visible such that they are displayed via the display generation component and/or a visible via a transparent or translucent component of the display generation component because the computer system does not obscure/prevent visibility of them through the display generation component). In some embodiments, at a low level of immersion (e.g., a first level of immersion), the background, virtual and/or real objects are displayed in an unobscured manner. For example, a virtual environment with a low level of immersion is optionally displayed concurrently with the background content, which is optionally displayed with full brightness, color, and/or translucency. In some embodiments, at a higher level of immersion (e.g., a second level of immersion higher than the first level of immersion), the background, virtual and/or real objects are displayed in an obscured manner (e.g., dimmed, blurred, or removed from display). For example, a respective virtual environment with a high level of immersion is displayed without concurrently displaying the background content (e.g., in a full screen or fully immersive mode). As another example, a virtual environment displayed with a medium level of immersion is displayed concurrently with darkened, blurred, or otherwise de-emphasized background content. In some embodiments, the visual characteristics of the background objects vary among the background objects. For example, at a particular immersion level, one or more first background objects are visually de-emphasized (e.g., dimmed, blurred, and/or displayed with increased transparency) more than one or more second background objects, and one or more third background objects cease to be displayed. In some embodiments, a null or zero level of immersion corresponds to the virtual environment ceasing to be displayed and instead a representation of a physical environment is displayed (optionally with one or more virtual objects such as application, windows, or virtual three-dimensional objects) without the representation of the physical environment being obscured by the virtual environment. Adjusting the level of immersion using a physical input element provides for quick and efficient method of adjusting immersion, which enhances the operability of the computer system and makes the user-device interface more efficient.

Viewpoint-locked virtual object: A virtual object is viewpoint-locked when a computer system displays the virtual object at the same location and/or position in the viewpoint of the user, even as the viewpoint of the user shifts (e.g., changes). In embodiments where the computer system is a head-mounted device, the viewpoint of the user is locked to the forward facing direction of the user's head (e.g., the viewpoint of the user is at least a portion of the field-of-view of the user when the user is looking straight ahead); thus, the viewpoint of the user remains fixed even as the user's gaze is shifted, without moving the user's head. In embodiments where the computer system has a display generation component (e.g., a display screen) that can be repositioned with respect to the user's head, the viewpoint of the user is the augmented reality view that is being presented to the user on a display generation component of the computer system. For example, a viewpoint-locked virtual object that is displayed in the upper left corner of the viewpoint of the user, when the viewpoint of the user is in a first orientation (e.g., with the user's head facing north) continues to be displayed in the upper left corner of the viewpoint of the user, even as the viewpoint of the user changes to a second orientation (e.g., with the user's head facing west). In other words, the location and/or position at which the viewpoint-locked virtual object is displayed in the viewpoint of the user is independent of the user's position and/or orientation in the physical environment. In embodiments in which the computer system is a head-mounted device, the viewpoint of the user is locked to the orientation of the user's head, such that the virtual object is also referred to as a "head-locked virtual object."

Environment-locked virtual object: A virtual object is environment-locked (alternatively, "world-locked") when a computer system displays the virtual object at a location and/or position in the viewpoint of the user that is based on (e.g., selected in reference to and/or anchored to) a location and/or object in the three-dimensional environment (e.g., a physical environment or a virtual environment). As the viewpoint of the user shifts, the location and/or object in the environment relative to the viewpoint of the user changes, which results in the environment-locked virtual object being displayed at a different location and/or position in the viewpoint of the user. For example, an environment-locked virtual object that is locked onto a tree that is immediately in front of a user is displayed at the center of the viewpoint of the user. When the viewpoint of the user shifts to the right (e.g., the user's head is turned to the right) so that the tree is now left-of-center in the viewpoint of the user (e.g., the tree's position in the viewpoint of the user shifts), the environment-locked virtual object that is locked onto the tree is displayed left-of-center in the viewpoint of the user. In other words, the location and/or position at which the environment-locked virtual object is displayed in the viewpoint of the user is dependent on the position and/or orientation of the location and/or object in the environment onto which the virtual object is locked. In some embodiments, the computer system uses a stationary frame of reference (e.g., a coordinate system that is anchored to a fixed location and/or object in the physical environment) in order to determine the position at which to display an environment-locked virtual object in the viewpoint of the user. An environment-locked virtual object can be locked to a stationary part of the environment (e.g., a floor, wall, table, or other stationary object) or can be locked to a moveable part of the environment (e.g., a vehicle, animal, person, or even a representation of portion of the users body that moves independently of a viewpoint of the user, such as a user's hand, wrist, arm, or foot) so that the virtual object is moved as the viewpoint or the portion of the environment moves to maintain a fixed relationship between the virtual object and the portion of the environment.

In some embodiments a virtual object that is environment-locked or viewpoint-locked exhibits lazy follow behavior which reduces or delays motion of the environment-locked or viewpoint-locked virtual object relative to movement of a point of reference which the virtual object is following. In some embodiments, when exhibiting lazy follow behavior the computer system intentionally delays movement of the virtual object when detecting movement of a point of reference (e.g., a portion of the environment, the viewpoint, or a point that is fixed relative to the viewpoint, such as a point that is between 5-300 cm from the viewpoint) which the virtual object is following. For example, when the point of reference (e.g., the portion of the environment or the viewpoint) moves with a first speed, the virtual object is moved by the device to remain locked to the point of reference but moves with a second speed that is slower than the first speed (e.g., until the point of reference stops moving or slows down, at which point the virtual object starts to catch up to the point of reference). In some embodiments, when a virtual object exhibits lazy follow behavior the device ignores small amounts of movement of the point of reference (e.g., ignoring movement of the point of reference that is below a threshold amount of movement such as movement by 0-5 degrees or movement by 0-50 cm). For example, when the point of reference (e.g., the portion of the environment or the viewpoint to which the virtual object is locked) moves by a first amount, a distance between the point of reference and the virtual object increases (e.g., because the virtual object is being displayed so as to maintain a fixed or substantially fixed position relative to a viewpoint or portion of the environment that is different from the point of reference to which the virtual object is locked) and when the point of reference (e.g., the portion of the environment or the viewpoint to which the virtual object is locked) moves by a second amount that is greater than the first amount, a distance between the point of reference and the virtual object initially increases (e.g., because the virtual object is being displayed so as to maintain a fixed or substantially fixed position relative to a viewpoint or portion of the environment that is different from the point of reference to which the virtual object is locked) and then decreases as the amount of movement of the point of reference increases above a threshold (e.g., a "lazy follow" threshold) because the virtual object is moved by the computer system to maintain a fixed or substantially fixed position relative to the point of reference. In some embodiments the virtual object maintaining a substantially fixed position relative to the point of reference includes the virtual object being displayed within a threshold distance (e.g., 1, 2, 3, 5, 15, 20, 50 cm) of the point of reference in one or more dimensions (e.g., up/down, left/right, and/or forward/backward relative to the position of the point of reference).

In some embodiments, spatial media includes spatial visual media and/or spatial audio. In some embodiments, a spatial capture is a capture of spatial media. In some embodiments, spatial visual media (also referred to as stereoscopic media) (e.g., a spatial image and/or a spatial video) is media that includes two different images or sets of images, representing two perspectives of the same or overlapping fields-of-view, for concurrent display. A first image representing a first perspective is presented to a first eye of the viewer and a second image representing a second perspective, different from the first perspective, is concurrently presented to a second eye of the viewer. The first image and the second image have the same or overlapping fields-of-view. In some embodiments, a computer system displays the first image via a first display that is positioned for viewing by the first eye of the viewer and concurrently displays the second image via a second display, different from the first display, that is position for viewing by the second eye of the viewer. In some embodiments, the first image and the second image, when viewed together, create a depth effect and provide the viewer with depth perception for the contents of the images. In some embodiments, a first video representing a first perspective is presented to a first eye of the viewer and a second video representing a second perspective, different from the first perspective, is concurrently presented to a second eye of the viewer. The first video and the second video have the same or overlapping fields-of-view. In some embodiments, the first video and the second video, when viewed together, create a depth effect and provide the viewer with depth perception for the contents of the videos. In some embodiments, spatial audio experiences in headphones are produced by manipulating sounds in the headphone's two audio channels (e.g., left and right) so that they resemble directional sounds arriving in the car-canal. For example, the headphones can reproduce a spatial audio signal that simulates a soundscape around the listener (also referred to as the user). An effective spatial sound reproduction can render sounds such that the listener perceives the sound as coming from a location within the soundscape external to the listener's head, just as the listener would experience the sound if encountered in the real world.

The geometry of the listener's ear, and in particular the outer ear (pinna), has a significant effect on the sound that arrives from a sound source to a listener's eardrum. The spatial audio sound experience is possible by taking into account the effect of the listener's pinna, the listener's head, and/or the listener's torso to the sound that enters to the listener's ear-canal. The geometry of the user's ear is optionally determined by using a three-dimensional scanning device that produces a three-dimensional model of at least a portion of the visible parts of the user's ear. This geometry is optionally used to produce a filter for producing the spatial audio experience. In some embodiments, spatial audio is audio that has been filtered such that a listener of the audio perceives the audio as coming from one or more directions and/or locations in three-dimensional space (e.g., from above, below, and/or in front of the listener).

An example of such a filter is a Head-Related Transfer Function (HRTF) filter. These filters are used to provide an effect that is similar to how a human ear, head, and torso filter sounds. When the geometry of the ears of a listener is known, a personalized filter (e.g., a personalized HRTF filter) can be produced so that the sound experienced by that listener through headphones (e.g., in-ear headphones, on-ear headphones, and/or over-ear headphones) is more realistic. In some embodiments, two filters are produced-one filter per ear-so that each ear of the listener has a corresponding personalized filter (e.g., personalized HRTF filter), as the cars of the listener may be of different geometry.

In some embodiments, a HRTF filter includes some (or all) acoustic information required to describe how sound reflects or diffracts around a listener's head before entering the listener's auditory system. In some embodiments, a personalized HRTF filter can be selected from a database of previously determined HRTFs for users having similar anatomical characteristics. In some embodiments, a personalized HRTF filter can be generated by numerical modeling based on the geometry of the listener's ear. One or more processors of the computer system optionally apply the personalized HRTF filter for the listener to an audio input signal to generate a spatial input signal for playback by headphones that are connected (e.g., wirelessly or by wire) to the computer system.

Hardware: There are many different types of electronic systems that enable a person to sense and/or interact with various XR environments. Examples include head-mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head-mounted system may include speakers and/or other audio output devices integrated into the head-mounted system for providing audio output. A head-mounted system may have one or more speaker(s) and an integrated opaque display. Alternatively, a head-mounted system may be configured to accept an external opaque display (e.g., a smartphone). The head-mounted system may incorporate one or more imaging sensors to capture images or video of the physical environment, and/or one or more microphones to capture audio of the physical environment. Rather than an opaque display, a head-mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical wave-guide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface. In some embodiments, the controller 110 is config-ured to manage and coordinate a XR experience for the user. In some embodiments, the controller 110 includes a suitable combination of software, firmware, and/or hardware. The controller 110 is described in greater detail below with respect to FIG. 2. In some embodiments, the controller 110 is a computing device that is local or remote relative to the scene 105 (e.g., a physical environment). For example, the controller 110 is a local server located within the scene 105. In another example, the controller 110 is a remote server located outside of the scene 105 (e.g., a cloud server, central server, etc.). In some embodiments, the controller 110 is communicatively coupled with the display generation com-ponent 120 (e.g., an HMD, a display, a projector, a touch-screen, etc.) via one or more wired or wireless communi-cation channels 144 (e.g., BLUETOOTH, IEEE 802.11x, IEEE 802.16x, IEEE 802.3x, etc.). In another example, the controller 110 is included within the enclosure (e.g., a physical housing) of the display generation component 120 (e.g., an HMD, or a portable electronic device that includes a display and one or more processors, etc.), one or more of the input devices 125, one or more of the output devices 155, one or more of the sensors 190, and/or one or more of the peripheral devices 195, or share the same physical enclosure or support structure with one or more of the above.

In some embodiments, the display generation component 120 is configured to provide the XR experience (e.g., at least a visual component of the XR experience) to the user. In some embodiments, the display generation component 120 includes a suitable combination of software, firmware, and/or hardware. The display generation component 120 is described in greater detail below with respect to FIG. 3. In some embodiments, the functionalities of the controller 110 are provided by and/or combined with the display generation component 120.

According to some embodiments, the display generation component 120 provides a XR experience to the user while the user is virtually and/or physically present within the scene 105.

In some embodiments, the display generation component is worn on a part of the user's body (e.g., on his/her head, on his/her hand, etc.). As such, the display generation component 120 includes one or more XR displays provided to display the XR content. For example, in various embodi-ments, the display generation component 120 encloses the field-of-view of the user. In some embodiments, the display generation component 120 is a handheld device (such as a smartphone or tablet) configured to present XR content, and the user holds the device with a display directed towards the field-of-view of the user and a camera directed towards the scene 105. In some embodiments, the handheld device is optionally placed within an enclosure that is worn on the head of the user. In some embodiments, the handheld device is optionally placed on a support (e.g., a tripod) in front of the user. In some embodiments, the display generation component 120 is a XR chamber, enclosure, or room con-figured to present XR content in which the user does not wear or hold the display generation component 120. Many user interfaces described with reference to one type of hardware for displaying XR content (e.g., a handheld device or a device on a tripod) could be implemented on another type of hardware for displaying XR content (e.g., an HMD or other wearable computing device). For example, a user interface showing interactions with XR content triggered based on interactions that happen in a space in front of a handheld or tripod mounted device could similarly be imple-mented with an HMD where the interactions happen in a space in front of the HMD and the responses of the XR content are displayed via the HMD. Similarly, a user inter-face showing interactions with XR content triggered based on movement of a handheld or tripod mounted device relative to the physical environment (e.g., the scene 105 or a part of the user's body (e.g., the user's eye(s), head, or hand)) could similarly be implemented with an HMD where the movement is caused by movement of the HMD relative to the physical environment (e.g., the scene 105 or a part of the user's body (e.g., the user's eye(s), head, or hand)).

While pertinent features of the operating environment 100 are shown in FIG. 1A, those of ordinary skill in the art will appreciate from the present disclosure that various other features have not been illustrated for the sake of brevity and so as not to obscure more pertinent aspects of the example embodiments disclosed herein.

Figure 1B:
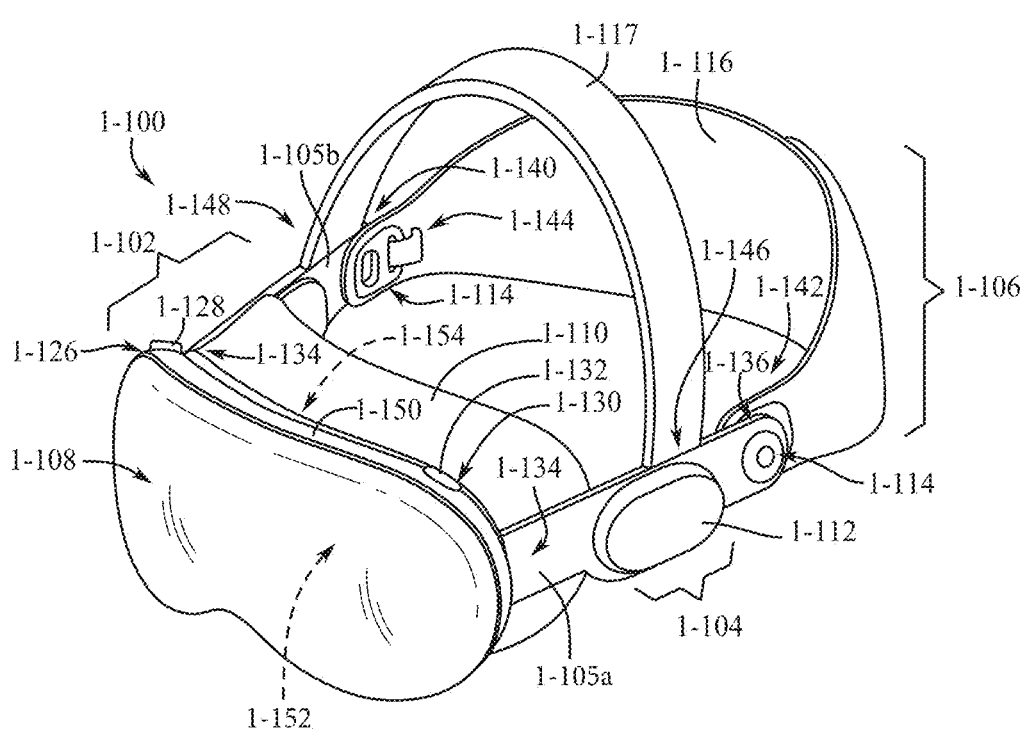
FIGS. 1B-1P are examples of a computer system for providing XR experiences in the operating environment of FIG. 1A.
Figure 1C:
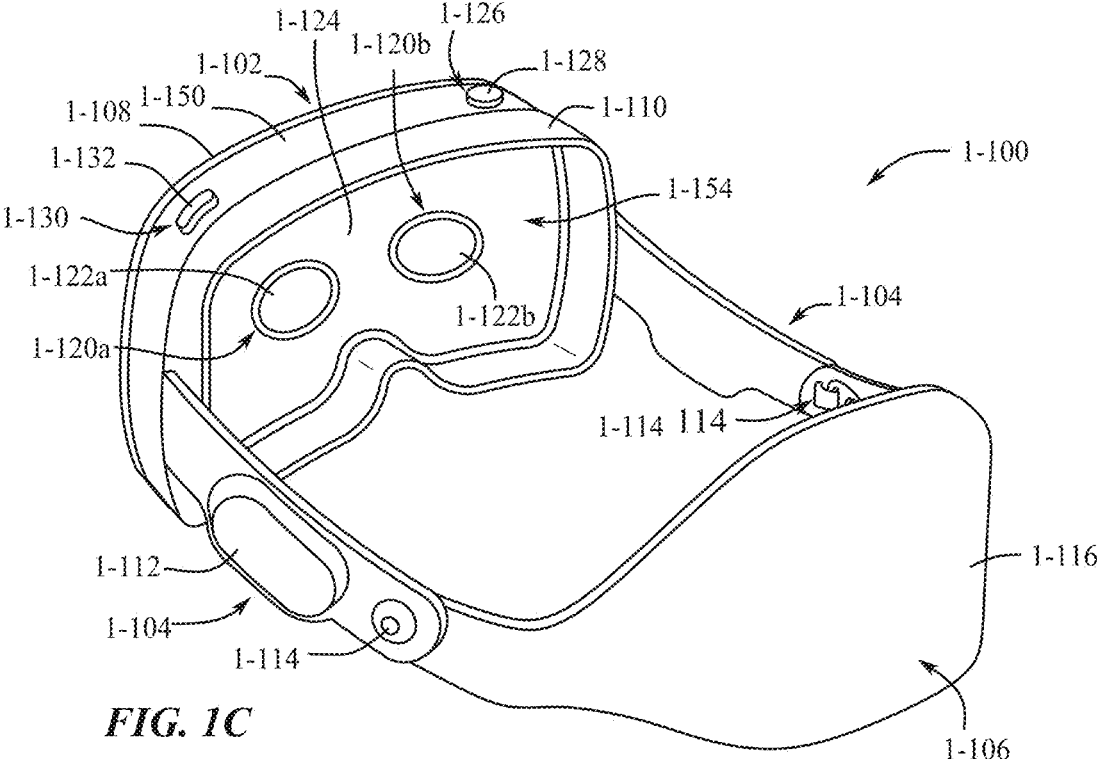
Figure 1D:
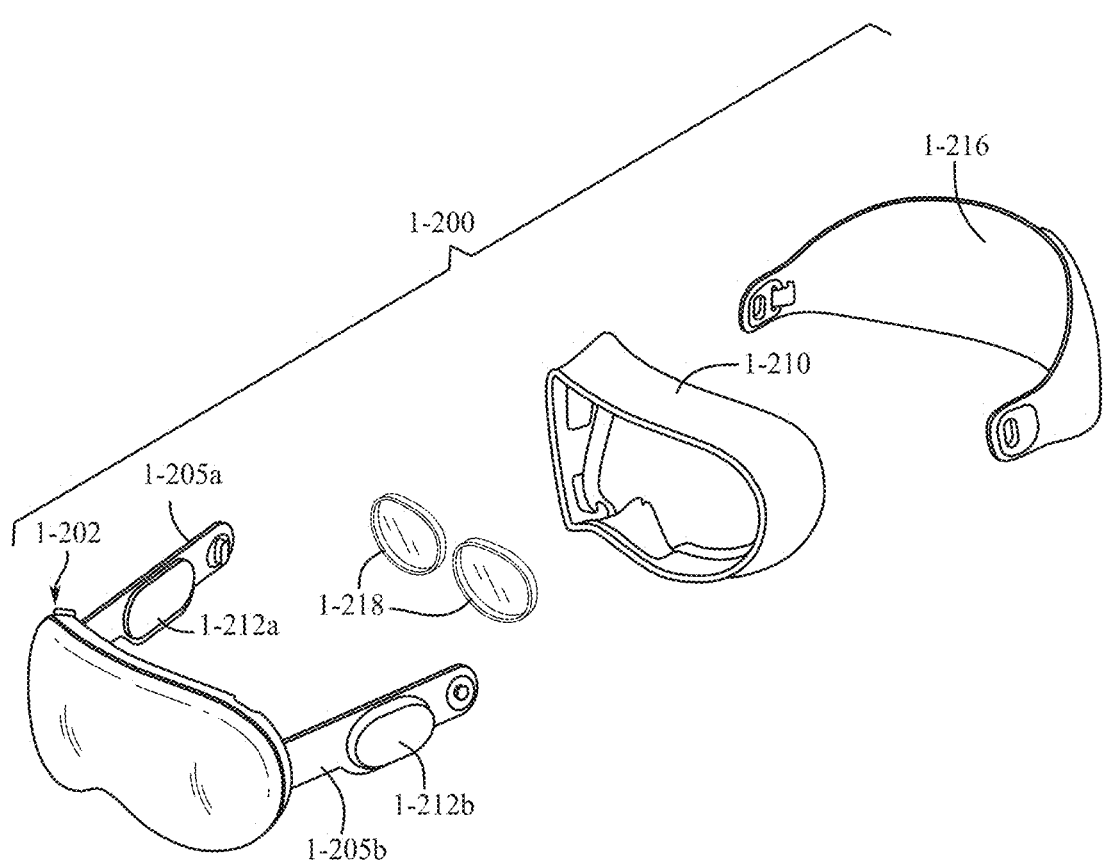
Figure 1E:
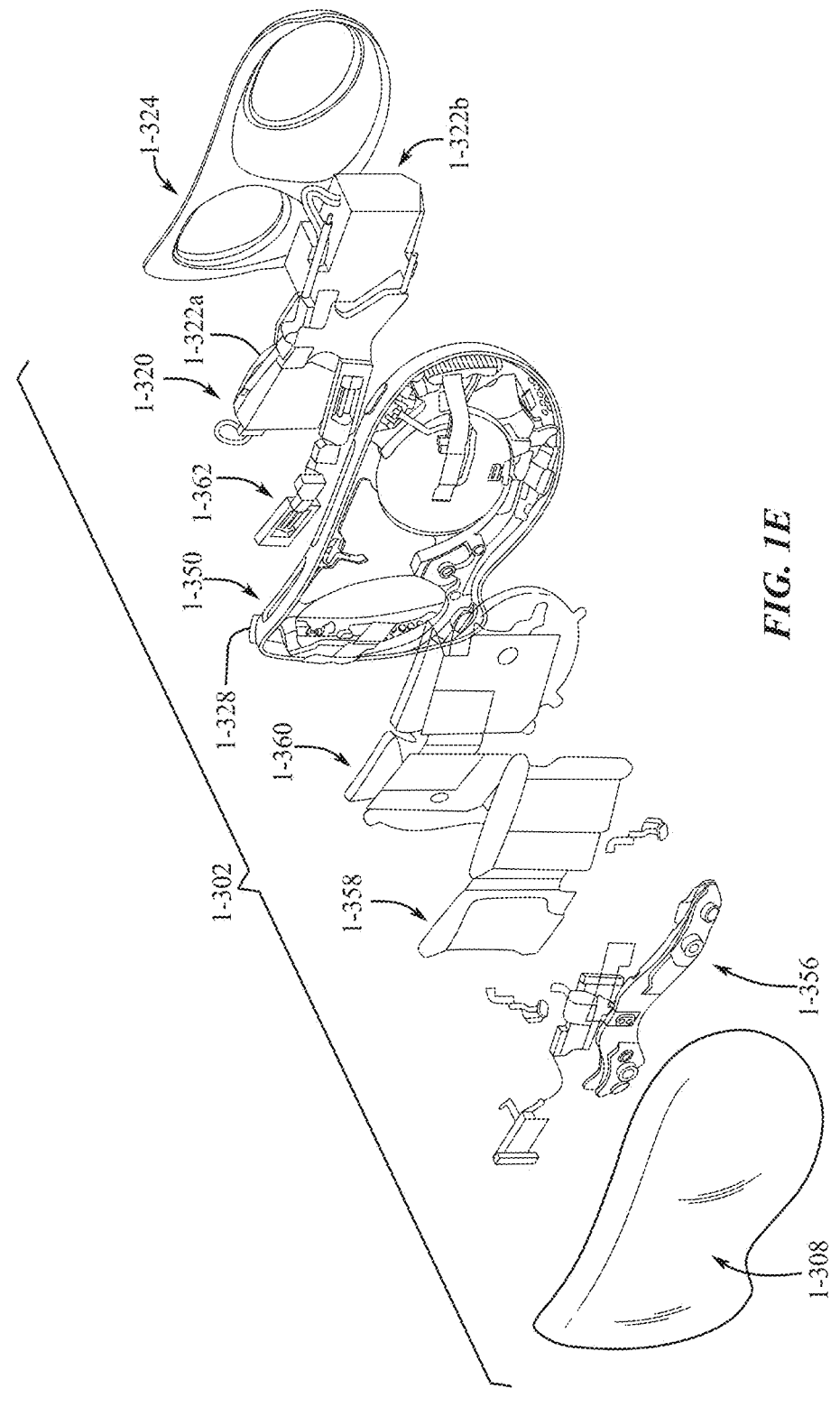
Figure 1F:
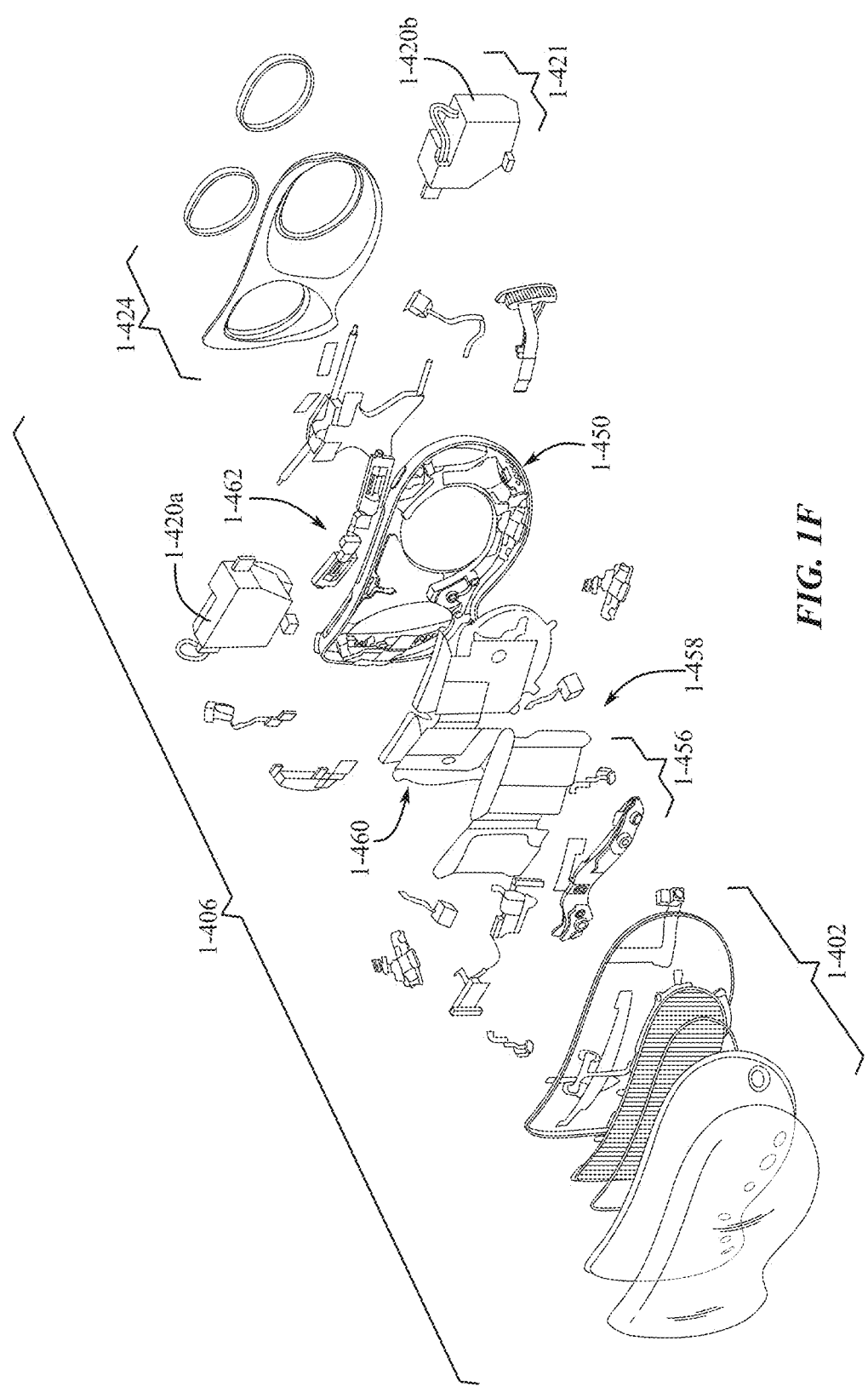
Figure 1G:
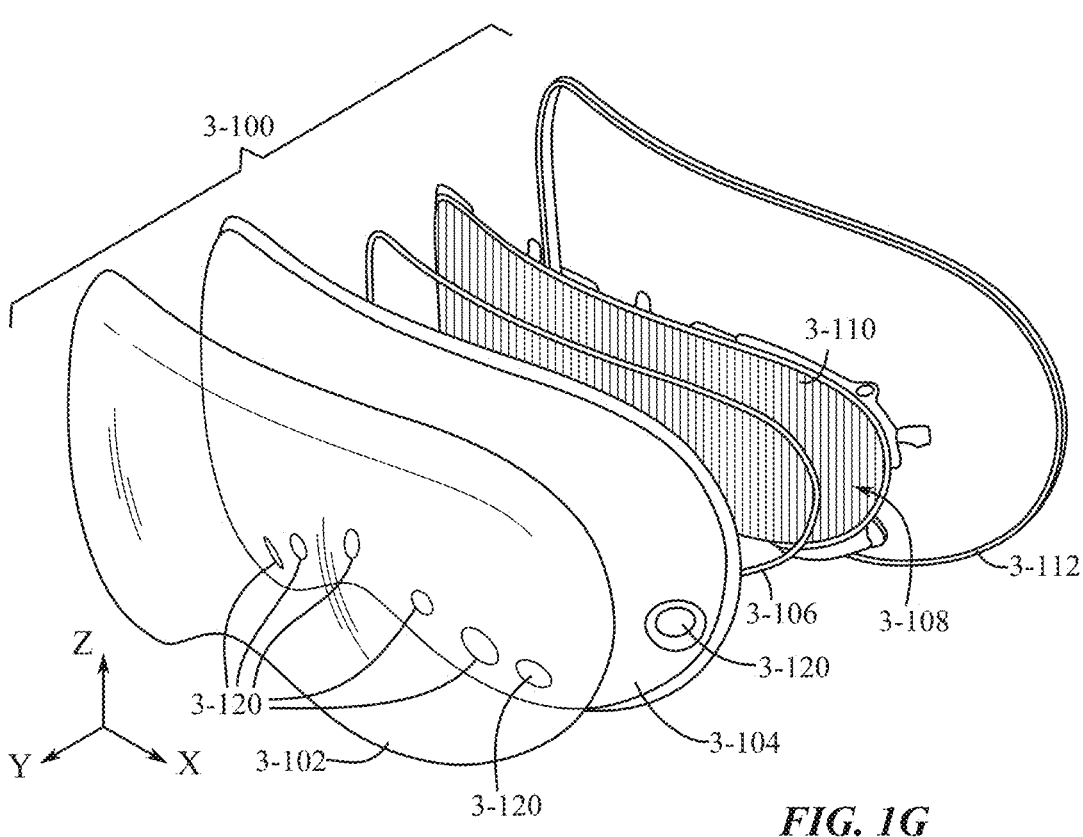
Figure 1H:
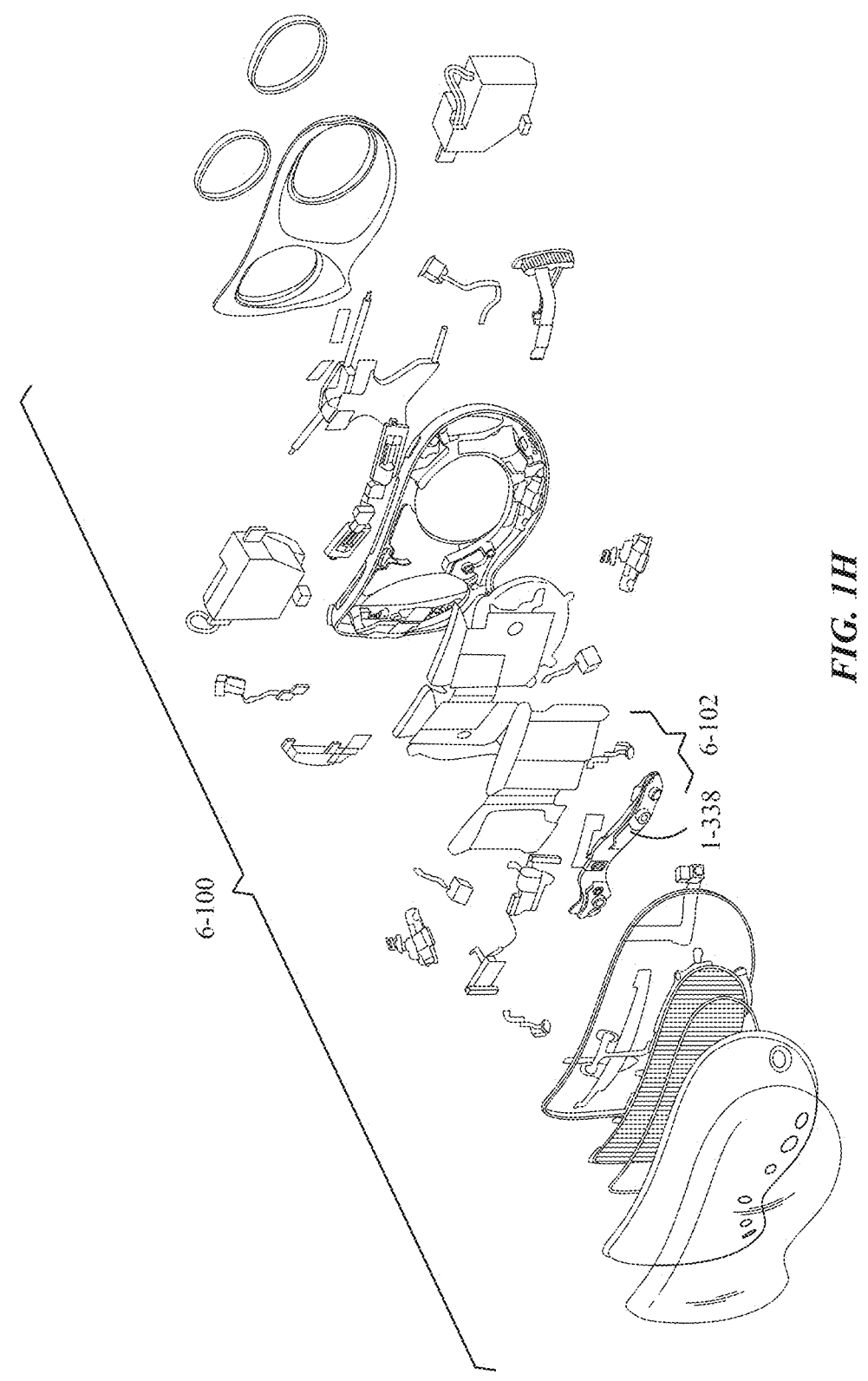
Figure 1I:
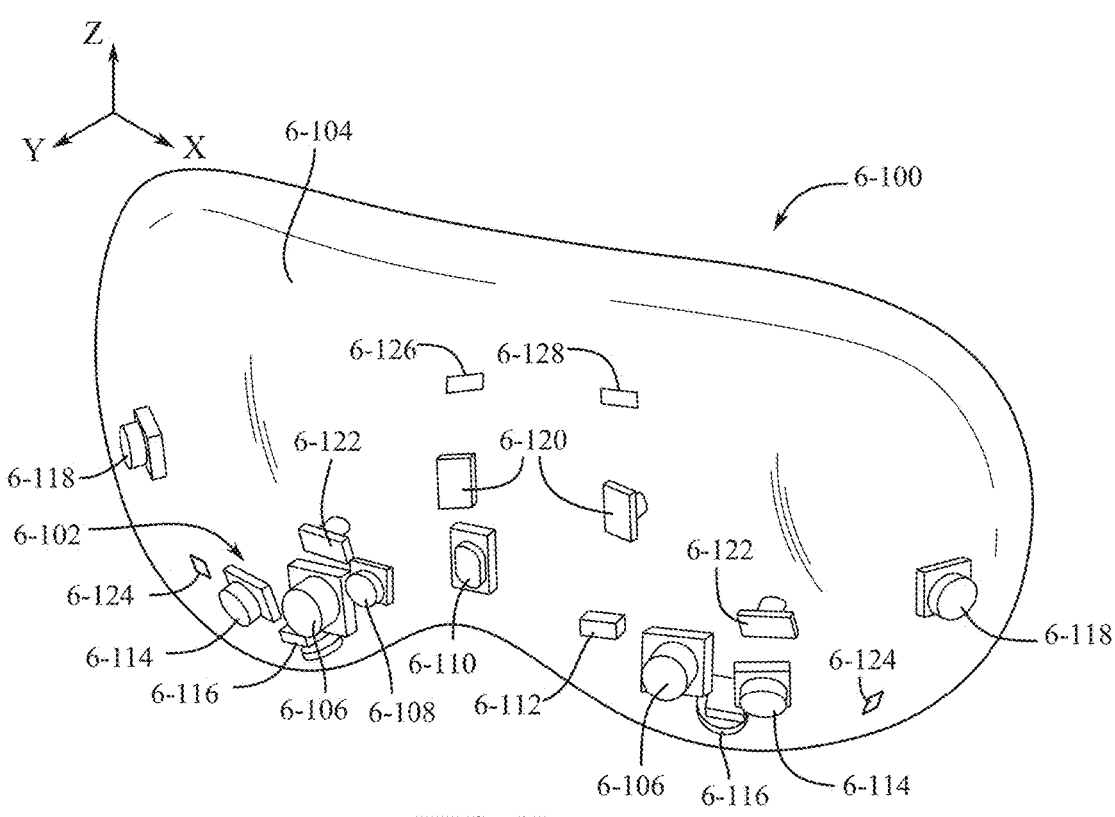
Figure 1J:
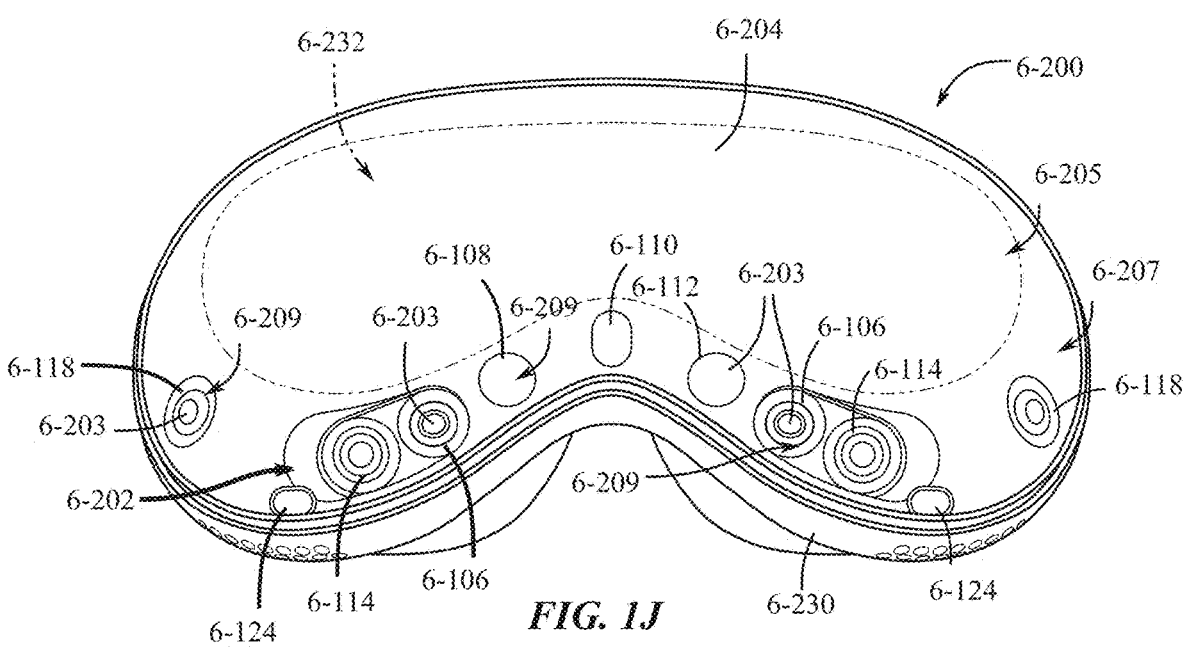
Figure 1K:
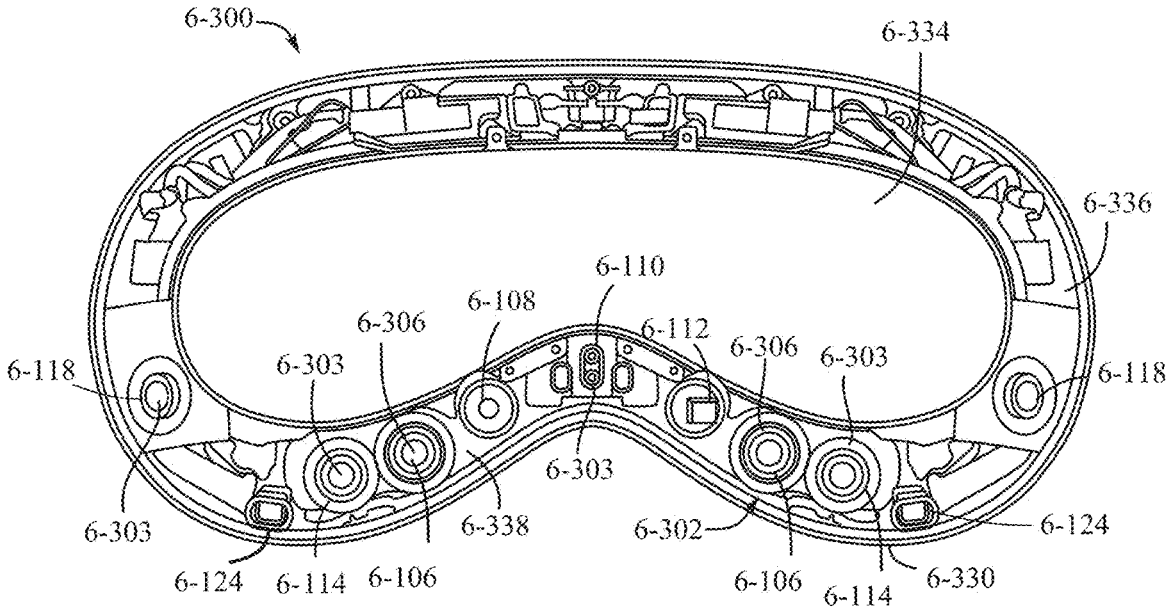
Figure 1L:
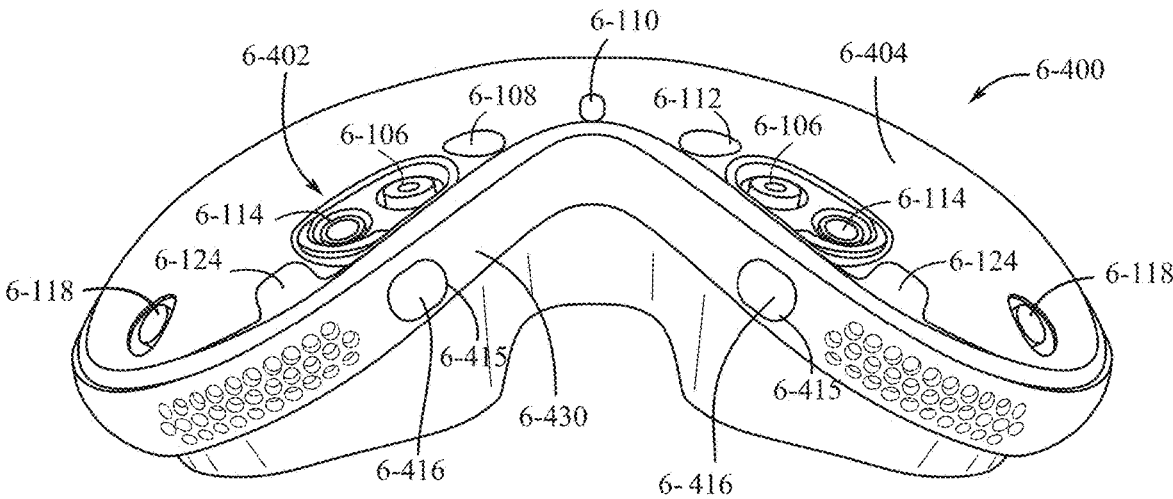
Figure 1M:
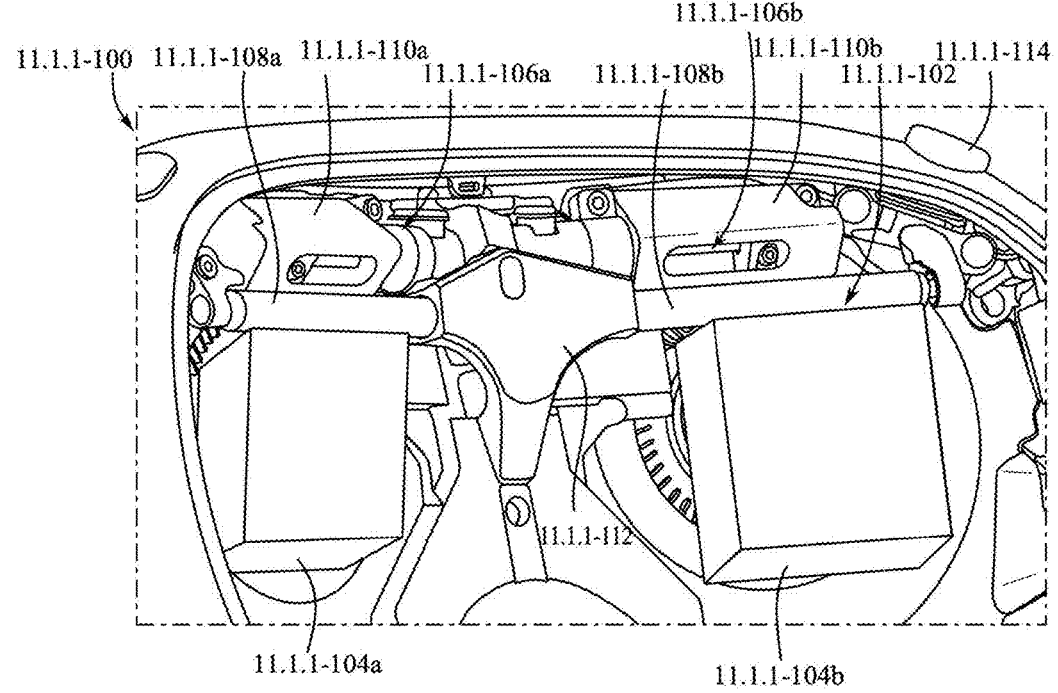
Figure 1N:
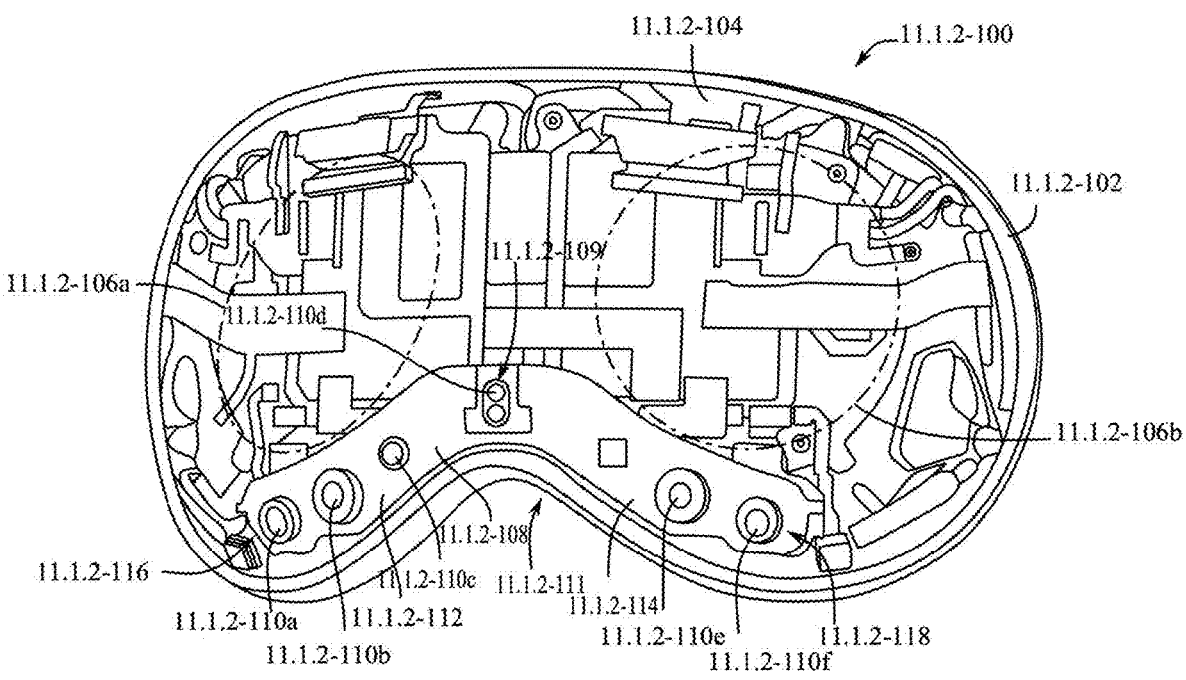
Figure 1O:
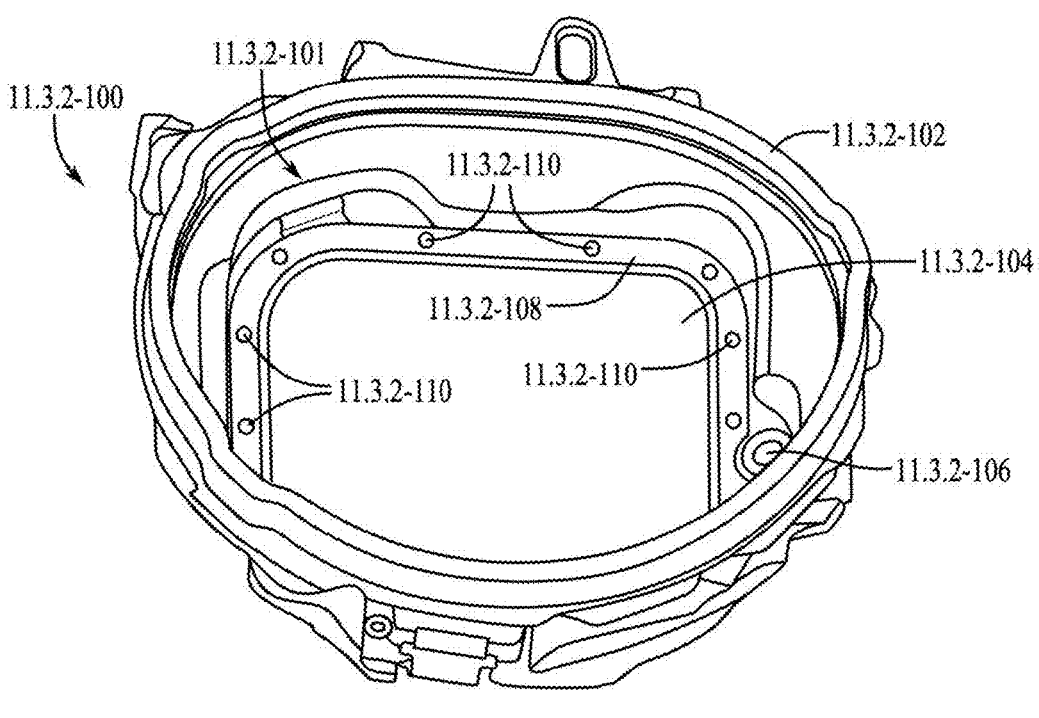
Figure 1P:
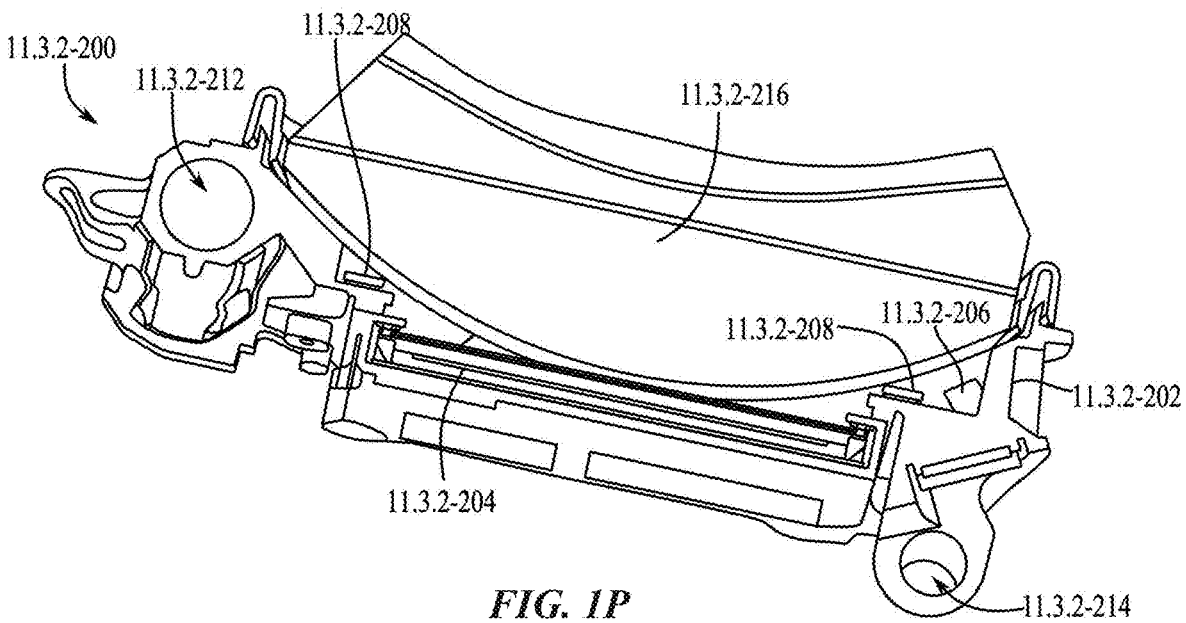

FIGS. 1A-1P illustrate various examples of a computer system that is used to perform the methods and provide audio, visual and/or haptic feedback as part of user inter-faces described herein. In some embodiments, the computer system includes one or more display generation components (e.g., first and second display assemblies 1-120a, 1-120b and/or first and second optical modules 11.1.1-104a and 11.1.1-104b) for displaying virtual elements and/or a repre-sentation of a physical environment to a user of the computer system, optionally generated based on detected events and/or user inputs detected by the computer system. User inter-faces generated by the computer system are optionally corrected by one or more corrective lenses 11.3.2-216 that are optionally removably attached to one or more of the optical modules to enable the user interfaces to be more easily viewed by users who would otherwise use glasses or contacts to correct their vision. While many user interfaces illustrated herein show a single view of a user interface, user interfaces in a HMD are optionally displayed using two optical modules (e.g., first and second display assemblies 1-120a, 1-120b and/or first and second optical modules 11.1.1-104a and 11.1.1-104b), one for a user's right eye and a different one for a user's left eye, and slightly different images are presented to the two different eyes to generate the illusion of stereoscopic depth, the single view of the user interface would typically be either a right-eye or left-eye view and the depth effect is explained in the text or using other schematic charts or views. In some embodiments, the computer system includes one or more external displays (e.g., display assembly 1-108) for displaying status infor-mation for the computer system to the user of the computer system (when the computer system is not being worn) and/or to other people who are near the computer system, option-ally generated based on detected events and/or user inputs detected by the computer system. In some embodiments, the computer system includes one or more audio output com-ponents (e.g., electronic component 1-112) for generating audio feedback, optionally generated based on detected events and/or user inputs detected by the computer system. In some embodiments, the computer system includes one or more input devices for detecting input such as one or more sensors (e.g., one or more sensors in sensor assembly 1-356, and/or FIG. 1I) for detecting information about a physical environment of the device which can be used (optionally in conjunction with one or more illuminators such as the illuminators described in FIG. 1I) to generate a digital passthrough image, capture visual media corresponding to the physical environment (e.g., photos and/or video), or determine a pose (e.g., position and/or orientation) of physical objects and/or surfaces in the physical environment so that virtual objects ban be placed based on a detected pose of physical objects and/or surfaces. In some embodiments, the computer system includes one or more input devices for detecting input such as one or more sensors for detecting hand position and/or movement (e.g., one or more sensors in sensor assembly 1-356, and/or FIG. 1I) that can be used (optionally in conjunction with one or more illuminators such as the illuminators 6-124 described in FIG. 1I) to determine when one or more air gestures have been performed. In some embodiments, the computer system includes one or more input devices for detecting input such as one or more sensors for detecting eye movement (e.g., eye tracking and gaze tracking sensors in FIG. 1I) which can be used (optionally in conjunction with one or more lights such as lights 11.3.2-110 in FIG. 1O) to determine attention or gaze position and/or gaze movement which can optionally be used to detect gaze-only inputs based on gaze movement and/or dwell. A combination of the various sensors described above can be used to determine user facial expressions and/or hand movements for use in generating an avatar or representation of the user such as an anthropomorphic avatar or representation for use in a real-time communication session where the avatar has facial expressions, hand movements, and/or body movements that are based on or similar to detected facial expressions, hand movements, and/or body movements of a user of the device. Gaze and/or attention information is, optionally, combined with hand tracking information to determine interactions between the user and one or more user interfaces based on direct and/or indirect inputs such as air gestures or inputs that use one or more hardware input devices such as one or more buttons (e.g., first button 1-128, button 11.1.1-114, second button 1-132, and or dial or button 1-328), knobs (e.g., first button 1-128, button 11.1.1-114, and/or dial or button 1-328), digital crowns (e.g., first button 1-128 which is depressible and twistable or rotatable, button 11.1.1-114, and/or dial or button 1-328), trackpads, touch screens, keyboards, mice and/or other input devices. One or more buttons (e.g., first button 1-128, button 11.1.1-114, second button 1-132, and or dial or button 1-328) are optionally used to perform system operations such as recentering content in three-dimensional environment that is visible to a user of the device, displaying a home user interface for launching applications, starting real-time communication sessions, or initiating display of virtual three-dimensional backgrounds. Knobs or digital crowns (e.g., first button 1-128 which is depressible and twistable or rotatable, button 11.1.1-114, and/or dial or button 1-328) are optionally rotatable to adjust parameters of the visual content such as a level of immersion of a virtual three-dimensional environment (e.g., a degree to which virtual-content occupies the viewport of the user into the three-dimensional environment) or other parameters associated with the three-dimensional environment and the virtual content that is displayed via the optical modules (e.g., first and second display assemblies 1-120a, 1-120b and/or first and second optical modules 11.1.1-104a and 11.1.1-104b).

FIG. 1B illustrates a front, top, perspective view of an example of a head-mountable display (HMD) device 1-100 configured to be donned by a user and provide virtual and altered/mixed reality (VR/AR) experiences. The HMD 1-100 can include a display unit 1-102 or assembly, an electronic strap assembly 1-104 connected to and extending from the display unit 1-102, and a band assembly 1-106 secured at either end to the electronic strap assembly 1-104. The electronic strap assembly 1-104 and the band 1-106 can be part of a retention assembly configured to wrap around a user's head to hold the display unit 1-102 against the face of the user.

In at least one example, the band assembly 1-106 can include a first band 1-116 configured to wrap around the rear side of a user's head and a second band 1-117 configured to extend over the top of a user's head. The second strap can extend between first and second electronic straps 1-105a, 1-105b of the electronic strap assembly 1-104 as shown. The strap assembly 1-104 and the band assembly 1-106 can be part of a securement mechanism extending rearward from the display unit 1-102 and configured to hold the display unit 1-102 against a face of a user.

In at least one example, the securement mechanism includes a first electronic strap 1-105a including a first proximal end 1-134 coupled to the display unit 1-102, for example a housing 1-150 of the display unit 1-102, and a first distal end 1-136 opposite the first proximal end 1-134. The securement mechanism can also include a second electronic strap 1-105b including a second proximal end 1-138 coupled to the housing 1-150 of the display unit 1-102 and a second distal end 1-140 opposite the second proximal end 1-138. The securement mechanism can also include the first band 1-116 including a first end 1-142 coupled to the first distal end 1-136 and a second end 1-144 coupled to the second distal end 1-140 and the second band 1-117 extending between the first electronic strap 1-105a and the second electronic strap 1-105b. The straps 1-105a-b and band 1-116 can be coupled via connection mechanisms or assemblies 1-114. In at least one example, the second band 1-117 includes a first end 1-146 coupled to the first electronic strap 1-105a between the first proximal end 1-134 and the first distal end 1-136 and a second end 1-148 coupled to the second electronic strap 1-105b between the second proximal end 1-138 and the second distal end 1-140.

In at least one example, the first and second electronic straps 1-105a-b include plastic, metal, or other structural materials forming the shape the substantially rigid straps 1-105a-b. In at least one example, the first and second bands 1-116, 1-117 are formed of elastic, flexible materials including woven textiles, rubbers, and the like. The first and second bands 1-116, 1-117 can be flexible to conform to the shape of the user' head when donning the HMD 1-100.

In at least one example, one or more of the first and second electronic straps 1-105a-b can define internal strap volumes and include one or more electronic components disposed in the internal strap volumes. In one example, as shown in FIG. 1B, the first electronic strap 1-105a can include an electronic component 1-112. In one example, the electronic component 1-112 can include a speaker. In one example, the electronic component 1-112 can include a computing component such as a processor.

In at least one example, the housing 1-150 defines a first, front-facing opening 1-152. The front-facing opening is labeled in dotted lines at 1-152 in FIG. 1B because the display assembly 1-108 is disposed to occlude the first opening 1-152 from view when the HMD 1-100 is assembled. The housing 1-150 can also define a rear-facing second opening 1-154. The housing 1-150 also defines an internal volume between the first and second openings 1-152, 1-154. In at least one example, the HMD 1-100 includes the display assembly 1-108, which can include a front cover and display screen (shown in other figures) disposed in or across the front opening 1-152 to occlude the front opening 1-152. In at least one example, the display screen of the display assembly 1-108, as well as the display assembly 1-108 in general, has a curvature configured to follow the curvature of a user's face. The display screen of the display assembly 1-108 can be curved as shown to compliment the user's facial features and general curvature from one side of the face to the other, for example from left to right and/or from top to bottom where the display unit 1-102 is pressed.

In at least one example, the housing 1-150 can define a first aperture 1-126 between the first and second openings 1-152, 1-154 and a second aperture 1-130 between the first and second openings 1-152, 1-154. The HMD 1-100 can also include a first button 1-128 disposed in the first aperture 1-126 and a second button 1-132 disposed in the second aperture 1-130. The first and second buttons 1-128, 1-132 can be depressible through the respective apertures 1-126, 1-130. In at least one example, the first button 1-126 and/or second button 1-132 can be twistable dials as well as depressible buttons. In at least one example, the first button 1-128 is a depressible and twistable dial button and the second button 1-132 is a depressible button.

FIG. 1C illustrates a rear, perspective view of the HMD 1-100. The HMD 1-100 can include a light seal 1-110 extending rearward from the housing 1-150 of the display assembly 1-108 around a perimeter of the housing 1-150 as shown. The light seal 1-110 can be configured to extend from the housing 1-150 to the user's face around the user's eyes to block external light from being visible. In one example, the HMD 1-100 can include first and second display assemblies 1-120a, 1-120b disposed at or in the rearward facing second opening 1-154 defined by the housing 1-150 and/or disposed in the internal volume of the housing 1-150 and configured to project light through the second opening 1-154. In at least one example, each display assembly 1-120a-b can include respective display screens 1-122a, 1-122b configured to project light in a rearward direction through the second opening 1-154 toward the user's eyes.

In at least one example, referring to both FIGS. 1B and 1C, the display assembly 1-108 can be a front-facing, forward display assembly including a display screen configured to project light in a first, forward direction and the rear facing display screens 1-122a-b can be configured to project light in a second, rearward direction opposite the first direction. As noted above, the light seal 1-110 can be configured to block light external to the HMD 1-100 from reaching the user's eyes, including light projected by the forward facing display screen of the display assembly 1-108 shown in the front perspective view of FIG. 1B. In at least one example, the HMD 1-100 can also include a curtain 1-124 occluding the second opening 1-154 between the housing 1-150 and the rear-facing display assemblies 1-120a-b. In at least one example, the curtain 1-124 can be elastic or at least partially elastic.

Any of the features, components, and/or parts, including the arrangements and configurations thereof shown in FIGS. 1B and 1C can be included, either alone or in any combination, in any of the other examples of devices, features, components, and parts shown in FIGS. 1D-IF and described herein. Likewise, any of the features, components, and/or parts, including the arrangements and configurations thereof shown and described with reference to FIGS. 1D-IF can be included, cither alone or in any combination, in the example of the devices, features, components, and parts shown in FIGS. 1B and 1C.

FIG. 1D illustrates an exploded view of an example of an HMD 1-200 including various portions or parts thereof separated according to the modularity and selective coupling of those parts. For example, the HMD 1-200 can include a band 1-216 which can be selectively coupled to first and second electronic straps 1-205a, 1-205b. The first securement strap 1-205a can include a first electronic component 1-212a and the second securement strap 1-205b can include a second electronic component 1-212b. In at least one example, the first and second straps 1-205a-b can be removably coupled to the display unit 1-202.

In addition, the HMD 1-200 can include a light seal 1-210 configured to be removably coupled to the display unit 1-202. The HMD 1-200 can also include lenses 1-218 which can be removably coupled to the display unit 1-202, for example over first and second display assemblies including display screens. The lenses 1-218 can include customized prescription lenses configured for corrective vision. As noted, each part shown in the exploded view of FIG. 1D and described above can be removably coupled, attached, re-attached, and changed out to update parts or swap out parts for different users. For example, bands such as the band 1-216, light seals such as the light seal 1-210, lenses such as the lenses 1-218, and electronic straps such as the straps 1-205a-b can be swapped out depending on the user such that these parts are customized to fit and correspond to the individual user of the HMD 1-200.

Any of the features, components, and/or parts, including the arrangements and configurations thereof shown in FIG. 1D can be included, either alone or in any combination, in any of the other examples of devices, features, components, and parts shown in FIGS. 1B, IC, and 1E-1F and described herein. Likewise, any of the features, components, and/or parts, including the arrangements and configurations thereof shown and described with reference to FIGS. 1B, 1C, and 1E-1F can be included, either alone or in any combination, in the example of the devices, features, components, and parts shown in FIG. 1D.

FIG. 1E illustrates an exploded view of an example of a display unit 1-306 of a HMD. The display unit 1-306 can include a front display assembly 1-308, a frame/housing assembly 1-350, and a curtain assembly 1-324. The display unit 1-306 can also include a sensor assembly 1-356, logic board assembly 1-358, and cooling assembly 1-360 disposed between the frame assembly 1-350 and the front display assembly 1-308. In at least one example, the display unit 1-306 can also include a rear-facing display assembly 1-320 including first and second rear-facing display screens 1-322a, 1-322b disposed between the frame 1-350 and the curtain assembly 1-324.

In at least one example, the display unit 1-306 can also include a motor assembly 1-362 configured as an adjustment mechanism for adjusting the positions of the display screens 1-322a-b of the display assembly 1-320 relative to the frame 1-350. In at least one example, the display assembly 1-320 is mechanically coupled to the motor assembly 1-362, with at least one motor for each display screen 1-322a-b, such that the motors can translate the display screens 1-322a-b to match an interpupillary distance of the user's eyes.

In at least one example, the display unit 1-306 can include a dial or button 1-328 depressible relative to the frame 1-350 and accessible to the user outside the frame 1-350. The button 1-328 can be electronically connected to the motor assembly 1-362 via a controller such that the button 1-328 can be manipulated by the user to cause the motors of the motor assembly 1-362 to adjust the positions of the display screens 1-322*a-b*.

Any of the features, components, and/or parts, including the arrangements and configurations thereof shown in FIG. 1E can be included, either alone or in any combination, in any of the other examples of devices, features, components, and parts shown in FIGS. 1B-1D and 1F and described herein. Likewise, any of the features, components, and/or parts, including the arrangements and configurations thereof shown and described with reference to FIGS. 1B-1D and 1F can be included, either alone or in any combination, in the example of the devices, features, components, and parts shown in FIG. 1E.

FIG. 1F illustrates an exploded view of another example of a display unit 1-406 of a HMD device similar to other HMD devices described herein. The display unit 1-406 can include a front display assembly 1-402, a sensor assembly 1-456, a logic board assembly 1-458, a cooling assembly 1-460, a frame assembly 1-450, a rear-facing display assembly 1-421, and a curtain assembly 1-424. The display unit 1-406 can also include a motor assembly 1-462 for adjusting the positions of first and second display sub-assemblies 1-420*a*, 1-420*b* of the rear-facing display assembly 1-421, including first and second respective display screens for interpupillary adjustments, as described above.

The various parts, systems, and assemblies shown in the exploded view of FIG. 1F are described in greater detail herein with reference to FIGS. 1B-1E as well as subsequent figures referenced in the present disclosure. The display unit 1-406 shown in FIG. 1F can be assembled and integrated with the securement mechanisms shown in FIGS. 1B-1E, including the electronic straps, bands, and other components including light seals, connection assemblies, and so forth.

Any of the features, components, and/or parts, including the arrangements and configurations thereof shown in FIG. 1F can be included, either alone or in any combination, in any of the other examples of devices, features, components, and parts shown in FIGS. 1B-1E and described herein. Likewise, any of the features, components, and/or parts, including the arrangements and configurations thereof shown and described with reference to FIGS. 1B-1E can be included, either alone or in any combination, in the example of the devices, features, components, and parts shown in FIG. 1F.

FIG. 1G illustrates a perspective, exploded view of a front cover assembly 3-100 of an HMD device described herein, for example the front cover assembly 3-1 of the HMD 3-100 shown in FIG. 1G or any other HMD device shown and described herein. The front cover assembly 3-100 shown in FIG. 1G can include a transparent or semi-transparent cover 3-102, shroud 3-104 (or "canopy"), adhesive layers 3-106, display assembly 3-108 including a lenticular lens panel or array 3-110, and a structural trim 3-112. The adhesive layer 3-106 can secure the shroud 3-104 and/or transparent cover 3-102 to the display assembly 3-108 and/or the trim 3-112. The trim 3-112 can secure the various components of the front cover assembly 3-100 to a frame or chassis of the HMD device.

In at least one example, as shown in FIG. 1G, the transparent cover 3-102, shroud 3-104, and display assembly 3-108, including the lenticular lens array 3-110, can be curved to accommodate the curvature of a user's face. The transparent cover 3-102 and the shroud 3-104 can be curved in two or three dimensions, e.g., vertically curved in the Z-direction in and out of the Z-X plane and horizontally curved in the X-direction in and out of the Z-X plane. In at least one example, the display assembly 3-108 can include the lenticular lens array 3-110 as well as a display panel having pixels configured to project light through the shroud 3-104 and the transparent cover 3-102. The display assembly 3-108 can be curved in at least one direction, for example the horizontal direction, to accommodate the curvature of a user's face from one side (e.g., left side) of the face to the other (e.g., right side). In at least one example, each layer or component of the display assembly 3-108, which will be shown in subsequent figures and described in more detail, but which can include the lenticular lens array 3-110 and a display layer, can be similarly or concentrically curved in the horizontal direction to accommodate the curvature of the user's face.

In at least one example, the shroud 3-104 can include a transparent or semi-transparent material through which the display assembly 3-108 projects light. In one example, the shroud 3-104 can include one or more opaque portions, for example opaque ink-printed portions or other opaque film portions on the rear surface of the shroud 3-104. The rear surface can be the surface of the shroud 3-104 facing the user's eyes when the HMD device is donned. In at least one example, opaque portions can be on the front surface of the shroud 3-104 opposite the rear surface. In at least one example, the opaque portion or portions of the shroud 3-104 can include perimeter portions visually hiding any components around an outside perimeter of the display screen of the display assembly 3-108. In this way, the opaque portions of the shroud hide any other components, including electronic components, structural components, and so forth, of the HMD device that would otherwise be visible through the transparent or semi-transparent cover 3-102 and/or shroud 3-104.

In at least one example, the shroud 3-104 can define one or more apertures transparent portions 3-120 through which sensors can send and receive signals. In one example, the portions 3-120 are apertures through which the sensors can extend or send and receive signals. In one example, the portions 3-120 are transparent portions, or portions more transparent than surrounding semi-transparent or opaque portions of the shroud, through which sensors can send and receive signals through the shroud and through the transparent cover 3-102. In one example, the sensors can include cameras, IR sensors, LUX sensors, or any other visual or non-visual environmental sensors of the HMD device.

Any of the features, components, and/or parts, including the arrangements and configurations thereof shown in FIG. 1G can be included, either alone or in any combination, in any of the other examples of devices, features, components, and parts described herein. Likewise, any of the features, components, and/or parts, including the arrangements and configurations thereof shown and described herein can be included, either alone or in any combination, in the example of the devices, features, components, and parts shown in FIG. 1G.

FIG. 1H illustrates an exploded view of an example of an HMD device 6-100. The HMD device 6-100 can include a sensor array or system 6-102 including one or more sensors, cameras, projectors, and so forth mounted to one or more components of the HMD 6-100. In at least one example, the sensor system 6-102 can include a bracket 1-338 on which one or more sensors of the sensor system 6-102 can be fixed/secured.

FIG. 1I illustrates a portion of an HMD device 6-100 including a front transparent cover 6-104 and a sensor system 6-102. The sensor system 6-102 can include a number of different sensors, emitters, receivers, including cameras, IR sensors, projectors, and so forth. The transparent cover 6-104 is illustrated in front of the sensor system 6-102 to illustrate relative positions of the various sensors and emitters as well as the orientation of each sensor/emitter of the system 6-102. As referenced herein, "sideways," "side," "lateral," "horizontal," and other similar terms refer to orientations or directions as indicated by the X-axis shown in FIG. 1J. Terms such as "vertical," "up," "down," and similar terms refer to orientations or directions as indicated by the Z-axis shown in FIG. 1J. Terms such as "frontward," "rearward," "forward," backward," and similar terms refer to orientations or directions as indicated by the Y-axis shown in FIG. 1J.

In at least one example, the transparent cover 6-104 can define a front, external surface of the HMD device 6-100 and the sensor system 6-102, including the various sensors and components thereof, can be disposed behind the cover 6-104 in the Y-axis/direction. The cover 6-104 can be transparent or semi-transparent to allow light to pass through the cover 6-104, both light detected by the sensor system 6-102 and light emitted thereby.

As noted elsewhere herein, the HMD device 6-100 can include one or more controllers including processors for electrically coupling the various sensors and emitters of the sensor system 6-102 with one or more mother boards, processing units, and other electronic devices such as display screens and the like. In addition, as will be shown in more detail below with reference to other figures, the various sensors, emitters, and other components of the sensor system 6-102 can be coupled to various structural frame members, brackets, and so forth of the HMD device 6-100 not shown in FIG. 1I. FIG. 1I shows the components of the sensor system 6-102 unattached and un-coupled electrically from other components for the sake of illustrative clarity.

In at least one example, the device can include one or more controllers having processors configured to execute instructions stored on memory components electrically coupled to the processors. The instructions can include, or cause the processor to execute, one or more algorithms for self-correcting angles and positions of the various cameras described herein overtime with use as the initial positions, angles, or orientations of the cameras get bumped or deformed due to unintended drop events or other events.

In at least one example, the sensor system 6-102 can include one or more scene cameras 6-106. The system 6-102 can include two scene cameras 6-102 disposed on either side of the nasal bridge or arch of the HMD device 6-100 such that each of the two cameras 6-106 correspond generally in position with left and right eyes of the user behind the cover 6-103. In at least one example, the scene cameras 6-106 are oriented generally forward in the Y-direction to capture images in front of the user during use of the HMD 6-100. In at least one example, the scene cameras are color cameras and provide images and content for MR video pass through to the display screens facing the user's eyes when using the HMD device 6-100. The scene cameras 6-106 can also be used for environment and object reconstruction.

In at least one example, the sensor system 6-102 can include a first depth sensor 6-108 pointed generally forward in the Y-direction. In at least one example, the first depth sensor 6-108 can be used for environment and object reconstruction as well as user hand and body tracking. In at least one example, the sensor system 6-102 can include a second depth sensor 6-110 disposed centrally along the width (e.g., along the X-axis) of the HMD device 6-100. For example, the second depth sensor 6-110 can be disposed above the central nasal bridge or accommodating features over the nose of the user when donning the HMD 6-100. In at least one example, the second depth sensor 6-110 can be used for environment and object reconstruction as well as hand and body tracking. In at least one example, the second depth sensor can include a LIDAR sensor.

In at least one example, the sensor system 6-102 can include a depth projector 6-112 facing generally forward to project electromagnetic waves, for example in the form of a predetermined pattern of light dots, out into and within a field of view of the user and/or the scene cameras 6-106 or a field of view including and beyond the field of view of the user and/or scene cameras 6-106. In at least one example, the depth projector can project electromagnetic waves of light in the form of a dotted light pattern to be reflected off objects and back into the depth sensors noted above, including the depth sensors 6-108, 6-110. In at least one example, the depth projector 6-112 can be used for environment and object reconstruction as well as hand and body tracking.

In at least one example, the sensor system 6-102 can include downward facing cameras 6-114 with a field of view pointed generally downward relative to the HDM device 6-100 in the Z-axis. In at least one example, the downward cameras 6-114 can be disposed on left and right sides of the HMD device 6-100 as shown and used for hand and body tracking, headset tracking, and facial avatar detection and creation for display a user avatar on the forward facing display screen of the HMD device 6-100 described elsewhere herein. The downward cameras 6-114, for example, can be used to capture facial expressions and movements for the face of the user below the HMD device 6-100, including the cheeks, mouth, and chin.

In at least one example, the sensor system 6-102 can include jaw cameras 6-116. In at least one example, the jaw cameras 6-116 can be disposed on left and right sides of the HMD device 6-100 as shown and used for hand and body tracking, headset tracking, and facial avatar detection and creation for display a user avatar on the forward facing display screen of the HMD device 6-100 described elsewhere herein. The jaw cameras 6-116, for example, can be used to capture facial expressions and movements for the face of the user below the HMD device 6-100, including the user's jaw, checks, mouth, and chin. for hand and body tracking, headset tracking, and facial avatar In at least one example, the sensor system 6-102 can include side cameras 6-118. The side cameras 6-118 can be oriented to capture side views left and right in the X-axis or direction relative to the HMD device 6-100. In at least one example, the side cameras 6-118 can be used for hand and body tracking, headset tracking, and facial avatar detection and re-creation.

In at least one example, the sensor system 6-102 can include a plurality of eye tracking and gaze tracking sensors for determining an identity, status, and gaze direction of a user's eyes during and/or before use. In at least one example, the eye/gaze tracking sensors can include nasal eye cameras 6-120 disposed on either side of the user's nose and adjacent the user's nose when donning the HMD device 6-100. The eye/gaze sensors can also include bottom eye cameras 6-122 disposed below respective user eyes for capturing images of the eyes for facial avatar detection and creation, gaze tracking, and iris identification functions.

In at least one example, the sensor system 6-102 can include infrared illuminators 6-124 pointed outward from the HMD device 6-100 to illuminate the external environment and any object therein with IR light for IR detection with one or more IR sensors of the sensor system 6-102. In at least one example, the sensor system 6-102 can include a flicker sensor 6-126 and an ambient light sensor 6-128. In at least one example, the flicker sensor 6-126 can detect overhead light refresh rates to avoid display flicker. In one example, the infrared illuminators 6-124 can include light emitting diodes and can be used especially for low light environments for illuminating user hands and other objects in low light for detection by infrared sensors of the sensor system 6-102.

In at least one example, multiple sensors, including the scene cameras 6-106, the downward cameras 6-114, the jaw cameras 6-116, the side cameras 6-118, the depth projector 6-112, and the depth sensors 6-108, 6-110 can be used in combination with an electrically coupled controller to combine depth data with camera data for hand tracking and for size determination for better hand tracking and object recognition and tracking functions of the HMD device 6-100. In at least one example, the downward cameras 6-114, jaw cameras 6-116, and side cameras 6-118 described above and shown in FIG. 1I can be wide angle cameras operable in the visible and infrared spectrums. In at least one example, these cameras 6-114, 6-116, 6-118 can operate only in black and white light detection to simplify image processing and gain sensitivity.

Any of the features, components, and/or parts, including the arrangements and configurations thereof shown in FIG. 1I can be included, either alone or in any combination, in any of the other examples of devices, features, components, and parts shown in FIGS. 1J-1L and described herein. Likewise, any of the features, components, and/or parts, including the arrangements and configurations thereof shown and described with reference to FIGS. 1J-1L can be included, either alone or in any combination, in the example of the devices, features, components, and parts shown in FIG. 1I.

FIG. 1J illustrates a lower perspective view of an example of an HMD 6-200 including a cover or shroud 6-204 secured to a frame 6-230. In at least one example, the sensors 6-203 of the sensor system 6-202 can be disposed around a perimeter of the HDM 6-200 such that the sensors 6-203 are outwardly disposed around a perimeter of a display region or area 6-232 so as not to obstruct a view of the displayed light. In at least one example, the sensors can be disposed behind the shroud 6-204 and aligned with transparent portions of the shroud allowing sensors and projectors to allow light back and forth through the shroud 6-204. In at least one example, opaque ink or other opaque material or films/layers can be disposed on the shroud 6-204 around the display area 6-232 to hide components of the HMD 6-200 outside the display area 6-232 other than the transparent portions defined by the opaque portions, through which the sensors and projectors send and receive light and electromagnetic signals during operation. In at least one example, the shroud 6-204 allows light to pass therethrough from the display (e.g., within the display region 6-232) but not radially outward from the display region around the perimeter of the display and shroud 6-204.

In some examples, the shroud 6-204 includes a transparent portion 6-205 and an opaque portion 6-207, as described above and elsewhere herein. In at least one example, the opaque portion 6-207 of the shroud 6-204 can define one or more transparent regions 6-209 through which the sensors 6-203 of the sensor system 6-202 can send and receive signals. In the illustrated example, the sensors 6-203 of the sensor system 6-202 sending and receiving signals through the shroud 6-204, or more specifically through the transparent regions 6-209 of the (or defined by) the opaque portion 6-207 of the shroud 6-204 can include the same or similar sensors as those shown in the example of FIG. 1I, for example depth sensors 6-108 and 6-110, depth projector 6-112, first and second scene cameras 6-106, first and second downward cameras 6-114, first and second side cameras 6-118, and first and second infrared illuminators 6-124. These sensors are also shown in the examples of FIGS. 1K and 1L. Other sensors, sensor types, number of sensors, and relative positions thereof can be included in one or more other examples of HMDs.

Any of the features, components, and/or parts, including the arrangements and configurations thereof shown in FIG. 1J can be included, either alone or in any combination, in any of the other examples of devices, features, components, and parts shown in FIGS. 1I and 1K-1L and described herein. Likewise, any of the features, components, and/or parts, including the arrangements and configurations thereof shown and described with reference to FIGS. 1I and 1K-1L can be included, either alone or in any combination, in the example of the devices, features, components, and parts shown in FIG. 1J.

FIG. 1K illustrates a front view of a portion of an example of an HMD device 6-300 including a display 6-334, brackets 6-336, 6-338, and frame or housing 6-330. The example shown in FIG. 1K does not include a front cover or shroud in order to illustrate the brackets 6-336, 6-338. For example, the shroud 6-204 shown in FIG. 1J includes the opaque portion 6-207 that would visually cover/block a view of anything outside (e.g., radially/peripherally outside) the display/display region 6-334, including the sensors 6-303 and bracket 6-338.

In at least one example, the various sensors of the sensor system 6-302 are coupled to the brackets 6-336, 6-338. In at least one example, the scene cameras 6-306 include tight tolerances of angles relative to one another. For example, the tolerance of mounting angles between the two scene cameras 6-306 can be 0.5 degrees or less, for example 0.3 degrees or less. In order to achieve and maintain such a tight tolerance, in one example, the scene cameras 6-306 can be mounted to the bracket 6-338 and not the shroud. The bracket can include cantilevered arms on which the scene cameras 6-306 and other sensors of the sensor system 6-302 can be mounted to remain un-deformed in position and orientation in the case of a drop event by a user resulting in any deformation of the other bracket 6-226, housing 6-330, and/or shroud.

Any of the features, components, and/or parts, including the arrangements and configurations thereof shown in FIG. 1K can be included, either alone or in any combination, in any of the other examples of devices, features, components, and parts shown in FIGS. 1I-1J and 1L and described herein. Likewise, any of the features, components, and/or parts, including the arrangements and configurations thereof shown and described with reference to FIGS. 1I-1J and 1L can be included, either alone or in any combination, in the example of the devices, features, components, and parts shown in FIG. 1K.

FIG. 1L illustrates a bottom view of an example of an HMD 6-400 including a front display/cover assembly 6-404 and a sensor system 6-402. The sensor system 6-402 can be similar to other sensor systems described above and else-where herein, including in reference to FIGS. 1I-1K. In at least one example, the jaw cameras 6-416 can be facing downward to capture images of the user's lower facial features. In one example, the jaw cameras 6-416 can be coupled directly to the frame or housing 6-430 or one or more internal brackets directly coupled to the frame or housing 6-430 shown. The frame or housing 6-430 can include one or more apertures/openings 6-415 through which the jaw cameras 6-416 can send and receive signals.

Any of the features, components, and/or parts, including the arrangements and configurations thereof shown in FIG. 1L can be included, either alone or in any combination, in any of the other examples of devices, features, components, and parts shown in FIGS. 1I-1K and described herein. Likewise, any of the features, components, and/or parts, including the arrangements and configurations thereof shown and described with reference to FIGS. 1I-1K can be included, either alone or in any combination, in the example of the devices, features, components, and parts shown in FIG. 1L.

FIG. 1M illustrates a rear perspective view of an inter-pupillary distance (IPD) adjustment system 11.1.1-102 including first and second optical modules 11.1.1-104*a-b* slidably engaging/coupled to respective guide-rods 11.1.1-108*a-b* and motors 11.1.1-110*a-b* of left and right adjust-ment subsystems 11.1.1-106*a-b*. The IPD adjustment system 11.1.1-102 can be coupled to a bracket 11.1.1-112 and include a button 11.1.1-114 in electrical communication with the motors 11.1.1-110*a-b*. In at least one example, the button 11.1.1-114 can electrically communicate with the first and second motors 11.1.1-110*a-b* via a processor or other circuitry components to cause the first and second motors 11.1.1-110*a-b* to activate and cause the first and second optical modules 11.1.1-104*a-b*, respectively, to change posi-tion relative to one another.

In at least one example, the first and second optical modules 11.1.1-104*a-b* can include respective display screens configured to project light toward the user's eyes when donning the HMD 11.1.1-100. In at least one example, the user can manipulate (e.g., depress and/or rotate) the button 11.1.1-114 to activate a positional adjustment of the optical modules 11.1.1-104*a-b* to match the inter-pupillary distance of the user's eyes. The optical modules 11.1.1-104*a-b* can also include one or more cameras or other sensors/sensor systems for imaging and measuring the IPD of the user such that the optical modules 11.1.1-104*a-b* can be adjusted to match the IPD.

In one example, the user can manipulate the button 11.1.1-114 to cause an automatic positional adjustment of the first and second optical modules 11.1.1-104*a-b*. In one example, the user can manipulate the button 11.1.1-114 to cause a manual adjustment such that the optical modules 11.1.1-104*a-b* move further or closer away, for example when the user rotates the button 11.1.1-114 one way or the other, until the user visually matches her/his own IPD. In one example, the manual adjustment is electronically com-municated via one or more circuits and power for the movements of the optical modules 11.1.1-104*a-b* via the motors 11.1.1-110*a-b* is provided by an electrical power source. In one example, the adjustment and movement of the optical modules 11.1.1-104*a-b* via a manipulation of the button 11.1.1-114 is mechanically actuated via the move-ment of the button 11.1.1-114.

Any of the features, components, and/or parts, including the arrangements and configurations thereof shown in FIG. 1M can be included, either alone or in any combination, in any of the other examples of devices, features, components, and parts shown in any other figures shown and described herein. Likewise, any of the features, components, and/or parts, including the arrangements and configurations thereof shown and described with reference to any other figure shown and described herein, either alone or in any combi-nation, in the example of the devices, features, components, and parts shown in FIG. 1M.

FIG. 1N illustrates a front perspective view of a portion of an HMD 11.1.2-100, including an outer structural frame 11.1.2-102 and an inner or intermediate structural frame 11.1.2-104 defining first and second apertures 11.1.2-106*a*, 11.1.2-106*b*. The apertures 11.1.2-106*a-b* are shown in dotted lines in FIG. 1N because a view of the apertures 11.1.2-106*a-b* can be blocked by one or more other com-ponents of the HMD 11.1.2-100 coupled to the inner frame 11.1.2-104 and/or the outer frame 11.1.2-102, as shown. In at least one example, the HMD 11.1.2-100 can include a first mounting bracket 11.1.2-108 coupled to the inner frame 11.1.2-104. In at least one example, the mounting bracket 11.1.2-108 is coupled to the inner frame 11.1.2-104 between the first and second apertures 11.1.2-106*a-b*.

The mounting bracket 11.1.2-108 can include a middle or central portion 11.1.2-109 coupled to the inner frame 11.1.2-104. In some examples, the middle or central portion 11.1.2-109 may not be the geometric middle or center of the bracket 11.1.2-108. Rather, the middle/central portion 11.1.2-109 can be disposed between first and second cantilevered extension arms extending away from the middle portion 11.1.2-109. In at least one example, the mounting bracket 108 includes a first cantilever arm 11.1.2-112 and a second cantilever arm 11.1.2-114 extending away from the middle portion 11.1.2-109 of the mount bracket 11.1.2-108 coupled to the inner frame 11.1.2-104.

As shown in FIG. 1N, the outer frame 11.1.2-102 can define a curved geometry on a lower side thereof to accom-modate a user's nose when the user dons the HMD 11.1.2-100. The curved geometry can be referred to as a nose bridge 11.1.2-111 and be centrally located on a lower side of the HMD 11.1.2-100 as shown. In at least one example, the mounting bracket 11.1.2-108 can be connected to the inner frame 11.1.2-104 between the apertures 11.1.2-106*a-b* such that the cantilevered arms 11.1.2-112, 11.1.2-114 extend downward and laterally outward away from the middle portion 11.1.2-109 to compliment the nose bridge 11.1.2-111 geometry of the outer frame 11.1.2-102. In this way, the mounting bracket 11.1.2-108 is configured to accommodate the user's nose as noted above. The nose bridge 11.1.2-111 geometry accommodates the nose in that the nose bridge 11.1.2-111 provides a curvature that curves with, above, over, and around the user's nose for comfort and fit.

The first cantilever arm 11.1.2-112 can extend away from the middle portion 11.1.2-109 of the mounting bracket 11.1.2-108 in a first direction and the second cantilever arm 11.1.2-114 can extend away from the middle portion 11.1.2-109 of the mounting bracket 11.1.2-10 in a second direction opposite the first direction. The first and second cantilever arms 11.1.2-112, 11.1.2-114 are referred to as "cantilevered" or "cantilever" arms because each arm 11.1.2-112, 11.1.2-114, includes a distal free end 11.1.2-116, 11.1.2-118, respectively, which are free of affixation from the inner and outer frames 11.1.2-102, 11.1.2-104. In this way, the arms 11.1.2-112, 11.1.2-114 are cantilevered from the middle portion 11.1.2-109, which can be connected to the inner frame 11.1.2-104, with distal ends 11.1.2-102, 11.1.2-104 unattached.

In at least one example, the HMD 11.1.2-100 can include one or more components coupled to the mounting bracket 11.1.2-108. In one example, the components include a plurality of sensors 11.1.2-110*a-f*. Each sensor of the plurality of sensors 11.1.2-110*a-f* can include various types of sensors, including cameras, IR sensors, and so forth. In some examples, one or more of the sensors 11.1.2-110*a-f* can be used for object recognition in three-dimensional space such that it is important to maintain a precise relative position of two or more of the plurality of sensors 11.1.2-110*a-f*. The cantilevered nature of the mounting bracket 11.1.2-108 can protect the sensors 11.1.2-110*a-f* from damage and altered positioning in the case of accidental drops by the user. Because the sensors 11.1.2-110*a-f* are cantilevered on the arms 11.1.2-112, 11.1.2-114 of the mounting bracket 11.1.2-108, stresses and deformations of the inner and/or outer frames 11.1.2-104, 11.1.2-102 are not transferred to the cantilevered arms 11.1.2-112, 11.1.2-114 and thus do not affect the relative positioning of the sensors 11.1.2-110*a-f* coupled/mounted to the mounting bracket 11.1.2-108.

Any of the features, components, and/or parts, including the arrangements and configurations thereof shown in FIG. 1N can be included, either alone or in any combination, in any of the other examples of devices, features, components, and described herein. Likewise, any of the features, components, and/or parts, including the arrangements and configurations thereof shown and described herein can be included, either alone or in any combination, in the example of the devices, features, components, and parts shown in FIG. 1N.

FIG. 1O illustrates an example of an optical module 11.3.2-100 for use in an electronic device such as an HMD, including HDM devices described herein. As shown in one or more other examples described herein, the optical module 11.3.2-100 can be one of two optical modules within an HMD, with each optical module aligned to project light toward a user's eye. In this way, a first optical module can project light via a display screen toward a user's first eye and a second optical module of the same device can project light via another display screen toward the user's second eye.

In at least one example, the optical module 11.3.2-100 can include an optical frame or housing 11.3.2-102, which can also be referred to as a barrel or optical module barrel. The optical module 11.3.2-100 can also include a display 11.3.2-104, including a display screen or multiple display screens, coupled to the housing 11.3.2-102. The display 11.3.2-104 can be coupled to the housing 11.3.2-102 such that the display 11.3.2-104 is configured to project light toward the eye of a user when the HMD of which the display module 11.3.2-100 is a part is donned during use. In at least one example, the housing 11.3.2-102 can surround the display 11.3.2-104 and provide connection features for coupling other components of optical modules described herein.

In one example, the optical module 11.3.2-100 can include one or more cameras 11.3.2-106 coupled to the housing 11.3.2-102. The camera 11.3.2-106 can be positioned relative to the display 11.3.2-104 and housing 11.3.2-102 such that the camera 11.3.2-106 is configured to capture one or more images of the user's eye during use. In at least one example, the optical module 11.3.2-100 can also include a light strip 11.3.2-108 surrounding the display 11.3.2-104. In one example, the light strip 11.3.2-108 is disposed between the display 11.3.2-104 and the camera 11.3.2-106. The light strip 11.3.2-108 can include a plurality of lights 11.3.2-110. The plurality of lights can include one or more light emitting diodes (LEDs) or other lights configured to project light toward the user's eye when the HMD is donned.

The individual lights 11.3.2-110 of the light strip 11.3.2-108 can be spaced about the strip 11.3.2-108 and thus spaced about the display 11.3.2-104 uniformly or non-uniformly at various locations on the strip 11.3.2-108 and around the display 11.3.2-104.

In at least one example, the housing 11.3.2-102 defines a viewing opening 11.3.2-101 through which the user can view the display 11.3.2-104 when the HMD device is donned. In at least one example, the LEDs are configured and arranged to emit light through the viewing opening 11.3.2-101 and onto the user's eye. In one example, the camera 11.3.2-106 is configured to capture one or more images of the user's eye through the viewing opening 11.3.2-101.

As noted above, each of the components and features of the optical module 11.3.2-100 shown in FIG. 1O can be replicated in another (e.g., second) optical module disposed with the HMD to interact (e.g., project light and capture images) of another eye of the user.

Any of the features, components, and/or parts, including the arrangements and configurations thereof shown in FIG. 1O can be included, either alone or in any combination, in any of the other examples of devices, features, components, and parts shown in FIG. 1P or otherwise described herein. Likewise, any of the features, components, and/or parts, including the arrangements and configurations thereof shown and described with reference to FIG. 1P or otherwise described herein can be included, either alone or in any combination, in the example of the devices, features, components, and parts shown in FIG. 1O.

FIG. 1P illustrates a cross-sectional view of an example of an optical module 11.3.2-200 including a housing 11.3.2-202, display assembly 11.3.2-204 coupled to the housing 11.3.2-202, and a lens 11.3.2-216 coupled to the housing 11.3.2-202. In at least one example, the housing 11.3.2-202 defines a first aperture or channel 11.3.2-212 and a second aperture or channel 11.3.2-214. The channels 11.3.2-212, 11.3.2-214 can be configured to slidably engage respective rails or guide rods of an HMD device to allow the optical module 11.3.2-200 to adjust in position relative to the user's eyes for match the user's interpapillary distance (IPD). The housing 11.3.2-202 can slidably engage the guide rods to secure the optical module 11.3.2-200 in place within the HMD.

In at least one example, the optical module 11.3.2-200 can also include a lens 11.3.2-216 coupled to the housing 11.3.2-202 and disposed between the display assembly 11.3.2-204 and the user's eyes when the HMD is donned. The lens 11.3.2-216 can be configured to direct light from the display assembly 11.3.2-204 to the user's eye. In at least one example, the lens 11.3.2-216 can be a part of a lens assembly including a corrective lens removably attached to the optical module 11.3.2-200. In at least one example, the lens 11.3.2-216 is disposed over the light strip 11.3.2-208 and the one or more eye-tracking cameras 11.3.2-206 such that the camera 11.3.2-206 is configured to capture images of the user's eye through the lens 11.3.2-216 and the light strip 11.3.2-208 includes lights configured to project light through the lens 11.3.2-216 to the users' eye during use.

Any of the features, components, and/or parts, including the arrangements and configurations thereof shown in FIG. 1P can be included, either alone or in any combination, in any of the other examples of devices, features, components, and parts and described herein. Likewise, any of the features, components, and/or parts, including the arrangements and configurations thereof shown and described herein can be included, either alone or in any combination, in the example of the devices, features, components, and parts shown in FIG. 1P.

Figure 2:
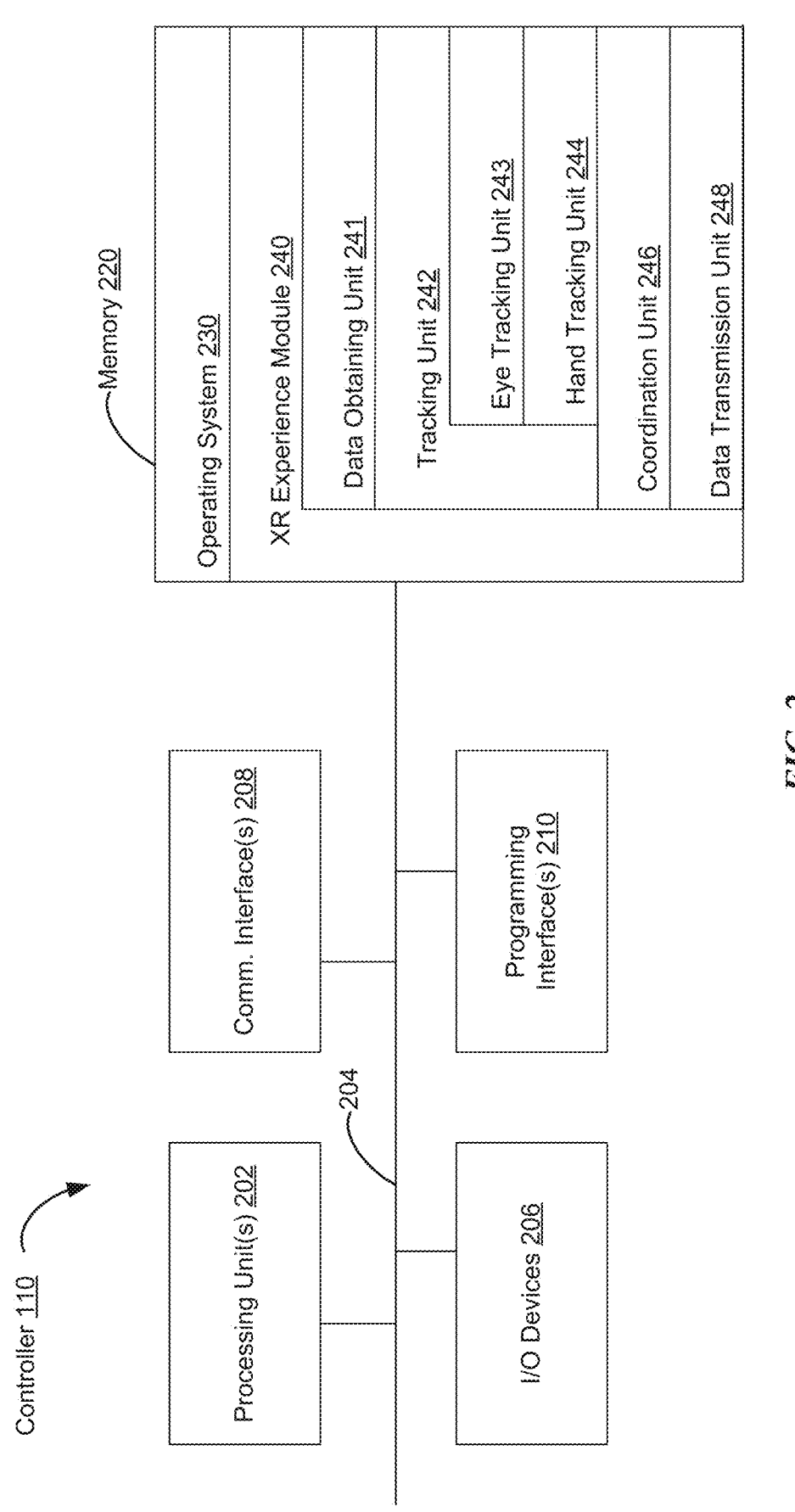
FIG. 2 is a block diagram illustrating a controller of a computer system that is configured to manage and coordinate a XR experience for the user in some embodiments.

FIG. 2 is a block diagram of an example of the controller 110 in some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments, the controller 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some embodiments, the one or more communication buses 204 include circuitry that interconnects and controls communications between system components. In some embodiments, the one or more I/O devices 206 include at least one of a keyboard, a mouse, a touchpad, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some embodiments, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some embodiments, the memory 220 or the non-transitory computer readable storage medium of the memory 220 stores the following programs, modules and data structures, or a subset thereof including an optional operating system 230 and a XR experience module 240.

The operating system 230 includes instructions for handling various basic system services and for performing hardware dependent tasks. In some embodiments, the XR experience module 240 is configured to manage and coordinate one or more XR experiences for one or more users (e.g., a single XR experience for one or more users, or multiple XR experiences for respective groups of one or more users). To that end, in various embodiments, the XR experience module 240 includes a data obtaining unit 241, a tracking unit 242, a coordination unit 246, and a data transmitting unit 248.

In some embodiments, the data obtaining unit 241 is configured to obtain data (e.g., presentation data, interaction data, sensor data, location data, etc.) from at least the display generation component 120 of FIG. 1A, and optionally one or more of the input devices 125, output devices 155, sensors 190, and/or peripheral devices 195. To that end, in various embodiments, the data obtaining unit 241 includes instructions and/or logic therefor, and heuristics and metadata therefor.

In some embodiments, the tracking unit 242 is configured to map the scene 105 and to track the position/location of at least the display generation component 120 with respect to the scene 105 of FIG. 1A, and optionally, to one or more of the input devices 125, output devices 155, sensors 190, and/or peripheral devices 195. To that end, in various embodiments, the tracking unit 242 includes instructions and/or logic therefor, and heuristics and metadata therefor. In some embodiments, the tracking unit 242 includes hand tracking unit 244 and/or eye tracking unit 243. In some embodiments, the hand tracking unit 244 is configured to track the position/location of one or more portions of the user's hands, and/or motions of one or more portions of the user's hands with respect to the scene 105 of FIG. 1A, relative to the display generation component 120, and/or relative to a coordinate system defined relative to the user's hand. The hand tracking unit 244 is described in greater detail below with respect to FIG. 4. In some embodiments, the eye tracking unit 243 is configured to track the position and movement of the user's gaze (or more broadly, the user's eyes, face, or head) with respect to the scene 105 (e.g., with respect to the physical environment and/or to the user (e.g., the user's hand)) or with respect to the XR content displayed via the display generation component 120. The eye tracking unit 243 is described in greater detail below with respect to FIG. 5.

In some embodiments, the coordination unit 246 is configured to manage and coordinate the XR experience presented to the user by the display generation component 120, and optionally, by one or more of the output devices 155 and/or peripheral devices 195. To that end, in various embodiments, the coordination unit 246 includes instructions and/or logic therefor, and heuristics and metadata therefor.

In some embodiments, the data transmitting unit 248 is configured to transmit data (e.g., presentation data, location data, etc.) to at least the display generation component 120, and optionally, to one or more of the input devices 125, output devices 155, sensors 190, and/or peripheral devices 195. To that end, in various embodiments, the data transmitting unit 248 includes instructions and/or logic therefor, and heuristics and metadata therefor.

Although the data obtaining unit 241, the tracking unit 242 (e.g., including the eye tracking unit 243 and the hand tracking unit 244), the coordination unit 246, and the data transmitting unit 248 are shown as residing on a single device (e.g., the controller 110), it should be understood that in other embodiments, any combination of the data obtaining unit 241, the tracking unit 242 (e.g., including the eye tracking unit 243 and the hand tracking unit 244), the coordination unit 246, and the data transmitting unit 248 may be located in separate computing devices.

Moreover, FIG. 2 is intended more as functional description of the various features that may be present in a particular implementation as opposed to a structural schematic of the embodiments described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various embodiments. The actual number of modules and the division of particular functions and how features are allocated among them will vary from one implementation to another and, in some embodiments, depends in part on the particular combination of hardware, software, and/or firmware chosen for a particular implementation.

Figure 3:
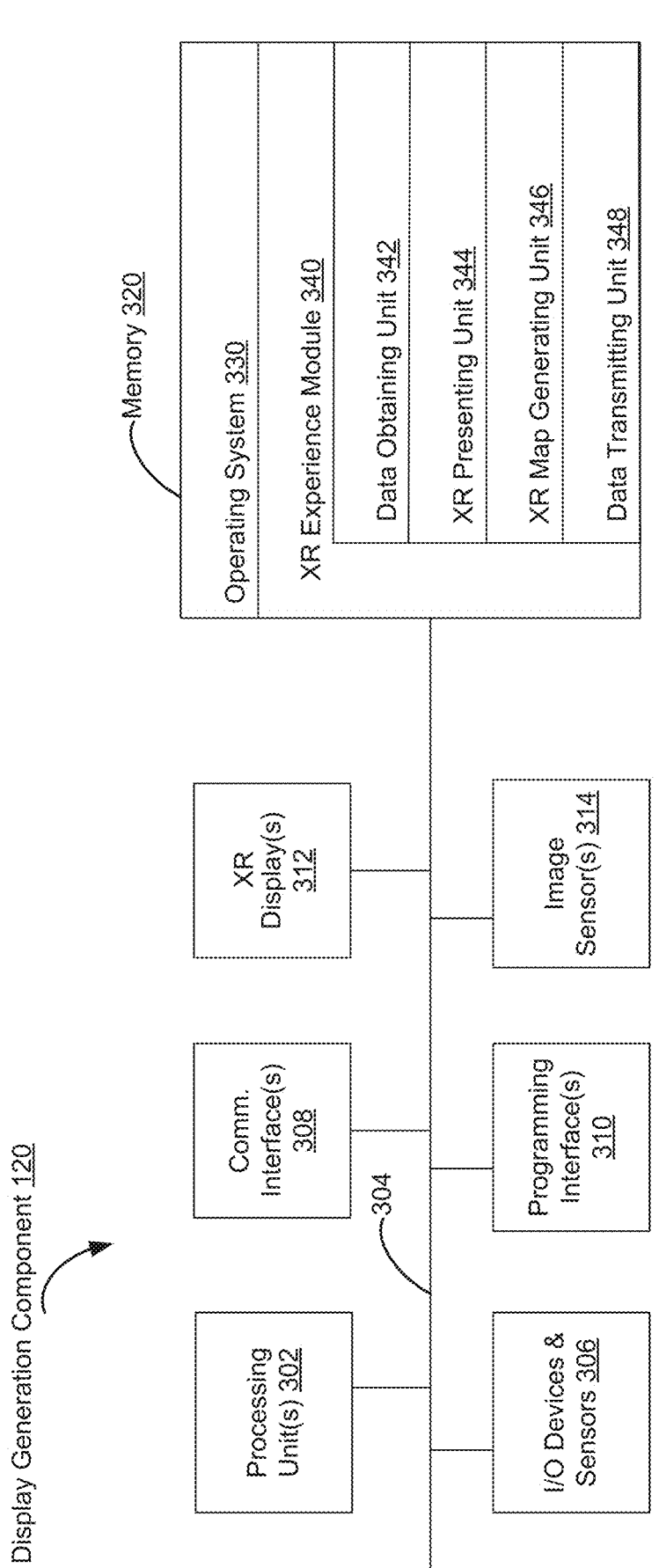
FIG. 3 is a block diagram illustrating a display generation component of a computer system that is configured to provide a visual component of the XR experience to the user in some embodiments.

FIG. 3 is a block diagram of an example of the display generation component 120 in some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the display generation component 120 (e.g., HMD) includes one or more processing units 302 (e.g., microprocessors, ASICS, FPGAs, GPUs, CPUs, processing cores, and/or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 310, one or more XR displays 312, one or more optional interior- and/or exterior-facing image sensors 314, a memory 320, and one or more communication buses 304 for interconnecting these and various other components.

In some embodiments, the one or more communication buses 304 include circuitry that interconnects and controls communications between system components. In some embodiments, the one or more I/O devices and sensors 306 include at least one of an inertial measurement unit (IMU), an accelerometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some embodiments, the one or more XR displays 312 are configured to provide the XR experience to the user. In some embodiments, the one or more XR displays 312 correspond to holographic, digital light processing (DLP), liquid-crystal display (LCD), liquid-crystal on silicon (Locos), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some embodiments, the one or more XR displays 312 correspond to diffractive, reflective, polarized, holographic, etc. waveguide displays. For example, the display generation component 120 (e.g., HMD) includes a single XR display. In another example, the display generation component 120 includes a XR display for each eye of the user. In some embodiments, the one or more XR displays 312 are capable of presenting MR and VR content. In some embodiments, the one or more XR displays 312 are capable of presenting MR or VR content.

In some embodiments, the one or more image sensors 314 are configured to obtain image data that corresponds to at least a portion of the face of the user that includes the eyes of the user (and may be referred to as an eye-tracking camera). In some embodiments, the one or more image sensors 314 are configured to obtain image data that corresponds to at least a portion of the user's hand(s) and optionally arm(s) of the user (and may be referred to as a hand-tracking camera). In some embodiments, the one or more image sensors 314 are configured to be forward-facing so as to obtain image data that corresponds to the scene as would be viewed by the user if the display generation component 120 (e.g., HMD) was not present (and may be referred to as a scene camera). The one or more optional image sensors 314 can include one or more RGB cameras (e.g., with a complimentary metal-oxide-semiconductor (CMOS) image sensor or a charge-coupled device (CCD) image sensor), one or more infrared (IR) cameras, one or more event-based cameras, and/or the like.

The memory 320 includes high-speed random-access memory, such as DRAM, SRAM, DDR RAM, or other random-access solid-state memory devices. In some embodiments, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some embodiments, the memory 320 or the non-transitory computer readable storage medium of the memory 320 stores the following programs, modules and data structures, or a subset thereof including an optional operating system 330 and a XR presentation module 340.

The operating system 330 includes instructions for handling various basic system services and for performing hardware dependent tasks. In some embodiments, the XR presentation module 340 is configured to present XR content to the user via the one or more XR displays 312. To that end, in various embodiments, the XR presentation module 340 includes a data obtaining unit 342, a XR presenting unit 344, a XR map generating unit 346, and a data transmitting unit 348.

In some embodiments, the data obtaining unit 342 is configured to obtain data (e.g., presentation data, interaction data, sensor data, location data, etc.) from at least the controller 110 of FIG. 1A. To that end, in various embodiments, the data obtaining unit 342 includes instructions and/or logic therefor, and heuristics and metadata therefor.

In some embodiments, the XR presenting unit 344 is configured to present XR content via the one or more XR displays 312. To that end, in various embodiments, the XR presenting unit 344 includes instructions and/or logic therefor, and heuristics and metadata therefor.

In some embodiments, the XR map generating unit 346 is configured to generate a XR map (e.g., a 3D map of the mixed reality scene or a map of the physical environment into which computer-generated objects can be placed to generate the extended reality) based on media content data. To that end, in various embodiments, the XR map generating unit 346 includes instructions and/or logic therefor, and heuristics and metadata therefor.

In some embodiments, the data transmitting unit 348 is configured to transmit data (e.g., presentation data, location data, etc.) to at least the controller 110, and optionally one or more of the input devices 125, output devices 155, sensors 190, and/or peripheral devices 195. To that end, in various embodiments, the data transmitting unit 348 includes instructions and/or logic therefor, and heuristics and metadata therefor.

Although the data obtaining unit 342, the XR presenting unit 344, the XR map generating unit 346, and the data transmitting unit 348 are shown as residing on a single device (e.g., the display generation component 120 of FIG. 1A), it should be understood that in other embodiments, any combination of the data obtaining unit 342, the XR presenting unit 344, the XR map generating unit 346, and the data transmitting unit 348 may be located in separate computing devices.

Moreover, FIG. 3 is intended more as a functional description of the various features that could be present in a particular implementation as opposed to a structural schematic of the embodiments described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various embodiments. The actual number of modules and the division of particular functions and how features are allocated among them will vary from one implementation to another and, in some embodiments, depends in part on the particular combination of hardware, software, and/or firmware chosen for a particular implementation.

FIG. 4 is a schematic, pictorial illustration of an example embodiment of the hand tracking device 140. In some embodiments, hand tracking device 140 (FIG. 1A) is controlled by hand tracking unit 244 (FIG. 2) to track the position/location of one or more portions of the user's hands, and/or motions of one or more portions of the user's hands with respect to the scene 105 of FIG. 1A (e.g., with respect to a portion of the physical environment surrounding the user, with respect to the display generation component 120, or with respect to a portion of the user (e.g., the user's face, eyes, or head), and/or relative to a coordinate system defined relative to the user's hand). In some embodiments, the hand tracking device 140 is part of the display generation component 120 (e.g., embedded in or attached to a head-mounted device). In some embodiments, the hand tracking device 140 is separate from the display generation component 120 (e.g., located in separate housings or attached to separate physical support structures).

In some embodiments, the hand tracking device 140 includes image sensors 404 (e.g., one or more IR cameras, 3D cameras, depth cameras, and/or color cameras, etc.) that capture three-dimensional scene information that includes at least a hand 406 of a human user. The image sensors 404 capture the hand images with sufficient resolution to enable the fingers and their respective positions to be distinguished. The image sensors 404 typically capture images of other parts of the user's body, as well, or possibly all of the body, and may have either zoom capabilities or a dedicated sensor with enhanced magnification to capture images of the hand with the desired resolution. In some embodiments, the image sensors 404 also capture 2D color video images of the hand 406 and other elements of the scene. In some embodiments, the image sensors 404 are used in conjunction with other image sensors to capture the physical environment of the scene 105, or serve as the image sensors that capture the physical environments of the scene 105. In some embodiments, the image sensors 404 are positioned relative to the user or the user's environment in a way that a field of view of the image sensors or a portion thereof is used to define an interaction space in which hand movement captured by the image sensors are treated as inputs to the controller 110.

In some embodiments, the image sensors 404 output a sequence of frames containing 3D map data (and possibly color image data, as well) to the controller 110, which extracts high-level information from the map data. This high-level information is typically provided via an Application Program Interface (API) to an application running on the controller, which drives the display generation component 120 accordingly. For example, the user may interact with software running on the controller 110 by moving his hand 406 and changing his hand posture.

In some embodiments, the image sensors 404 project a pattern of spots onto a scene containing the hand 406 and capture an image of the projected pattern. In some embodiments, the controller 110 computes the 3D coordinates of points in the scene (including points on the surface of the user's hand) by triangulation, based on transverse shifts of the spots in the pattern. This approach is advantageous in that it does not require the user to hold or wear any sort of beacon, sensor, or other marker. It gives the depth coordinates of points in the scene relative to a predetermined reference plane, at a certain distance from the image sensors 404. In the present disclosure, the image sensors 404 are assumed to define an orthogonal set of x, y, z axes, so that depth coordinates of points in the scene correspond to z components measured by the image sensors. Alternatively, the image sensors 404 (e.g., a hand tracking device) may use other methods of 3D mapping, such as stereoscopic imaging or time-of-flight measurements, based on single or multiple cameras or other types of sensors.

In some embodiments, the hand tracking device 140 captures and processes a temporal sequence of depth maps containing the user's hand, while the user moves his hand (e.g., whole hand or one or more fingers). Software running on a processor in the image sensors 404 and/or the controller 110 processes the 3D map data to extract patch descriptors of the hand in these depth maps. The software matches these descriptors to patch descriptors stored in a database 408, based on a prior learning process, in order to estimate the pose of the hand in each frame. The pose typically includes 3D locations of the user's hand joints and finger tips.

The software may also analyze the trajectory of the hands and/or fingers over multiple frames in the sequence in order to identify gestures. The pose estimation functions described herein may be interleaved with motion tracking functions, so that patch-based pose estimation is performed only once in every two (or more) frames, while tracking is used to find changes in the pose that occur over the remaining frames. The pose, motion, and gesture information are provided via the above-mentioned API to an application program running on the controller 110. This program may, for example, move and modify images presented on the display generation component 120, or perform other functions, in response to the pose and/or gesture information.

In some embodiments, a gesture includes an air gesture. An air gesture is a gesture that is detected without the user touching (or independently of) an input element that is part of a device (e.g., computer system 101, one or more input device 125, and/or hand tracking device 140) and is based on detected motion of a portion (e.g., the head, one or more arms, one or more hands, one or more fingers, and/or one or more legs) of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

In some embodiments, input gestures used in the various examples and embodiments described herein include air gestures performed by movement of the user's finger(s) relative to other finger(s) (or part(s) of the user's hand) for interacting with an XR environment (e.g., a virtual or mixed-reality environment), in some embodiments. In some embodiments, an air gesture is a gesture that is detected without the user touching an input element that is part of the device (or independently of an input element that is a part of the device) and is based on detected motion of a portion of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

In some embodiments in which the input gesture is an air gesture (e.g., in the absence of physical contact with an input device that provides the computer system with information about which user interface element is the target of the user input, such as contact with a user interface element displayed on a touchscreen, or contact with a mouse or trackpad to move a cursor to the user interface element), the gesture takes into account the user's attention (e.g., gaze) to determine the target of the user input (e.g., for direct inputs, as described below). Thus, in implementations involving air gestures, the input gesture is, for example, detected attention (e.g., gaze) toward the user interface element in combination (e.g., concurrent) with movement of a user's finger(s) and/or hands to perform a pinch and/or tap input, as described in more detail below.

In some embodiments, input gestures that are directed to a user interface object are performed directly or indirectly with reference to a user interface object. For example, a user input is performed directly on the user interface object in performing the input gesture with the user's hand at a position that corresponds to the position of the user interface object in the three-dimensional environment (e.g., as determined based on a current viewpoint of the user). In some embodiments, the input gesture is performed indirectly on the user interface object in accordance with the user performing the input gesture while a position of the user's hand is not at the position that corresponds to the position of the user interface object in the three-dimensional environment while detecting the user's attention (e.g., gaze) on the user interface object. For example, for direct input gesture, the user is enabled to direct the user's input to the user interface object by initiating the gesture at, or near, a position corresponding to the displayed position of the user interface object (e.g., within 0.5 cm, 1 cm, 5 cm, or a distance between 0-5 cm, as measured from an outer edge of the option or a center portion of the option). For an indirect input gesture, the user is enabled to direct the user's input to the user interface object by paying attention to the user interface object (e.g., by gazing at the user interface object) and, while paying attention to the option, the user initiates the input gesture (e.g., at any position that is detectable by the computer system) (e.g., at a position that does not correspond to the displayed position of the user interface object).

In some embodiments, input gestures (e.g., air gestures) used in the various examples and embodiments described herein include pinch inputs and tap inputs, for interacting with a virtual or mixed-reality environment, in some embodiments. For example, the pinch inputs and tap inputs described below are performed as air gestures.

In some embodiments, a pinch input is part of an air gesture that includes one or more of: a pinch gesture, a long pinch gesture, a pinch and drag gesture, or a double pinch gesture. For example, a pinch gesture that is an air gesture includes movement of two or more fingers of a hand to make contact with one another, that is, optionally, followed by an immediate (e.g., within 0-1 seconds) break in contact from each other. A long pinch gesture that is an air gesture includes movement of two or more fingers of a hand to make contact with one another for at least a threshold amount of time (e.g., at least 1 second), before detecting a break in contact with one another. For example, a long pinch gesture includes the user holding a pinch gesture (e.g., with the two or more fingers making contact), and the long pinch gesture continues until a break in contact between the two or more fingers is detected. In some embodiments, a double pinch gesture that is an air gesture comprises two (e.g., or more) pinch inputs (e.g., performed by the same hand) detected in immediate (e.g., within a predefined time period) succession of each other. For example, the user performs a first pinch input (e.g., a pinch input or a long pinch input), releases the first pinch input (e.g., breaks contact between the two or more fingers), and performs a second pinch input within a predefined time period (e.g., within 1 second or within 2 seconds) after releasing the first pinch input.

In some embodiments, a pinch and drag gesture that is an air gesture includes a pinch gesture (e.g., a pinch gesture or a long pinch gesture) performed in conjunction with (e.g., followed by) a drag input that changes a position of the user's hand from a first position (e.g., a start position of the drag) to a second position (e.g., an end position of the drag). In some embodiments, the user maintains the pinch gesture while performing the drag input, and releases the pinch gesture (e.g., opens their two or more fingers) to end the drag gesture (e.g., at the second position). In some embodiments, the pinch input and the drag input are performed by the same hand (e.g., the user pinches two or more fingers to make contact with one another and moves the same hand to the second position in the air with the drag gesture). In some embodiments, the pinch input is performed by a first hand of the user and the drag input is performed by the second hand of the user (e.g., the user's second hand moves from the first position to the second position in the air while the user continues the pinch input with the user's first hand). In some embodiments, an input gesture that is an air gesture includes inputs (e.g., pinch and/or tap inputs) performed using both of the user's two hands. For example, the input gesture includes two (e.g., or more) pinch inputs performed in conjunction with (e.g., concurrently with, or within a predefined time period of) each other. For example, a first pinch gesture performed using a first hand of the user (e.g., a pinch input, a long pinch input, or a pinch and drag input), and, in conjunction with performing the pinch input using the first hand, performing a second pinch input using the other hand (e.g., the second hand of the user's two hands). In some embodiments, movement between the user's two hands (e.g., to increase and/or decrease a distance or relative orientation between the user's two hands).

In some embodiments, a tap input (e.g., directed to a user interface element) performed as an air gesture includes movement of a user's finger(s) toward the user interface element, movement of the user's hand toward the user interface element optionally with the user's finger(s) extended toward the user interface element, a downward motion of a user's finger (e.g., mimicking a mouse click motion or a tap on a touchscreen), or other predefined movement of the user's hand. In some embodiments a tap input that is performed as an air gesture is detected based on movement characteristics of the finger or hand performing the tap gesture movement of a finger or hand away from the viewpoint of the user and/or toward an object that is the target of the tap input followed by an end of the movement. In some embodiments the end of the movement is detected based on a change in movement characteristics of the finger or hand performing the tap gesture (e.g., an end of movement away from the viewpoint of the user and/or toward the object that is the target of the tap input, a reversal of direction of movement of the finger or hand, and/or a reversal of a direction of acceleration of movement of the finger or hand).

In some embodiments, attention of a user is determined to be directed to a portion of the three-dimensional environment based on detection of gaze directed to the portion of the three-dimensional environment (optionally, without requiring other conditions). In some embodiments, attention of a user is determined to be directed to a portion of the three-dimensional environment based on detection of gaze directed to the portion of the three-dimensional environment with one or more additional conditions such as requiring that gaze is directed to the portion of the three-dimensional environment for at least a threshold duration (e.g., a dwell duration) and/or requiring that the gaze is directed to the portion of the three-dimensional environment while the viewpoint of the user is within a distance threshold from the portion of the three-dimensional environment in order for the device to determine that attention of the user is directed to the portion of the three-dimensional environment, where if one of the additional conditions is not met, the device determines that attention is not directed to the portion of the three-dimensional environment toward which gaze is directed (e.g., until the one or more additional conditions are met).

In some embodiments, the detection of a ready state configuration of a user or a portion of a user is detected by the computer system. Detection of a ready state configuration of a hand is used by a computer system as an indication that the user is likely preparing to interact with the computer system using one or more air gesture inputs performed by the hand (e.g., a pinch, tap, pinch and drag, double pinch, long pinch, or other air gesture described herein). For example, the ready state of the hand is determined based on whether the hand has a predetermined hand shape (e.g., a pre-pinch shape with a thumb and one or more fingers extended and spaced apart ready to make a pinch or grab gesture or a pre-tap with one or more fingers extended and palm facing away from the user), based on whether the hand is in a predetermined position relative to a viewpoint of the user (e.g., below the user's head and above the user's waist and extended out from the body by at least 15, 20, 25, 30, or 50 cm), and/or based on whether the hand has moved in a particular manner (e.g., moved toward a region in front of the user above the user's waist and below the user's head or moved away from the user's body or leg). In some embodiments, the ready state is used to determine whether interactive elements of the user interface respond to attention (e.g., gaze) inputs.

In scenarios where inputs are described with reference to air gestures, it should be understood that similar gestures could be detected using a hardware input device that is attached to or held by one or more hands of a user, where the position of the hardware input device in space can be tracked using optical tracking, one or more accelerometers, one or more gyroscopes, one or more magnetometers, and/or one or more inertial measurement units and the position and/or movement of the hardware input device is used in place of the position and/or movement of the one or more hands in the corresponding air gesture(s). In scenarios where inputs are described with reference to air gestures, it should be understood that similar gestures could be detected using a hardware input device that is attached to or held by one or more hands of a user, user inputs can be detected with controls contained in the hardware input device such as one or more touch-sensitive input elements, one or more pressure-sensitive input elements, one or more buttons, one or more knobs, one or more dials, one or more joysticks, one or more hand or finger coverings that can detect a position or change in position of portions of a hand and/or fingers relative to each other, relative to the user's body, and/or relative to a physical environment of the user, and/or other hardware input device controls, wherein the user inputs with the controls contained in the hardware input device are used in place of hand and/or finger gestures such as air taps or air pinches in the corresponding air gesture(s). For example, a selection input that is described as being performed with an air tap or air pinch input could be alternatively detected with a button press, a tap on a touch-sensitive surface, a press on a pressure-sensitive surface, or other hardware input. As another example, a movement input that is described as being performed with an air pinch and drag could be alternatively detected based on an interaction with the hardware input control such as a button press and hold, a touch on a touch-sensitive surface, a press on a pressure-sensitive surface, or other hardware input that is followed by movement of the hardware input device (e.g., along with the hand with which the hardware input device is associated) through space. Similarly, a two-handed input that includes movement of the hands relative to each other could be performed with one air gesture and one hardware input device in the hand that is not performing the air gesture, two hardware input devices held in different hands, or two air gestures performed by different hands using various combinations of air gestures and/or the inputs detected by one or more hardware input devices that are described above.

In scenarios where inputs are described with reference to air gestures, it should be understood that similar gestures could be detected using a hardware input device that is attached to or held by one or more hands of a user, where the position of the hardware input device in space can be tracked using optical tracking, one or more accelerometers, one or more gyroscopes, one or more magnetometers, and/or one or more inertial measurement units and the position and/or movement of the hardware input device is used in place of the position and/or movement of the one or more hands in the corresponding air gesture(s). In scenarios where inputs are described with reference to air gestures, it should be understood that similar gestures could be detected using a hardware input device that is attached to or held by one or more hands of a user. User inputs can be detected with controls contained in the hardware input device such as one or more touch-sensitive input elements, one or more pressure-sensitive input elements, one or more buttons, one or more knobs, one or more dials, one or more joysticks, one or more hand or finger coverings that can detect a position or change in position of portions of a hand and/or fingers relative to each other, relative to the user's body, and/or relative to a physical environment of the user, and/or other hardware input device controls, where the user inputs with the controls contained in the hardware input device are used in place of hand and/or finger gestures such as air taps or air pinches in the corresponding air gesture(s). For example, a selection input that is described as being performed with an air tap or air pinch input could be alternatively detected with a button press, a tap on a touch-sensitive surface, a press on a pressure-sensitive surface, or other hardware input. As another example, a movement input that is described as being performed with an air pinch and drag could be alternatively detected based on an interaction with the hardware input control such as a button press and hold, a touch on a touch-sensitive surface, a press on a pressure-sensitive surface, or other hardware input that is followed by movement of the hardware input device (e.g., along with the hand with which the hardware input device is associated) through space. Similarly, a two-handed input that includes movement of the hands relative to each other could be performed with one air gesture and one hardware input device in the hand that is not performing the air gesture, two hardware input devices held in different hands, or two air gestures performed by different hands using various combinations of air gestures and/or the inputs detected by one or more hardware input devices that are described above.

In some embodiments, the software may be downloaded to the controller 110 in electronic form, over a network, for example, or it may alternatively be provided on tangible, non-transitory media, such as optical, magnetic, or electronic memory media. In some embodiments, the database 408 is likewise stored in a memory associated with the controller 110. Alternatively or additionally, some or all of the described functions of the computer may be implemented in dedicated hardware, such as a custom or semi-custom integrated circuit or a programmable digital signal processor (DSP). Although the controller 110 is shown in FIG. 4, by way of example, as a separate unit from the image sensors 404, some or all of the processing functions of the controller may be performed by a suitable microprocessor and software or by dedicated circuitry within the housing of the image sensors 404 (e.g., a hand tracking device) or otherwise associated with the image sensors 404. In some embodiments, at least some of these processing functions may be carried out by a suitable processor that is integrated with the display generation component 120 (e.g., in a television set, a handheld device, or head-mounted device, for example) or with any other suitable computerized device, such as a game console or media player. The sensing functions of image sensors 404 may likewise be integrated into the computer or other computerized apparatus that is to be controlled by the sensor output.

FIG. 4 further includes a schematic representation of a depth map 410 captured by the image sensors 404, in some embodiments. The depth map, as explained above, comprises a matrix of pixels having respective depth values. The pixels 412 corresponding to the hand 406 have been segmented out from the background and the wrist in this map. The brightness of each pixel within the depth map 410 corresponds inversely to its depth value, i.e., the measured z distance from the image sensors 404, with the shade of gray growing darker with increasing depth. The controller 110 processes these depth values in order to identify and segment a component of the image (i.e., a group of neighboring pixels) having characteristics of a human hand. These characteristics, may include, for example, overall size, shape and motion from frame to frame of the sequence of depth maps.

FIG. 4 also schematically illustrates a hand skeleton 414 that controller 110 ultimately extracts from the depth map 410 of the hand 406, in some embodiments. In FIG. 4, the hand skeleton 414 is superimposed on a hand background 416 that has been segmented from the original depth map. In some embodiments, key feature points of the hand (e.g., points corresponding to knuckles, finger tips, center of the palm, end of the hand connecting to wrist, etc.) and optionally on the wrist or arm connected to the hand are identified and located on the hand skeleton 414. In some embodiments, location and movements of these key feature points over multiple image frames are used by the controller 110 to determine the hand gestures performed by the hand or the current state of the hand, in some embodiments.

Figure 5:
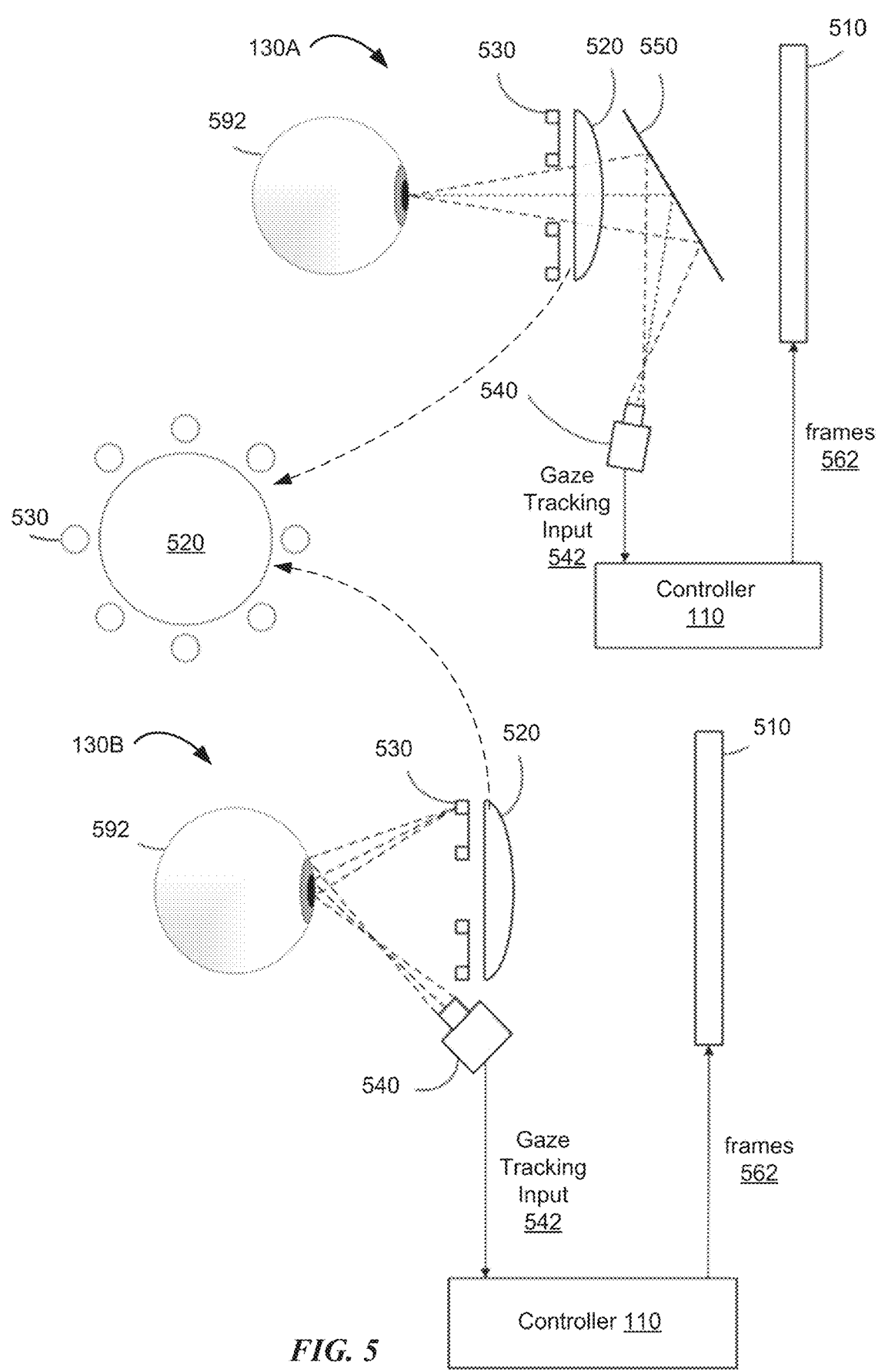
FIG. 5 is a block diagram illustrating an eye tracking unit of a computer system that is configured to capture gaze inputs of the user in some embodiments.

FIG. 5 illustrates an example embodiment of the eye tracking device 130 (FIG. 1A). In some embodiments, the eye tracking device 130 is controlled by the eye tracking unit 243 (FIG. 2) to track the position and movement of the user's gaze with respect to the scene 105 or with respect to the XR content displayed via the display generation component 120. In some embodiments, the eye tracking device 130 is integrated with the display generation component 120. For example, in some embodiments, when the display generation component 120 is a head-mounted device such as headset, helmet, goggles, or glasses, or a handheld device placed in a wearable frame, the head-mounted device includes both a component that generates the XR content for viewing by the user and a component for tracking the gaze of the user relative to the XR content. In some embodiments, the eye tracking device 130 is separate from the display generation component 120. For example, when display generation component is a handheld device or a XR chamber, the eye tracking device 130 is optionally a separate device from the handheld device or XR chamber. In some embodiments, the eye tracking device 130 is a head-mounted device or part of a head-mounted device. In some embodiments, the head-mounted eye-tracking device 130 is optionally used in conjunction with a display generation component that is also head-mounted, or a display generation component that is not head-mounted. In some embodiments, the eye tracking device 130 is not a head-mounted device, and is optionally used in conjunction with a head-mounted display generation component. In some embodiments, the eye tracking device 130 is not a head-mounted device, and is optionally part of a non-head-mounted display generation component.

In some embodiments, the display generation component 120 uses a display mechanism (e.g., left and right near-eye display panels) for displaying frames including left and right images in front of a user's eyes to thus provide 3D virtual views to the user. For example, a head-mounted display generation component may include left and right optical lenses (referred to herein as eye lenses) located between the display and the user's eyes. In some embodiments, the display generation component may include or be coupled to one or more external video cameras that capture video of the user's environment for display. In some embodiments, a head-mounted display generation component may have a transparent or semi-transparent display through which a user may view the physical environment directly and display virtual objects on the transparent or semi-transparent display. In some embodiments, display generation component projects virtual objects into the physical environment. The virtual objects may be projected, for example, on a physical surface or as a holograph, so that an individual, using the system, observes the virtual objects superimposed over the physical environment. In such cases, separate display panels and image frames for the left and right eyes may not be necessary.

As shown in FIG. 5, in some embodiments, eye tracking device 130 (e.g., a gaze tracking device) includes at least one eye tracking camera (e.g., infrared (IR) or near-IR (NIR) cameras), and illumination sources (e.g., IR or NIR light sources such as an array or ring of LEDs) that emit light (e.g., IR or NIR light) towards the user's eyes. The eye tracking cameras may be pointed towards the user's eyes to receive reflected IR or NIR light from the light sources directly from the eyes, or alternatively may be pointed towards "hot" mirrors located between the user's eyes and the display panels that reflect IR or NIR light from the eyes to the eye tracking cameras while allowing visible light to pass. The eye tracking device 130 optionally captures images of the user's eyes (e.g., as a video stream captured at 60-120 frames per second (fps)), analyze the images to generate gaze tracking information, and communicate the gaze tracking information to the controller 110. In some embodiments, two eyes of the user are separately tracked by respective eye tracking cameras and illumination sources. In some embodiments, only one eye of the user is tracked by a respective eye tracking camera and illumination sources.

In some embodiments, the eye tracking device 130 is calibrated using a device-specific calibration process to determine parameters of the eye tracking device for the specific operating environment 100, for example the 3D geometric relationship and parameters of the LEDs, cameras, hot mirrors (if present), eye lenses, and display screen. The device-specific calibration process may be performed at the factory or another facility prior to delivery of the AR/VR equipment to the end user. The device-specific calibration process may be an automated calibration process or a manual calibration process. A user-specific calibration process may include an estimation of a specific user's eye parameters, for example the pupil location, fovea location, optical axis, visual axis, eye spacing, etc. Once the device-specific and user-specific parameters are determined for the eye tracking device 130, images captured by the eye tracking cameras can be processed using a glint-assisted method to determine the current visual axis and point of gaze of the user with respect to the display, in some embodiments.

As shown in FIG. 5, the eye tracking device 130 (e.g., 130A or 130B) includes eye lens(es) 520, and a gaze tracking system that includes at least one eye tracking camera 540 (e.g., infrared (IR) or near-IR (NIR) cameras) positioned on a side of the user's face for which eye tracking is performed, and an illumination source 530 (e.g., IR or NIR light sources such as an array or ring of NIR light-emitting diodes (LEDs)) that emit light (e.g., IR or NIR light) towards the user's eye(s) 592. The eye tracking cameras 540 may be pointed towards mirrors 550 located between the user's eye(s) 592 and a display 510 (e.g., a left or right display panel of a head-mounted display, or a display of a handheld device, a projector, etc.) that reflect IR or NIR light from the eye(s) 592 while allowing visible light to pass (e.g., as shown in the top portion of FIG. 5), or alternatively may be pointed towards the user's eye(s) 592 to receive reflected IR or NIR light from the eye(s) 592 (e.g., as shown in the bottom portion of FIG. 5).

In some embodiments, the controller 110 renders AR or VR frames 562 (e.g., left and right frames for left and right display panels) and provides the frames 562 to the display 510. The controller 110 uses gaze tracking input 542 from the eye tracking cameras 540 for various purposes, for example in processing the frames 562 for display. The controller 110 optionally estimates the user's point of gaze on the display 510 based on the gaze tracking input 542 obtained from the eye tracking cameras 540 using the glint-assisted methods or other suitable methods. The point of gaze estimated from the gaze tracking input 542 is optionally used to determine the direction in which the user is currently looking.

The following describes several possible use cases for the user's current gaze direction, and is not intended to be limiting. As an example use case, the controller 110 may render virtual content differently based on the determined direction of the user's gaze. For example, the controller 110 may generate virtual content at a higher resolution in a foveal region determined from the user's current gaze direction than in peripheral regions. As another example, the controller may position or move virtual content in the view based at least in part on the user's current gaze direction. As another example, the controller may display particular virtual content in the view based at least in part on the user's current gaze direction. As another example use case in AR applications, the controller 110 may direct external cameras for capturing the physical environments of the XR experience to focus in the determined direction. The autofocus mechanism of the external cameras may then focus on an object or surface in the environment that the user is currently looking at on the display 510. As another example use case, the eye lenses 520 may be focusable lenses, and the gaze tracking information is used by the controller to adjust the focus of the eye lenses 520 so that the virtual object that the user is currently looking at has the proper vergence to match the convergence of the user's eyes 592. The controller 110 may leverage the gaze tracking information to direct the eye lenses 520 to adjust focus so that close objects that the user is looking at appear at the right distance.

In some embodiments, the eye tracking device is part of a head-mounted device that includes a display (e.g., display 510), two eye lenses (e.g., eye lens(es) 520), eye tracking cameras (e.g., eye tracking camera(s) 540), and light sources (e.g., illumination sources 530 (e.g., IR or NIR LEDs)), mounted in a wearable housing. The light sources emit light (e.g., IR or NIR light) towards the user's eye(s) 592. In some embodiments, the light sources may be arranged in rings or circles around each of the lenses as shown in FIG. 5. In some embodiments, eight illumination sources 530 (e.g., LEDs) are arranged around each lens 520 as an example. However, more or fewer illumination sources 530 may be used, and other arrangements and locations of illumination sources 530 may be used.

In some embodiments, the display 510 emits light in the visible light range and does not emit light in the IR or NIR range, and thus does not introduce noise in the gaze tracking system. Note that the location and angle of eye tracking camera(s) 540 is given by way of example, and is not intended to be limiting. In some embodiments, a single eye tracking camera 540 is located on each side of the user's face. In some embodiments, two or more NIR cameras 540 may be used on each side of the user's face. In some embodiments, a camera 540 with a wider field of view (FOV) and a camera 540 with a narrower FOV may be used on each side of the user's face. In some embodiments, a camera 540 that operates at one wavelength (e.g., 850 nm) and a camera 540 that operates at a different wavelength (e.g., 940 nm) may be used on each side of the user's face.

Embodiments of the gaze tracking system as illustrated in FIG. 5 may, for example, be used in computer-generated reality, virtual reality, and/or mixed reality applications to provide computer-generated reality, virtual reality, augmented reality, and/or augmented virtuality experiences to the user.

Figure 6:
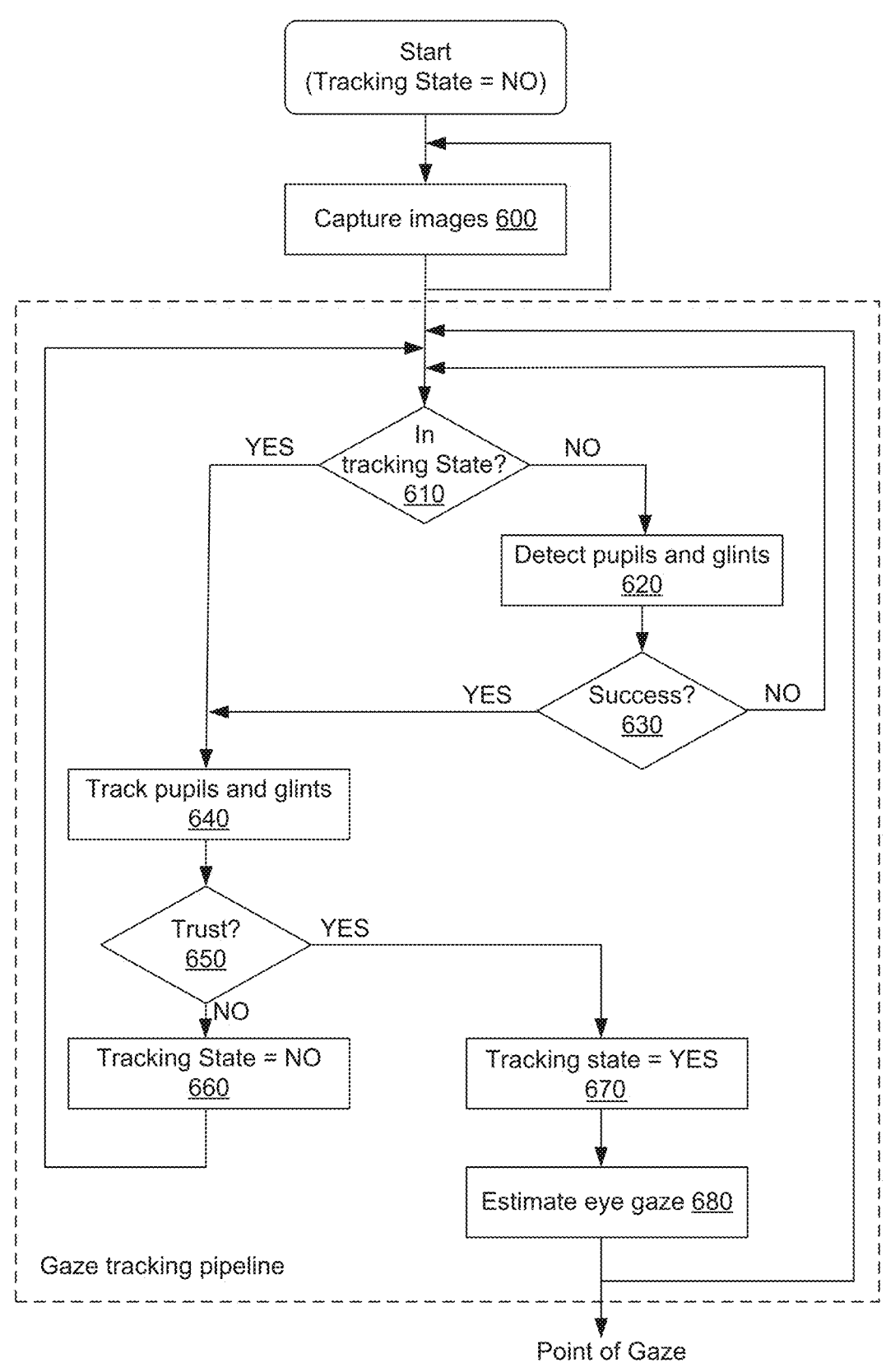
FIG. 6 is a flow diagram illustrating a glint-assisted gaze tracking pipeline in some embodiments.
Figures 7A, 7B:
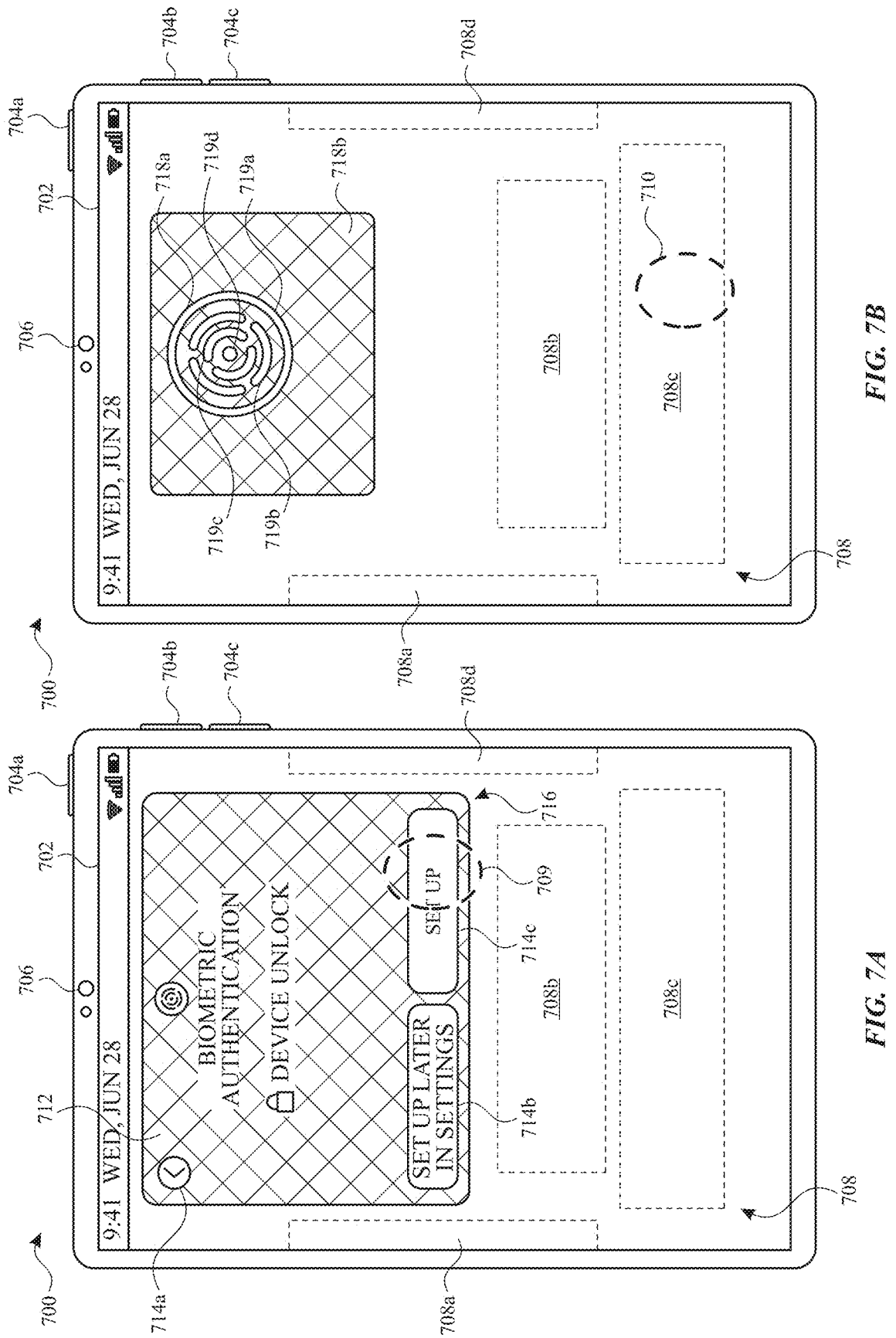
FIGS. 7A-7N illustrate example techniques for user enrollment, in some embodiments.

FIG. 6 illustrates a glint-assisted gaze tracking pipeline, in some embodiments. In some embodiments, the gaze tracking pipeline is implemented by a glint-assisted gaze tracking system (e.g., eye tracking device 130 as illustrated in FIGS. 1 and 5). The glint-assisted gaze tracking system may maintain a tracking state. Initially, the tracking state is off or "NO". When in the tracking state, the glint-assisted gaze tracking system uses prior information from the previous frame when analyzing the current frame to track the pupil contour and glints in the current frame. When not in the tracking state, the glint-assisted gaze tracking system attempts to detect the pupil and glints in the current frame and, if successful, initializes the tracking state to "YES" and continues with the next frame in the tracking state.

As shown in FIG. 6, the gaze tracking cameras may capture left and right images of the user's left and right eyes. The captured images are then input to a gaze tracking pipeline for processing beginning at 610. As indicated by the arrow returning to element 600, the gaze tracking system may continue to capture images of the user's eyes, for example at a rate of 60 to 120 frames per second. In some embodiments, each set of captured images may be input to the pipeline for processing. However, in some embodiments or under some conditions, not all captured frames are processed by the pipeline.

At 610, for the current captured images, if the tracking state is YES, then the method proceeds to element 640. At 610, if the tracking state is NO, then as indicated at 620 the images are analyzed to detect the user's pupils and glints in the images. At 630, if the pupils and glints are successfully detected, then the method proceeds to element 640. Otherwise, the method returns to element 610 to process next images of the user's eyes.

At 640, if proceeding from element 610, the current frames are analyzed to track the pupils and glints based in part on prior information from the previous frames. At 640, if proceeding from element 630, the tracking state is initialized based on the detected pupils and glints in the current frames. Results of processing at element 640 are checked to verify that the results of tracking or detection can be trusted. For example, results may be checked to determine if the pupil and a sufficient number of glints to perform gaze estimation are successfully tracked or detected in the current frames. At 650, if the results cannot be trusted, then the tracking state is set to NO at element 660, and the method returns to element 610 to process next images of the user's eyes. At 650, if the results are trusted, then the method proceeds to element 670. At 670, the tracking state is set to YES (if not already YES), and the pupil and glint information is passed to element 680 to estimate the user's point of gaze.

FIG. 6 is intended to serve as one example of eye tracking technology that may be used in a particular implementation. As recognized by those of ordinary skill in the art, other eye tracking technologies that currently exist or are developed in the future may be used in place of or in combination with the glint-assisted eye tracking technology describe herein in the computer system 101 for providing XR experiences to users, in some embodiments.

In some embodiments, the captured portions of real world environment 602 are used to provide a XR experience to the user, for example, a mixed reality environment in which one or more virtual objects are superimposed over representations of real world environment 602.

Thus, the description herein describes some embodiments of three-dimensional environments (e.g., XR environments) that include representations of real world objects and representations of virtual objects. For example, a three-dimensional environment optionally includes a representation of a table that exists in the physical environment, which is captured and displayed in the three-dimensional environment (e.g., actively via cameras and displays of a computer system, or passively via a transparent or translucent display of the computer system). As described previously, the three-dimensional environment is optionally a mixed reality system in which the three-dimensional environment is based on the physical environment that is captured by one or more sensors of the computer system and displayed via a display generation component. As a mixed reality system, the computer system is optionally able to selectively display portions and/or objects of the physical environment such that the respective portions and/or objects of the physical environment appear as if they exist in the three-dimensional environment displayed by the computer system. Similarly, the computer system is optionally able to display virtual objects in the three-dimensional environment to appear as if the virtual objects exist in the real world (e.g., physical environment) by placing the virtual objects at respective locations in the three-dimensional environment that have corresponding locations in the real world. For example, the computer system optionally displays a vase such that it appears as if a real vase is placed on top of a table in the physical environment. In some embodiments, a respective location in the three-dimensional environment has a corresponding location in the physical environment. Thus, when the computer system is described as displaying a virtual object at a respective location with respect to a physical object (e.g., such as a location at or near the hand of the user, or at or near a physical table), the computer system displays the virtual object at a particular location in the three-dimensional environment such that it appears as if the virtual object is at or near the physical object in the physical world (e.g., the virtual object is displayed at a location in the three-dimensional environment that corresponds to a location in the physical environment at which the virtual object would be displayed if it were a real object at that particular location).

In some embodiments, real world objects that exist in the physical environment that are displayed in the three-dimensional environment (e.g., and/or visible via the display generation component) can interact with virtual objects that exist only in the three-dimensional environment. For example, a three-dimensional environment can include a table and a vase placed on top of the table, with the table being a view of (or a representation of) a physical table in the physical environment, and the vase being a virtual object.

In a three-dimensional environment (e.g., a real environment, a virtual environment, or an environment that includes a mix of real and virtual objects), objects are sometimes referred to as having a depth or simulated depth, or objects are referred to as being visible, displayed, or placed at different depths. In this context, depth refers to a dimension other than height or width. In some embodiments, depth is defined relative to a fixed set of coordinates (e.g., where a room or an object has a height, depth, and width defined relative to the fixed set of coordinates). In some embodiments, depth is defined relative to a location or viewpoint of a user, in which case, the depth dimension varies based on the location of the user and/or the location and angle of the viewpoint of the user. In some embodiments where depth is defined relative to a location of a user that is positioned relative to a surface of an environment (e.g., a floor of an environment, or a surface of the ground), objects that are further away from the user along a line that extends parallel to the surface are considered to have a greater depth in the environment, and/or the depth of an object is measured along an axis that extends outward from a location of the user and is parallel to the surface of the environment (e.g., depth is defined in a cylindrical or substantially cylindrical coordinate system with the position of the user at the center of the cylinder that extends from a head of the user toward feet of the user). In some embodiments where depth is defined relative to viewpoint of a user (e.g., a direction relative to a point in space that determines which portion of an environment that is visible via a head mounted device or other display), objects that are further away from the viewpoint of the user along a line that extends parallel to the direction of the viewpoint of the user are considered to have a greater depth in the environment, and/or the depth of an object is measured along an axis that extends outward from a line that extends from the viewpoint of the user and is parallel to the direction of the viewpoint of the user (e.g., depth is defined in a spherical or substantially spherical coordinate system with the origin of the viewpoint at the center of the sphere that extends outwardly from a head of the user). In some embodiments, depth is defined relative to a user interface container (e.g., a window or application in which application and/or system content is displayed) where the user interface container has a height and/or width, and depth is a dimension that is orthogonal to the height and/or width of the user interface container. In some embodiments, in circumstances where depth is defined relative to a user interface container, the height and or width of the container are typically orthogonal or substantially orthogonal to a line that extends from a location based on the user (e.g., a viewpoint of the user or a location of the user) to the user interface container (e.g., the center of the user interface container, or another characteristic point of the user interface container) when the container is placed in the three-dimensional environment or is initially displayed (e.g., so that the depth dimension for the container extends outward away from the user or the viewpoint of the user). In some embodiments, in situations where depth is defined relative to a user interface container, depth of an object relative to the user interface container refers to a position of the object along the depth dimension for the user interface container. In some embodiments, multiple different containers can have different depth dimensions (e.g., different depth dimensions that extend away from the user or the viewpoint of the user in different directions and/or from different starting points). In some embodiments, when depth is defined relative to a user interface container, the direction of the depth dimension remains constant for the user interface container as the location of the user interface container, the user and/or the viewpoint of the user changes (e.g., or when multiple different viewers are viewing the same container in the three-dimensional environment such as during an in-person collaboration session and/or when multiple participants are in a real-time communication session with shared virtual content including the container). In some embodiments, for curved containers (e.g., including a container with a curved surface or curved content region), the depth dimension optionally extends into a surface of the curved container. In some situations, z-separation (e.g., separation of two objects in a depth dimension), z-height (e.g., distance of one object from another in a depth dimension), z-position (e.g., position of one object in a depth dimension), z-depth (e.g., position of one object in a depth dimension), or simulated z dimension (e.g., depth used as a dimension of an object, dimension of an environment, a direction in space, and/or a direction in simulated space) are used to refer to the concept of depth as described above.

In some embodiments, a user is optionally able to interact with virtual objects in the three-dimensional environment using one or more hands as if the virtual objects were real objects in the physical environment. For example, as described above, one or more sensors of the computer system optionally capture one or more of the hands of the user and display representations of the hands of the user in the three-dimensional environment (e.g., in a manner similar to displaying a real world object in three-dimensional environment described above), or in some embodiments, the hands of the user are visible via the display generation component via the ability to see the physical environment through the user interface due to the transparency/translucency of a portion of the display generation component that is displaying the user interface or due to projection of the user interface onto a transparent/translucent surface or projection of the user interface onto the user's eye or into a field of view of the user's eye. Thus, in some embodiments, the hands of the user are displayed at a respective location in the three-dimensional environment and are treated as if they were objects in the three-dimensional environment that are able to interact with the virtual objects in the three-dimensional environment as if they were physical objects in the physical environment. In some embodiments, the computer system is able to update display of the representations of the user's hands in the three-dimensional environment in conjunction with the movement of the user's hands in the physical environment.

In some of the embodiments described below, the computer system is optionally able to determine the "effective" distance between physical objects in the physical world and virtual objects in the three-dimensional environment, for example, for the purpose of determining whether a physical object is directly interacting with a virtual object (e.g., whether a hand is touching, grabbing, holding, etc. a virtual object or within a threshold distance of a virtual object). For example, a hand directly interacting with a virtual object optionally includes one or more of a finger of a hand pressing a virtual button, a hand of a user grabbing a virtual vase, two fingers of a hand of the user coming together and pinching/holding a user interface of an application, and any of the other types of interactions described here. For example, the computer system optionally determines the distance between the hands of the user and virtual objects when determining whether the user is interacting with virtual objects and/or how the user is interacting with virtual objects. In some embodiments, the computer system determines the distance between the hands of the user and a virtual object by determining the distance between the location of the hands in the three-dimensional environment and the location of the virtual object of interest in the three-dimensional environment. For example, the one or more hands of the user are located at a particular position in the physical world, which the computer system optionally captures and displays at a particular corresponding position in the three-dimensional environment (e.g., the position in the three-dimensional environment at which the hands would be displayed if the hands were virtual, rather than physical, hands). The position of the hands in the three-dimensional environment is optionally compared with the position of the virtual object of interest in the three-dimensional environment to determine the distance between the one or more hands of the user and the virtual object. In some embodiments, the computer system optionally determines a distance between a physical object and a virtual object by comparing positions in the physical world (e.g., as opposed to comparing positions in the three-dimensional environment). For example, when determining the distance between one or more hands of the user and a virtual object, the computer system optionally determines the corresponding location in the physical world of the virtual object (e.g., the position at which the virtual object would be located in the physical world if it were a physical object rather than a virtual object), and then determines the distance between the corresponding physical position and the one of more hands of the user. In some embodiments, the same techniques are optionally used to determine the distance between any physical object and any virtual object. Thus, as described herein, when determining whether a physical object is in contact with a virtual object or whether a physical object is within a threshold distance of a virtual object, the computer system optionally performs any of the techniques described above to map the location of the physical object to the three-dimensional environment and/or map the location of the virtual object to the physical environment.

In some embodiments, the same or similar technique is used to determine where and what the gaze of the user is directed to and/or where and at what a physical stylus held by a user is pointed. For example, if the gaze of the user is directed to a particular position in the physical environment, the computer system optionally determines the correspond-ing position in the three-dimensional environment (e.g., the virtual position of the gaze), and if a virtual object is located at that corresponding virtual position, the computer system optionally determines that the gaze of the user is directed to that virtual object. Similarly, the computer system is option-ally able to determine, based on the orientation of a physical stylus, to where in the physical environment the stylus is pointing. In some embodiments, based on this determina-tion, the computer system determines the corresponding virtual position in the three-dimensional environment that corresponds to the location in the physical environment to which the stylus is pointing, and optionally determines that the stylus is pointing at the corresponding virtual position in the three-dimensional environment.

Similarly, the embodiments described herein may refer to the location of the user (e.g., the user of the computer system) and/or the location of the computer system in the three-dimensional environment. In some embodiments, the user of the computer system is holding, wearing, or other-wise located at or near the computer system. Thus, in some embodiments, the location of the computer system is used as a proxy for the location of the user. In some embodiments, the location of the computer system and/or user in the physical environment corresponds to a respective location in the three-dimensional environment. For example, the loca-tion of the computer system would be the location in the physical environment (and its corresponding location in the three-dimensional environment) from which, if a user were to stand at that location facing a respective portion of the physical environment that is visible via the display genera-tion component, the user would see the objects in the physical environment in the same positions, orientations, and/or sizes as they are displayed by or visible via the display generation component of the computer system in the three-dimensional environment (e.g., in absolute terms and/or relative to each other). Similarly, if the virtual objects displayed in the three-dimensional environment were physi-cal objects in the physical environment (e.g., placed at the same locations in the physical environment as they are in the three-dimensional environment, and having the same sizes and orientations in the physical environment as in the three-dimensional environment), the location of the com-puter system and/or user is the position from which the user would see the virtual objects in the physical environment in the same positions, orientations, and/or sizes as they are displayed by the display generation component of the com-puter system in the three-dimensional environment (e.g., in absolute terms and/or relative to each other and the real world objects).

In the present disclosure, various input methods are described with respect to interactions with a computer system. When an example is provided using one input device or input method and another example is provided using another input device or input method, it is to be understood that each example may be compatible with and optionally utilizes the input device or input method described with respect to another example. Similarly, vari-ous output methods are described with respect to interac-tions with a computer system. When an example is provided using one output device or output method and another example is provided using another output device or output method, it is to be understood that each example may be compatible with and optionally utilizes the output device or output method described with respect to another example. Similarly, various methods are described with respect to interactions with a virtual environment or a mixed reality environment through a computer system. When an example is provided using interactions with a virtual environment and another example is provided using mixed reality environ-ment, it is to be understood that each example may be compatible with and optionally utilizes the methods described with respect to another example. As such, the present disclosure discloses embodiments that are combina-tions of the features of multiple examples, without exhaus-tively listing all features of an embodiment in the description of each example embodiment.

User Interfaces and Associated Processes

Attention is now directed towards embodiments of user interfaces ("UI") and associated processes that may be implemented on a computer system, such as a portable multifunction device or a head-mounted device, in commu-nication with a display generation component and (option-ally) one or more input devices.

FIGS. 7A-7N illustrate example techniques of user enroll-ment. FIG. 8 is a flow diagram of an exemplary method 800 for user enrollment. The user interfaces in FIGS. 7A-7N are used to illustrate the processes described below, including the processes in FIG. 8.

FIG. 7A depicts electronic device 700, which is a tablet that includes touch-sensitive display 702, buttons 704a-704c, and one or more input sensors 706 (e.g., one or more cameras, eye gaze trackers, hand movement trackers, and/or head movement trackers). In some embodiments described below, electronic device 700 is a tablet. In some embodi-ments, electronic device 700 is a smartphone, a wearable device, a wearable smartwatch device, a head-mounted system (e.g., headset), or other computer system that includes and/or is in communication with one or more display devices (e.g., display screens and/or projection devices). In some embodiments in which electronic device 700 is a head-mounted system, electronic device 700 option-ally includes two displays (e.g., one for each eye of a user), with each display displaying respective various content, to enable a user of electronic device 700 to perceive the various depths of the various content (e.g., physical objects and/or virtual objects) of three-dimensional environments. Electronic device 700 is a computer system (e.g., computer system 101 in FIG. 1A).

At FIG. 7A, electronic device 700 displays user interface 712 overlaid on three-dimensional environment 708. In the depicted scenario, three-dimensional environment 708 includes objects 708a-708d. In some embodiments, three-dimensional environment 708 is displayed by a display (e.g., display 702, as depicted in FIG. 7A). In some embodiments, three-dimensional environment 708 includes a virtual environment or an image (or video) of a physical environment captured by one or more cameras (e.g., one or more cameras that are part of input sensors 706 and/or one or more external cameras). For example, in some embodiments, object 708a is a virtual object that is representative of a physical object that has been captured by one or more cameras and/or detected by one or more sensors; and object 708b is a virtual object that is representative of a second physical object that has been captured by one or more cameras and/or detected by one or more sensors, and so forth. In some embodiments, three-dimensional environment 708 is visible to a user behind user interface 712 but is not displayed by a display. For example, in some embodiments, three-dimensional environment 708 is a physical environment (and, for example, objects 708a-708d are physical objects) that is visible to a user (e.g., through one or more transparent displays) behind user interface 712 without being displayed by a display. In some embodiments, user interface 712 and/or three-dimensional environment 708 are part of an extended reality experience.

In FIG. 7A, user interface 712 indicates that electronic device 700 is in a locked state. Furthermore, in FIG. 7A, the user has not been enrolled for biometric authentication on electronic device 700. Accordingly, user interface 712 includes option 714c that is selectable for the user to enroll in and enable biometric authentication, and option 714b that is selectable for the user to skip biometric authentication enrollment. User interface 712 also includes option 714a, that is selectable to cease display of user interface 712. At FIG. 7A, electronic device 700 detects user input 709, which corresponds to selection of option 714c. In FIG. 7A, user input 709 is a tap input on touch-sensitive display 702. However, in some embodiments, user input 709 is a different type of user input, such as a gesture or other action taken by a user. For example, in some embodiments, electronic device 700 is a head-mounted system, and detecting user input 709 includes, for example, detecting a user performing a gesture (e.g., an air gesture (e.g., an air tap gesture; and/or an air pinch gesture)) while electronic device 700 is worn, detecting a button press while electronic device 700 is worn, detecting rotation of a rotatable input mechanism while electronic device 700 is worn, detecting a gaze-based gesture (e.g., detecting the user looking at an object and/or moving his or her gaze in a particular manner), and/or any combination of the foregoing (e.g., detecting a gaze at object 714c in conjunction with an air pinch gesture).

At FIG. 7B, in response to detecting user input 709, electronic device 700 displays gaze target 718a and gaze target background 718b overlaid on three-dimensional environment 708. In some embodiments, gaze target 718a and gaze target background 718b are viewpoint-locked objects. In the depicted embodiments, gaze target 718a is depicted as multiple concentric circles 719a-719d. In some embodiments, gaze target 718a includes two or more concentric shapes (e.g., two or more concentric circles) inside of an outline of a representation of a biometric feature (e.g., a representation of an eye and/or other biometric feature). For example, in some embodiments, outermost shape 719a is representative of an eye (e.g., is in the shape of an eye), and two or more concentric shapes (e.g., circles 719b-719d) are positioned within the representation of the eye. In some embodiments, a first set of the two or more concentric shapes (e.g., one or more of the two or more concentric shapes) (e.g., 719b-719d) represent an iris of the eye. In some embodiments, a second set of the two or more concentric shapes (e.g., one or more of the two or more concentric shapes) (e.g., 719b-719d) represent a pupil of the eye. For example, in some embodiments, circle 719b and/or circle 719c represent an iris of the eye, and in some embodiments, circle 719c and/or circle 719d represent a pupil of the eye. At FIG. 7B, electronic device 700 detects the gaze of the user, as indicated by gaze indication 710. In FIG. 7B, the user is looking at object 708c, and is not looking at gaze target 718a.

Figures 7C, 7D:
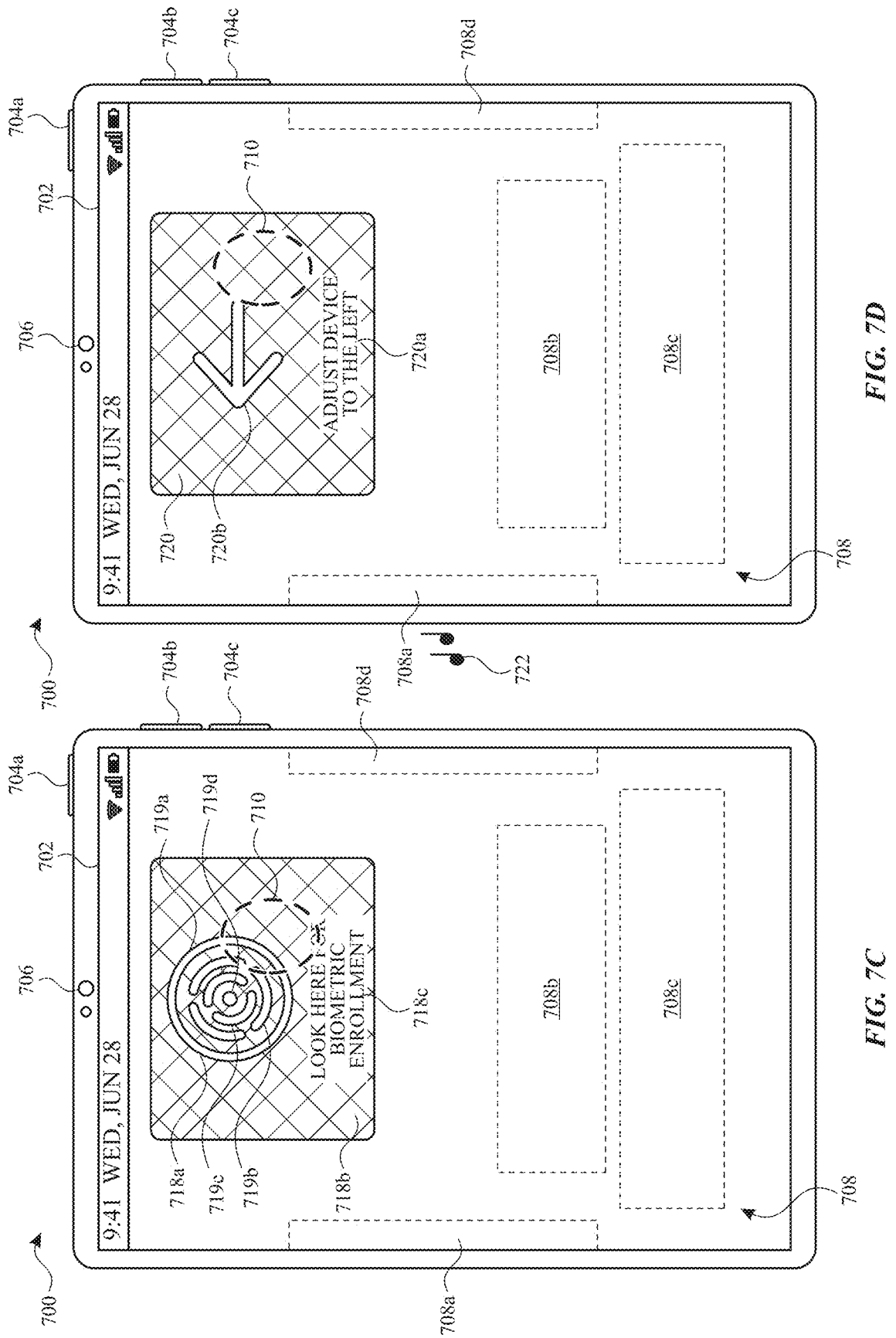

At FIG. 7C, based on a determination that the user is not looking at gaze target 718a, and has not looked at gaze target 718a for a threshold amount of time (e.g., for 0.1, 0.25, 0.5, 1, 3, 5, or 7 seconds), electronic device 700 displays prompt 718c prompting the user to look at gaze target 718a for biometric enrollment. At FIG. 7C, electronic device 700 detects that the user is now looking at gaze target 718a, as indicated by gaze indication 710.

At FIG. 7D, electronic device 700 detects that a physical position of electronic device 700 satisfies one or more error conditions (e.g., is not positioned properly, is not positioned correctly, and/or the electronic device 700 should be moved (e.g., in order for electronic device 700 to operate properly and/or optimally)). In some embodiments, electronic device 700 detects that a physical position of electronic device 700 satisfies one or more error conditions relative to a portion of the body of a user (e.g., a user that is using and/or wearing electronic device 700) (e.g., relative to a user's head, a user's face, one or more of the user's eyes, and/or a portion of a user's face) (e.g., is not positioned properly relative to the portion of the body of the user, is not positioned correctly relative to the portion of the body of the user, and/or the electronic device 700 should be moved relative to the portion of the body of the user). For example, in some embodiments, electronic device 700 is a head-mounted system, and electronic device 700 detects that at least a portion of electronic device 700 is not positioned properly relative to the head, face, and/or eyes of a user (e.g., should be moved relative to the head, face, and/or eyes of a user). In some embodiments, electronic device 700 detects that at least a portion of electronic device 700 is not positioned properly relative to the face and/or eyes of the user, for example, for accurate gaze-based tracking (e.g., for gaze-based user inputs).

In the depicted embodiments, in response to the determination that electronic device 700 satisfies one or more error conditions (e.g., relative to a portion of the body of the user), electronic device 700 displays, via display 702, user interface 720 overlaid on three-dimensional environment 708. In some embodiments, when electronic device 700 detects that electronic device 700 does not satisfy the one or more error conditions (e.g., relative to at least a portion of a body of a user) (e.g., electronic device 700 is positioned properly and/or electronic device 700 does not need to be moved (e.g., in order for electronic device 700 to operate properly and/or optimally)), electronic device 700 forgoes display of user interface 720 (e.g., maintains display of gaze target 718a and gaze target background 718b overlaid on three-dimensional environment 708; and/or skips from FIG. 7C to FIG. 7F).

At FIG. 7D, electronic device 700 determines that electronic device 700 should be moved to the left relative to a portion of a body of a user (e.g., a user using and/or wearing electronic device 700). In response to this determination, user interface 720 includes prompt 720a and prompt 720b instructing the user to move electronic device 700 "to the left." Furthermore, in FIG. 7D, in response to the determination that electronic device 700 should be moved to the left relative to a portion of the body of the user, electronic device 700 outputs audio output 722 on the left side of electronic device 700 (e.g., without outputting audio output on the top, bottom, and/or right sides of electronic device 700). In some embodiments, audio output 722 includes spatialized audio that gives the impression to the user that audio output 722 is coming from a position to the left of the user.

Figures 7E, 7F:
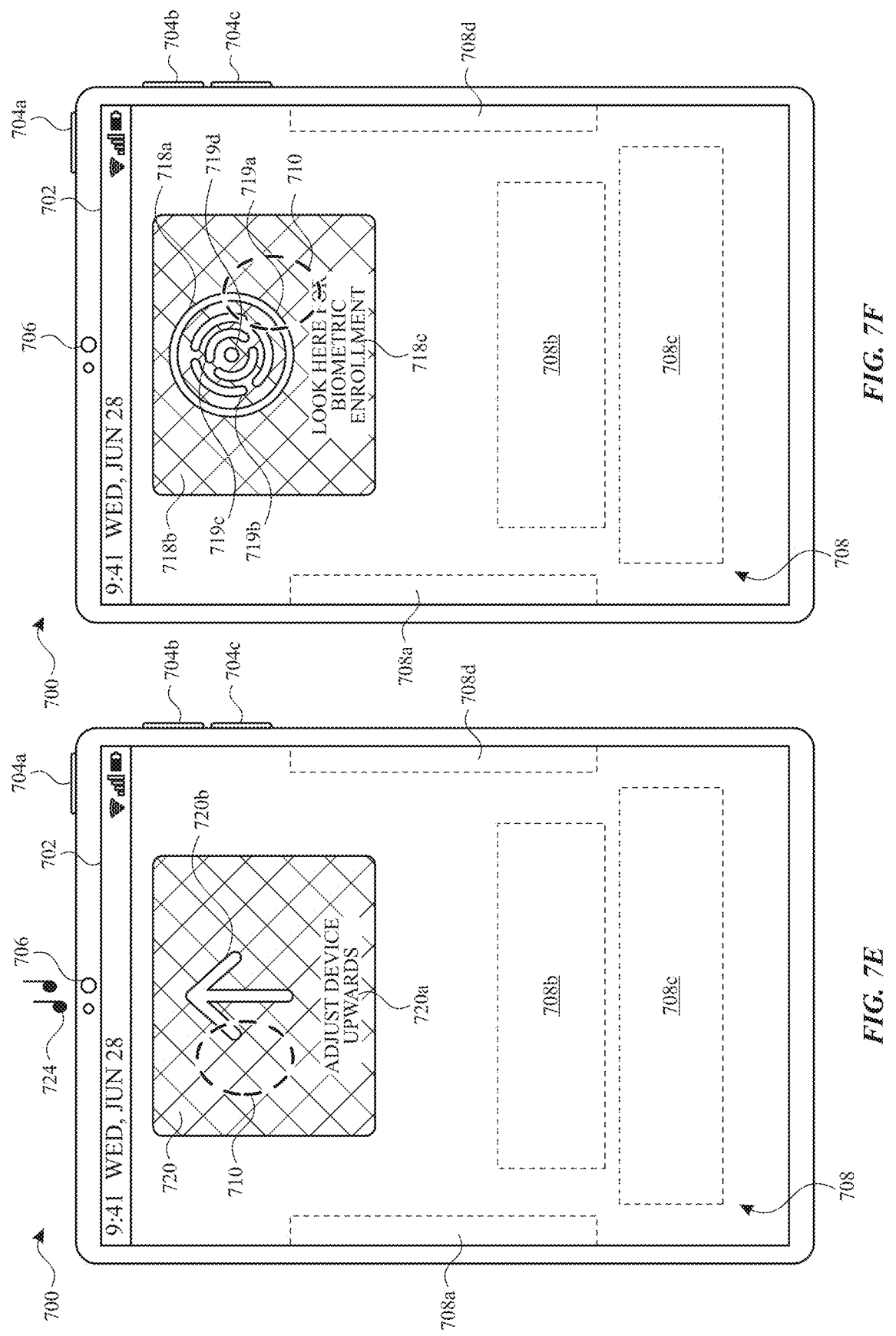

At FIG. 7E, electronic device 700 detects that the user has moved electronic device 700 to the left, and that electronic device 700 no longer needs to be moved to the left, but now needs to be moved upwards. In response to the determination that electronic device 700 no longer needs to be moved to the left and now needs to be moved upwards, electronic device 700 updates user interface 720, prompt 720a, and prompt 720b to instruct the user to adjust electronic device 700 upwards, and also outputs audio output 724 on a top side of electronic device 700 (e.g., without outputting audio output on the bottom, left, and/or right sides of electronic device 700). In some embodiments, audio output 724 includes spatialized audio that gives the impression to the user that audio output 724 is coming from a position above the user.

At FIG. 7F, electronic device 700 detects that it has been moved upwards relative to at least a portion of the body of the user, and that the physical position of electronic device 700 no longer satisfies the one or more error conditions (e.g., detects that electronic device 700 is now positioned correctly relative to at least a portion of the body of the user). In response to the determination that the physical position of electronic device 700 no longer satisfies the one or more error conditions, electronic device 700 replaces display of user interface 720 with gaze target 718a and gaze target background 718b. At FIG. 7F, electronic device 700 detects that the user is looking at gaze target 718a (as indicated by gaze indication 710).

Figures 7G, 7H:
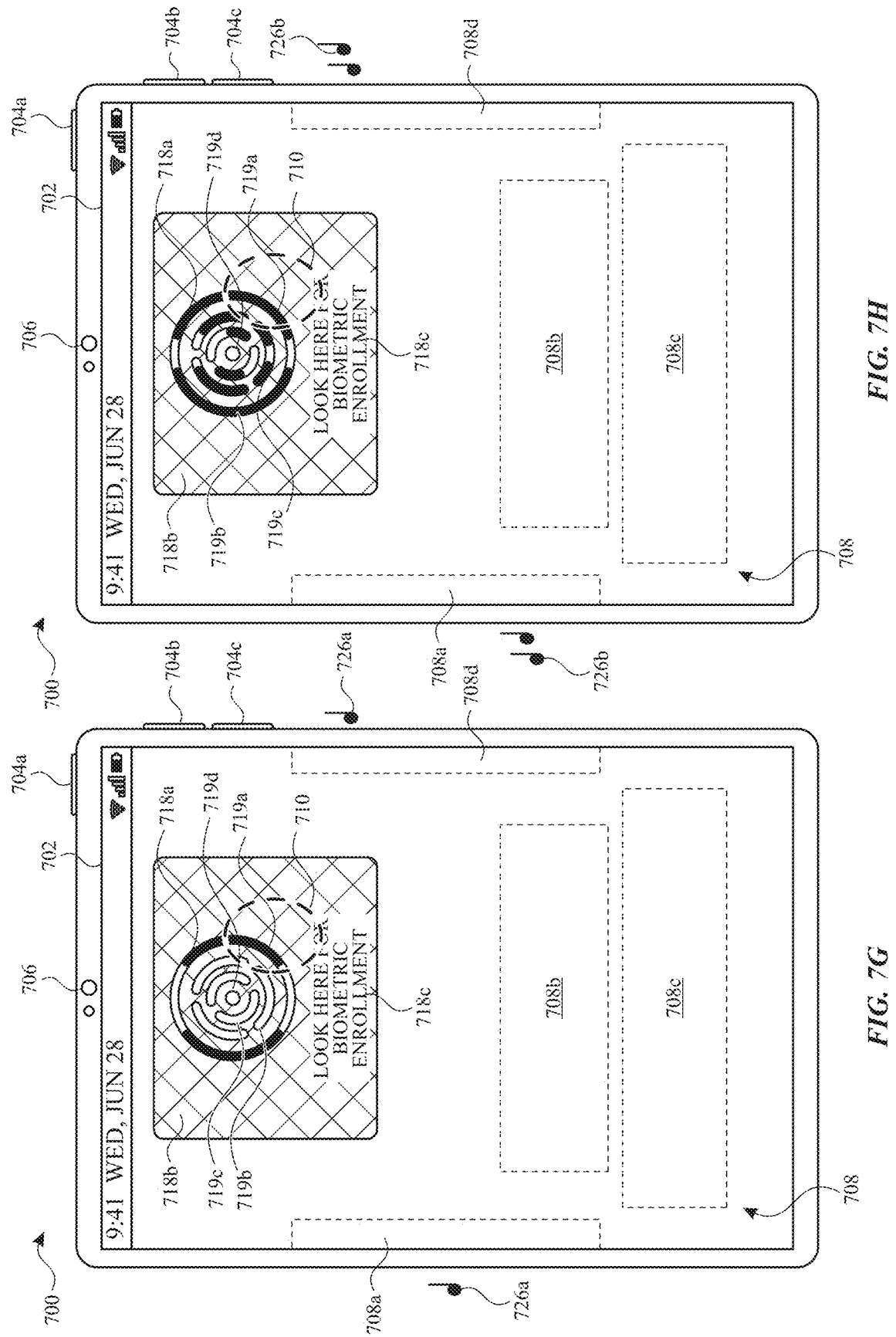

At FIG. 7G, in response to the determination that the user is looking at gaze target 718a, electronic device 700 collects biometric information corresponding to the user. For example, in some embodiments, electronic device 700 collects one or more images and/or scans of the user's eye(s). In some embodiments, the biometric information is collected for future use in biometric authentication of the user. For example, one or more images and/or scans of the user's eye(s) is collected so that the user can later be identified and/or authenticated using eye-based identification and/or authentication. Furthermore, in FIG. 7G, in response to the determination that the user is looking at gaze target 718a, electronic device 700 displays an animation of gaze target 718a, which has gaze target 718a filling up with color from the outside edges of gaze target 718a towards the center of gaze target 718a. The animation of gaze target 718a is indicative of progress in biometric enrollment of the user (e.g., progress in the collection of biometric information from the user). In FIG. 7G, the animation indicates that about one-third of the biometric enrollment process has been completed. Furthermore, in FIG. 7G, electronic device 700 outputs audio output 726a indicating progress in the biometric enrollment process. In some embodiments, audio output 726a includes spatialized audio that gives the impression to the user that audio output 726a is coming from the position of gaze target 718a.

At FIG. 7H, electronic device 700 detects that the user continues to look at gaze target 718a. While the user continues to look at gaze target 718a, electronic device 700 continues to collect biometric information corresponding to the user. Furthermore, in response to the determination that the user continues to look at gaze target 718a, electronic device 700 displays continued animation of gaze target 718a, which is now shown two-thirds full of color, indicating that about two-thirds of the biometric enrollment process has been completed. In FIG. 7H, electronic device 700 also outputs audio output 726b indicating further progress in the biometric enrollment process. In some embodiments, audio output 726b is different from audio output 726a. For example, in some embodiments, audio output 726b has a higher volume than audio output 726a, and/or audio output 726b has a different pitch (e.g., a higher pitch and/or a lower pitch) than audio output 726a to indicate progress in the biometric enrollment process. In some embodiments, audio output 726b includes spatialized audio that gives the impression to the user that audio output 726b is coming from the position of gaze target 718a.

Figures 7I, 7J:
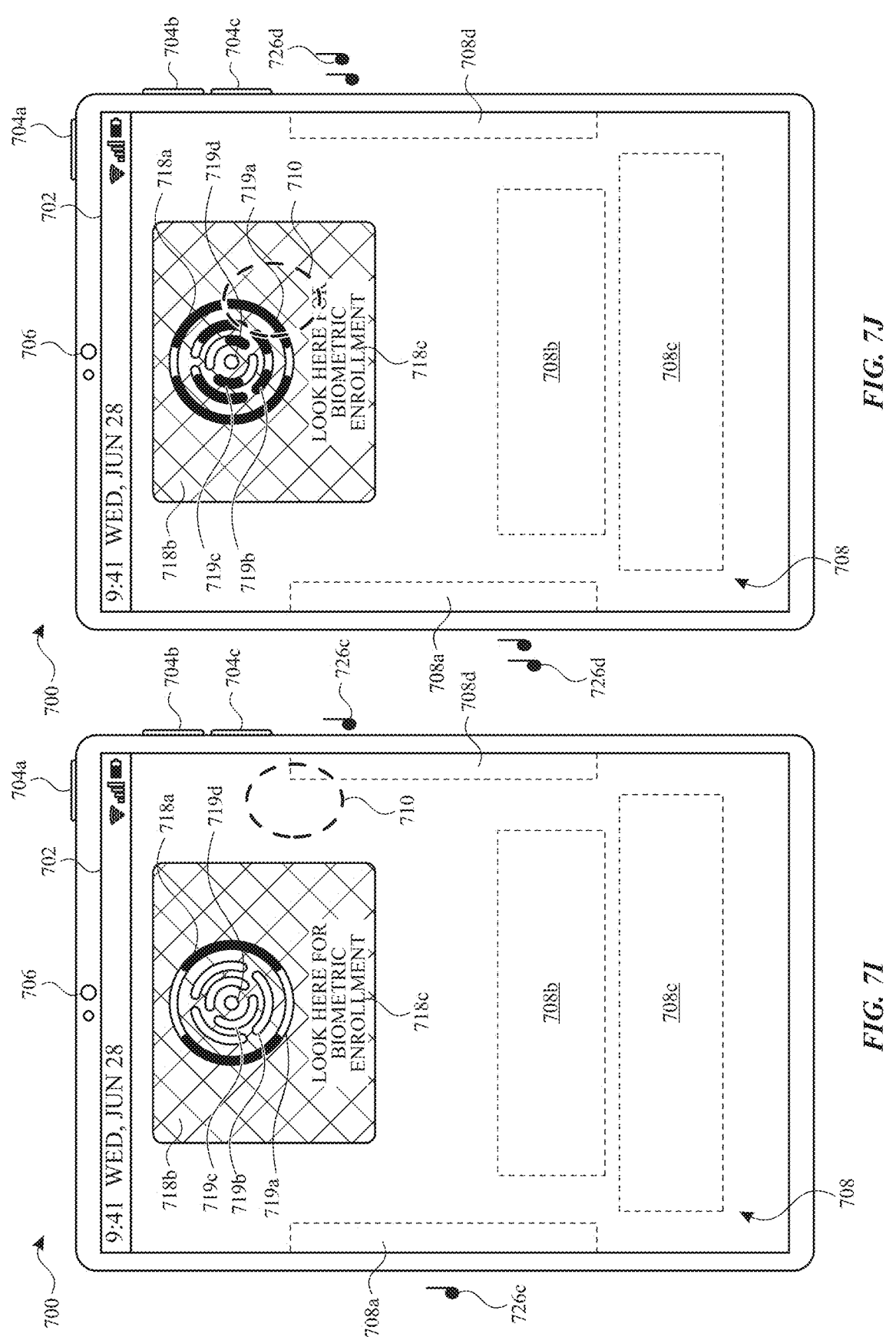

At FIG. 7I, electronic device 700 detects that the user has stopped looking at gaze target 718a, as indicated by gaze indication 710. In response to the determination that the user has stopped looking at gaze target 718a, electronic device 700 displays gaze target 718a animating in such a way that gaze target 718a is now less filled with color, and has now reverted to being only one-third filled with color, thereby indicating that the biometric enrollment process has stopped progressing (e.g., due to the user no longer looking at gaze target 718a). Furthermore, in response to the determination that the user has stopped looking at gaze target 718a, electronic device 700 outputs audio output 726c different from audio output 726b. In some embodiments, audio output 726c is the same as audio output 726a. In some embodiments, audio output 726c is different from audio output 726a. In some embodiments, audio output 726c includes spatialized audio that gives the impression to the user that audio output 726c is coming from the position of gaze target 718a.

At FIG. 7J, electronic device 700 detects that the user is now looking at gaze target 718a, as indicated by gaze indication 710. In response to the determination that the user has resumed looking at gaze target 718a, electronic device 700 displays animation of gaze target 718a so that gaze target 718a is once again two-thirds full of color, indicating progress in the biometric enrollment process (e.g., indicating that the biometric enrollment process is two-thirds completed). Electronic device 700 also outputs audio output 726d. In some embodiments, audio output 726d is the same as audio output 726b. In some embodiments, audio output 726d includes spatialized audio that gives the impression to the user that audio output 726d is coming from the position of gaze target 718a.

At FIG. 7K1, electronic device 700 detects that the user continues to look at gaze target 718a, as indicated by gaze indication 710. In response to the determination that the user continues to look at gaze target 718a, electronic device 700 displays animation of gaze target 718a such that gaze target 718a is now filled with color, and electronic device 700 also outputs audio output 726e. In some embodiments, audio output 726e is different from audio output 726a, 726b, 726c, and/or 726d. For example, in some embodiments, audio output 726e has a higher volume than audio output 726d, and/or audio output 726*e* has a different pitch (e.g., a higher pitch and/or a lower pitch) than audio output 726*d* to indicate progress in the biometric enrollment process. In some embodiments, audio output 726*e* includes spatialized audio that gives the impression to the user that audio output 726*e* is coming from the position of gaze target 718*a*.

In some embodiments, the techniques and user interface (s) described in FIGS. 7A-7N are provided by one or more of the devices described in FIGS. 1A-1P. For example, FIG. 7K2 illustrates an embodiment in which gaze target 718*a* (e.g., as described in FIGS. 7B, 7C, 7F-7K1) is displayed on display module X702 of head-mounted device (HMD) X700. In some embodiments, HMD X700 includes a pair of display modules that provide stereoscopic content to different eyes of the same user. For example, HMD X700 includes display module X702 (which provides content to a left eye of the user) and a second display module (which provides content to a right eye of the user). In some embodiments, the second display module displays a slightly different image than display module X702 to generate the illusion of stereoscopic depth.

At FIG. 7K2, HMD X700 detects that the user continues to look at gaze target 718*a*, as indicated by gaze indication X710. In response to the determination that the user continues to look at gaze target 718*a*, HMD X700 displays animation of gaze target 718*a* such that gaze target 718*a* is now filled with color, and HMD X700 also outputs audio output X726*c*. In some embodiments, audio output X726*e* is different from audio output 726*a*, 726*b*, 726*c*, and/or 726*d*. For example, in some embodiments, audio output X726*e* has a higher volume than audio output 726*d*, and/or audio output X726*e* has a different pitch (e.g., a higher pitch and/or a lower pitch) than audio output 726*d* to indicate progress in the biometric enrollment process. In some embodiments, audio output X726*e* includes spatialized audio that gives the impression to the user that audio output X726*e* is coming from the position of gaze target 718*a*.

Any of the features, components, and/or parts, including the arrangements and configurations thereof shown in FIGS. 1B-1P can be included, either alone or in any combination, in HMD X700. For example, in some embodiments, HMD X700 includes any of the features, components, and/or parts of HMD 1-100, 1-200, 3-100, 6-100, 6-200, 6-300, 6-400, 11.1.1-100, and/or 11.1.2-100, either alone or in any combination. In some embodiments, display module X702 includes any of the features, components, and/or parts of display unit 1-102, display unit 1-202, display unit 1-306, display unit 1-406, display generation component 120, display screens 1-122*a-b*, first and second rear-facing display screens 1-322*a*, 1-322*b*, display 11.3.2-104, first and second display assemblies 1-120*a*, 1-120*b*, display assembly 1-320, display assembly 1-421, first and second display sub-assemblies 1-420*a*, 1-420*b*, display assembly 3-108, display assembly 11.3.2-204, first and second optical modules 11.1.1-104*a* and 11.1.1-104*b*, optical module 11.3.2-100, optical module 11.3.2-200, lenticular lens array 3-110, display region or area 6-232, and/or display/display region 6-334, either alone or in any combination. In some embodiments, HMD X700 includes a sensor that includes any of the features, components, and/or parts of any of sensors 190, sensors 306, image sensors 314, image sensors 404, sensor assembly 1-356, sensor assembly 1-456, sensor system 6-102, sensor system 6-202, sensors 6-203, sensor system 6-302, sensors 6-303, sensor system 6-402, and/or sensors 11.1.2-110*a-f*, either alone or in any combination. In some embodiments, HMD X700 includes one or more input devices, which can include any of the features, components, and/or parts of any of first button 1-128, button 11.1.1-114, second button 1-132, and or dial or button 1-328, either alone or in any combination. In some embodiments, HMD X700 includes one or more audio output components (e.g., electronic component 1-112) for generating audio feedback (e.g., audio output X726*c*), optionally generated based on detected events and/or user inputs detected by the HMD X700.

Figure 7L:
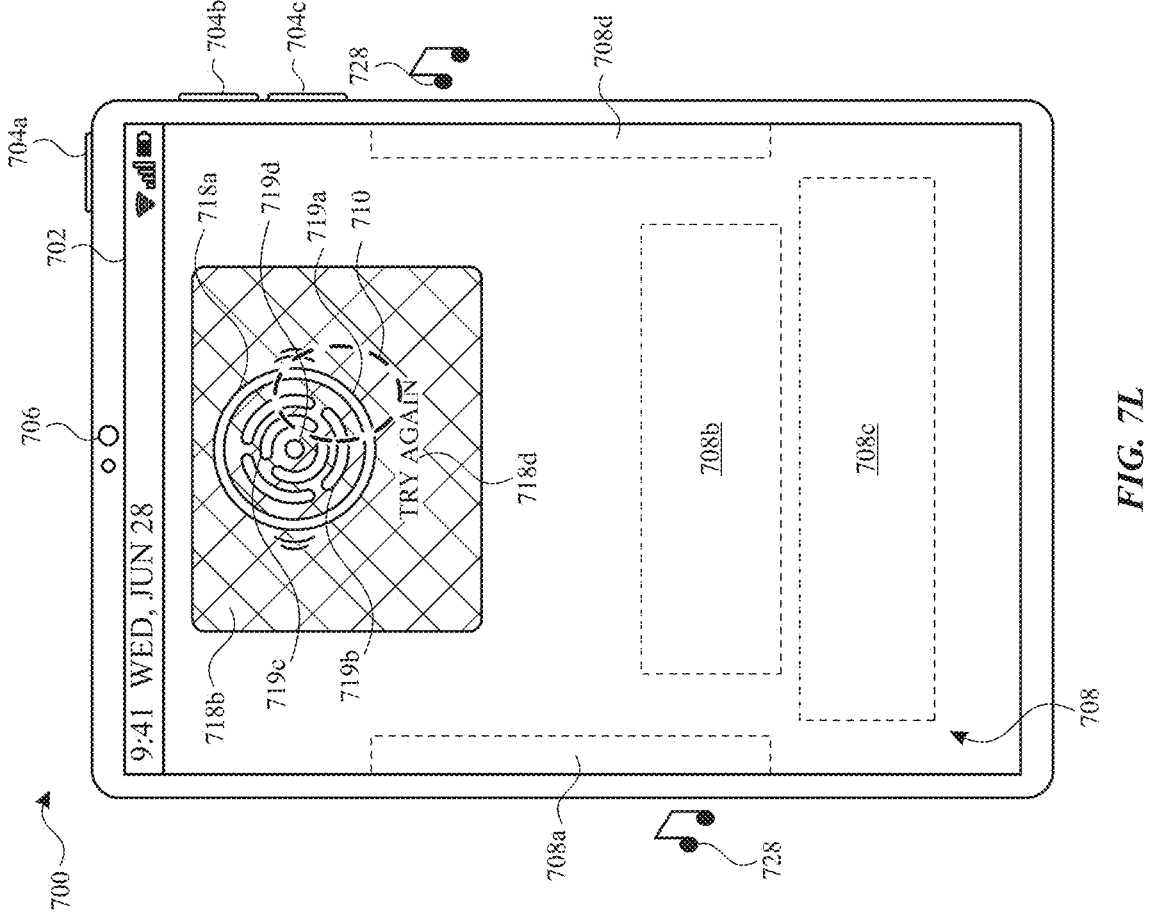
Figures 7M, 7N:
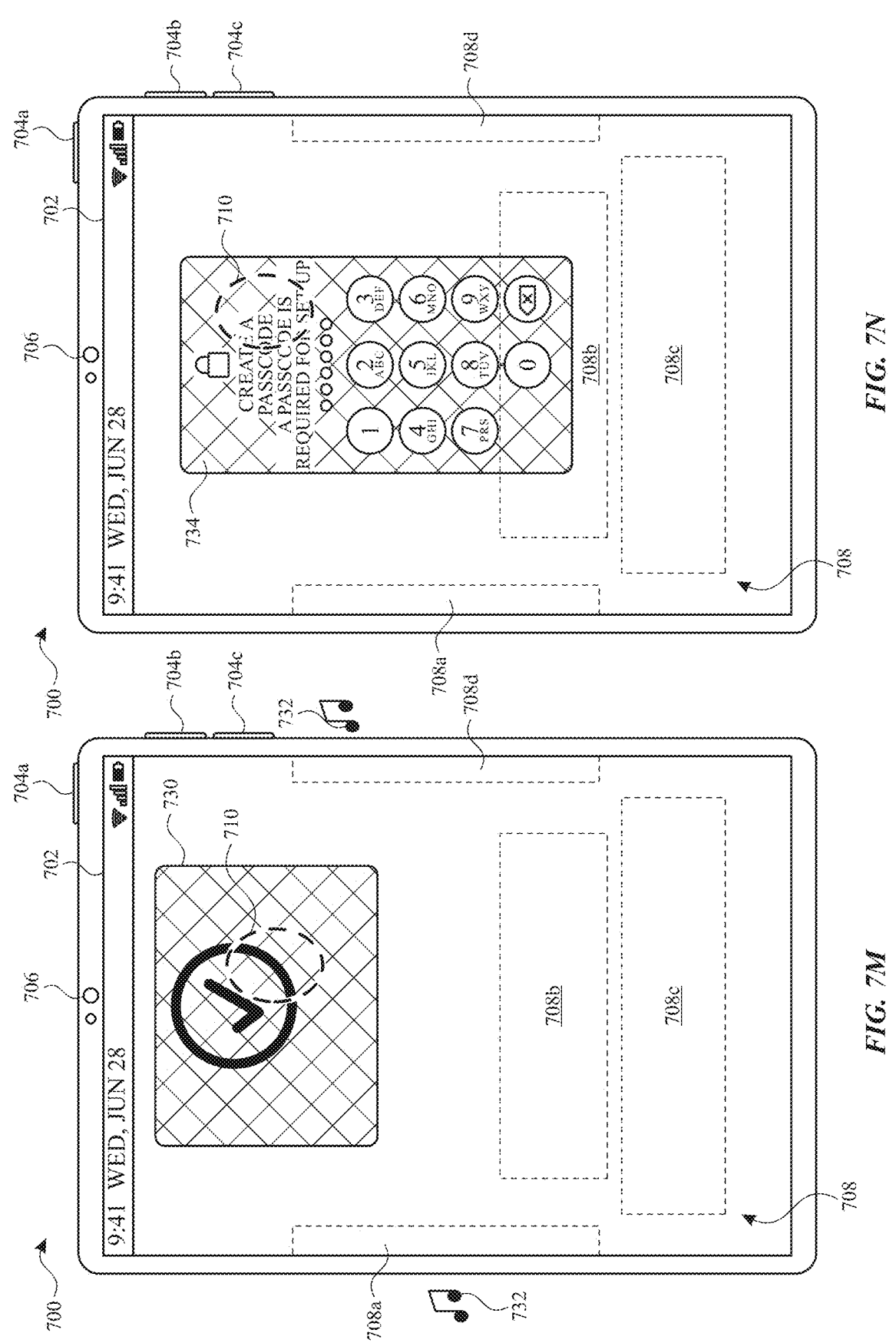

FIG. 7L depicts a first scenario, in which biometric enrollment of the user has failed. For example, in some embodiments, in FIG. 7L, electronic device 700 detects that biometric information collected from the user is not adequate and/or is not suitable for use in biometric authentication of the user (e.g., due to image quality issues and/or other errors). In response to a determination that biometric enrollment of the user has failed, electronic device 700 displays a failure animation in which gaze target 718*a* vibrates, and also displays prompt 718*d* prompting the user to re-try biometric enrollment. Furthermore, in response to the determination that biometric enrollment has failed, electronic device 700 outputs audio output 728 indicating that biometric enrollment has failed. In some embodiments, after failed biometric enrollment of a user, electronic device 700 automatically re-tries biometric enrollment of the user. For example, in some embodiments, after displaying the failure animation and user interfaces shown in FIG. 7L, electronic device 700 re-initiates the biometric enrollment process by re-displaying gaze target 718*a* as shown in FIG. 7B. In other embodiments, after displaying the failure animation and user interfaces shown in FIG. 7L, electronic device 700 re-displays user interface 712 of FIG. 7A.

FIG. 7M depicts a different scenario in which biometric enrollment of the user is successful. In response to a determination that the user has successfully been enrolled in biometric authentication (e.g., biometric information has successfully been collected from the user for use in biometric authentication of the user), electronic device 700 ceases display of gaze target 718*a*, and displays user interface 730 indicative of successful biometric enrollment of the user, and outputs audio output 732 indicative of successful biometric enrollment of the user.

At FIG. 7N, subsequent to displaying user interface 730, electronic device 700 replaces display of user interface 730 with user interface 734, which prompts the user to create a passcode for passcode-based authentication of the user in the future. A user is able to interact with user interface 734 to enter and create a numerical passcode corresponding to the user.

Additional descriptions regarding FIGS. 7A-7N are provided below in reference to method 800 described with respect to FIG. 8.

FIG. 8 is a flow diagram of an exemplary method 800 for user enrollment, in some embodiments. In some embodiments, method 800 is performed at a computer system (e.g., computer system 101 in FIG. 1A; 700 and/or X700) (e.g., a smart phone, a smart watch, a tablet, a laptop, a desktop, a wearable device, and/or head-mounted device) that is in communication with one or more display generation components (e.g., display generation component 120 in FIGS. 1, 3, and 4; 702 and/or X702) (e.g., a heads-up display, a display, a touchscreen, and/or a projector) (e.g., a visual output device, a 3D display, a display having at least a portion that is transparent or translucent on which images can be projected (e.g., a see-through display), a projector, a heads-up display, and/or a display controller) and one or more input devices (e.g., 702, 704*a*-704*c*, and/or 706) (e.g., a touch-sensitive surface (e.g., a touch-sensitive display); a mouse; a keyboard; a remote control; a visual input device (e.g., one or more cameras (e.g., an infrared camera, a depth camera, a visible light camera, and/or a gaze tracking camera)); an audio input device; a biometric sensor (e.g., a fingerprint sensor, a face identification sensor, a gaze tracking sensor, and/or an iris identification sensor) and/or one or more mechanical input devices (e.g., a depressible input mechanism; a button; a rotatable input mechanism; a crown; and/or a dial)). In some embodiments, method 800 is governed by instructions that are stored in a non-transitory (or transitory) computer-readable storage medium and that are executed by one or more processors of a computer system, such as the one or more processors 202 of computer system 101 (e.g., control 110 in FIG. 1A). Some operations in method 800 are, optionally, combined and/or the order of some operations is, optionally, changed.

In some embodiments, the computer system (e.g., 700 and/or X700) displays (802), via the one or more display generation components (e.g., 702 and/or X702), as part of enrolling one or more eyes of a person (e.g., an enrollment process in which eye-based biometric information (e.g., one or more eye scans, one or more iris scans, one or more cornea scans, and/or one or more retina scans) corresponding to the one or more eyes and/or the person (e.g., a person that has not yet enrolled in eye-based biometric authentication and/or a person for which eye-based biometric information is not yet available and/or has not been previously collected) is collected for future eye-based biometric authentication, eye-based user inputs (e.g., gaze inputs), and/or eye-based biometric identification of the person), a first user interface object (e.g., 718a) (e.g., a gaze target and/or an object for the person to look at while the computer system collects eye-based biometric information corresponding to the one or more eyes and/or the person (e.g., to be used in future eye-based biometric authentication, eye-based user inputs (e.g., gaze inputs) and/or eye-based biometric identification of the person)). While displaying the first user interface object (e.g., 718a) (804), the computer system detects (806), via the one or more input devices (e.g., 702, 704a-704c, and/or 706), a gaze (e.g., 710 and/or X710) of the one or more eyes (e.g., detecting that the one or more eyes and/or the person is looking at a particular object, position, and/or location in a user interface). In response to detecting the gaze of the one or more eyes (808): in accordance with a determination that the gaze of the one or more eyes is moving towards the first user interface object (e.g., 718a) (810) (in some embodiments, in accordance with a determination that the one or more eyes and/or the person is looking at the first user interface object and/or the gaze of the one or more eyes and/or the person is directed towards the first user interface object), the computer system outputs (812) first feedback (e.g., displaying first visual feedback, outputting first audio feedback, and/or outputting first haptic feedback) (e.g., first feedback indicating that the gaze of the one or more eyes and/or the person is moving towards the first user interface object) (e.g., the animation of gaze target 718a shown in FIGS. 7G, 7H, 7K1, and/or 7K2; and/or audio output 726a, 726b, 726d, 726e, and/or X726c); and in accordance with a determination that the gaze of the one or more eyes is moving away from the first user interface object (e.g., 718a) (814) (in some embodiments, in accordance with a determination that the person is not looking at the first user interface object, in accordance with a determination that the gaze of the one or more eyes and/or the person is not moving towards the first user interface object, and/or the gaze of the one or more eyes and/or the person is not directed towards the first user interface object), the computer system outputs (816) second feedback (e.g., the lack of animation shown in FIG. 7B, prompt 718c in FIG. 7C, and/or the reversal animation shown in FIGS. 7H-7I) (e.g., displaying second visual feedback different from the first visual feedback, outputting second audio feedback different from the first audio feedback, and/or outputting second haptic feedback different from the first haptic feedback) (e.g., second feedback indicating that the gaze of the one or more eyes and/or the person is moving away from the first user interface object) different from the first feedback. Outputting first feedback when a user's gaze moves towards the first user interface object, and outputting second feedback when the user's gaze moves away from the first user interface object enhances the operability of the system and makes the user-system interface more efficient (e.g., by helping the user to provide proper inputs and reducing errors) which, additionally, reduces power usage and improves battery life of the device by enabling the user to use the system more quickly and efficiently. Furthermore, doing so also provides the user with feedback about a state of the device (e.g., the device has determined that the user's gaze is moving towards or away from the first user interface object), and provides the user with an indication that the user should look at the first user interface object.

In some embodiments, the first user interface object (e.g., 718a) is a viewpoint-locked virtual object. Displaying the first user interface object (e.g., a gaze target) as a viewpoint-locked virtual object enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, outputting the first feedback comprises displaying, via the one or more display generation components (e.g., 702 and/or X702), first visual feedback (e.g., displaying a first user interface, displaying a first animation, and/or displaying a first visual effect) (e.g., the animation of gaze target 718a filling up with color shown in FIGS. 7G, 7H, 7K1, and/or 7K2). In some embodiments, outputting second feedback comprises displaying, via the one or more display generation components (e.g., 702 and/or X702), second visual feedback different from the first visual feedback (e.g., displaying a second user interface different from the first user interface, displaying a second animation different from the first animation, and/or displaying a second visual effect different from the first visual effect) (e.g., the lack of animation shown in FIG. 7B, prompt 718c in FIG. 7C, and/or the reversal animation shown in FIGS. 7H-7I in which gaze target 718a empties of color). Displaying first visual feedback when a user's gaze moves towards the first user interface object enhances the operability of the system and makes the user-system interface more efficient (e.g., by helping the user to provide proper inputs and reducing errors) which, additionally, reduces power usage and improves battery life of the device by enabling the user to use the system more quickly and efficiently. Furthermore, doing so also provides the user with feedback about a state of the device (e.g., the device has determined that the user's gaze is moving towards or away from the first user interface object), and provides the user with an indication that the user should look at the first user interface object.

In some embodiments, displaying the first visual feedback comprises displaying a first animation (e.g., modification, movement, and/or change) of the first user interface object changing appearance (e.g., the animation of gaze target 718a filling up with color shown in FIGS. 7G, 7H, 7K1, and/or 7K2). Displaying animation of the first user interface object when a user's gaze moves towards the first user interface object enhances the operability of the system and makes the user-system interface more efficient (e.g., by helping the user to provide proper inputs and reducing errors) which, additionally, reduces power usage and improves battery life of the device by enabling the user to use the system more quickly and efficiently. Furthermore, doing so also provides the user with feedback about a state of the device (e.g., the device has determined that the user's gaze is moving towards or away from the first user interface object), and provides the user with an indication that the user should look at the first user interface object.

In some embodiments, the first user interface object (e.g., 718a) comprises one or more segments (e.g., one or more portions, one or more regions, one or more line segments, one or more empty segments, one or more transparent segments, one or more white segments, and/or one or more fillable segments); and displaying the first animation of the first user interface object changing appearance comprises displaying filling of at least a portion of the one or more segments with one or more colors (e.g., changing the color of at least a portion of the one or more segments) (e.g., the animation of gaze target 718a filling up with color shown in FIGS. 7G, 7H, 7K1, and/or 7K2). Displaying animation of the first user interface object when a user's gaze moves towards the first user interface object enhances the operability of the system and makes the user-system interface more efficient (e.g., by helping the user to provide proper inputs and reducing errors) which, additionally, reduces power usage and improves battery life of the device by enabling the user to use the system more quickly and efficiently. Furthermore, doing so also provides the user with feedback about a state of the device (e.g., the device has determined that the user's gaze is moving towards or away from the first user interface object), and provides the user with an indication that the user should look at the first user interface object.

In some embodiments, displaying the first animation of the first user interface object (e.g., 718a) changing appearance comprises displaying progressive filling of at least a portion of the one or more segments from an outer region (e.g., an outer edge and/or an outer boundary) of the first user interface object towards a center region (e.g., a center point and/or a center line) of the first user interface object (e.g., from one or more directions) (e.g., the animation of gaze target 718a filling up with color shown in FIGS. 7G, 7H, 7K1, and/or 7K2). Displaying animation of the first user interface object that includes progressive filling of the user interface object from an outer region of the first user interface object towards a center region of the first user interface object when a user's gaze moves towards the first user interface object enhances the operability of the system and makes the user-system interface more efficient (e.g., by helping the user to provide proper inputs and reducing errors) which, additionally, reduces power usage and improves battery life of the device by enabling the user to use the system more quickly and efficiently. Furthermore, doing so also provides the user with feedback about a state of the device (e.g., the device has determined that the user's gaze is moving towards or away from the first user interface object), and provides the user with an indication that the user should look at the first user interface object (e.g., until the first user interface object fills towards the center).

In some embodiments, subsequent to displaying, via the one or more display generation components (e.g., 702 and/or X702), the first animation of the first user interface object (e.g., 718a) changing appearance (e.g., FIGS. 7F-7H): in accordance with a determination that the gaze of the one or more eyes (e.g., 710 and/or X710) is moving away from the first user interface object (e.g., 718a) (e.g., in accordance with a determination that the gaze of the one or more eyes is no longer moving towards and/or is no longer directed to the first user interface object), the computer system (e.g., 700 and/or X700) displays, via the one or more display generation components (e.g., 702 and/or X702), a second animation of the first user interface object (e.g., 718a) different from the first animation, wherein the second animation at least partially reverses (e.g., undoes, negates, and/or removes) the change in appearance (e.g., the second animation is opposite to the first animation and/or the second animation returns the first user interface object to a visual appearance that the first user interface object had before the first animation) (e.g., the second animation at least partially reverses the change in appearance and/or the second animation completely reverses the change in appearance) (e.g., in FIGS. 7H-7I, gaze target 718a is emptied of color). In some embodiments, subsequent to displaying the first animation of the first user interface object, and in accordance with a determination that the gaze of the one or more eyes is moving towards the first user interface object and/or the gaze of the one or more eyes is maintained on the first user interface object, the computer system displays, via the one or more display generation components, a third animation of the first user interface object different from the second animation (e.g., FIGS. 7J-7K2, in which gaze target 718a becomes more full of color). In some embodiments, the third animation is a continuation and/or progression of the first animation. Displaying a first animation of the first user interface object when a user's gaze moves towards the first user interface object and displaying a second animation that reverses the first animation when the user does not look at the first user interface object enhances the operability of the system and makes the user-system interface more efficient (e.g., by helping the user to provide proper inputs and reducing errors) which, additionally, reduces power usage and improves battery life of the device by enabling the user to use the system more quickly and efficiently. Furthermore, doing so also provides the user with feedback about a state of the device (e.g., the device has determined that the user's gaze is moving towards or away from the first user interface object), and provides the user with an indication that the user should look at the first user interface object.

In some embodiments, outputting the second feedback comprises maintaining display of the first user interface object without displaying the first animation (e.g., maintaining display of the first user interface without changing the appearance of the first user interface object) (e.g., FIGS. 7B-7C, maintaining display of an empty gaze target 718a). Displaying a first animation of the first user interface object when a user's gaze moves towards the first user interface object and forgoing display of the first animation when the user does not look at the first user interface object enhances the operability of the system and makes the user-system interface more efficient (e.g., by helping the user to provide proper inputs and reducing errors) which, additionally, reduces power usage and improves battery life of the device by enabling the user to use the system more quickly and efficiently. Furthermore, doing so also provides the user with feedback about a state of the device (e.g., the device has determined that the user's gaze is moving towards or away from the first user interface object), and provides the user with an indication that the user should look at the first user interface object.

In some embodiments, the first visual feedback comprises a prompt (e.g., 720*a*, and/or 720*b*) (e.g., a text prompt and/or other visual prompt) to change (e.g., instructs the user to change) a position of at least a portion of the computer system (e.g., 700 and/or X700) relative to the one or more eyes (e.g., a prompt to adjust alignment of at least a portion of the computer system relative to the one or more eyes; a prompt to adjust alignment of at least a portion of the computer system on the head of a user and/or a person and/or relative to the head of a user and/or person; and/or a prompt to adjust at least a portion of the computer system up, down, left, and/or right relative to the one or more eyes). Displaying visual feedback instructing a user to adjust the position of the computer system relative to the user's eyes enhances the operability of the system and makes the user-system interface more efficient (e.g., by helping the user to provide proper inputs and reducing errors) which, additionally, reduces power usage and improves battery life of the device by enabling the user to use the system more quickly and efficiently. Furthermore, doing so also provides the user with feedback about a state of the device (e.g., the device has detected that it is not properly aligned and/or positioned).

In some embodiments, displaying the first visual feedback comprises replacing display of the first user interface object (e.g., 718*a*) with display of the prompt (e.g., 720, 720*a*, and/or 720*b*) to change a position of at least a portion of the computer system relative to the one or more eyes (e.g., FIGS. 7C-7D) (e.g., ceasing display of the first user interface object and displaying the prompt to change a position of at least a portion of the computer system relative to the one or more eyes). In some embodiments, displaying the first visual feedback comprises displaying the prompt to change a position of at least a portion of the computer system relative to the one or more eyes at a first display position that was previously occupied by the first user interface object. Displaying visual feedback instructing a user to adjust the position of the computer system relative to the user's eyes enhances the operability of the system and makes the user-system interface more efficient (e.g., by helping the user to provide proper inputs and reducing errors) which, additionally, reduces power usage and improves battery life of the device by enabling the user to use the system more quickly and efficiently. Furthermore, doing so also provides the user with feedback about a state of the device (e.g., the device has detected that it is not properly aligned and/or positioned). Replacing display of the first user interface object with the prompt also indicates to the user that the user must adjust the device (e.g., before the user's eyes can be enrolled and/or scanned).

In some embodiments, displaying the first visual feedback comprises: displaying, via the one or more display generation components, a first prompt (e.g., 720, 720*a*, and/or 720*b* in FIG. 7D) to change a position of at least a portion of the computer system relative to the one or more eyes in a first direction (e.g., up, down, left, and/or right); and subsequent to displaying the first prompt (e.g., after display of the first prompt has ended, immediately after displaying the first prompt, and/or after displaying the first prompt), displaying, via the one or more display generation components, a second prompt (e.g., 720, 720*a*, and/or 720*b* in FIG. 7E) to change a position of at least a portion of the computer system relative to the one or more eyes in a second direction different from the first direction (e.g., up, down, left, and/or right). Displaying sequential instructions instructing a user to adjust the position of the computer system relative to the user's eyes enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, outputting the first feedback comprises outputting a first audio prompt (e.g., 722 and/or 724) corresponding to a request to change a position of at least a portion of the computer system relative to the one or more eyes (e.g., spoken words instructing the user to adjust a position of at least a portion of the computer system, spoken words reading the displayed prompt, one or more sounds corresponding to the prompt, and/or one or more indicating a direction to adjust the at least a portion of the computer system). In some embodiments, while displaying the prompt to change a position of at least a portion of the computer system relative to the one or more eyes, the computer system outputs a first audio prompt (e.g., 722 and/or 724) corresponding to the prompt to change a position of at least a portion of the computer system relative to the one or more eyes (e.g., spoken words instructing the user to adjust a position of at least a portion of the computer system, spoken words reading the displayed prompt, one or more sounds corresponding to the prompt, and/or one or more indicating a direction to adjust the at least a portion of the computer system). Outputting audio feedback instructing a user to adjust the position of the computer system relative to the user's eyes enhances the operability of the system and makes the user-system interface more efficient (e.g., by helping the user to provide proper inputs and reducing errors) which, additionally, reduces power usage and improves battery life of the device by enabling the user to use the system more quickly and efficiently. Furthermore, doing so also provides the user with feedback about a state of the device (e.g., the device has detected that it is not properly aligned and/or positioned).

In some embodiments, in accordance with a determination that at least a portion of the computer system (e.g., 700 and/or X700) should be moved in a first direction (e.g., up, down, left, and/or right), the first audio prompt (e.g., 722) includes spatialized audio corresponding to the first direction (e.g., 722 in FIG. 7D includes spatialized audio coming from the left) (e.g., an audio prompt that emanates from and/or is played by audio output devices so as to give the impression of emanating from the left of the user, from the right of the user, from above the user, and/or from below the user); and in accordance with a determination that at least a portion of the computer system should be moved in a second direction (e.g., up, down, left, and/or right) different from the first direction, the first audio prompt (e.g., 724) includes spatialized audio corresponding to the second direction (e.g., 724 in FIG. 7E includes spatialized audio coming from the top and/or above) (e.g., an audio prompt that emanates from and/or is played by audio output devices so as to give the impression of emanating from the left of the user, from the right of the user, from above the user, and/or from below the user). In some embodiments, spatialized audio experiences are produced by manipulating sounds in an audio output device's two audio channels (e.g., left and right) so that they resemble directional sounds arriving in the car-canal. For example, headphones can reproduce a spatial audio signal that simulates a soundscape around the listener (also referred to as the user). An effective spatial sound reproduction can render sounds such that the listener perceives the sound as coming from a location within the soundscape external to the listener's head, just as the listener would experience the sound if encountered in the real world. In some embodiments, spatialized audio is audio that has been filtered such that a listener of the audio perceives the audio as coming from one or more directions and/or locations in a three-dimensional space (e.g., from above, below, and/or in front of the listener). An example of such a filter is a Head-Related Transfer Function (HRTF) filter. Outputting spatialized audio feedback corresponding to a prompt instructing a user to adjust the position of the computer system relative to the user's eyes enhances the operability of the system and makes the user-system interface more efficient (e.g., by helping the user to provide proper inputs and reducing errors) which, additionally, reduces power usage and improves battery life of the device by enabling the user to use the system more quickly and efficiently. Furthermore, doing so also provides the user with feedback about a state of the device (e.g., the device has detected that it is not properly aligned and/or positioned and should be moved in a first direction and/or a second direction).

In some embodiments, outputting the second feedback comprises displaying, via the one or more display generation components (e.g., 702 and/or X702), a prompt (e.g., 718c) (e.g., a text prompt and/or other visual prompt) to look at the first user interface object. Displaying a prompt instructing a user to look at the first user interface object enhances the operability of the system and makes the user-system interface more efficient (e.g., by helping the user to provide proper inputs and reducing errors) which, additionally, reduces power usage and improves battery life of the device by enabling the user to use the system more quickly and efficiently. Furthermore, doing so also provides the user with feedback about a state of the device (e.g., the device has detected that the user is not looking at the first user interface object).

In some embodiments, subsequent to enrolling the one or more eyes of the person (e.g., FIG. 7M) (e.g., subsequent to successful scanning of the one or more eyes and/or subsequent to receiving biometric information corresponding to the one or more eyes) (in some embodiments, in accordance with a determination that the one or more eyes of the person have been successfully enrolled), the computer system (e.g., 700 and/or X700) displays, via the one or more display generation components (e.g., 702 and/or X702), a passcode generation user interface (e.g., 734). While displaying the passcode generation user interface (e.g., 734), the computer system receives, via the one or more input devices (e.g., 702, 704a-704c, and/or 706), one or more user inputs (e.g., one or more mouse inputs, one or more keyboard inputs, one or more touch inputs, one or more gesture inputs, one or more air gesture inputs, and/or one or more gaze inputs) interacting with the passcode generation user interface (e.g., 734). In response to receiving the one or more user inputs interacting with the passcode generation user interface, the computer system stores a passcode (e.g., a password, a pass phrase, an alphanumeric passcode, and/or a gesture-based passcode) corresponding to the person (e.g., corresponding to and/or associated with a user account that corresponds to the person). Automatically displaying a passcode generation user interface enables a user to generate a passcode with fewer user inputs. Furthermore, doing so enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, outputting the first feedback comprises outputting first audio feedback (e.g., 726a, 726b, 726d, 726e, and/or X726c) (e.g., a first sound, a first audio track, and/or a first audio effect (e.g., increasing and/or decreasing volume, modifying tone, and/or increasing and/or decreasing crossfading of a first sound (e.g., relative to a second sound))); and outputting the second feedback comprises outputting second audio feedback (e.g., 726c) (e.g., a second sound, a second audio track, and/or a second audio effect (e.g., increasing and/or decreasing volume, modifying tone, and/or increasing and/or decreasing crossfading of a first sound (e.g., relative to a second sound))) different from the first audio feedback. In some embodiments, in accordance with a determination that the gaze of the one or more eyes is moving away from the first user interface object, the computer system forgoes outputting the first audio feedback (and, optionally, does not output second audio feedback and/or does not output any audio content). Outputting first audio feedback when a user's gaze moves towards the first user interface object and outputting second audio feedback when a user's gaze moves away from the first user interface object enhances the operability of the system and makes the user-system interface more efficient (e.g., by helping the user to provide proper inputs and reducing errors) which, additionally, reduces power usage and improves battery life of the device by enabling the user to use the system more quickly and efficiently. Furthermore, doing so also provides the user with feedback about a state of the device (e.g., the device has determined that the user's gaze is moving towards or away from the first user interface object), and provides the user with an indication that the user should look at the first user interface object.

In some embodiments, outputting the first audio feedback (e.g., 726a and/or 726d) comprises outputting the first audio feedback while the gaze of the one or more eyes (e.g., 710 and/or X710) is directed toward the first user interface object (e.g., 718a) (e.g., is directed and/or is looking at the first user interface object). In some embodiments, subsequent to outputting the first audio feedback (e.g., 726a and/or 726d) (e.g., while the first audio feedback is being output and/or after the first audio feedback is output), in accordance with a determination that the gaze of the one or more eyes (e.g., 710 and/or X710) continues to be directed toward the first user interface object (e.g., 718a) (e.g., continues to be directed at and/or continues to look at the first user interface object) (e.g., the gaze of the one or more eyes is continuously maintained on the first user interface object and/or is maintained on the first user interface object with less than a threshold duration and/or amount of interruption), the computer system outputs third audio feedback (e.g., 726b, 726e, and/or X726e) different from the first audio feedback (e.g., increases and/or decreases a volume of the first audio feedback, increases and/or decreases crossfading of the first audio feedback, and/or changes a tone of the first audio feedback). In some embodiments, subsequent to outputting the first audio feedback (e.g., 726a and/or 726d) (e.g., while the first audio feedback is being output and/or after the first audio feedback is output), in accordance with a determination that the gaze of the one or more eyes (e.g., 710 and/or X710) is not directed toward (e.g., is no longer directed toward) the first user interface object (e.g., 718a) (e.g., is no longer directed at and/or no longer looks at the first user interface object), the computer system (e.g., 700 and/or X700) outputs fourth audio feedback (e.g., 726c) different from the third audio feedback and the first audio feedback (e.g., ceases output of the first audio feedback, increases and/or decreases a volume of the first audio feedback, increases and/or decreases crossfading of the first audio feedback, and/or changes a tone of the first audio feedback).

Changing audio feedback as the user maintains their gaze on the first user interface object enhances the operability of the system and makes the user-system interface more efficient (e.g., by helping the user to provide proper inputs and reducing errors) which, additionally, reduces power usage and improves battery life of the device by enabling the aser to use the system more quickly and efficiently. Furthermore, doing so also provides the user with feedback about a state of the device (e.g., the device detects the user's continuous gaze on the first user interface object, and/or the device is progressing in enrollment of the user's eyes).

In some embodiments, outputting the third audio feedback (e.g., 726b, 726e, and/or X726e) different from the first audio feedback (e.g., 726a and/or 726d) comprises increasing a volume of the first audio feedback. Changing audio feedback as the user maintains their gaze on the first user interface object enhances the operability of the system and makes the user-system interface more efficient (e.g., by helping the user to provide proper inputs and reducing errors) which, additionally, reduces power usage and improves battery life of the device by enabling the user to use the system more quickly and efficiently. Furthermore, doing so also provides the user with feedback about a state of the device (e.g., the device detects the user's continuous gaze directed toward the first user interface object, and/or the device is progressing in enrollment of the user's eyes).

In some embodiments, subsequent to outputting the first audio feedback (e.g., 726b) (e.g., while the first audio feedback is being output and/or after the first audio feedback is output), in accordance with a determination that the gaze of the one or more eyes (e.g., 710 and/or X710) is not directed toward (e.g., is no longer directed toward) the first user interface object (e.g., 718a) (e.g., is no longer directed at and/or no longer looks at the first user interface object), the computer system outputs fourth audio feedback (e.g., 726c) different from the third audio feedback (e.g., 728c) and the first audio feedback (e.g., 728b) (e.g., ceases output of the first audio feedback, increases and/or decreases a volume of the first audio feedback, increases and/or decreases crossfading of the first audio feedback, and/or changes a tone of the first audio feedback), wherein outputting the fourth audio feedback (e.g., 726c) comprises decreasing a volume of the first audio feedback (e.g., 728b). Changing audio feedback when the user stops looking at the first user interface object enhances the operability of the system and makes the user-system interface more efficient (e.g., by helping the user to provide proper inputs and reducing errors) which, additionally, reduces power usage and improves battery life of the device by enabling the user to use the system more quickly and efficiently. Furthermore, doing so also provides the user with feedback about a state of the device (e.g., the device detects that the user has stopped looking at the first user interface object).

In some embodiments, subsequent to outputting the third audio feedback (e.g., 726b) (e.g., while the third audio feedback is being output and/or after the third audio feedback is output), in accordance with a determination that the gaze of the one or more eyes (e.g., 710 and/or X710) is not directed toward (e.g., is no longer directed toward) the first user interface object (e.g., 718a) (e.g., is no longer directed at and/or no longer looks at the first user interface object, and/or in accordance with a determination that the one or more eyes have looked away from the first user interface object), the computer system outputs the first audio feedback (e.g., 726a) (and, optionally, ceases output of the first audio feedback) (e.g., reverses the change from the first audio feedback to the third audio feedback) (e.g., in some embodiments, audio output 726c is the same as audio output 726a). Changing audio feedback from the first audio feedback to the third audio feedback when the user looks at the first user interface object, and then reversing that change when the user stops looking at the first user interface object enhances the operability of the system and makes the user-system interface more efficient (e.g., by helping the user to provide proper inputs and reducing errors) which, additionally, reduces power usage and improves battery life of the device by enabling the user to use the system more quickly and efficiently. Furthermore, doing so also provides the user with feedback about a state of the device (e.g., the device detects that the user has stopped looking at the first user interface object).

In some embodiments, subsequent to outputting the first audio feedback (e.g., 726b) (e.g., while the first audio feedback is being output and/or after the first audio feedback is output), in accordance with a determination that the gaze of the one or more eyes (e.g., 710 and/or X710) is not directed toward (e.g., is no longer directed toward) the first user interface object (e.g., 718a) (e.g., is no longer directed at and/or no longer looks at the first user interface object), the computer system maintains output of the first audio feedback (e.g., forgoes output of the third audio feedback and maintaining output of the first audio feedback) (e.g., in some embodiments, audio output 726c is the same as audio output 726b). Changing audio feedback from the first audio feedback to the third audio feedback when the user looks at the first user interface object and maintaining output of the first audio feedback when the user does not look at the first user interface enhances the operability of the system and makes the user-system interface more efficient (e.g., by helping the user to provide proper inputs and reducing errors) which, additionally, reduces power usage and improves battery life of the device by enabling the user to use the system more quickly and efficiently. Furthermore, doing so also provides the user with feedback about a state of the device (e.g., the device detects that the user has stopped looking at the first user interface object).

In some embodiments, the first audio feedback (e.g., 726a, 726b, 726d, 726e, and/or X726e) (and, in some embodiments, the second audio feedback, the third audio feedback, and/or the fourth audio feedback) includes spatial audio having a location corresponding to the first user interface object (e.g., 718a) (e.g., audio that emanates from and/or is played by audio output devices so as to give the impression of emanating from the first user interface object). Outputting the first audio feedback as spatial audio that has a location corresponding to the first user interface object provides the user with an indication that the first andio feedback corresponds to the first user interface object, and indicates that the user should look at the first user interface object.

In some embodiments, the computer system (e.g., 700 and/or X700) outputs, based on successful enrollment of the one or more eyes of the person (e.g., subsequent to successful scanning of the one or more eyes and/or subsequent to receiving biometric information corresponding to the one or more eyes) (in some embodiments, in accordance with a determination that the one or more eyes of the person have been successfully enrolled and/or in response to a determination that the one or more eyes of the person have been successfully enrolled) success audio content (e.g., 732) indicative of successful enrollment of the one or more eyes of the person. Outputting the success audio content based on successful enrollment of the one or more eyes of the user provides the user with feedback about a state of the device (e.g., the device has successfully enrolled the user's eyes).

In some embodiments, the success audio content (e.g., 732) corresponds to (e.g., is the same as, and/or is a modified version of) unlock audio content that is output when the computer system (e.g., 700 and/or X700) transitions from a locked state (e.g., a low power state, an unauthorized state, a state in which one or more functions of the computer system are disabled, and/or a state in which a user has not been authenticated) to an unlocked state (e.g., a higher power state, an authorized state, a state in which one or more functions of the computer system that were disabled in the unlocked state are enabled, and/or a state in which a user has been successfully authenticated). Outputting the success audio content subsequent to enrolling the one or more eyes of the user provides the user with feedback about a state of the device (e.g., the device has successfully enrolled the user's eyes). Furthermore, outputting success audio content that corresponds to unlocked audio content provides the user with an indication that enrollment of the one or more eyes pertains to unlocking the computer system.

In some embodiments, in response to a determination that enrollment of the one or more eyes of the person has failed (e.g., has not been completed successfully and/or meets one or more error conditions), the computer system outputs failure audio content (e.g., 728) indicative of failed enrollment of the one or more eyes of the person. Outputting failure audio content in response to a determination that enrollment of the one or more eyes of the person has failed enhances the operability of the system and makes the user-system interface more efficient (e.g., by helping the user to provide proper inputs and reducing errors) which, additionally, reduces power usage and improves battery life of the device by enabling the user to use the system more quickly and efficiently. Furthermore, doing so also provides the user with feedback about a state of the device (e.g., the device has failed to enroll the user's eyes).

In some embodiments, in response to the determination that enrollment of the one or more eyes of the person has failed, the computer system (e.g., 700 and/or X700) displays, via the one or more display generation components (e.g., 702 and/or X702), a visual prompt (e.g., 718d) prompting the person to initiate a process for enrollment of the one or more eyes of the person (e.g., an object that is selectable to re-try and/or re-initiate enrollment of the one or more eyes of the person (e.g., re-try scanning and/or capturing of biometric information pertaining to the one or more eyes) and/or an instruction instructing the user to re-try enrollment of the one or more eyes of the person). Displaying a visual prompt prompting the user to initiate a process for enrollment of the user's eyes in response to a determination that enrollment of the one or more eyes of the person has failed enhances the operability of the system and makes the user-system interface more efficient (e.g., by helping the user to provide proper inputs and reducing errors) which, additionally, reduces power usage and improves battery life of the device by enabling the user to use the system more quickly and efficiently. Furthermore, doing so also provides the user with feedback about a state of the device (e.g., the device has failed to enroll the user's eyes).

In some embodiments, in response to the determination that enrollment of the one or more eyes of the person has failed (e.g., FIG. 7L), the computer system (e.g., 700 and/or X700) automatically initiates a process for enrollment of the one or more eyes of the person (e.g., from FIG. 7L, automatically displays user interface 712 in FIG. 7A and/or gaze target 718a in FIG. 7B). In some embodiments, automatically initiating a process for enrollment of the one or more eyes of the person includes scanning the one or more eyes of the person and/or collecting biometric information from the one or more eyes of the person. In some embodiments, automatically initiating a process for enrollment of the one or more eyes of the person includes displaying (e.g., re-displaying and/or maintaining display of), via the one or more display generation components, as part of enrolling the one or more eyes of the person, the first user interface object (e.g., 718a). Automatically initiating a process for enrollment of the one or more eyes of the person reduces the number of inputs needed to perform this operation, and allows for this operation to be performed without further user input.

In some embodiments, automatically initiating the process for enrollment of the one or more eyes of the person comprises: delaying automatically initiating the process for enrollment of the one or more eyes of the person until one or more error conditions (e.g., one or more of the one or more eyes is closed, and/or at least a portion of the computer system is not properly aligned with the one or more eyes) are resolved. Delaying initiating a process for enrollment of the one or more eyes of the person until one or more error conditions are resolved enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, aspects/operations of methods 800, 1000, 1200, 1400, and/or 1600 may be interchanged, substituted, and/or added between these methods. For example, in some embodiments, enrolling the one or more eyes of a person in method 800 can be performed in order to perform eye-based biometric authentication of the person in methods 1000, 1200, and/or 1400; and/or in some embodiments, the spatial transition animation in method 1600 is performed in response to user authentication (e.g., as recited in methods 1000 and/or 1400). For brevity, these details are not repeated here.

FIGS. 9A-9M illustrate examples of user authentication. FIG. 10 is a flow diagram of an exemplary method 1000 for user authentication. The user interfaces in FIGS. 9A-9M are used to illustrate the processes described below, including the processes in FIG. 10.

Figures 9A, 9B:
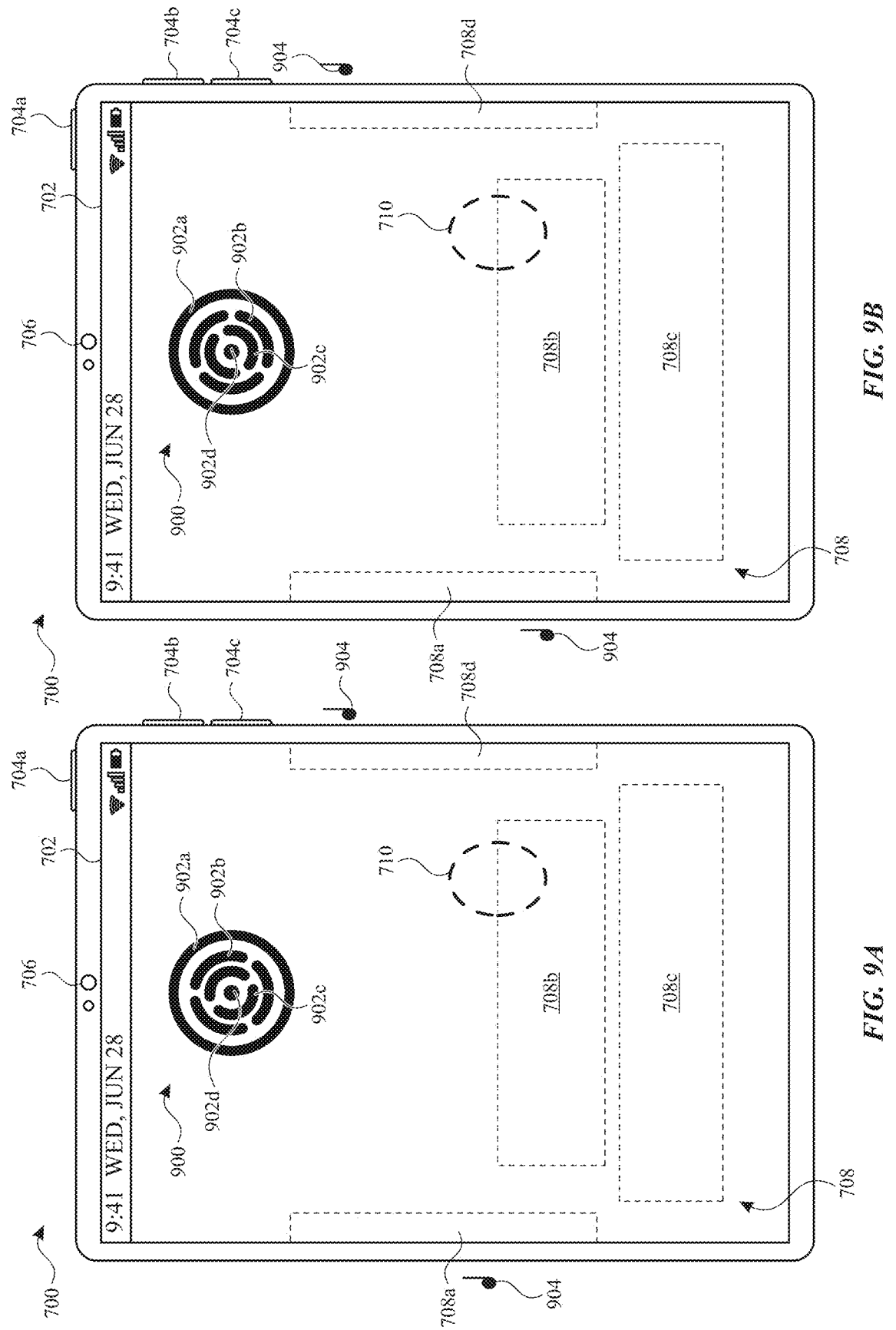

FIG. 9A depicts electronic device 700, which is a tablet that includes touch-sensitive display 702, buttons 704a-704c, and one or more input sensors 706 (e.g., one or more cameras, eye gaze trackers, hand movement trackers, and/or head movement trackers). In some embodiments described below, electronic device 700 is a tablet. In some embodiments, electronic device 700 is a smartphone, a wearable device, a wearable smartwatch device, a head-mounted system (e.g., headset), or other computer system that includes and/or is in communication with one or more display devices (e.g., display screens and/or projection devices). In some embodiments in which electronic device 700 is a head-mounted system, electronic device 700 optionally includes two displays (e.g., one for each eye of a user), with each display displaying respective various content, to enable a user of electronic device 700 to perceive the various depths of the various content (e.g., physical objects and/or virtual objects) of three-dimensional environments. Electronic device 700 is a computer system (e.g., computer system 101 in FIG. 1A).

At FIG. 9A, electronic device 700 displays gaze target 900 overlaid on three-dimensional environment 708. In the depicted scenario, three-dimensional environment 708 includes objects 708*a*-708*d*. In some embodiments, three-dimensional environment 708 is displayed by a display (e.g., display 702, as depicted in FIG. 9A). In some embodiments, three-dimensional environment 708 includes a virtual environment or an image (or video) of a physical environment captured by one or more cameras (e.g., one or more cameras that are part of input sensors 706 and/or one or more external cameras). For example, in some embodiments, object 708*a* is a virtual object that is representative of a physical object that has been captured by one or more cameras and/or detected by one or more sensors; and object 708*b* is a virtual object that is representative of a second physical object that has been captured by one or more cameras and/or detected by one or more sensors, and so forth. In some embodiments, three-dimensional environment 708 is visible to a user behind gaze target 900, but is not displayed by a display. For example, in some embodiments, three-dimensional environment 708 is a physical environment (and, for example, objects 708*a*-708*d* are physical objects) that is visible to a user (e.g., through one or more transparent displays) behind gaze target 900 without being displayed by a display. In some embodiments, gaze target 900 and/or three-dimensional environment 708 are part of an extended reality experience.

In FIG. 9A, gaze target 900 is displayed as part of a biometric authentication process. For example, in some embodiments, when a user looks at gaze target 900, electronic device 700 collects biometric information from the user, such as one or more eye scans and/or one or more images of the user's eye(s), in order to compare the biometric information from the user with stored biometric information corresponding to known and/or authorized users. In the depicted embodiment, gaze target 900 includes multiple concentric circles 902*a*-902*d*. Circle 902*b* is divided into three segments, and circle 902*c* is divided into two segments. In the depicted embodiments, gaze target 900 is depicted as multiple concentric circles 902*a*-902*d*. In some embodiments, gaze target 900 includes two or more concentric shapes (e.g., two or more concentric circles) inside of an outline of a representation of a biometric feature (e.g., a representation of an eye and/or other biometric feature). For example, in some embodiments, outermost shape 902*a* is representative of an eye (e.g., is in the shape of an eye), and two or more concentric shapes (e.g., circles 902-902*d*) are positioned within the representation of the eye. In some embodiments, a first set of the two or more concentric shapes (e.g., one or more of the two or more concentric shapes) (e.g., 902*b*-902*d*) represent an iris of the eye. In some embodiments, a second set of the two or more concentric shapes (e.g., one or more of the two or more concentric shapes) (e.g., 902*b*-902*d*) represent a pupil of the eye. For example, in some embodiments, circle 902*b* and/or circle 902*c* represent an iris of the eye, and in some embodiments, circle 902*c* and/or circle 902*d* represent a pupil of the eye. In FIG. 9A, electronic device 700 detects that the gaze of the user (e.g., using one or more sensors 706) is directed to object 708*b* and is not directed to gaze target 900 (e.g., the user is not looking at gaze target 900), as indicated by gaze indication 710. In FIG. 9A, in response to the determination that the user is not looking at gaze target 900, electronic device 700 outputs audio output 904. In some embodiments, audio output 904 includes spatialized audio that has a location corresponding to gaze target 900 (e.g., electronic device 700 outputs audio output 904 such that a user is given the impression that audio output 904 is emanating from the location of gaze target 900). In some embodiments, audio output 904 includes a repeating and/or repetitive sound, such as the sound of a clock ticking.

At FIG. 9B, electronic device 700 determines that the gaze of the user continues not to be directed to gaze target 900, as indicated by gaze indication 710. In response to the determination that the gaze of the user is not directed to gaze target 900 (e.g., the user is not looking at gaze target 900), electronic device 700 displays a first animation of gaze target 900, in which one or more of concentric circles 902*a*-902*d* are shown rotating. In FIG. 9B, circle 902*b* and circle 902*c* have both rotated from their respective positions from FIG. 9A. In some embodiments, circle 902*b* rotates in a first direction (e.g., clockwise or counterclockwise) and circle 902*c* rotates in a different direction (e.g., the opposite direction) (e.g., counterclockwise or clockwise). Furthermore, in response to the determination that the gaze of the user is not directed to gaze target 900, electronic device 700 continues to output audio output 904.

At FIG. 9C1, electronic device 700 determines that the gaze of the user continues not to be directed to gaze target 900, as indicated by gaze indication 710. In response to the determination that the gaze of the user is not directed to gaze target 900 (e.g., the user is not looking at gaze target 900), electronic device 700 continues to display the animation of gaze target 900 in which concentric circle 902*b* and concentric circle 902*c* are rotated. In FIG. 9C1, circle 902*b* and circle 902*c* have both rotated from their respective positions from FIG. 9B. Electronic device 700 also continues to output audio output 904 based on the determination that the gaze of the user is not directed to gaze target 900. Furthermore, in FIG. 9C1, in response to a determination that the user has not looked at gaze target 900 for a threshold duration of time (e.g., 1 second, 3 seconds, 5 seconds, 7 seconds, or 10 seconds), electronic device 700 displays vibration of gaze target 900 and also displays prompt 906 instructing the user to look at gaze target 900 for biometric authentication.

In some embodiments, the techniques and user interface(s) described in FIGS. 9A-9M are provided by one or more of the devices described in FIGS. 1A-1P. For example, FIG. 9C2 illustrates an embodiment in which the animation of gaze target 900 (e.g., as described in FIGS. 9A-9C1) is displayed on display module X702 of head-mounted device (HMD) X700. In some embodiments, HMD X700 includes a pair of display modules that provide stereoscopic content to different eyes of the same user. For example, HMD X700 includes display module X702 (which provides content to a left eye of the user) and a second display module (which provides content to a right eye of the user). In some embodiments, the second display module displays a slightly different image than display module X702 to generate the illusion of stereoscopic depth.

At FIG. 9C2, HMD X700 determines that the gaze of the user continues not to be directed to gaze target 900, as indicated by gaze indication X710. In response to the determination that the gaze of the user is not directed to gaze target 900 (e.g., the user is not looking at gaze target 900), HMD X700 continues to display the animation of gaze target 900 in which concentric circle 902*b* and concentric circle 902*c* are rotated. In FIG. 9C2, circle 902*b* and circle 902*c* have both rotated from their respective positions from FIG. 9B. HMD X700 also continues to output audio output X904 based on the determination that the gaze of the user is not directed to gaze target 900. Furthermore, in FIG. 9C2, in response to a determination that the user has not looked at gaze target 900 for a threshold duration of time (e.g., 1 second, 3 seconds, 5 seconds, 7 seconds, or 10 seconds), HMD X700 displays vibration of gaze target 900 and also displays prompt 906 instructing the user to look at gaze target 900 for biometric authentication.

Any of the features, components, and/or parts, including the arrangements and configurations thereof shown in FIGS. 1B-1P can be included, either alone or in any combination, in HMD X700. For example, in some embodiments, HMD X700 includes any of the features, components, and/or parts of HMD 1-100, 1-200, 3-100, 6-100, 6-200, 6-300, 6-400, 11.1.1-100, and/or 11.1.2-100, cither alone or in any combination. In some embodiments, display module X702 includes any of the features, components, and/or parts of display unit 1-102, display unit 1-202, display unit 1-306, display unit 1-406, display generation component 120, display screens 1-122a-b, first and second rear-facing display screens 1-322a, 1-322b, display 11.3.2-104, first and second display assemblies 1-120a, 1-120b, display assembly 1-320, display assembly 1-421, first and second display sub-assemblies 1-420a, 1-420b, display assembly 3-108, display assembly 11.3.2-204, first and second optical modules 11.1.1-104a and 11.1.1-104b, optical module 11.3.2-100, optical module 11.3.2-200, lenticular lens array 3-110, display region or area 6-232, and/or display/display region 6-334, either alone or in any combination. In some embodiments, HMD X700 includes a sensor that includes any of the features, components, and/or parts of any of sensors 190, sensors 306, image sensors 314, image sensors 404, sensor assembly 1-356, sensor assembly 1-456, sensor system 6-102, sensor system 6-202, sensors 6-203, sensor system 6-302, sensors 6-303, sensor system 6-402, and/or sensors 11.1.2-110a-f, cither alone or in any combination. In some embodiments, HMD X700 includes one or more input devices, which can include any of the features, components, and/or parts of any of first button 1-128, button 11.1.1-114, second button 1-132, and or dial or button 1-328, either alone or in any combination. In some embodiments, HMD X700 includes one or more audio output components (e.g., electronic component 1-112) for generating audio feedback (e.g., audio output X904), optionally generated based on detected events and/or user inputs detected by the HMD X700.

Figure 9D:
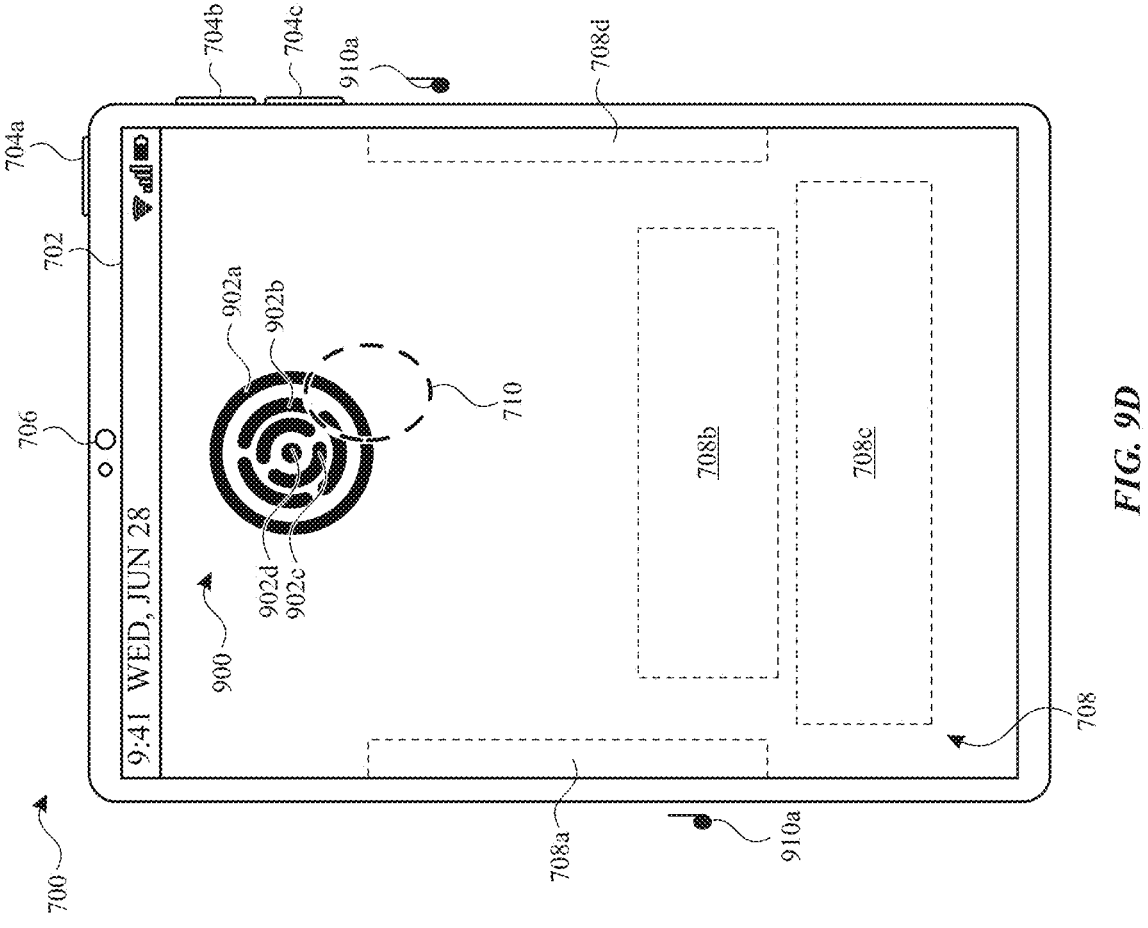

At FIG. 9D, electronic device 700 determines that the gaze of the user is now directed to gaze target 900 (e.g., the user is looking at gaze target 900), as indicated by gaze indication 710. In response to the determination that the gaze of the user is now directed to gaze target 900, electronic device 700 ceases display of prompt 906, ceases the first animation of gaze target 900 in which one or more of circles 902a-902d are rotated (e.g., gaze target 900 is shown in the same state as it was in FIGS. 9C1 and/or 9C2), and outputs audio output 910a. In some embodiments, audio output 910a is different from audio output 904. In some embodiments, audio output 910a includes spatialized audio that corresponds to a position of gaze target 900. Furthermore, in response to the determination that the gaze of the user is now directed to gaze target 900, electronic device 700 begins to collect biometric information from the user in order to perform biometric authentication of the user. For example, in some embodiments, electronic device 700 captures one or more images and/or scans of the user's eye(s) in order to attempt eye-based biometric authentication of the user.

Figures 9E, 9F:
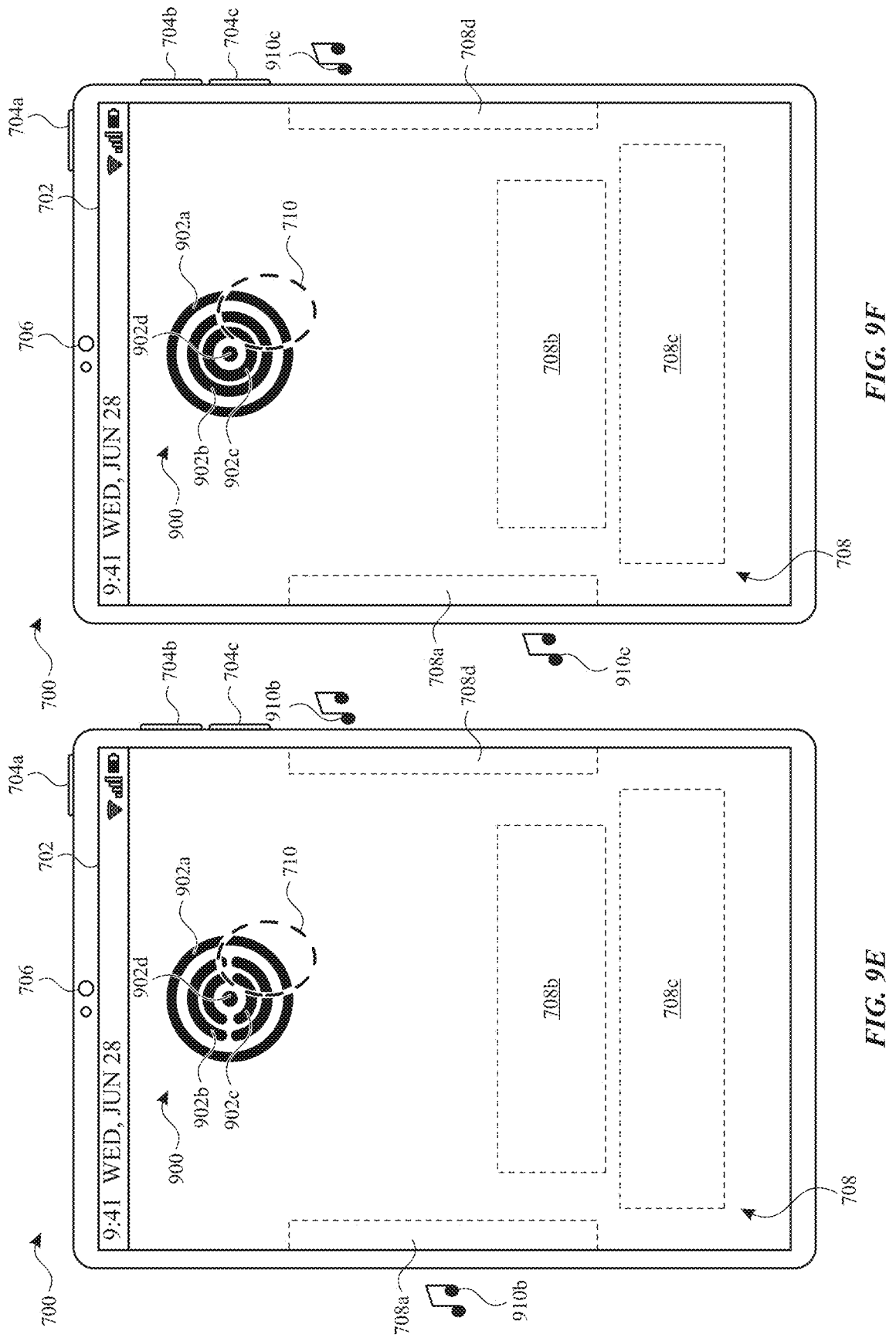

At FIG. 9E, electronic device 700 determines that the gaze of the user continues to be directed to gaze target 900 (e.g., the user continues to look at gaze target 900), as indicated by gaze indication 710. In response to the determination that the gaze of the user continues to be directed to gaze target 900, electronic device 700 displays a progress animation of gaze target 900 indicative of progress in biometric authentication of the user and, in some embodiments, continues to collect biometric information from the user to be used in biometric authentication of the user. The progress animation of gaze target 900 is different from the first animation of gaze target 900 that was shown in FIGS. 9A-9C2. As mentioned, the progress animation of gaze target 900 is indicative of electronic device 700 collecting biometric information from the user and/or performing biometric authentication of the user. In the depicted embodiment, the progress animation includes displaying the three segments of circle 902b merging into two segments of equal length. For example, in some embodiments, two of the three segments merge into a single segment which is slightly shorter than the combined length of the two segments, while the third segment lengthens, resulting in two segments of equal length separated by two gaps. Furthermore, circle 902b and circle 902c are rotated so that the resultant two gaps in circle 902b and the two gaps in circle 902c align along a horizontal axis of concentric circles 902a-902d, as shown in FIG. 9E. Furthermore, based on the determination that the user continues to look at gaze target 900, electronic device 700 outputs audio output 910b. In some embodiments, audio output 910b is different from audio output 904 and/or audio output 910a. In some embodiments, audio output 910b is a modification and/or progression of audio output 910a in order to give the impression of progress in the biometric authentication process. For example, in some embodiments, audio output 910b has an increased volume compared to audio output 910a and/or a higher pitch than audio output 910a. In some embodiments, audio output 910b is the same as audio output 910a. In some embodiments, audio output 910b includes spatialized audio that has a position corresponding to the position of gaze target 900.

At FIG. 9F, electronic device 700 determines that the gaze of the user continues to be directed to gaze target 900, as indicated by gaze indication 710. In response to the determination that the gaze of the user continues to be directed to gaze target 900, electronic device 700 continues display of the progress animation of gaze target 900 indicative of progress in biometric authentication of the user and, in some embodiments, continues to collect biometric information from the user to be used in biometric authentication of the user. In FIG. 9F, circle 902b has been animated so that the two segments in circle 902b from FIG. 9E have been joined into a single segment to form an unbroken circle. Similarly, circle 902c has been animated so that the two segments in circle 902c from FIG. 9E have also been joined into a single continuous segment to form an unbroken circle. Furthermore, based on the determination that the user continues to look at gaze target 900, electronic device outputs audio output 910c. In some embodiments, audio output 910c is different from audio output 904, audio output 910a, and/or audio output 910b. In some embodiments, audio output 910c is a modification and/or progression of audio output 910b in order to give the impression of progress in the biometric authentication process. For example, in some embodiments, audio output 910c has an increased volume compared to audio output 910b and/or a higher pitch than audio output 910b. In some embodiments, audio output 910c is the same as audio output 910b. In some embodiments, audio output 910c includes spatialized audio that has a position corresponding to the position of gaze target 900.

Figures 9G, 9H:
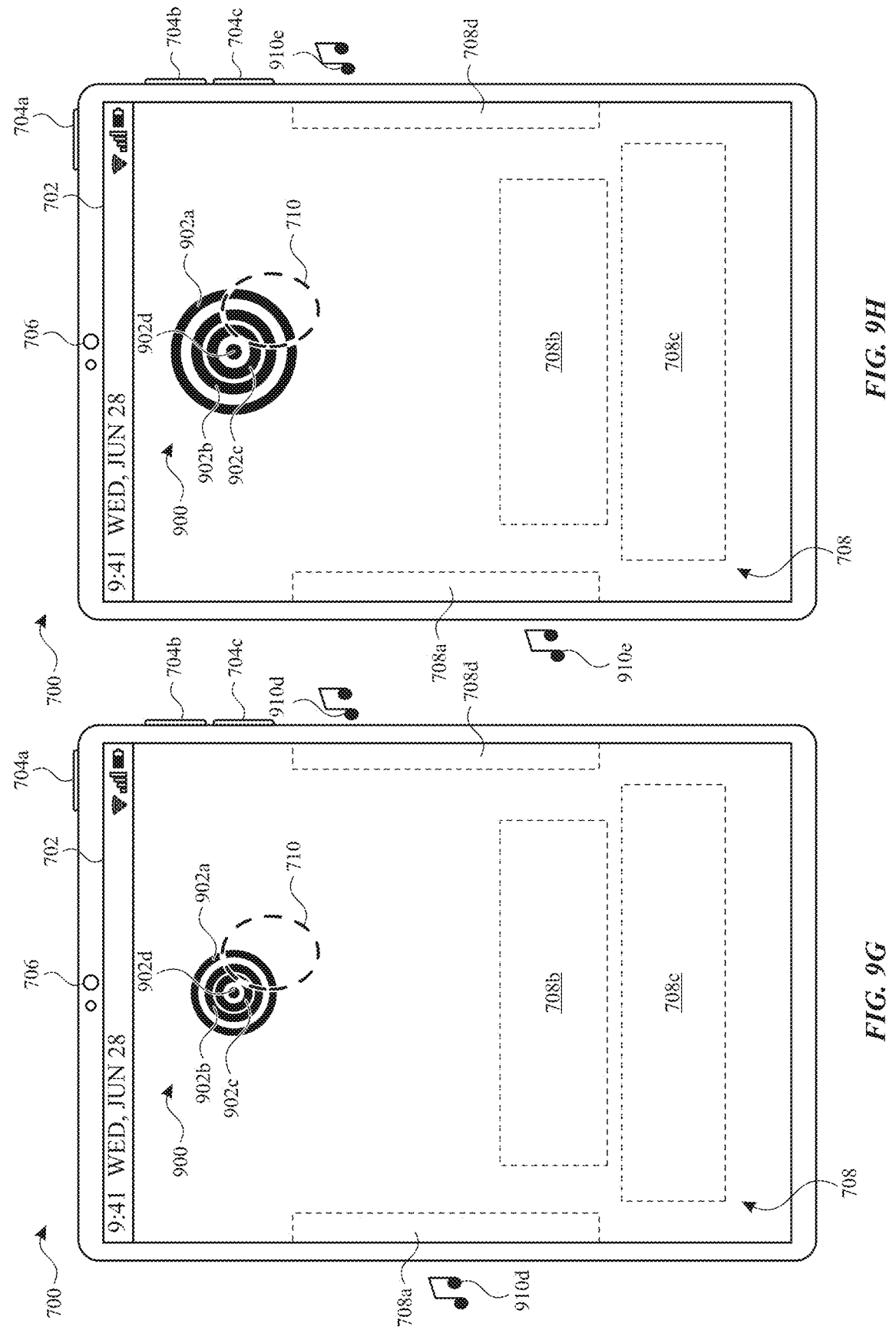

At FIG. 9G, electronic device 700 determines that the gaze of the user continues to be directed to gaze target 900, as indicated by gaze indication 710. In response to the determination that the gaze of the user continues to be directed to gaze target 900, electronic device 700 continues display of the progress animation of gaze target 900 indicative of progress in biometric authentication of the user and, in some embodiments, continues to collect biometric information from the user to be used in biometric authentication of the user. In FIG. 9G, concentric circles 902a-902d are displayed decreasing in size. In some embodiments, gaze target 900 is representative of a human eye. For example, in some embodiments, gaze target 900 has the appearance of a human eye, and one or more of concentric circles 902a-902d form parts of the circular pupil and/or iris. In some such embodiments, the decrease in size of gaze target 900 is representative of the eye blinking and/or closing. Furthermore, based on the determination that the user continues to look at gaze target 900, electronic device outputs audio output 910d. In some embodiments, audio output 910d is different from audio output 904, audio output 910a, audio output 910b, and/or audio output 910c. In some embodiments, audio output 910d is a modification and/or progression of audio output 910c in order to give the impression of progress in the biometric authentication process. For example, in some embodiments, audio output 910d has an increased volume compared to audio output 910c and/or a higher pitch than audio output 910c. In some embodiments, audio output 910d is the same as audio output 910c. In some embodiments, audio output 910d includes spatialized audio that has a position corresponding to the position of gaze target 900.

At FIG. 9H, electronic device 700 determines that the gaze of the user continues to be directed to gaze target 900, as indicated by gaze indication 710. In response to the determination that the gaze of the user continues to be directed to gaze target 900, electronic device 700 continues display of the progress animation of gaze target 900 indicative of progress in biometric authentication of the user and, in some embodiments, continues to collect biometric information from the user to be used in biometric authentication of the user. In FIG. 9H, concentric circles 902a-902d are displayed increasing in size back to their size from FIG. 9F. In some embodiments, gaze target 900 is representative of a human eye. For example, in some embodiments, gaze target 900 has the appearance of a human eye, and one or more of concentric circles 902a-902d form parts of the circular pupil and/or iris. In some such embodiments, the decrease in size of gaze target 900 in FIG. 9G is representative of the eye blinking and/or closing and the increase in size of gaze target 900 in FIG. 9H is representative of the eye re-opening. Furthermore, based on the determination that the user continues to look at gaze target 900, electronic device outputs audio output 910c. In some embodiments, audio output 910e is different from audio output 904, audio output 910a, audio output 910b, audio output 910c, and/or audio output 910d. In some embodiments, audio output 910e is a modification and/or progression of audio output 910d in order to convey progress in the biometric authentication process. For example, in some embodiments, audio output 910e has an increased volume compared to audio output 910d and/or a higher pitch than audio output 910d. In some embodiments, audio output 910e is the same as audio output 910d. In some embodiments, audio output 910e includes spatialized audio that has a position corresponding to the position of gaze target 900.

In some embodiments, the progress animation shown in FIGS. 9D-9H is a progress animation that is indicative of ongoing and/or current biometric authentication of the user. In some embodiments, the progress animation shown in FIGS. 9D-9H is a success animation that is displayed based on a determination that the user has been successfully biometrically authenticated. In some embodiments, while electronic device 700 is collecting biometric information and/or attempting biometric authentication of the user, electronic device 700 does not display animation of gaze target 900 (e.g., displays gaze target in a frozen state, for example, as shown in FIG. 9D).

Figures 9I, 9J:
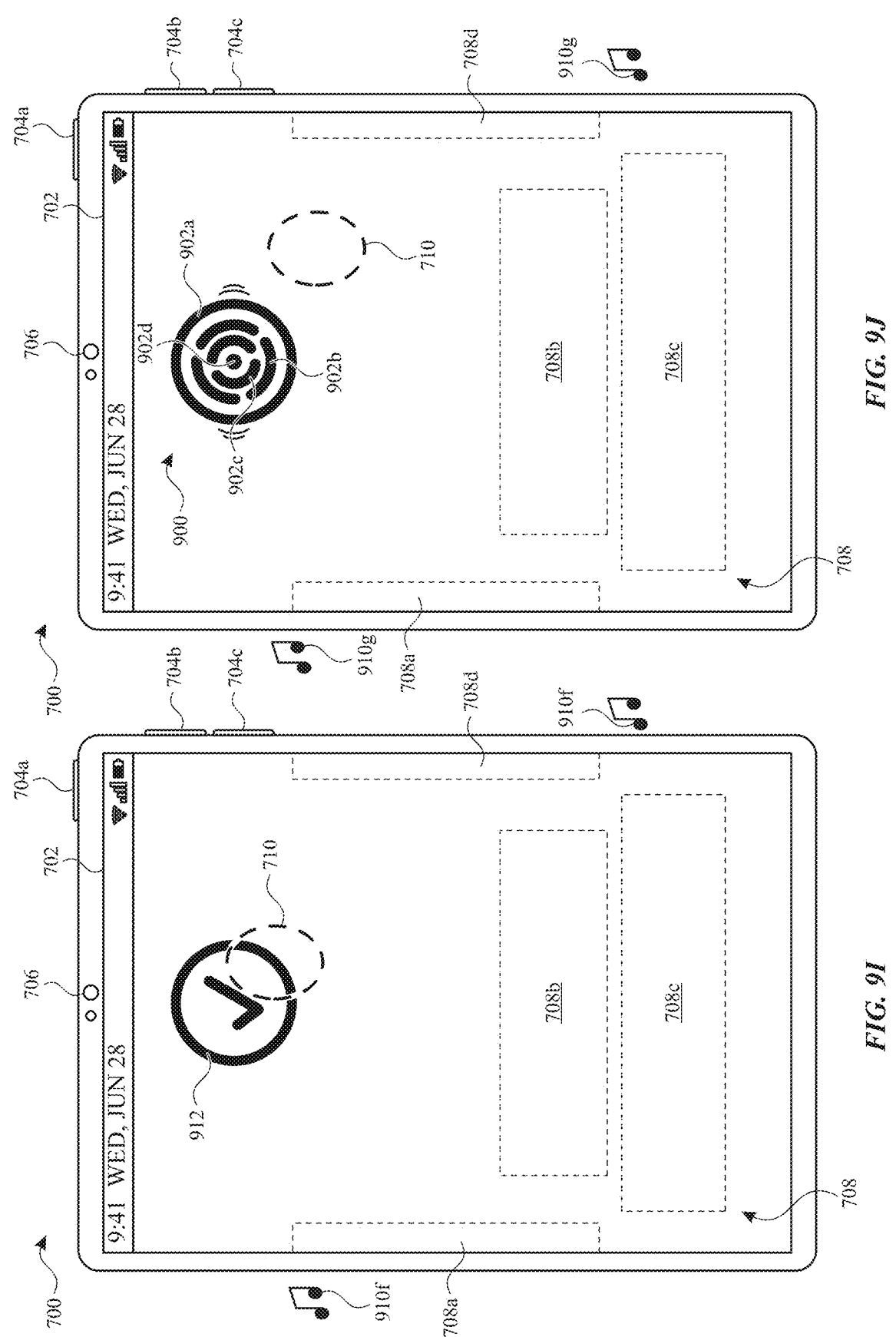

FIG. 9I depicts a first scenario in which biometric authentication of the user is successful (e.g., biometric information collected from the user matches stored biometric information corresponding to a known, registered, and/or authorized user). Based on a determination that biometric authentication of the user is successful, electronic device 700 replaces display of gaze target 900 with success indication 912 and outputs audio output 910f. In some embodiments, audio output 910f is different from audio outputs 904 and/or 910a-910e. In some embodiments, audio output 910f corresponds to (e.g., is the same as) audio output 732 of FIG. 7M. In some embodiments, audio output 910f includes spatialized audio that has a position corresponding to the position of success indication 912. In some embodiments, upon successful biometric authentication of the user, electronic device 700 transitions from a locked state to an unlocked state.

FIG. 9J depicts a second scenario in which biometric authentication of the user is not successful (e.g., fails) (e.g., biometric information collected from the user does not match stored biometric information corresponding to a known, registered, and/or authorized user). Based on a determination that biometric authentication of the user is not successful, electronic device 700 reverts gaze target 900 back to its previous state from FIGS. 9C1 and/or 9C2 prior to display of the progress animation, such that circle 902b once again has three segments and circle 902c once again has two segments, and also displays gaze target 900 vibrating. Electronic device 700 also outputs audio output 910g indicative of failed biometric authentication of the user. In some embodiments, audio output 910g is different from audio outputs 904 and/or 910a-910f. In some embodiments, audio output 910g includes spatialized audio that has a position corresponding to the position of gaze target 900. In some embodiments, based on failed biometric authentication of the user, electronic device 700 maintains itself in a locked state.

Figures 9K, 9L:
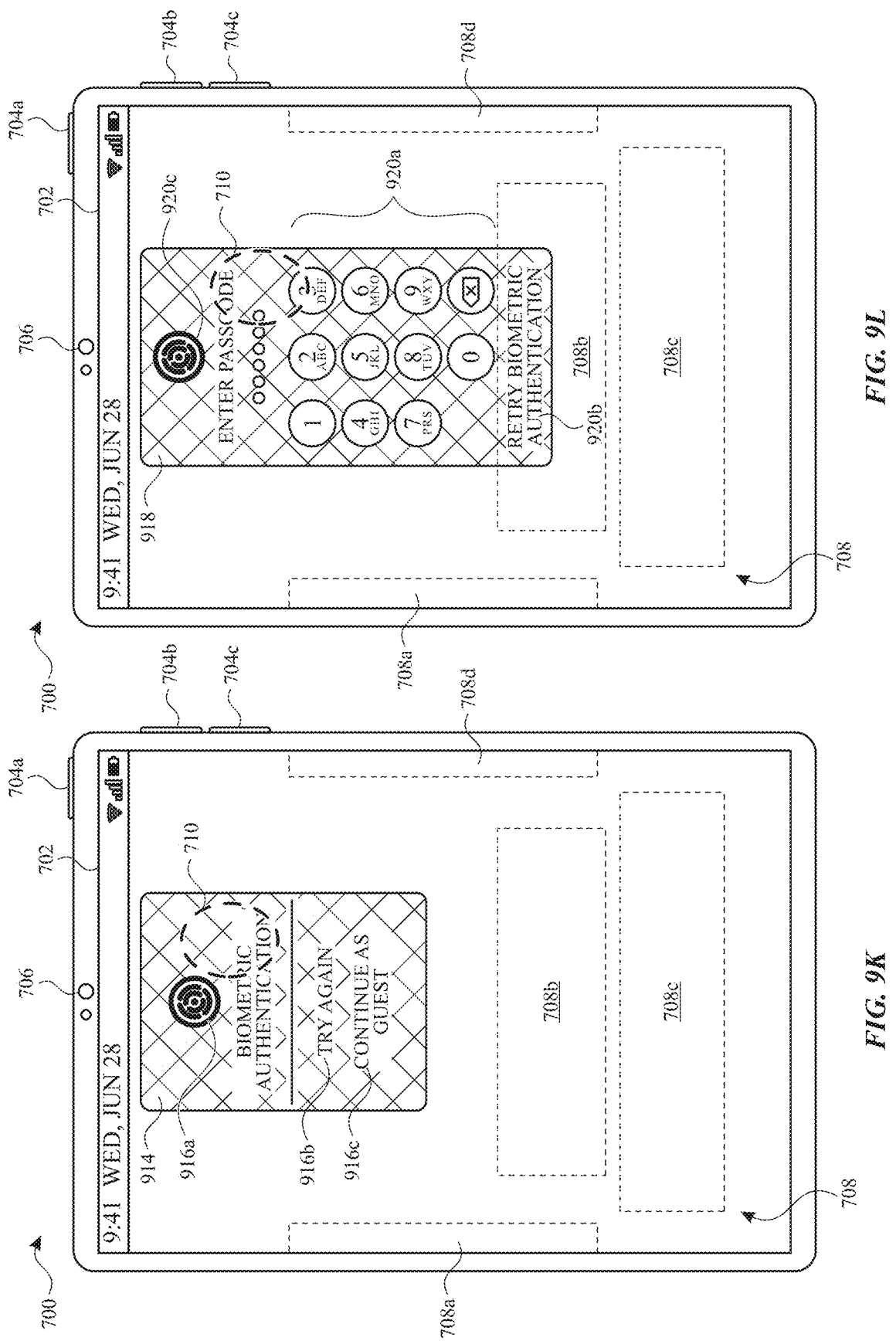

At FIG. 9K, electronic device 700 replaces display of gaze target 900 with user interface 914. User interface 914 includes gaze target representation 916a, and options 916b-916c. Gaze target representation 916a and option 916b are each selectable by a user to re-try biometric authentication (e.g., to return to the state of FIG. 9A). Option 916c is selectable by a user to operate electronic device 700 in a guest mode of operation. In some embodiments, the guest mode of operation provides access to fewer features and/or less content than the unlocked state of electronic device 700. In some embodiments, user interface 914 is displayed after a first failed biometric authentication attempt and/or when fewer than a first threshold number of failed biometric authentication attempts have occurred (e.g., consecutively and/or within a threshold duration of time). In some embodiments, after a first failed biometric authentication attempt, electronic device 700 automatically returns to FIG. 9A and automatically re-tries biometric authentication.

At FIG. 9L, electronic device 700 displays user interface 918. In some embodiments, after display of gaze target 900 in FIG. 9K, electronic device 700 replaces display of gaze target 900 with user interface 918. In some embodiments, electronic device 700 displays user interface 918 when greater than a first threshold number of failed biometric authentication attempts have occurred (e.g., consecutively and/or within a threshold duration of time). For example, in some embodiments, electronic device 700 displays user interface 918 after two consecutive failed biometric authentication attempts. User interface 918 includes keypad 920a which a user can interact with to enter passcode-based authentication information to unlock electronic device 700. User interface 918 also includes option 920b and option 920c, which are selectable by a user to retry biometric authentication. In some embodiments, user interface 918 also includes an option to use electronic device 700 in a guest mode of operation (similar to option 916c of FIG. 9K).

Figure 9M:
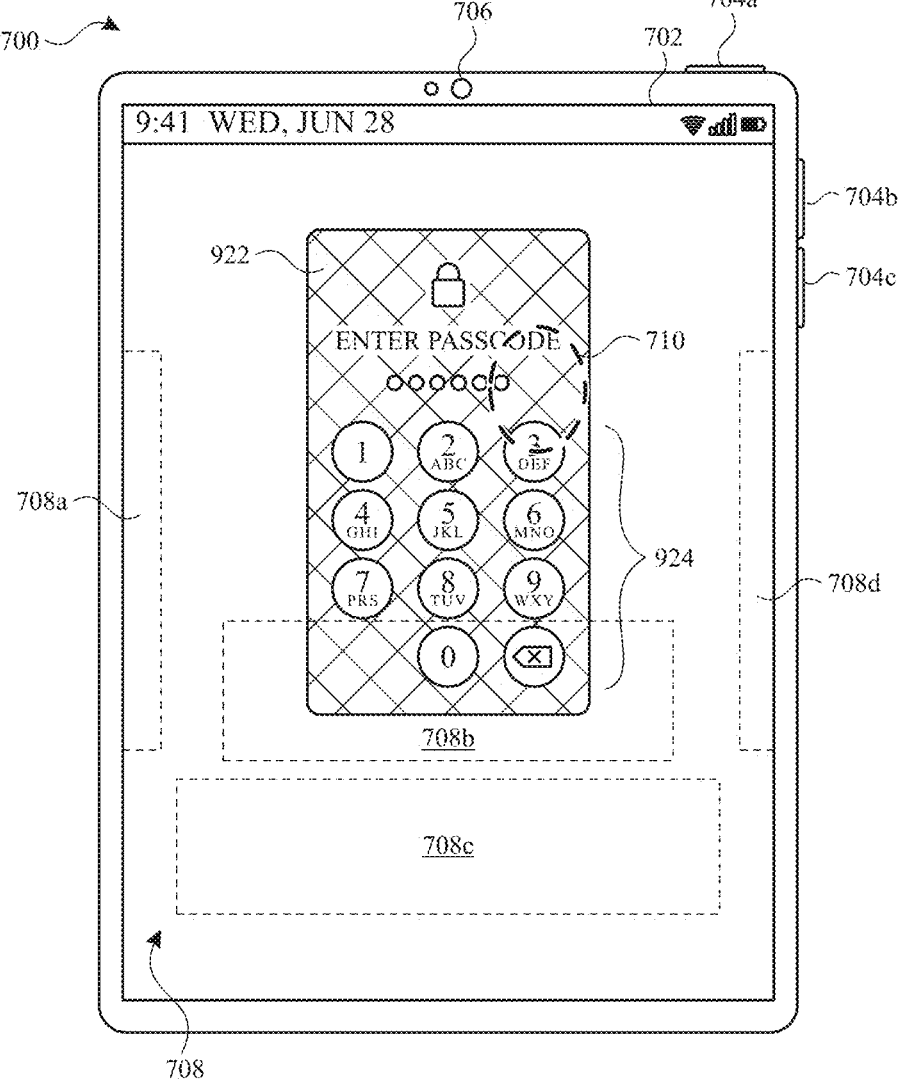

At FIG. 9M, electronic device 700 displays user interface 922. In some embodiments, after display of gaze target 900 in FIG. 9K, electronic device 700 replaces display of gaze target 900 with user interface 922. In some embodiments, electronic device 700 displays user interface 922 when greater than a second threshold number of failed biometric authentication attempts have occurred (e.g., consecutively and/or within a threshold duration of time). For example, in some embodiments, electronic device 700 displays user interface 918 after three consecutive failed biometric authentication attempts. User interface 922 includes keypad 924 which a user can interact with to enter passcode-based authentication information to unlock electronic device 700. However, user interface 922 does not include any selectable option to re-try biometric authentication. In some embodiments, user interface 922 also includes an option to use electronic device 700 in a guest mode of operation (similar to option 916c of FIG. 9K).

Additional descriptions regarding FIGS. 9A-9M are provided below in reference to method 1000 described with respect to FIG. 10.

FIG. 10 is a flow diagram of an exemplary method 1000 for user authentication, in some embodiments. In some embodiments, method 1000 is performed at a computer system (e.g., computer system 101 in FIG. 1A, 700, and/or X700) (e.g., a smart phone, a smart watch, a tablet, a laptop, a desktop, a wearable device, and/or head-mounted device) that is in communication with one or more display generation components (e.g., display generation component 120 in FIGS. 1, 3, and 4 702 and/or X702) (e.g., a heads-up display, a display, a touchscreen, and/or a projector) (e.g., a visual output device, a 3D display, a display having at least a portion that is transparent or translucent on which images can be projected (e.g., a see-through display), a projector, a heads-up display, and/or a display controller) and one or more input devices (e.g., 704a-c and/or 706) (e.g., a touch-sensitive surface (e.g., a touch-sensitive display); a mouse; a keyboard; a remote control; a visual input device (e.g., one or more cameras (e.g., an infrared camera, a depth camera, a visible light camera, and/or a gaze tracking camera)); an audio input device; a biometric sensor (e.g., a fingerprint sensor, a face identification sensor, a gaze tracking sensor, and/or an iris identification sensor) and/or one or more mechanical input devices (e.g., a depressible input mechanism; a button; a rotatable input mechanism; a crown; and/or a dial)). In some embodiments, method 1000 is governed by instructions that are stored in a non-transitory (or transitory) computer-readable storage medium and that are executed by one or more processors of a computer system, such as the one or more processors 202 of computer system 101 (e.g., control 110 in FIG. 1A). Some operations in method 1000 are, optionally, combined and/or the order of some operations is, optionally, changed.

In some embodiments, the computer system (e.g., 700 and/or X700) displays (1002), via the one or more display generation components (e.g., 702 and/or X702), a first user interface object (e.g., 900) (e.g., a gaze target for the user to look at while the computer system performs eye-based biometric authentication and/or eye-based biometric identification of the user; and/or a gaze target for the user to look at while the computer system collects eye-based biometric information (e.g., one or more eye scans, one or more iris scans, one or more cornea scans, and/or one or more retina scans) to be used in eye-based biometric authentication and/or eye-based biometric identification of the user). While displaying the first user interface object (e.g., 900) (1004), the computer system detects (1006), via the one or more input devices (e.g., 706), a gaze (e.g., 710 and/or X710) of one or more eyes detected by the computer system (e.g., detects that the one or more eyes and/or a user is looking at a particular object, position, and/or location in a user interface). In response to detecting the gaze of the one or more eyes (1008): in accordance with a determination that the gaze (e.g., 710 and/or X710) of the one or more eyes is not directed towards the first user interface object (e.g., 900) (1010) (e.g., in accordance with a determination that the one or more eyes and/or a user is not looking at the first user interface object and/or the gaze of the one or more eyes and/or a user is moving away from the first user interface object), the computer system displays (1012), via the one or more display generation components (e.g., 702 and/or X702), a first animation of the first user interface object (e.g., FIGS. 9A-9C2) (e.g., a first animation that includes animation of the first user interface object and/or a first animation that includes movement of at least a portion of the first user interface object); and in accordance with a determination that the gaze (e.g., 710 and/or X710) of the one or more eyes is directed towards the first user interface object (e.g., 900) (1014) (e.g., in accordance with a determination that the one or more eyes and/or a user is looking at the first user interface object), the computer system forgoes displaying (1016) the first animation of the first user interface object (e.g., in FIGS. 9D-9I, electronic device 700 and/or HMD X700 displays a progress animation that is different from the first animation displayed in FIGS. 9A-9C2) (e.g., displays a second animation of the first user interface object different from the first animation; and/or displays the first user interface object without animation (e.g., without movement of the first user interface object and/or without movement of any portion of the first user interface objection)). Displaying a first animation when a user is not looking at a first user interface object and forgoing display of the first animation when the user is looking at the first user interface object enhances the operability of the system and makes the user-system interface more efficient (e.g., by helping the user to provide proper inputs and reducing errors) which, additionally, reduces power usage and improves battery life of the device by enabling the user to use the system more quickly and efficiently. Furthermore, doing so also provides the user with feedback about a state of the device (e.g., the device has detected that the user is not looking at the first user interface object or is looking at the first user interface object).

In some embodiments, while detecting that the gaze (e.g., 710 and/or X710) of the one or more eyes is not directed towards the first user interface object (e.g., 900), the computer system (e.g., 700 and/or X700) displays (e.g., continuously displays and/or repeatedly displays) the first animation of the first user interface object (e.g., 900 in FIGS. 9A-9C2) (e.g., continuously looping the first animation of the first user interface object). While displaying the first animation of the first user interface object (e.g., 900 in FIGS. 9A-9C2), the computer system detects that the gaze (e.g., 710 and/or X710) of the one or more eyes is directed towards the first user interface object (e.g., gaze 710 and/or X710 is on gaze target 900 in FIG. 9D). In response to detecting that the gaze of the one or more eyes is directed towards the first user interface object, the computer system (e.g., 700 and/or X700) ceases display of the first animation (e.g., in FIG. 9D, electronic device 700 and/or HMD X700 ceases display of the first animation in which circles 702a-702d rotate) (e.g., ceases movement of the first user interface object, displays the first user interface object without movement of the first user interface object, and/or display the first user interface with movement different from the first animation). Displaying a first animation when a user is not looking at a first user interface object and ceasing display of the first animation when the user is looking at the first user interface object enhances the operability of the system and makes the user-system interface more efficient (e.g., by helping the user to provide proper inputs and reducing errors) which, additionally, reduces power usage and improves battery life of the device by enabling the user to use the system more quickly and efficiently. Furthermore, doing so also provides the user with feedback about a state of the device (e.g., the device has detected that the user is not looking at the first user interface object or is looking at the first user interface object).

In some embodiments, while displaying the first animation of the first user interface object (e.g., 900 in FIGS. 9A-9C2): in accordance with a determination that the gaze (e.g., 710 and/or X710) of the one or more eyes has not been directed towards the first user interface object (e.g., 900) for a threshold duration of time (e.g., the one or more eyes have not looked at the first user interface object for the last X seconds and/or minutes (e.g., 0.1 seconds, 0.2 seconds, 0.5 seconds, 1 second, 1.5 seconds, 2 seconds, 3 seconds, 5 seconds, 10 seconds, 30 seconds, or 1 minute)), the computer system displays, via the one or more display generation components, a visual indication (e.g., 906 and/or vibration of gaze target 900 in FIGS. 9C1 and/or 9C2) prompting a user to look at the first user interface object (e.g., 900) (e.g., a textual indication prompting the user to look at the first user interface object and/or a non-textual indication prompting the user to look at the first user interface object). In some embodiments, while displaying the first animation of the first user interface object: in accordance with a determination that less than the threshold duration of time has elapsed during which the gaze of the one or more eyes has not been directed towards the first user interface object (e.g., 900) (e.g., the user has looked at the first user interface object within the threshold duration of time (e.g., within the last 0.1 seconds, 0.2 seconds, 0.5 seconds, 1 second, 1.5 seconds, 2 seconds, 3 seconds, 5 seconds, 10 seconds, 30 seconds, or 1 minute) and/or the threshold duration of time has not yet elapsed), the computer system forgoes display of the visual indication prompting the user to look at the first user interface object (e.g., FIGS. 9A-9B). Displaying a visual indication prompting the user to look at the first user interface object when the user has not looked at the first user interface object for a threshold duration of time enhances the operability of the system and makes the user-system interface more efficient (e.g., by helping the user to provide proper inputs and reducing errors) which, additionally, reduces power usage and improves battery life of the device by enabling the user to use the system more quickly and efficiently. Furthermore, doing so also provides the user with feedback about a state of the device (e.g., the device has detected that the user has not looked at the first user interface object for the threshold duration of time).

In some embodiments, the visual indication prompting the user to look at the first user interface object includes movement of the first user interface object (e.g., 900) different from the first animation (e.g., vibration of gaze target 900 in FIGS. 9C1 and/or 9C2) (e.g., bouncing of the first user interface object and/or vibration of the first user interface object). Displaying a visual indication prompting the user to look at the first user interface object when the user has not looked at the first user interface object for a threshold duration of time enhances the operability of the system and makes the user-system interface more efficient (e.g., by helping the user to provide proper inputs and reducing errors) which, additionally, reduces power usage and improves battery life of the device by enabling the user to use the system more quickly and efficiently. Furthermore, doing so also provides the user with feedback about a state of the device (e.g., the device has detected that the user has not looked at the first user interface object for the threshold duration of time).

In some embodiments, the first animation includes movement of a plurality of concentric elements such as concentric rings (e.g., in FIGS. 9A-9C2, at least circle 902b and 902c are rotated) (e.g., the first user interface object includes a plurality of concentric rings, and the first animation includes movement of the plurality of concentric rings (e.g., rotation of the plurality of concentric rings)). Displaying a first animation when a user is not looking at a first user interface object and forgoing display of the first animation when the user is looking at the first user interface object enhances the operability of the system and makes the user-system interface more efficient (e.g., by helping the user to provide proper inputs and reducing errors) which, additionally, reduces power usage and improves battery life of the device by enabling the user to use the system more quickly and efficiently. Furthermore, doing so also provides the user with feedback about a state of the device (e.g., the device has detected that the user is not looking at the first user interface object or is looking at the first user interface object).

In some embodiments, the first animation includes movement of at least a portion of a representation of a human eye (e.g., in some embodiments, gaze target 900 is representative of a human eye) (e.g., a visual object that looks like a human eye and/or approximates the appearance of a human eye (e.g., a visual object that includes a representation of a pupil and/or a representation of an iris)). In some embodiments, the first user interface object (e.g., 900) is a representation of a human eye (e.g., looks like a human eye and/or approximates the appearance of a human eye (e.g., includes a representation of a pupil and/or a representation of an iris)) and/or includes a portion that is a representation of a human eye. Displaying a first animation when a user is not looking at a first user interface object and forgoing display of the first animation when the user is looking at the first user interface object enhances the operability of the system and makes the user-system interface more efficient (e.g., by helping the user to provide proper inputs and reducing errors) which, additionally, reduces power usage and improves battery life of the device by enabling the user to use the system more quickly and efficiently. Furthermore, doing so also provides the user with feedback about a state of the device (e.g., the device has detected that the user is not looking at the first user interface object or is looking at the first user interface object).

In some embodiments, in response to detecting the gaze (e.g., 710 and/or X710) of the one or more eyes: in accordance with a determination that the gaze of the one or more eyes is not directed towards the first user interface object (e.g., 900), the computer system outputs a first audio output (e.g., 904 and/or X904) corresponding to the first animation (e.g., a first audio output that indicates that the gaze of the one or more eyes is not directed towards the first user interface object) (e.g., while displaying the first animation of the first user interface object). In some embodiments, in response to detecting the gaze of the one or more eyes: in accordance with a determination that the gaze (e.g., 710 and/or X710) of the one or more eyes is directed towards the first user interface object (e.g., 900), the computer system forgoes outputting the first audio output corresponding to the first animation (e.g., in FIGS. 9D-9I, electronic device 700 and/or HMD X700 does not output audio output 904 and/or audio output X904) (e.g., outputs second audio output different from the first audio output and/or forgoes outputting any audio output). Outputting first audio output when a user is not looking at a first user interface object enhances the operability of the system and makes the user-system interface more efficient (e.g., by helping the user to provide proper inputs and reducing errors) which, additionally, reduces power usage and improves battery life of the device by enabling the user to use the system more quickly and efficiently. Furthermore, doing so also provides the user with feedback about a state of the device (e.g., the device has detected that the user is not looking at the first user interface object).

In some embodiments, the first audio output (e.g., 904 and/or X904) includes a repeating sound (e.g., a ticking sound and/or a clock sound, and/or a sound that repeats periodically (e.g., at regular or semi-regular intervals such as 0.1, 0.2, 0.5, 1, 2, 5, or 10 second intervals)). Outputting first audio output when a user is not looking at a first user interface object enhances the operability of the system and makes the user-system interface more efficient (e.g., by helping the user to provide proper inputs and reducing errors) which, additionally, reduces power usage and improves battery life of the device by enabling the user to use the system more quickly and efficiently. Furthermore, doing so also provides the user with feedback about a state of the device (e.g., the device has detected that the user is not looking at the first user interface object).

In some embodiments, in response to detecting the gaze (e.g., 710 and/or X710) of the one or more eyes: in accordance with a determination that the gaze (e.g., 710 and/or X710) of the one or more eyes is directed towards the first user interface object (e.g., 900), the computer system outputs a second audio output (e.g., 910*a*, 910*b*, 910*c*, 910*d*, 910*e*, and/or 910*f*) (e.g., a second audio output that indicates that the gaze of the one or more eyes is directed towards the first user interface object) different from the first audio output. In some embodiments, the second audio output (e.g., 910*a*, 910*b*, 910*c*, 910*d*, 910*c*, and/or 910*f*) changes over time as the one or more eyes continue to be directed towards the first user interface object (e.g., 900) (e.g., a second audio output that changes over time to indicate progress towards biometric authentication and/or biometric enrollment). In some embodiments, the second audio output increases and/or decreases in volume over time. In some embodiments, the second audio output increases and/or decreases in frequency over time (e.g., the frequency of a repeating sound increases and/or decreases over time). In some embodiments, the second audio output changes in tone and/or pitch over time (e.g., progressively higher pitched sounds and/or keys).

Outputting second audio output when a user is looking at a first user interface object enhances the operability of the system and makes the user-system interface more efficient (e.g., by helping the user to provide proper inputs and reducing errors) which, additionally, reduces power usage and improves battery life of the device by enabling the user to use the system more quickly and efficiently. Furthermore, doing so also provides the user with feedback about a state of the device (e.g., the device has detected that the user is looking at the first user interface object).

In some embodiments, the first audio output (e.g., 904 and/or X904) includes spatial audio having a location corresponding to the first user interface object (e.g., 900) (e.g., audio that emanates from and/or is played by audio output devices so as to give the impression of emanating from the first user interface object). Outputting first audio output when a user is not looking at a first user interface object, and having the first audio output emanate from the location of the first user interface object, enhances the operability of the system and makes the user-system interface more efficient (e.g., by helping the user to provide proper inputs and reducing errors) which, additionally, reduces power usage and improves battery life of the device by enabling the user to use the system more quickly and efficiently. Furthermore, doing so also provides the user with feedback about a state of the device (e.g., the device has detected that the user is not looking at the first user interface object).

In some embodiments, in response to detecting the gaze (e.g., 710 and/or X710) of the one or more eyes: in accordance with a determination that the gaze of the one or more eyes is directed towards the first user interface object (e.g., 900), the computer system (e.g., 700 and/or X700) collects biometric information corresponding to the one or more eyes (e.g., collecting one or more eye scans and/or one or more images of the one or more eyes). Subsequent to collecting the biometric information corresponding to the one or more eyes: in accordance with a determination that the biometric information corresponding to the one or more eyes satisfies authentication criteria (e.g., the biometric information corresponding to the one or more eyes matches stored and/or known biometric information corresponding to a known user, a registered user, and/or an authorized user), the computer system displays, via the one or more display generation components (e.g., 702 and/or X702), the first user interface object (e.g., 900) changing in appearance in a first manner (e.g., displaying object 912 in place of gaze target 900) (e.g., ceases display of the first user interface object, changes one or more visual characteristics (e.g., size, color, and/or shape) of the first user interface object, moves the first user interface object in a first manner, and/or animates the first user interface object in a first manner); and in accordance with a determination that the biometric information corresponding to the one or more eyes does not satisfy the authentication criteria (e.g., the biometric information corresponding to the one or more eyes does not match stored and/or known biometric information corresponding to a known user, a registered user, and/or an authorized user), the computer system displays, via the one or more display generation components (e.g., 702 and/or X702), the first user interface object (e.g., 900) changing in appearance in a second manner different from the first manner (e.g., gaze target 900 vibrating in FIG. 9J) (e.g., ceases display of the first user interface object, changes one or more visual characteristics (e.g., size, color, and/or shape) of the first user interface object, moves the first user interface object in a second manner, and/or animates the first user interface object in a second manner). Automatically collecting biometric information and performing biometric authentication based on a determination that the user is looking at the first user interface object reduces the number of inputs needed to perform these operations and enables these operations to be performed without displaying additional controls. Furthermore, displaying the first user interface object changing in appearance in a first manner when the biometric information satisfies authentication criteria, and displaying the first user interface object changing in appearance in a second manner when the biometric information does not satisfy the authentication criteria, provides the user with feedback about a state of the device (e.g., the device has determined that the biometric information satisfies the authentication criteria or does not satisfy the authentication criteria).

In some embodiments, displaying the first user interface object (e.g., 900) changing in appearance in the second manner includes shaking the first user interface object (e.g., vibration of gaze target 900 in FIG. 9J) (e.g., vibrating the first user interface object and/or moving the first user interface object in a first direction and then moving the first user interface object in a second direction opposite or substantially opposite to the first direction). Displaying the first user interface object shaking when the biometric information does not satisfy the authentication criteria provides the user with feedback about a state of the device (e.g., the device has determined that the biometric information does not satisfy the authentication criteria).

In some embodiments, subsequent to collecting the biometric information corresponding to the one or more eyes, the computer system determines that the biometric information corresponding to the one or more eyes does not satisfy the authentication criteria (e.g., FIG. 9J). In response to determining that the biometric information corresponding to the one or more eyes does not satisfy the authentication criteria: in accordance with a determination that there are no previous failed authentication attempts of the one or more eyes within a defined period of time (e.g., the last 10 minutes, the last 30 minutes, the last hour, since the computer system was last turned on, and/or since the computer system was placed on the body of a user (e.g., placed on the head of the user)) (e.g., this was the first failed authentication attempt of the one or more eyes within the defined period of time), the computer system (e.g., 700 and/or X700) collects second biometric information corresponding to the one or more eyes to be used in a second authentication attempt of the one or more eyes (e.g., after FIG. 9J, when there have not been any previous failed authentication attempts of the one or more eyes, electronic device 700 and/or HMD X700 returns to FIG. 9A to re-collect biometric information from the user) (e.g., automatically re-trying a second authentication of the one or more eyes). Automatically re-collecting biometric information and retrying biometric authentication after a first failed authentication reduces the number of inputs needed to perform these operations and enables these operations to be performed without displaying additional controls.

In some embodiments, in response to determining that the biometric information corresponding to the one or more eyes does not satisfy the authentication criteria (e.g., FIG. 9J): in accordance with a determination that there have been at least a threshold number (e.g., 1, 2, 3, 4, 5, or 10) previous failed eye authentication attempts within the defined period of time (e.g., the last 10 minutes, the last 30 minutes, the last hour, since the computer system was last turned on, and/or since the computer system was placed on the body of a user (e.g., placed on the head of the user)) (e.g., this was the second failed authentication attempt of the one or more eyes within the defined period of time), the computer system displays, via the one or more display generation components, an authentication user interface (e.g., 918 and/or 922) that includes one or more selectable objects (e.g., 920a and/or 924) (e.g. that are selectable to enter authentication information (e.g., one or more selectable objects that are selectable by a user for the user to enter a passcode and/or a password). In some embodiments, in response to determining that the biometric information corresponding to the one or more eyes does not satisfy the authentication criteria and in accordance with a determination that there are no previous failed authentication attempts of the one or more eyes within the defined period of time, the computer system forgoes display of the authentication user interface (e.g., FIG. 9K). Displaying an authentication user interface when biometric authentication of the user fails twice enhances the operability of the system and makes the user-system interface more efficient (e.g., by helping the user to provide proper inputs and reducing errors) which, additionally, reduces power usage and improves battery life of the device by enabling the user to use the system more quickly and efficiently. Furthermore, doing so also provides the user with feedback about a state of the device (e.g., the device has determined that biometric information collected from the user does not satisfy authentication criteria).

In some embodiments, the authentication user interface (e.g., 918) includes a retry object (e.g., 920b and/or 920c) that is selectable to initiate a process for re-attempting biometric authentication of the one or more eyes. In some embodiments, while displaying the authentication user interface (e.g., 918), the computer system receives, via the one or more input devices (e.g., 702, 704a-704c, and/or 706), a user input (e.g., a touch input, a gesture input, an air gesture input, and/or a gaze-based input) corresponding to selection of the retry object (e.g., 920b and/or 920c). In response to receiving the user input corresponding to selection of the retry object (e.g., 920b and/or 920c), the computer system collects third biometric information corresponding to the one or more eyes to be used in an authentication attempt (e.g., a third authentication attempt) of the one or more eyes (e.g., in some embodiments, in response to selection of options 920b and/or 920c, electronic device 700 and/or HMD X700 returns to FIG. 9A to collect additional biometric information from the user and/or re-try biometric authentication of the user). Displaying an authentication user interface that includes an option that is selectable to retry biometric authentication when biometric authentication of the user fails twice enhances the operability of the system and makes the user-system interface more efficient (e.g., by helping the user to provide proper inputs and reducing errors) which, additionally, reduces power usage and improves battery life of the device by enabling the user to use the system more quickly and efficiently. Furthermore, doing so also provides the user with feedback about a state of the device (e.g., the device has determined that biometric information collected from the user does not satisfy authentication criteria).

In some embodiments, in response to determining that the biometric information corresponding to the one or more eyes does not satisfy the authentication criteria: in accordance with a determination that there have been greater than the threshold number (e.g., greater than one, greater than two, greater than three, greater than four, or greater than five) of previous failed eye authentication attempts within the defined period of time (e.g., the last 10 minutes, the last 30 minutes, the last hour, since the computer system was last turned on, and/or since the computer system was placed on the body of a user (e.g., placed on the head of the user)) (e.g., this was the second failed authentication attempt of the one or more eyes within the defined period of time), the computer system (e.g., 700 and/or X700) displays, via the one or more display generation components (e.g., 702 and/or X702), a second authentication user interface (e.g., 922) that includes one or more selectable objects (e.g., 924) that are selectable to enter authentication information (e.g., one or more selectable objects that are selectable by a user for the user to enter a passcode and/or a password), wherein the second authentication user interface (e.g., 922) does not include the retry object (e.g., does not include an option to retry biometric authentication of the one or more eyes). Displaying a second authentication user interface when biometric authentication of the user fails more than a threshold number of times enhances the operability of the system and makes the user-system interface more efficient (e.g., by helping the user to provide proper inputs and reducing errors) which, additionally, reduces power usage and improves battery life of the device by enabling the user to use the system more quickly and efficiently. Furthermore, doing so also provides the user with feedback about a state of the device (e.g., the user no longer has the option to attempt biometric authentication and must enter authentication information).

In some embodiments, the user input corresponding to selection of the retry object (e.g., 920b and/or 920c) includes: a gaze input (e.g., 710 and/or X710) corresponding to the retry object (e.g., a gaze of the one or more eyes directed at the retry object); and a selection input (e.g., an air pinch gesture, an air tap gesture, or another selection input) (e.g., a gesture in which one or more fingers of a hand move towards and/or move closer to the thumb of the hand; and/or a gesture in which one or more fingers of a hand move towards and/or move closer to one or more other fingers of the hand) (e.g., a pinch gesture that occurs while the gaze of the one or more eyes is directed at the retry object; and/or a pinch gesture that occurs concurrently with the gaze input corresponding to the retry object). Displaying an authentication user interface that includes an option that is selectable to retry biometric authentication when biometric authentication of the user fails twice enhances the operability of the system and makes the user-system interface more efficient (e.g., by helping the user to provide proper inputs and reducing errors) which, additionally, reduces power usage and improves battery life of the device by enabling the user to use the system more quickly and efficiently. Furthermore, doing so also provides the user with feedback about a state of the device (e.g., the device has determined that biometric information collected from the user does not satisfy authentication criteria).

In some embodiments, prior to displaying the first user interface object (e.g., 900), the computer system (e.g., 700 and/or X700) displays, via the one or more display generation components (e.g., 702 and/or X702), as part of enrolling one or more eyes of a person (e.g., FIGS. 7A-7N) (e.g., an enrollment process in which eye-based biometric information (e.g., one or more eye scans, one or more iris scans, one or more cornea scans, and/or one or more retina scans) corresponding to the one or more eyes and/or the person (e.g., a person that has not yet enrolled in eye-based biometric authentication and/or a person for which eye-based biometric information is not yet available and/or has not been previously collected) is collected for future eye-based biometric authentication, eye-based user inputs (e.g., gaze inputs), and/or eye-based biometric identification of the person), an enrollment user interface (e.g., 718a and/or 718b) that includes an enrollment gaze target object (e.g., 718a). While displaying the enrollment user interface (e.g., 718a and/or 718b), in accordance with a determination that the gaze (e.g., 710 and/or X710) of the one or more eyes of the person is moving away from the enrollment gaze target object (e.g., 718a), the computer system (e.g., 700 and/or X700) displays, via the one or more display generation components, a prompt (e.g., 718c) (e.g., a text prompt and/or other visual prompt) to look at the enrollment gaze target object (e.g., 718a). Subsequent to displaying the enrollment user interface (e.g., subsequent to completion of enrolling the one or more eyes of the person): the computer system collects biometric information corresponding to the one or more eyes (e.g., collecting one or more eye scans and/or one or more images of the one or more eyes) (e.g., FIGS. 9D-9H). Subsequent to collecting the biometric information corresponding to the one or more eyes: in accordance with a determination that the biometric information corresponding to the one or more eyes does not satisfy authentication criteria (e.g., the biometric information corresponding to the one or more eyes does not match stored and/or known biometric information corresponding to a known user, a registered user, and/or an authorized user), the computer system displays, via the one or more display generation components, a prompt (e.g., 906) (e.g., a text prompt and/or other visual prompt) to look at the first user interface object (e.g., 900) (e.g., after failed authentication of the user in FIG. 9J, in some embodiments, electronic device 700 and/or HMD X700 displays prompt 906 prompting the user to look at gaze target 900). In some embodiments, subsequent to collecting the biometric information corresponding to the one or more eyes: in accordance with a determination that the biometric information corresponding to the one or more eyes satisfies the authentication criteria, the computer system forgoes display of the prompt to look at the first user interface object. Displaying a prompt that directs the user to look at the first user interface object enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, in accordance with a determination that there are one or more previous failed authentication attempts of the one or more eyes within a defined period of time (e.g., the last 10 minutes, the last 30 minutes, the last hour, since the computer system was last turned on, and/or since the computer system was placed on the body of a user (e.g., placed on the head of the user)) (e.g., the first user interface object is being displayed as part of a second attempt to perform biometric authentication of the one or more eyes and/or as part of a subsequent to attempt to perform biometric authentication of the one or more eyes after at least one failed attempt), the computer system displays the first user interface object (e.g., 900) with a first platter at least partially surrounding the first user interface object (e.g., a background platter, such as background 718b, positioned behind gaze target 900); and in accordance with a determination that there are no previous failed authentication attempts of the one or more eyes within a defined period of time (e.g., the last 10 minutes, the last 30 minutes, the last hour, since the computer system was last turned on, and/or since the computer system was placed on the body of a user (e.g., placed on the head of the user)) (e.g., the first user interface object is being displayed as part of an initial attempt to perform biometric authentication of the one or more eyes), the computer system displays the first user interface object (e.g., 900) without displaying the first platter (e.g., as shown in FIGS. 9A-9H) (e.g., without displaying any platter and/or any object around the first user interface object). Displaying the first user interface object without a platter on a first authentication attempt, and then displaying the first user interface object with a platter on subsequent authentication attempts enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, the first platter (e.g., a background platter behind gaze target 900, such as background 718*b*) is displayed in a manner (e.g., with a color, brightness, and/or size) that brightens the one or more eyes for subsequent collection of biometric information corresponding to the one or more eyes (e.g., the platter is large enough and/or bright enough to brighten the one or more eyes in order to improve collection of biometric information corresponding to the one or more eyes). Displaying the first user interface object without a platter on a first authentication attempt, and then displaying the first user interface object with a platter on subsequent authentication attempts enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, subsequent to detecting the gaze (e.g., 710 and/or X710) of the one or more eyes, and while displaying the first user interface object (e.g., 900), the computer system collects biometric information corresponding to the one or more eyes. Subsequent to collecting the biometric information corresponding to the one or more eyes (e.g., in response to collecting the biometric information corresponding to the one or more eyes): in accordance with a determination that the biometric information corresponding to the one or more eyes satisfies authentication criteria (e.g., the biometric information corresponding to the one or more eyes matches stored and/or known biometric information corresponding to a known user, a registered user, and/or an authorized user), the computer system ceases display of the first user interface object (e.g., 900) (e.g., in FIG. 9I, electronic device 700 and/or HMD X700 replaces display of gaze target 900 with indication 912). In some embodiments, subsequent to collecting the biometric information corresponding to the one or more eyes: in accordance with a determination that the biometric information corresponding to the one or more eyes does not satisfy the authentication criteria, the computer system maintains display of the first user interface object (e.g., 900) (e.g., FIG. 9J). Ceasing display of the first user interface object when the user is successfully biometrically authenticated enhances the operability of the system and makes the user-system interface more efficient (e.g., by helping the user to provide proper inputs and reducing errors) which, additionally, reduces power usage and improves battery life of the device by enabling the user to use the system more quickly and efficiently. Furthermore, doing so also provides the user with feedback about a state of the device (e.g., the device has successfully authenticated the user).

In some embodiments, subsequent to detecting the gaze (e.g., 710 and/or X710) of the one or more eyes, the computer system collects biometric information corresponding to the one or more eyes. Subsequent to collecting the biometric information corresponding to the one or more eyes (e.g., in response to collecting the biometric information corresponding to the one or more eyes): in accordance with a determination that the biometric information corresponding to the one or more eyes satisfies authentication criteria (e.g., the biometric information corresponding to the one or more eyes matches stored and/or known biometric information corresponding to a known user, a registered user, and/or an authorized user), the computer system displays, via the one or more display generation components, a success visual feedback (e.g., 912) (e.g., a success visual feedback indicative of successful biometric authentication of the one or more eyes). In some embodiments, subsequent to collecting the biometric information corresponding to the one or more eyes: in accordance with a determination that the biometric information corresponding to the one or more eyes does not satisfy the authentication criteria, the computer system forgoes display of the success visual feedback (e.g., 912) (e.g., FIG. 9J, electronic device 700 and/or HMD X700 does not display indication 912). In some embodiments, collecting biometric information corresponding to the one or more eyes is performed in accordance with a determination that the gaze (e.g., 710 and/or X710) of the one or more eyes is directed towards the first user interface object (e.g., 900). Displaying success visual feedback when the user is successfully biometrically authenticated enhances the operability of the system and makes the user-system interface more efficient (e.g., by helping the user to provide proper inputs and reducing errors) which, additionally, reduces power usage and improves battery life of the device by enabling the user to use the system more quickly and efficiently. Furthermore, doing so also provides the user with feedback about a state of the device (e.g., the device has successfully authenticated the user).

In some embodiments, while collecting the biometric information corresponding to the one or more eyes (e.g., FIGS. 9D-9F), the computer system displays, via the one or more display generation components (e.g., 702 and/or X702), progress animation (e.g., animation of gaze target 900 in FIGS. 9D-9F) (e.g., progress animation indicative of the computer system collecting biometric information corresponding to the one or more eyes (e.g., collecting one or more eye scans and/or collecting one or more images of the one or more eyes)). In some embodiments, the first user interface object (e.g., 900) includes a first plurality of lines (e.g., segments making up circles 902*a*-902*d*); and the progress animation includes movement of the first plurality of lines (e.g., in FIGS. 9D-9F, the segments making up circles 902*a*-902*d* are shown moving) (e.g., while maintaining display of the first plurality of lines; while maintaining the same number of lines; and/or while maintaining the same shape and/or length of each line of the first plurality of lines). In some embodiments, the success visual feedback includes changing the first plurality of lines (e.g., three segments in circle 902*b* in FIG. 9D and/or two segments in circle 902*c* in FIG. 9D) to a second plurality of lines different from the first plurality of lines (e.g., two segments in circle 902*b* in FIG. 9E; one segment in circle 902*b* in FIG. 9F; and/or one segment in circle 902*c* in FIG. 9F) (e.g., a second plurality of lines that includes more lines or less lines than the first plurality of lines; or a second plurality of lines that includes the same number of lines as the first plurality of lines but changing the first plurality of lines to the second plurality of lines includes changing the length and/or shape of one or more of the lines in the first plurality of lines). Displaying success visual feedback when the user is successfully biometrically authenticated enhances the operability of the system and makes the user-system interface more efficient (e.g., by helping the user to provide proper inputs and reducing errors) which, additionally, reduces power usage and improves battery life of the device by enabling the user to use the system more quickly and efficiently. Furthermore, doing so also provides the user with feedback about a state of the device (e.g., the device has successfully authenticated the user).

In some embodiments, the second plurality of lines includes a different number of lines (e.g., more lines or less lines) from the first plurality of lines (e.g., in FIG. 9E, circle 902b includes two segments, whereas it previously had three segments in FIG. 9D; in FIG. 9F, circle 902b has one segment, whereas it previously had three segments in FIG. 9D and two segments in FIG. 9E; in FIG. 9F, circle 902d has one segment, whereas it previously had two segments in FIGS. 9D and 9E). Displaying success visual feedback when the user is successfully biometrically authenticated enhances the operability of the system and makes the user-system interface more efficient (e.g., by helping the user to provide proper inputs and reducing errors) which, additionally, reduces power usage and improves battery life of the device by enabling the user to use the system more quickly and efficiently. Furthermore, doing so also provides the user with feedback about a state of the device (e.g., the device has successfully authenticated the user).

In some embodiments, changing the first plurality of lines to a second plurality of lines comprises merging a first line of the first plurality of lines with a second line of the first plurality of lines (e.g., merging two or more lines into one line) (e.g., in FIG. 9E, circle 902b includes two segments, whereas it previously had three segments in FIG. 9D; in FIG. 9F, circle 902b has one segment, whereas it previously had three segments in FIG. 9D and two segments in FIG. 9E; in FIG. 9F, circle 902d has one segment, whereas it previously had two segments in FIGS. 9D and 9E). Displaying success visual feedback when the user is successfully biometrically authenticated enhances the operability of the system and makes the user-system interface more efficient (e.g., by helping the user to provide proper inputs and reducing errors) which, additionally, reduces power usage and improves battery life of the device by enabling the user to use the system more quickly and efficiently. Furthermore, doing so also provides the user with feedback about a state of the device (e.g., the device has successfully authenticated the user).

In some embodiments, the first plurality of lines includes: a first subset of lines with a first number of gaps separating the first subset of lines (e.g., in FIG. 9D, circle 902b includes three segments separated by three gaps); and a second subset of lines with a second number of gaps separating the second subset of lines (e.g., in FIG. 9D, circle 902c includes two segments separated by two gaps), wherein the second number of gaps is different from the first number of gaps (e.g., more gaps or less gaps). In some embodiments, changing the first plurality of lines to the second plurality of lines comprises modifying at least one of the first subset of lines and the second subset of lines so that the first subset of lines and the second subset of lines includes a third number of gaps (e.g., in FIG. 9E, circle 902b is modified to now have two segments separated by two gaps) (e.g., a third number of gaps the same as or different from the first number of gaps; and/or a third number of gaps the same as or different from the second number of gaps) (e.g., modifying at least one of the first subset of lines and the second subset of lines so that the first subset of lines and the second subset of lines has the same number of gaps (and, optionally, the same number of lines)). In some embodiments, subsequent to changing the first plurality of lines to the second plurality of lines (or, in some embodiments, as part of changing the first plurality of lines to the second plurality of lines), the computer system aligns the third number of gaps in the first subset of lines with the third number of gaps in the second subset of lines (e.g., in FIG. 9E, circle 902b and circle 902c are rotated so that the two gaps in circle 902b align with the two gaps in circle 902c) (e.g., such that each gap in the first subset of lines is adjacent to a gap (e.g., a respective gap) in the second subset of lines; and/or each gap in the second subset of lines is adjacent to a gap (e.g., a respective gap) in the first subset of lines). Displaying success visual feedback when the user is successfully biometrically authenticated enhances the operability of the system and makes the user-system interface more efficient (e.g., by helping the user to provide proper inputs and reducing errors) which, additionally, reduces power usage and improves battery life of the device by enabling the user to use the system more quickly and efficiently. Furthermore, doing so also provides the user with feedback about a state of the device (e.g., the device has successfully authenticated the user).

In some embodiments, the first plurality of lines includes one or more lines separated by one or more gaps (e.g., in FIG. 9D, circle 902b includes three segments separated by three gaps); and changing the first plurality of lines to the second plurality of lines comprises combining at least some of the one or more lines to remove the one or more gaps (e.g., in FIG. 9E, circle 902b includes two segments separated by two gaps). Displaying success visual feedback when the user is successfully biometrically authenticated enhances the operability of the system and makes the user-system interface more efficient (e.g., by helping the user to provide proper inputs and reducing errors) which, additionally, reduces power usage and improves battery life of the device by enabling the user to use the system more quickly and efficiently. Furthermore, doing so also provides the user with feedback about a state of the device (e.g., the device has successfully authenticated the user).

In some embodiments, displaying the success visual feedback includes shrinking the size of the first user interface object (e.g., 900 in FIGS. 9F-9G) (e.g., displaying an animation in which the first user interface object is reduced in size). Displaying success visual feedback when the user is successfully biometrically authenticated enhances the operability of the system and makes the user-system interface more efficient (e.g., by helping the user to provide proper inputs and reducing errors) which, additionally, reduces power usage and improves battery life of the device by enabling the user to use the system more quickly and efficiently. Furthermore, doing so also provides the user with feedback about a state of the device (e.g., the device has successfully authenticated the user).

In some embodiments, displaying the success visual feedback includes displaying an animation that includes movement that is representative of an eye blinking (e.g., in FIGS. 9D-9H, the animation of gaze target 900 shrinking and then expanding again is, in some embodiments, representative of an eye blinking and then re-opening) (e.g., movement that looks like an eye blinking; movement in which a first displayed object that is representative of an eye decrease in size and/or moves from a circular and/or ovular shape into a flatter shape and/or a linear shape). In some embodiments, the first user interface object is representative of an eye (e.g., a human eye) (e.g., includes a representation of a pupil, an iris, and/or an eyelid), and the success visual feedback includes animation of the first user interface object in which the first user interface object appears to blink (e.g., decreases in size, and/or changes from a circular and/or ovular shape into a flatter shape and/or a linear shape). Displaying success visual feedback when the user is successfully biometrically authenticated enhances the operability of the system and makes the user-system interface more efficient (e.g., by helping the user to provide proper inputs and reducing errors) which, additionally, reduces power usage and improves battery life of the device by enabling the user to use the system more quickly and efficiently. Furthermore, doing so also provides the user with feedback about a state of the device (e.g., the device has successfully authenticated the user).

In some embodiments, while the first user interface object (e.g., 900) is displayed, an augmented reality passthrough environment (e.g., 708) is visible via the one or more display generation components (e.g., 702 and/or X702) concurrently with the first user interface object (e.g., 900). In some embodiments, the augmented reality passthrough environment (e.g., 708) is an optical passthrough environment, and the augmented reality passthrough environment is a physical environment that is visible through transparent display generation components (e.g., 702 and/or X702) (e.g., while the first user interface object is being displayed by at least some of the transparent display generation components) without the display generation components displaying the augmented reality passthrough environment. In some embodiments, the augmented reality passthrough environment (e.g., 708) is a virtual passthrough environment, and the augmented reality passthrough environment is displayed by the one or more display generation components (e.g., 702 and/or X702) concurrently with the first user interface object (e.g., 900). Having an augmented reality passthrough environment be visible concurrently with the first user interface object improves user safety by allowing a user to view his or her environment while biometric authentication is taking place.

In some embodiments, while displaying the first user interface object (e.g., 900), an augmented reality passthrough environment (e.g., 708) is not visible via the one or more display generation components (e.g., in some embodiments, in FIGS. 9A-9H, three-dimensional environment 708 is not visible via display 702 and/or display X702); and subsequent to displaying the first user interface object (e.g., 900) (e.g., after the first user interface object is no longer displayed) (in some embodiments, after successful authentication of the one or more eyes), the augmented reality passthrough environment (e.g., 708) is visible via the one or more display generation components (e.g., 702 and/or X702). In some embodiments, the augmented reality passthrough environment (e.g., 708) is an optical passthrough environment, and the augmented reality passthrough environment is a physical environment that is visible through transparent display generation components without the display generation components (e.g., 702 and/or X702) displaying the augmented reality passthrough environment (e.g., 708). In some embodiments, the augmented reality passthrough environment (e.g., 708) is a virtual passthrough environment, and the augmented reality passthrough environment (e.g., 708) is displayed by the one or more display generation components (e.g., 702 and/or X702) including a video feed that corresponds to a field of view of one or more cameras. Having a passthrough environment not be visible during biometric authentication, and then having the passthrough environment be visible after biometric authentication enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, aspects/operations of methods 800, 1000, 1200, 1400, and/or 1600 may be interchanged, substituted, and/or added between these methods. For example, in some embodiments, enrolling the one or more eyes of a person in method 800 can be performed in order to perform eye-based biometric authentication of the person in methods 1000, 1200, and/or 1400; and/or in some embodiments, the spatial transition animation in method 1600 is performed in response to user authentication (e.g., as recited in methods 1000 and/or 1400). For brevity, these details are not repeated here.

FIGS. 11A-11I illustrate examples of representing a user. FIG. 12 is a flow diagram of an exemplary method 1200 for representing a user. The user interfaces in FIGS. 11A-11I are used to illustrate the processes described below, including the processes in FIG. 12.

Figure 11A:
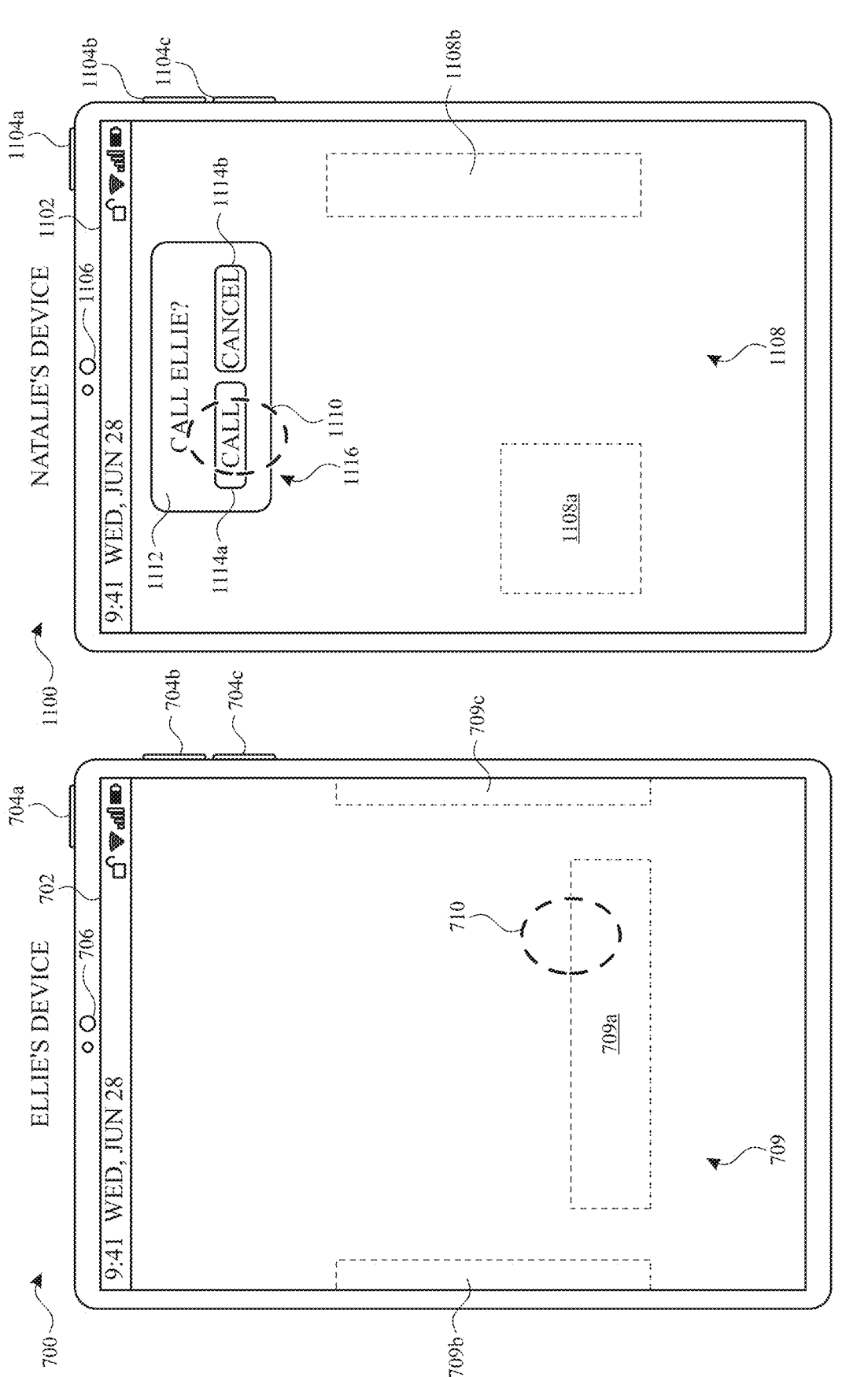

FIG. 11A depicts electronic device 700, which is a tablet that includes touch-sensitive display 702, buttons 704a-704c, and one or more input sensors 706 (e.g., one or more cameras, eye gaze trackers, hand movement trackers, and/or head movement trackers). In some embodiments described below, electronic device 700 is a tablet. In some embodiments, electronic device 700 is a smartphone, a wearable device, a wearable smartwatch device, a head-mounted system (e.g., headset), or other computer system that includes and/or is in communication with one or more display devices (e.g., display screens and/or projection devices). In some embodiments in which electronic device 700 is a head-mounted system, electronic device 700 optionally includes two displays (e.g., one for each eye of a user), with each display displaying respective various content, to enable a user of electronic device 700 to perceive the various depths of the various content (e.g., physical objects and/or virtual objects) of three-dimensional environments. Electronic device 700 is a computer system (e.g., computer system 101 in FIG. 1A).

FIG. 11A also depicts electronic device 1100, which is a tablet that includes touch-sensitive display 1102, buttons 1104a-1104c, and one or more input sensors 1106 (e.g., one or more cameras, eye gaze trackers, hand movement trackers, and/or head movement trackers). In some embodiments described below, electronic device 1100 is a tablet. In some embodiments, electronic device 1100 is a smartphone, a wearable device, a wearable smartwatch device, a head-mounted system (e.g., headset), or other computer system that includes and/or is in communication with one or more display devices (e.g., display screens and/or projection devices). In some embodiments in which electronic device 1100 is a head-mounted system, electronic device 1100 optionally includes two displays (e.g., one for each eye of a user), with each display displaying respective various content, to enable a user of electronic device 700 to perceive the various depths of the various content (e.g., physical objects and/or virtual objects) of three-dimensional environments. Electronic device 1100 is a computer system (e.g., computer system 101 in FIG. 1A).

In FIG. 11A, electronic device 700 corresponds to a registered user named Ellie that is being used by a first current user who may or may not be Ellie, while electronic device 1100 corresponds to a registered user named Natalie that is currently being used by a second current user who may or may not be Natalie. Electronic device 700 displays three-dimensional environment 709, while electronic device 1100 displays user interface 1112 overlaid on three-dimensional environment 1108. In the depicted scenario, three-dimensional environment 709 includes objects 709a-709c and three-dimensional environment 1108 includes objects 1108a-1108b. In some embodiments, objects 709a-709c are three-dimensional objects that are spatially arranged around three-dimensional environment 709, and objects 1108a-1108b are three-dimensional objects that are spatially arranged around three-dimensional environment 1108. For example, in some embodiments, objects 709a-709c are physical objects that are physically positioned around physical environment 709 and, similarly, in some embodiments, objects 1108a-1108b are physical objects that are physical positioned around physical environment 1108. In some embodiments, objects 709a-709c are three-dimensional virtual objects that are positioned in different spatial positions within virtual environment 709 and, similarly, in some embodiments, objects 1108a-1108b are three-dimensional virtual objects that are positioned in different spatial positions within virtual environment 1108. In some embodiments, as the viewpoint of the user of electronic device 700 changes (and/or, as the viewpoint of electronic device 700 changes) (e.g., as the user turns his or her head while electronic device 700 is worn on the user's head), different objects within three-dimensional environment 709 come into view of the user and/or electronic device 700 while certain objects exit the viewpoint of the user and/or electronic device 700. Similarly, as the viewpoint of the user of electronic device 1100 changes (and/or, as the viewpoint of electronic device 1100 changes) (e.g., as the user turns his or her head while electronic device 1100 is worn on the user's head), different objects within three-dimensional environment 1108 come into view of the user and/or electronic device 1100 while certain objects exit the viewpoint of the user and/or electronic device 1100. In some embodiments, three-dimensional environment 709 and/or three-dimensional environment 1108 are displayed by a display (e.g., display 702 and/or display 1102, as depicted in FIG. 11A). In some embodiments, three-dimensional environment 709 and/or three-dimensional environment 1108 include virtual environments or images (or video) of physical environments captured by one or more cameras (e.g., one or more cameras that are part of input sensors 706 and/or one or more external cameras of electronic device 700; and/or one or more cameras that are part of input sensors 1106 and/or one or more external cameras or electronic device 1100). For example, in some embodiments, object 709a is a virtual object that is representative of a physical object that has been captured by one or more cameras and/or detected by one or more sensors of electronic device 700; object 709b is a virtual object that is representative of a second physical object that has been captured by one or more cameras and/or detected by one or more sensors of electronic device 700; object 1108a is a virtual object that is representative of a third physical object that has been captured by one or more cameras and/or detected by one or more sensors of electronic device 1100; and/or object 1108b is a virtual object that is representative of a fourth physical object that has been captured by one or more cameras and/or detected by one or more sensors of electronic device 1100, and so forth. In some embodiments, three-dimensional environment 709 is visible to a user of electronic device 700 (e.g., via display 702) and/or three-dimensional environment 1108 is visible to a user of electronic device 1100 (e.g., via display 1102), but are not displayed by a display. For example, in some embodiments, three-dimensional environment 709 is a physical environment (and, for example, objects 709a-709c are physical objects) that is visible to a user (e.g., through one or more transparent displays 702) without being displayed by a display; and/or, in some embodiments, three-dimensional environment 1108 is a physical environment (and, for example, objects 1108a-1108b are physical objects) that is visible to a user (e.g., through one or more transparent displays 1102) without being displayed by a display. In some embodiments, three-dimensional environment 709 is part of an extended reality experience; and/or user interface 1112 and three-dimensional environment 1108 are part of an extended reality experience.

In FIG. 11A, user interface 1112 includes option 1114a that is selectable by a user of electronic device 1100 to initiate and/or request a communication session (e.g., a real-time communication session) with the user of electronic device 700, as well as option 1114b that is selectable to cease display of user interface 1112 (e.g., without initiating and/or requesting a communication session with the user of electronic device 700). In FIG. 11A, electronic device 700 detects (e.g., via one or more sensors 706) that the gaze of the user of electronic device 700 is directed to object 709a, as indicated by gaze indication 710. In FIG. 11A, electronic device 1100 detects (e.g., via one or more sensors 1106) that the gaze of the user of electronic device 1100 is directed to object 1114a, as indicated by gaze indication 1110. At FIG. 11A, electronic device 1100 detects user input 1116 corresponding to selection of option 1114a. In some embodiments, user input 1116 is a tap input on display 1102 corresponding to selection of option 1114a. However, in some embodiments, user input 1116 is a different type of user input, such as a gesture or other action taken by a user. For example, in some embodiments, electronic device 1100 is a head-mounted system, and detecting user input 1116 includes, for example, detecting a user performing a gesture (e.g., an air gesture (e.g., an air tap gesture and/or an air pinch gesture)) while electronic device 1100 is worn, detecting a button press while electronic device 1100 is worn, detecting rotation of a rotatable input mechanism while electronic device 1100 is worn, detecting a gaze-based gesture (e.g., detecting the user looking at an object (e.g., as shown by gaze indication 1110 in FIG. 11A) and/or moving his or her gaze in a particular manner), and/or any combination of the foregoing (e.g., detecting a gaze at object 1114a (e.g., as shown by gaze indication 1110 in FIG. 11A) in conjunction with an air pinch gesture).

Figure 11B:
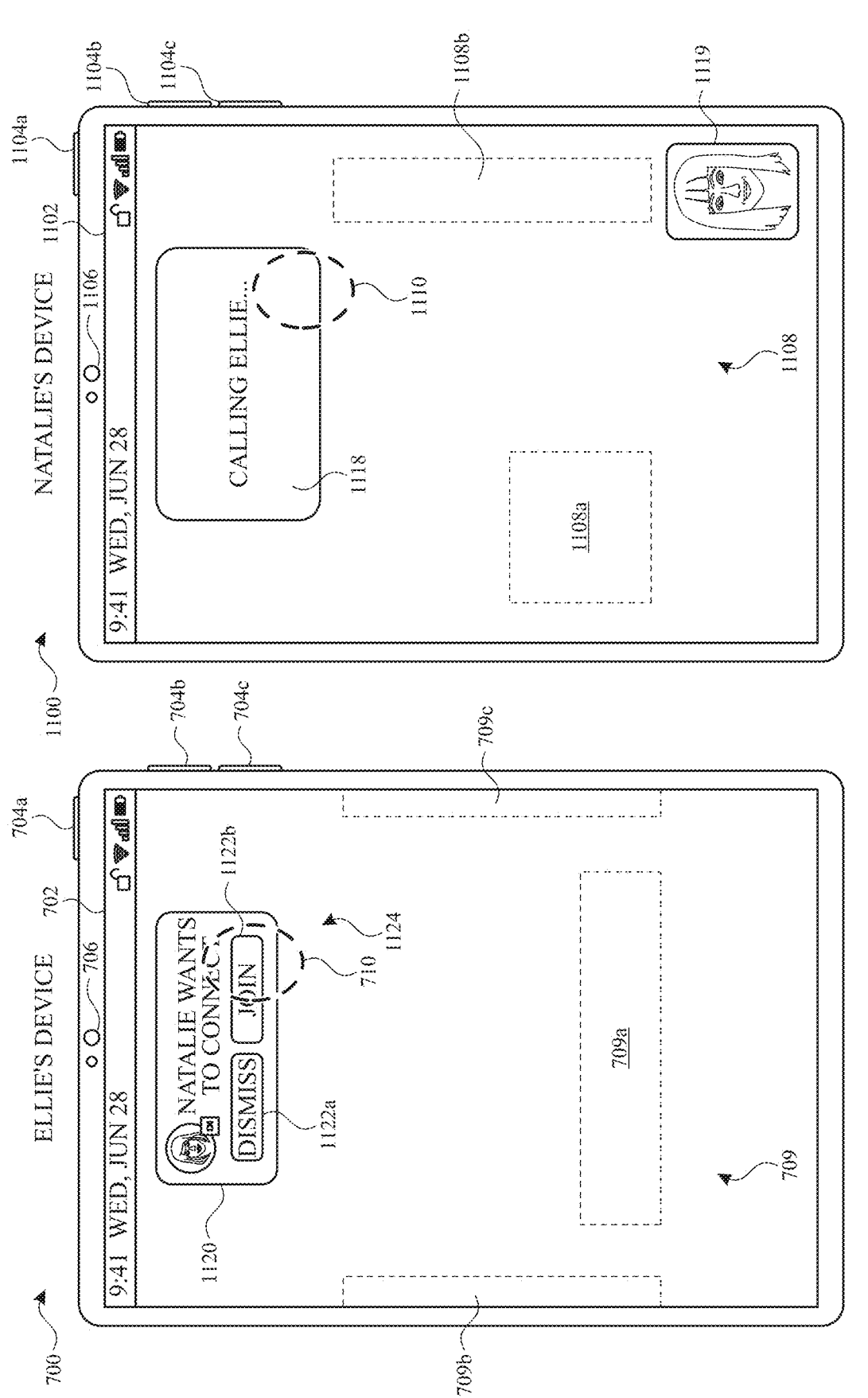

At FIG. 11B, in response to detecting user input 1116, electronic device 1100 displays user interface 1118, and transmits a request to electronic device 700 to initiate a communication session. At FIG. 11B, in response to receiving the request from electronic device 1100, electronic device 700 displays user interface 1120, indicating that the user of electronic device 1100 has requested a communication session. User interface 1120 includes option 1122a that is selectable to cease display of user interface 1120 without joining in a communication session with electronic device 1100, and option 1122b that is selectable to agree to the communication session with electronic device 1100 (e.g., selectable to initiate the communication session with electronic device 1100). At FIG. 11B, electronic device 700 detects user input 1124, corresponding to selection of option 1122b. In some embodiments, user input 1124 is a tap input on display 702 corresponding to selection of option 1122b. However, in some embodiments, user input 1124 is a different type of user input, such as a gesture or other action taken by a user. For example, in some embodiments, electronic device 700 is a head-mounted system, and detecting user input 1124 includes, for example, detecting a user performing a gesture (e.g., an air gesture (e.g., an air tap gesture and/or an air pinch gesture)) while electronic device 700 is worn, detecting a button press while electronic device 700 is worn, detecting rotation of a rotatable input mechanism while electronic device 700 is worn, detecting a gaze-based gesture (e.g., detecting the user looking at an object (e.g., as shown by gaze indication 710 in FIG. 11B) and/or moving his or her gaze in a particular manner), and/or any combination of the foregoing (e.g., detecting a gaze at object 1122*b* (e.g., as shown by gaze indication 710 in FIG. 11B) in conjunction with an air pinch gesture).

Figure 11C:
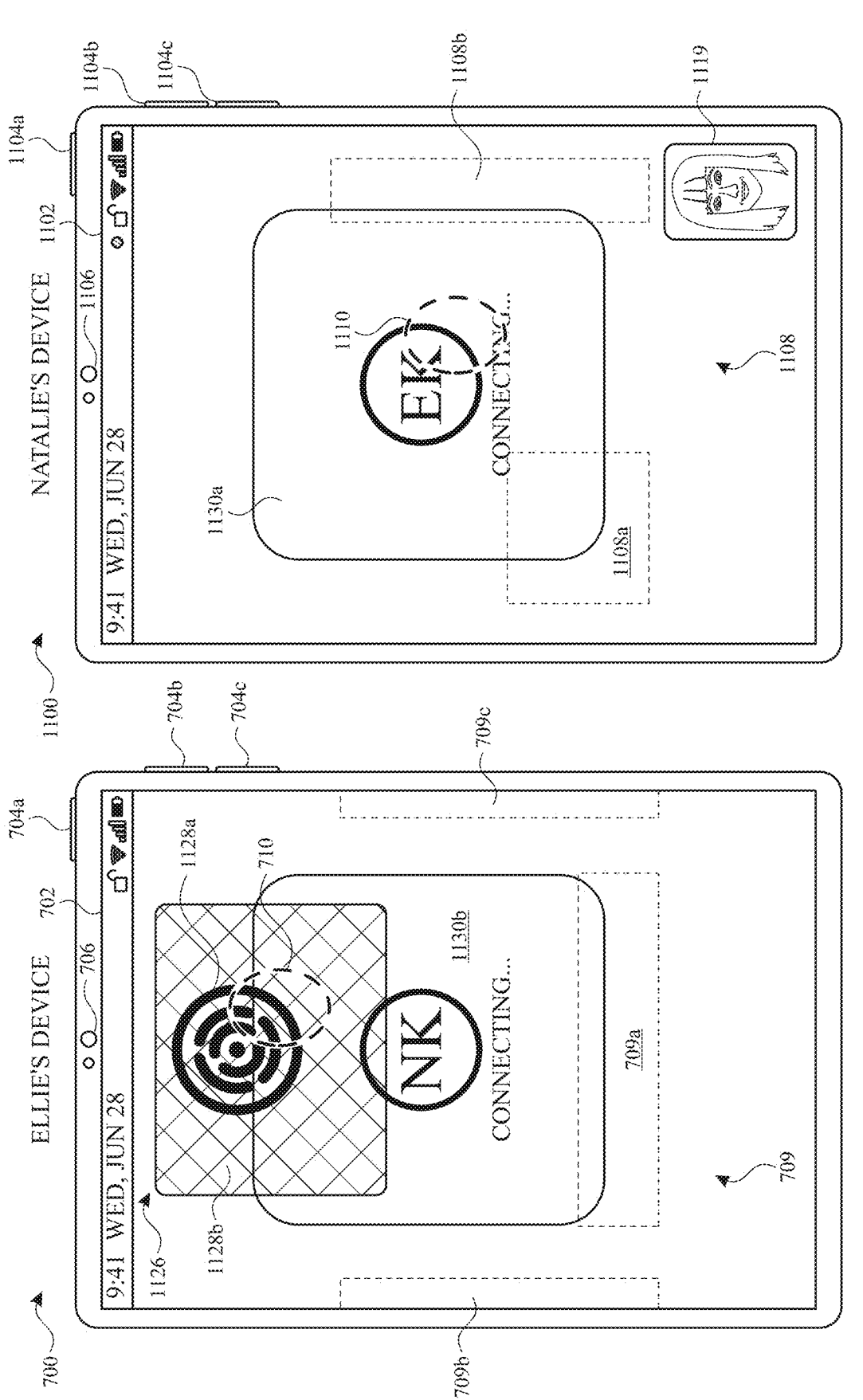

At FIG. 11C, in response to detecting user input 1124, electronic device 700 displays user interface 1126 and user interface 1130*b*, and also transmits an indication to electronic device 1100 that the user of electronic device 700 has accepted the request to initiate a communication session. At FIG. 11C, in response to receiving the indication that the user of electronic device 700 has accepted the request to initiate the communication session, electronic device 1100 displays user interface 1130*a* and self-view representation 1119.

In the depicted scenario, in FIG. 11C, the user of electronic device 1100 has been authenticated on electronic device 1100 as being a registered user named Natalie. For example, in some embodiments, the user of electronic device 1100 has been authenticated using biometric authentication (e.g., eye-based authentication and/or face-based authentication). However, in FIG. 11C, the user of electronic device 700 has not been authenticated on electronic device 700 and/or has not been authenticated on electronic device 700 using a particular type of authentication (e.g., biometric authentication). For example, in some embodiments, the user of electronic device 700 has been authenticated using passcode-based authentication, but has not been authenticated using biometric authentication. In some embodiments, the user of electronic device 700 has not been authenticated using any type of authentication. Based on a determination that the user of electronic device 700 has not been authenticated on electronic device 700 (and/or, based on a determination that the user of electronic device 700 has not been authenticated on electronic device 700 using the particular type of authentication), electronic device 700 displays user interface 1126, which includes gaze target 1128*a* overlaid on background 1128*b*. Gaze target 1128*a* is similar to gaze target 900 of FIGS. 9A-9H and, in various embodiments, the features described above with respect to gaze target 900 are applicable to gaze target 1128*a*. In the depicted embodiments, gaze target 1128*a* is depicted as multiple concentric circles. In some embodiments, gaze target 1128*a* includes two or more concentric shapes (e.g., two or more concentric circles) inside of an outline of a representation of a biometric feature (e.g., a representation of an eye and/or other biometric feature). For example, in some embodiments, the outermost shape and/or outline of gaze target 1128*a* is representative of an eye (e.g., is in the shape of an eye), and two or more concentric shapes (e.g., concentric circles and/or other concentric shapes) are positioned within the representation of the eye. In some embodiments, a first set of the two or more concentric shapes represent an iris of the eye. In some embodiments, a second set of the two or more concentric shapes represent a pupil of the eye. In some embodiments, gaze target 1128*a* is displayed as part of a biometric authentication process. When the user of electronic device 700 looks at gaze target 1128*a* (as is the case in FIG. 11C, as indicated by gaze indication 710), electronic device 700 collects biometric information from the user (e.g., one or more eye scans and/or one or more face scans) in order to attempt biometric authentication of the user.

In FIG. 11C, based on a determination that the user of electronic device 1100 has already been authenticated on electronic device 1100 (e.g., using the particular type of authentication (e.g., biometric authentication and/or eye-based biometric authentication)), electronic device 1100 does not display a gaze target for biometric authentication of the user. However, had the user of electronic device 1100 also not been authenticated on electronic device 1100 using the particular type of authentication, in some embodiments, electronic device 1100 would also display a gaze target such as gaze target 1128*a* in order to perform biometric authentication of the user of electronic device 1100. Furthermore, based on a determination that the user of electronic device 1100 has been authenticated on electronic device 1100 (e.g., using the particular type of authentication), electronic device 1100 displays self view representation 1119, which provides the user of electronic device 1100 with a preview of how the user of electronic device 1100 will be seen and/or visually represented on electronic device 700 and/or within the communication session. At FIG. 11C, based on a determination that the user of electronic device 700 is looking at gaze target 1128*a*, electronic device 700 collects biometric information from the user of electronic device 700 and attempts biometric authentication of the user.

Figure 11D:
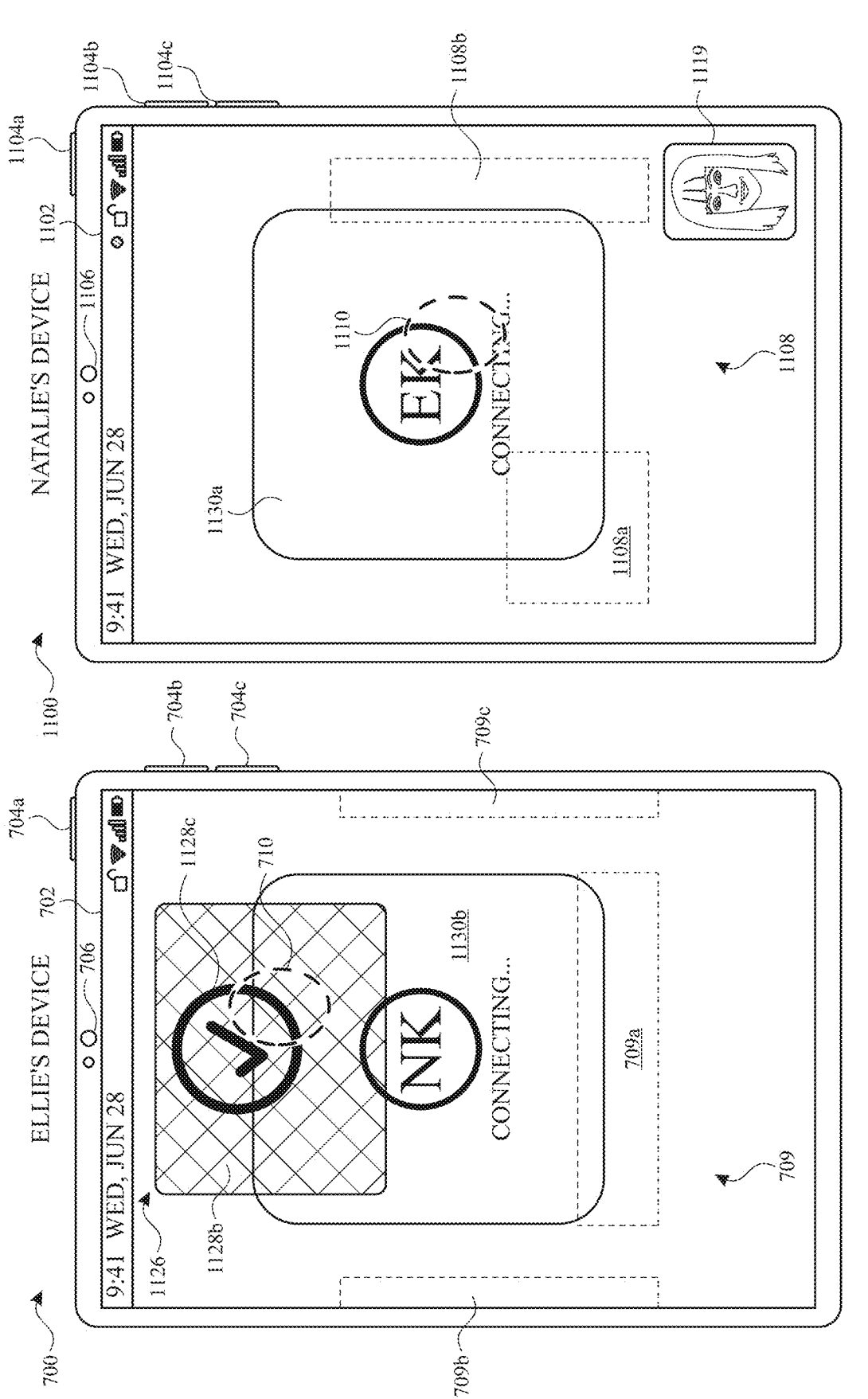
Figure 11E:
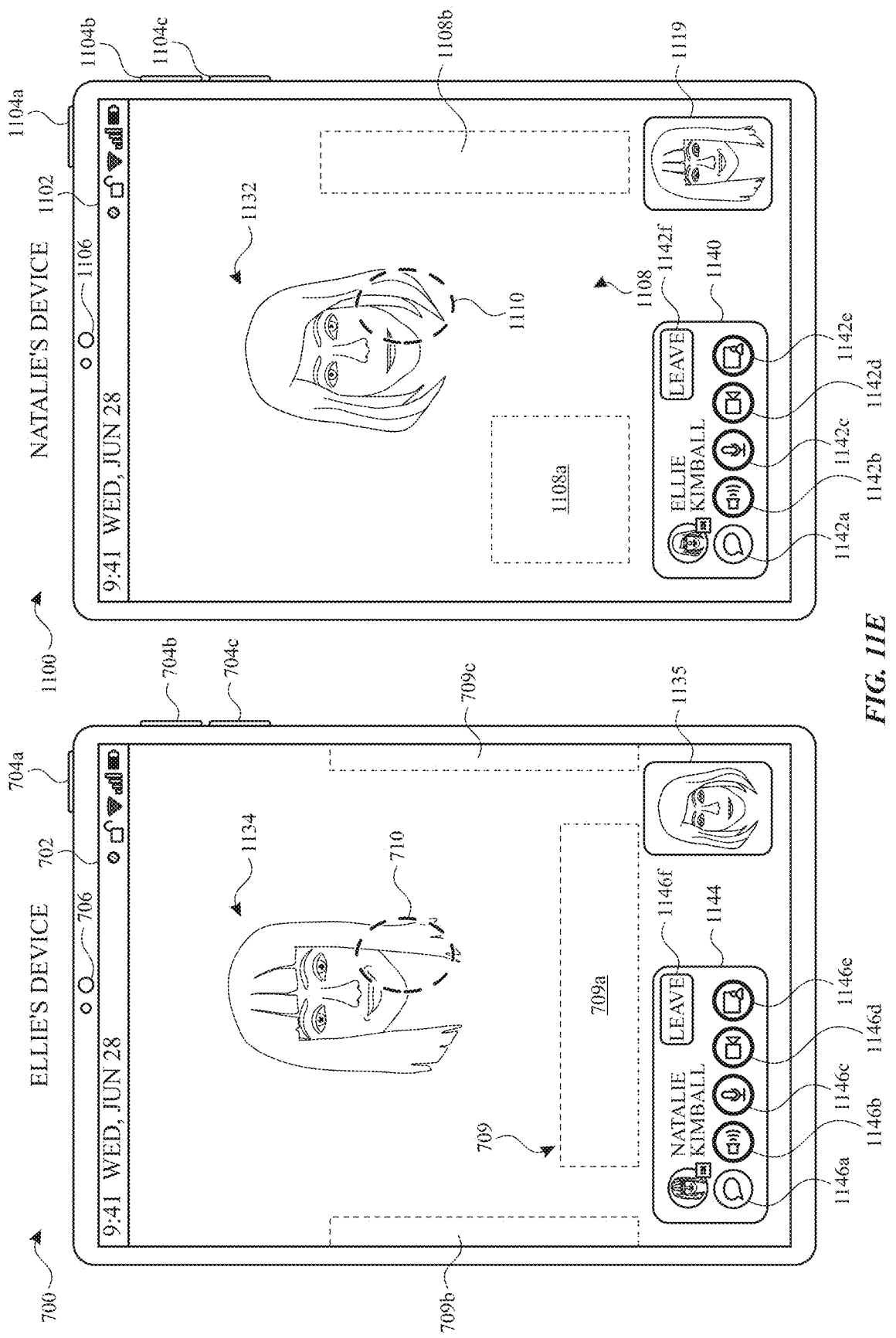

FIGS. 11D-11E depict a first example scenario in which biometric authentication of the user of electronic device 700 is successful. For example, in the depicted scenario, the user of electronic device 700 is successfully authenticated, and electronic device 700 has identified the user as a registered user named Ellie. At FIG. 11D, based on a determination that biometric authentication of the user of electronic device 700 is successful, electronic device 700 displays success indication 1128*c*. Then, at FIG. 11E, based on the determination that biometric authentication of the user of electronic device 700 is successful, electronic device 700 proceeds with using visual representation 1132 of the user of electronic device 700 (e.g., Ellie) to represent the user of electronic device 700 within the real-time communication session. Furthermore, based on the determination that biometric authentication of the user of electronic device 700 is successful, electronic device 1100 displays visual representation 1132 of the user of electronic device 700. In some embodiments, visual representation 1132 includes an anthropomorphic representation of a registered user of the device. In some embodiments, when the user of electronic device 700 is recognized and/or identified as a registered user of electronic device 700 (e.g., based on biometric authentication and/or identification), electronic device 700 permits use of visual representation 1132 that includes an anthropomorphic representation of the registered user. In some embodiments, when the user of electronic device 700 is not the registered user of the device and/or is not identified as the registered user of electronic device 700, electronic device 700 does not permit use of visual representation 1132 that includes an anthropomorphic representation of the registered user. In some embodiments, visual representation 1132 includes an avatar that has a face that moves based on movement of a face of a current user of the computer system and/or a virtual avatar that is generated based on an appearance of the user of electronic device 700 using image-based and/or sensor-based user information corresponding to the current user of electronic device 700. In some embodiments, visual representation 1132 moves (e.g., within three-dimensional environment 1108 and/or within the real-time communication session) based on physical movements made by the user of electronic device 700.

Similarly, in FIG. 11E, based on a determination that the user of electronic device 1100 has been authenticated on electronic device 1100 (e.g., using the particular type of authentication (e.g., biometric authentication and/or eye-based biometric authentication)), electronic device 1100 proceeds with using visual representation 1134 of the user of electronic device 1100 (e.g., Natalie) to represent the user of electronic device 1100 within the real-time communication session, and electronic device 700 displays visual representation 1134 of the user of electronic device 1100. In some embodiments, visual representation 1134 includes an anthropomorphic representation of a registered user of the device; an avatar that has a face that moves based on movement of a face of a current user of the computer system and/or a virtual avatar that is generated based on an appearance of the user of electronic device 1100 (e.g., Natalie) using image-based and/or sensor-based user information corresponding to the user of electronic device 1100. In some embodiments, visual representation 1134 moves (e.g., within three-dimensional environment 709 and/or within the real-time communication session) based on physical movements made by the user of electronic device 1100.

In FIG. 11E, electronic device 700 displays self-view representation 1135 that provides the user of electronic device 700 with a preview of how the user of electronic device 700 is visually represented on electronic device 1100 and/or within the real-time communication session. Electronic device 700 also displays options 1146a-1146f. Option 1146a is selectable to cause electronic device 700 to open a text messaging user interface for the user of electronic device 700 to transmit text messages to electronic device 1100 (and/or to the user of electronic device 1100) and/or to read text messages that have been received from the user of electronic device 1100. Option 1146b is selectable to modify the volume on electronic device 700. Option 1146c is selectable to turn a speakerphone function of electronic device 700 on or off. Option 1146d is selectable to turn off the camera of electronic device 700, cease transmitting video information from electronic device 700 into the real-time communication session, and/or to cease use of visual representation 1132 to represent the user of electronic device 700 within the real-time communication session. Option 1146e is selectable to share the screen of electronic device 700 into the real-time communication session. Option 1146f is selectable to end the real-time communication session.

Similarly, electronic device 1100 displays options 1142a-1142f, which correspond to options 1146a-1146f displayed on electronic device 700. Option 1142a is selectable to cause electronic device 1100 to open a text messaging user interface for the user of electronic device 1100 to transmit text messages to electronic device 700 (and/or to the user of electronic device 700) and/or to read text messages that have been received from the user of electronic device 700. Option 1142b is selectable to modify the volume on electronic device 1100. Option 1142c is selectable to turn a speakerphone function of electronic device 1100 on or off. Option 1142d is selectable to turn off the camera of electronic device 1100, cease transmitting video information from electronic device 1100 into the real-time communication session, and/or to cease use of visual representation 1134 to represent the user of electronic device 1100 within the real-time communication session. Option 1142e is selectable to share the screen of electronic device 1100 into the real-time communication session. Option 1142f is selectable to end the real-time communication session.

FIGS. 11F1-11G depict an alternative scenario in which biometric authentication of the user of electronic device 700 in FIG. 11C is not successful. In FIG. 11F1, based on a determination that biometric authentication of the user of electronic device 700 is not successful, electronic device 700 displays indication 1141, and does not use visual representation 1132 to represent the user of electronic device 700 within the real-time communication session. Instead, electronic device 700 uses alternative representation 1136 to represent the user of electronic device 700 in the real-time communication session, and electronic device 1100 displays alternative representation 1136 to represent the user of electronic device 700 in the real-time communication session. Alternative representation 1136 includes a default shape 1138a (e.g., a circle, square, cylinder, sphere, or amorphous blob) and/or a textual identifier (e.g., a monogram, and/or a text identifier 1138b) to represent a current user of electronic device 700. In some embodiments, alternative representation 1136 is not an image-based and/or sensor based representation (e.g., is not generated based on image-based information corresponding to the user of electronic device 700), is not an anthropomorphic avatar, and/or does not move based on movements by the user of electronic device 700 (e.g., does not move within three-dimensional environment 709 and/or 1108 based on physical movements by the current user of electronic device 700, and/or does not change visual characteristics based on movements by the current user of electronic device 700 (e.g., facial movements, hand movements, arm movements, and/or head movements)). In some embodiments, alternative representation 1136 is spatially positioned within three-dimensional environment 1108. In some embodiments, alternative representation 1136 is spatially positioned within three-dimensional environment 1108, but does not move within three-dimensional environment 1108 based on movements by the current user of electronic device 700. In some embodiments, alternative representation 1136 is spatially positioned within three-dimensional environment 1108, and moves within three-dimensional environment 1108 based on a first type of movement by the current user of electronic device 700 (e.g., movement in which the current user of electronic device 700 changes his or her physical position within an environment), but does not change visual characteristics based on other movements by the current user of electronic device 700 (e.g., movements that are not the first type of movement) (e.g., facial movements, hand movements, arm movements, and/or head movements). In some embodiments, selection of option 1146d in FIG. 11E would cause electronic device 700 to use alternative representation 1136 to represent the user of electronic device 700 within the real-time communication session instead of visual representation 1132. Although the user of electronic device 700 is being represented with a different visual representation based on failed biometric authentication of that user, the user of electronic device 1100 is still represented using visual representation 1134 because that user has been biometrically authenticated on electronic device 1100 (e.g., as discussed above with reference to FIG. 11B).

At FIG. 11F1, electronic device 700 detects user input 1145 corresponding to selection of option 1146d, and corresponding to a user request to start using visual representation 1132 to represent the user of electronic device 700 within the real-time communication session. In some embodiments, user input 1145 is a tap input on display 702 corresponding to selection of option 1146d. However, in some embodiments, user input 1145 is a different type of user input, such as a gesture or other action taken by a user. For example, in some embodiments, electronic device 700 is a head-mounted system, and detecting user input 1145 includes, for example, detecting a user performing a gesture (e.g., an air gesture (e.g., an air tap gesture and/or an air pinch gesture)) while electronic device 700 is worn, detecting a button press while electronic device 700 is worn, detecting rotation of a rotatable input mechanism while electronic device 700 is worn, detecting a gaze-based gesture (e.g., detecting the user looking at an object (e.g., as shown by gaze indication 710 in FIG. 11F1) and/or moving his or her gaze in a particular manner), and/or any combination of the foregoing (e.g., detecting a gaze at object 1146*d* (e.g., as shown by gaze indication 710 in FIG. 11F1) in conjunction with an air pinch gesture).

In some embodiments, the techniques and user interface(s) described in FIGS. 11A-11I are provided by one or more of the devices described in FIGS. 1A-1P. For example, FIG. 11F2 illustrates an embodiment in which alternative representation 1136 (e.g., as described in FIG. 11F1) is displayed on display module X702 of head-mounted device (HMD) X700. In some embodiments, HMD X700 includes a pair of display modules that provide stereoscopic content to different eyes of the same user. For example, HMD X700 includes display module X702 (which provides content to a left eye of the user) and a second display module (which provides content to a right eye of the user). In some embodiments, the second display module displays a slightly different image than display module X702 to generate the illusion of stereoscopic depth.

FIG. 11F2 depicts a scenario in which biometric authentication of the user of HMD X700 is not successful. In FIG. 11F2, based on a determination that biometric authentication of the user of HMD X700 is not successful, HMD X700 displays indication 1141, and does not use visual representation 1132 to represent the user of HMD X700 within the real-time communication session. Instead, HMD X700 uses alternative representation 1136 to represent the user of HMD X700 in the real-time communication session, and HMD X1100 displays alternative representation 1136 to represent the user of HMD X700 in the real-time communication session. Alternative representation 1136 includes a default shape 1138*a* (e.g., a circle, square, cylinder, sphere, or amorphous blob) and/or a textual identifier (e.g., a monogram, and/or a text identifier 1138*b*) to represent a current user of HMD X700. In some embodiments, alternative representation 1136 is not an image-based and/or sensor based representation (e.g., is not generated based on image-based information corresponding to the user of HMD X700), is not an anthropomorphic avatar, and/or does not move based on movements by the user of HMD X700 (e.g., does not move within three-dimensional environment 709 and/or 1108 based on physical movements by the current user of HMD X700, and/or does not change visual characteristics based on movements by the current user of HMD X700 (e.g., facial movements, hand movements, arm movements, and/or head movements)). In some embodiments, alternative representation 1136 is spatially positioned within three-dimensional environment 1108. In some embodiments, alternative representation 1136 is spatially positioned within three-dimensional environment 1108, but does not move within three-dimensional environment 1108 based on movements by the current user of HMD X700. In some embodiments, alternative representation 1136 is spatially positioned within three-dimensional environment 1108, and moves within three-dimensional environment 1108 based on a first type of movement by the current user of HMD X700 (e.g., movement in which the current user of HMD X700 changes his or her physical position within an environment), but does not change visual characteristics based on other movements by the current user of HMD X700 (e.g., movements that are not the first type of movement) (e.g., facial movements, hand movements, arm movements, and/or head movements). In some embodiments, selection of option 1146*d* in FIG. 11E would cause HMD X700 to use alternative representation 1136 to represent the user of HMD X700 within the real-time communication session instead of visual representation 1132. Although the user of HMD X700 is being represented with a different visual representation based on failed biometric authentication of that user, the user of HMD X1100 is still represented using visual representation 1134 because that user has been biometrically authenticated on HMD X1100 (e.g., as discussed above with reference to FIG. 11B).

At FIG. 11F2, HMD X700 detects user input X1145 corresponding to selection of option 1146*d*, and corresponding to a user request to start using visual representation 1132 to represent the user of HMD X700 within the real-time communication session. In some embodiments, user input X1145 is an air gesture performed by a user of HMD X700. In some embodiments, HMD X700 detects hands X750A and/or X750B of the user of HMD X700 and determines whether motion of hands X750A and/or X750B perform a predetermined air gesture corresponding to selection of option 1146*d*. In some embodiments, the predetermined air gesture selecting option 1146*d* includes a pinch gesture. In some embodiments, the pinch gesture includes detecting movement of finger X750C and thumb X750D toward one another. In some embodiments, HMD X700 detects selection of option 1146*d* based on a gaze and air gesture input performed by the user of HMD X700. In some embodiments, the gaze and air gesture input includes detecting that the user of HMD X700 is looking at option 1146*d* (e.g., for more than a predetermined amount of time) and hands X750A and/or X750B of the user of HMD X700 perform a pinch gesture.

Any of the features, components, and/or parts, including the arrangements and configurations thereof shown in FIGS. 1B-1P can be included, either alone or in any combination, in HMD X700. For example, in some embodiments, HMD X700 includes any of the features, components, and/or parts of HMD 1-100, 1-200, 3-100, 6-100, 6-200, 6-300, 6-400, 11.1.1-100, and/or 11.1.2-100, either alone or in any combination. In some embodiments, display module X702 includes any of the features, components, and/or parts of display unit 1-102, display unit 1-202, display unit 1-306, display unit 1-406, display generation component 120, display screens 1-122*a-b*, first and second rear-facing display screens 1-322*a*, 1-322*b*, display 11.3.2-104, first and second display assemblies 1-120*a*, 1-120*b*, display assembly 1-320, display assembly 1-421, first and second display sub-assemblies 1-420*a*, 1-420*b*, display assembly 3-108, display assembly 11.3.2-204, first and second optical modules 11.1.1-104*a* and 11.1.1-104*b*, optical module 11.3.2-100, optical module 11.3.2-200, lenticular lens array 3-110, display region or area 6-232, and/or display/display region 6-334, either alone or in any combination. In some embodiments, HMD X700 includes a sensor that includes any of the features, components, and/or parts of any of sensors 190, sensors 306, image sensors 314, image sensors 404, sensor assembly 1-356, sensor assembly 1-456, sensor system 6-102, sensor system 6-202, sensors 6-203, sensor system 6-302, sensors 6-303, sensor system 6-402, and/or sensors 11.1.2-110*a-f*, either alone or in any combination. In some embodiments, HMD X700 includes one or more input devices, which can include any of the features, components, and/or parts of any of first button 1-128, button 11.1.1-114, second button 1-132, and or dial or button 1-328, either alone or in any combination. In some embodiments, HMD X700 includes one or more audio output components (e.g., electronic component 1-112) for generating audio feedback (e.g., audio output), optionally generated based on detected events and/or user inputs detected by the HMD X700.

Figure 11G:
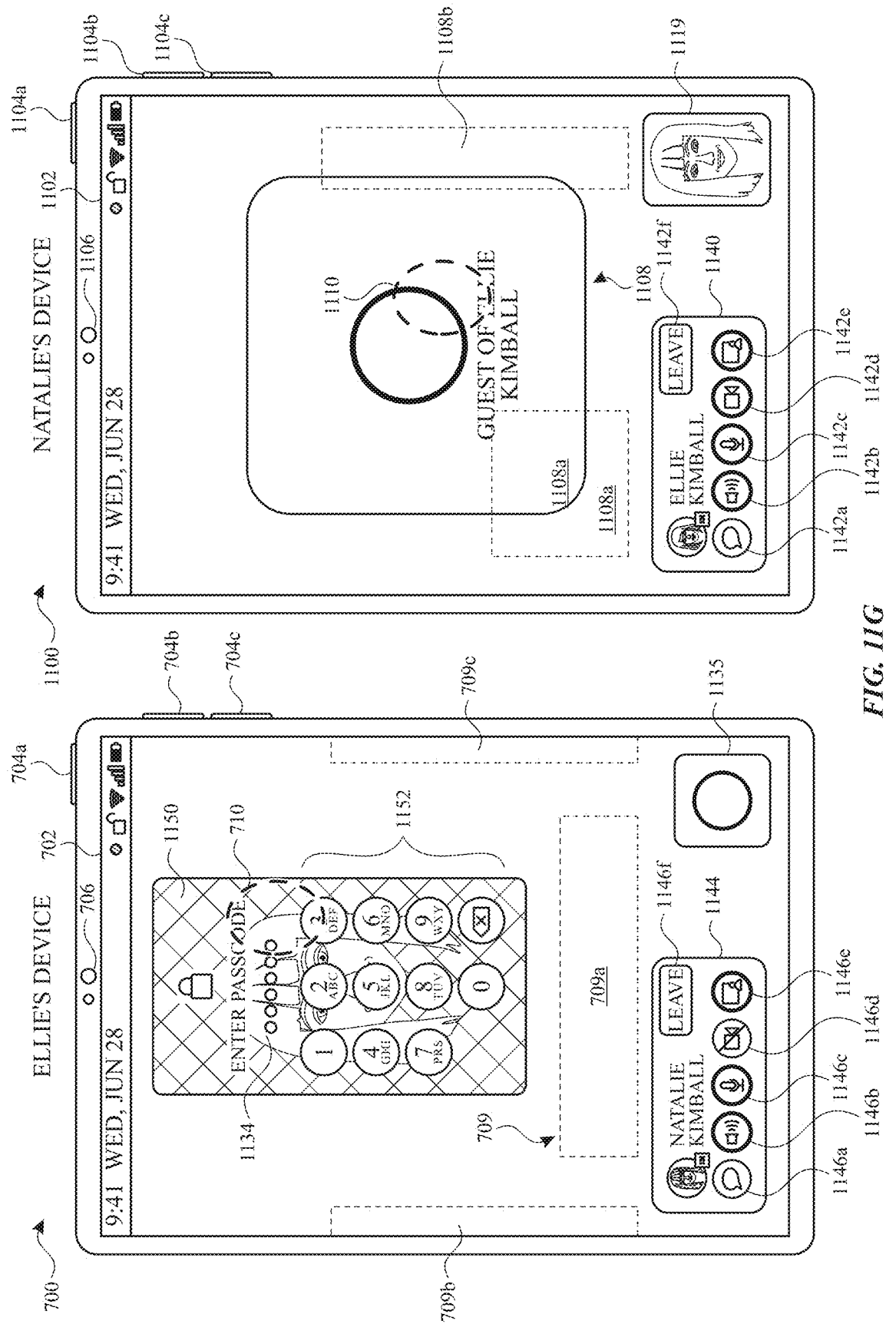

At FIG. 11G, in response to detecting user input 1145, electronic device 700 displays user interface 1150, which includes keypad 1152 for a user of electronic device 700 to enter passcode-based authentication information. In some embodiments, if the user of electronic device 700 is successfully authenticated using passcode-based authentication, electronic device 700 proceeds with using visual representation 1132 to represent the user of electronic device 700 within the real-time communication session (e.g., as shown in FIG. 11E). However, if authentication of the user of electronic device 700 fails, electronic device 700 forgoes using visual representation 1132, and continues to use alternative representation 1136 to represent the user of electronic device 700 in the real-time communication session. In some embodiments, in response to detecting user input 1145, rather than displaying user interface 1150, electronic device 700 displays gaze target 1128a and attempts biometric authentication of the user of electronic device 700.

Figures 11H, 11I:
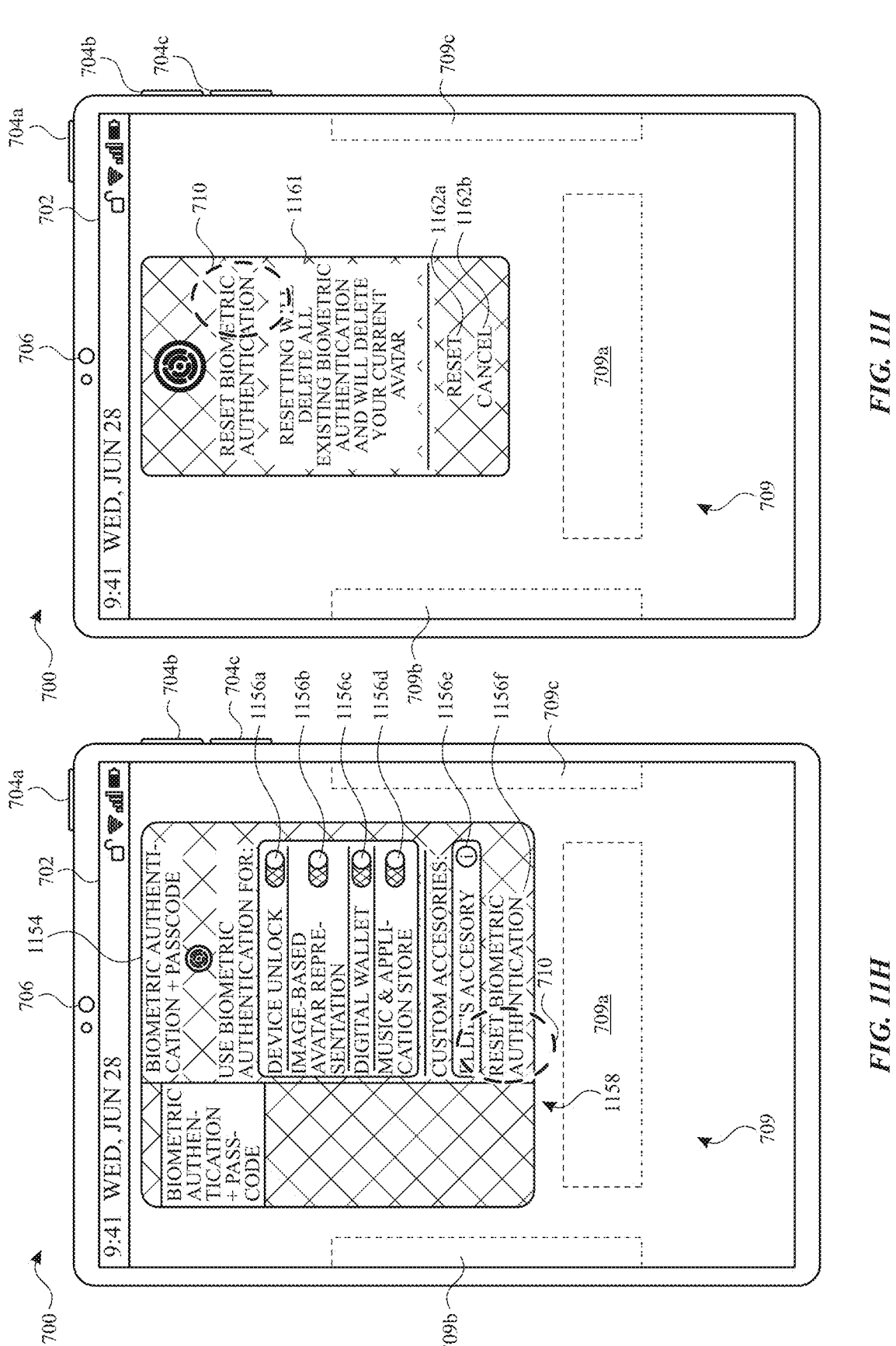

At FIG. 11H, electronic device 700 displays settings user interface 1154, which includes various options pertaining to biometric authentication on electronic device 700. User interface 1154 includes options 1156a-1156f. Option 1156a is selectable to selectively enable or disable biometric authentication to be used for unlocking electronic device 700. Option 1156b is selectable to selectively enable or disable the use of visual representation 1132 to represent the user of electronic device 700 (e.g., in real-time communication sessions and/or in one or more other functions). Option 1156c is selectable to selectively enable or disable biometric authentication to be used for approving transactions using a digital wallet of electronic device 700. Option 1156d is selectable to selectively enable or disable biometric authentication to be used for approving downloads and/or transactions in a music and/or application store of electronic device 700. Option 1156e is selectable to view details about one or more custom accessories corresponding to the user of electronic device 700. For example, in some embodiments, electronic device 700 is a head mounted system that includes one or more displays, and the one or more custom accessories include one or more prescription optical lenses to be used with electronic device 700 that are positioned between the user's eyes and the one or more displays. Option 1156f is selectable to reset biometric authentication and/or to delete a biometric authentication profile corresponding to the user of electronic device 700. In some embodiments, selection of option 1156f initiates a process for deleting stored biometric information corresponding to the user of electronic device 700 such that the user would have to re-enroll in biometric authentication on electronic device 700 (e.g., re-provide biometric information to be used in biometric authentication of the user).

At FIG. 11H, electronic device 700 detects user input 1158 corresponding to selection of option 1156f. In some embodiments, user input 1158 is a tap input on display 702 corresponding to selection of option 1156f. However, in some embodiments, user input 1158 is a different type of user input, such as a gesture or other action taken by a user. For example, in some embodiments, electronic device 700 is a head-mounted system, and detecting user input 1158 includes, for example, detecting a user performing a gesture (e.g., an air gesture (e.g., an air tap gesture and/or an air pinch gesture)) while electronic device 700 is worn, detecting a button press while electronic device 700 is worn, detecting rotation of a rotatable input mechanism while electronic device 700 is worn, detecting a gaze-based gesture (e.g., detecting the user looking at an object (e.g., as shown by gaze indication 710 in FIG. 11H) and/or moving his or her gaze in a particular manner), and/or any combination of the foregoing (e.g., detecting a gaze at object 1156f (e.g., as shown by gaze indication 710 in FIG. 11H) in conjunction with an air pinch gesture).

At FIG. 11I, in response to detecting user input 1158, electronic device 700 displays user interface 1161. User interface 1161 warns the user that removing the user's biometric authentication profile will also cause visual representation 1132 to be removed from electronic device 700. User interface 1161 includes option 1162a, that is selectable to proceed with removing the user's biometric authentication profile and visual representation 1132 from electronic device 700, and option 1162b that is selectable to cease display of user interface 1161 without removing the user's biometric authentication profile or visual representation 1132 from electronic device 700.

Additional descriptions regarding FIGS. 11A-11I are provided below in reference to method 1200 described with respect to FIG. 12.

FIG. 12 is a flow diagram of an exemplary method 1200 for representing a user, in some embodiments. In some embodiments, method 1200 is performed at a computer system (e.g., computer system 101 in FIG. 1A, 700, X700, and/or 1100) (e.g., a smart phone, a smart watch, a tablet, a laptop, a desktop, a wearable device, and/or head-mounted device) that is in communication with one or more display generation components (e.g., display generation component 120 in FIGS. 1, 3, and 4, 702, X702, and/or 1102) (e.g., a heads-up display, a display, a touchscreen, and/or a projector) (e.g., a visual output device, a 3D display, a display having at least a portion that is transparent or translucent on which images can be projected (e.g., a see-through display), a projector, a heads-up display, and/or a display controller) and one or more input devices (e.g., 702, 704a-704c, 706, 1102, 1104a-1104c, and/or 1106) (e.g., a touch-sensitive surface (e.g., a touch-sensitive display); a mouse; a keyboard; a remote control; a visual input device (e.g., one or more cameras (e.g., an infrared camera, a depth camera, a visible light camera, and/or a gaze tracking camera)); an audio input device; a biometric sensor (e.g., a fingerprint sensor, a face identification sensor, a gaze tracking sensor, and/or an iris identification sensor) and/or one or more mechanical input devices (e.g., a depressible input mechanism; a button; a rotatable input mechanism; a crown; and/or a dial)). In some embodiments, method 1200 is governed by instructions that are stored in a non-transitory (or transitory) computer-readable storage medium and that are executed by one or more processors of a computer system, such as the one or more processors 202 of computer system 101 (e.g., control 110 in FIG. 1A). Some operations in method 1200 are, optionally, combined and/or the order of some operations is, optionally, changed.

In some embodiments, the computer system (e.g., 700, X700, and/or 1100) detects (1202), via the one or more input devices (e.g., 702, 704a-704c, 706, 1102, 1104-1104c, and/or 1106), a request (e.g., by a user) to use a first virtual representation (e.g., 1132 and/or 1134) of a user (e.g., a first visual representation and/or a first avatar) (e.g., in some embodiments, an image-based representation; an image-based avatar; a virtual avatar that is generated based on an appearance of the user of the computer system using image-based user information corresponding to the user of the computer system; and/or a first type of representation that moves based on physical movements made by the user of the computer system) to represent the user to other people with whom the user is communicating (e.g., a request to use the first virtual representation of the user to represent the user in a communication session and/or in a virtual environment; and/or a request to allow the first virtual representation of the user to be displayed (e.g., by one or more external devices and/or computer systems separate from the computer system) as a representation of the user within a communication session and/or in a virtual environment) (e.g., in various embodiments, user inputs 1124 and/or 1146*d* represent a request by the user of electronic device 700 and/or HMD X700 to user representation 1132 to represent the user of electronic device 700 and/or HMD X700; and/or user input 1116 represents a request by the user of electronic device 1100 to user representation 1134 to represent the user of electronic device 1100). In some embodiments, the request to use the first virtual representation of the user comprises one or more user inputs corresponding to a request to use the first virtual representation of the user. In some embodiments, the request to use the first virtual representation of the user comprises one or more user inputs corresponding to a request to join and/or initiate a communication session (e.g., and to use the first virtual representation of the user in the communication session).

In response to detecting the request to use the first virtual representation of the user to represent the user to other people with whom the user is communicating (1204): in accordance with a determination that the user is authenticated on the computer system (1206) (e.g., in accordance with a determination that the user has been identified and/or authenticated by the computer system based on biometric information collected from the user and/or based on non-biometric authentication information (e.g., username, password, and/or passcode)), the computer system proceeds (1208) with (e.g., permitting) using the first virtual representation (e.g., 1132 and/or 1134) of the user to represent the user to other people with whom the user is communicating (e.g., in FIG. 11E, electronic device 700 and/or HMD X700 proceeds with using representation 1132 to represent the user of electronic device 700 and/or HMD X700; and electronic device 1100 proceeds with using representation 1134 to represent the user of electronic device 1100) (in some embodiments, proceeding with using the first virtual representation of the user to represent the user to other people with whom the user is communicating comprises permitting the first representation of the user to be displayed on a first external device separate from the computer system (e.g., a first external device that is participating in a communication session with the computer system and/or that is participating in a virtual environment) and/or displaying the first virtual representation of the user via the one or more display generation components); and in accordance with a determination that the user is not authenticated on the computer system (1210) (e.g., in accordance with a determination that the user has not been identified and/or authenticated by the computer system), the computer system forgoes proceeding (1212) with using the first virtual representation of the user to represent the user to other people with whom the user is communicating (e.g., in FIG. 11F1, electronic device 700 and/or HMD X700 forgoes using representation 1132 to represent the user of electronic device 700 and/or HMD X700) (e.g., prevents the first virtual representation of user from being used; forgoes permitting and/or prevents display of the first virtual representation of the user on a first external device separate from the computer system (e.g., a first external device that is participating in a communication session with the computer system and/or participating in a virtual environment); and/or forgoes display of the first virtual representation of the user via the one or more display generation components). Allowing a first virtual representation of a user to be used only if the user is authenticated on the computer system improves privacy and security by ensuring that only authenticated and/or authorized users are able to use the first virtual representation.

In some embodiments, proceeding with using the first virtual representation (e.g., 1132 and/or 1134) of the user to represent the user to other people with whom the user is communicating comprises proceeding with using the first virtual representation (e.g., 1132 and/or 1134) of the user to represent the user in a real-time communication session (e.g., a communication session in which a plurality of users are participating concurrently; and/or a communication session in which audio input, video input, and/or movements made by participants in the real-time communication session are transmitted to the other participants in real time) that includes one or more other people with whom the user is communicating. In some embodiments, the first virtual representation of the user is visible to one or more other participants in the real-time communication session (e.g., is displayed by one or more external devices corresponding to the one or more other participants and/or one or more display generation components that are in communication with the one or more external devices) (e.g., representation 1134 is representative of the user of electronic device 1100 and/or HMD X700, and is displayed on electronic device 700 and/or HMD X700; and/or representation 1132 is representative of the user of electronic device 700 and/or HMD X700, and is displayed on electronic device 1100 and/or HMD X700). In some embodiments, the first virtual representation of the user is not visible to the user while the first virtual representation of the user is used to represent the user in the real-time communication session (e.g., is not displayed by the computer system and/or is not displayed via the one or more display generation components that are in communication with the computer system) (e.g., in some embodiments, electronic device 700 and/or HMD X700 does not display self-view representation 1135 and/or electronic device 1100 and/or HMD X700 does not display self-view representation 1119). Allowing a first virtual representation of a user to be used in a real-time communication session only if the user is authenticated on the computer system improves privacy and security by ensuring that only authenticated and/or authorized users are able to use the first virtual representation.

In some embodiments, proceeding with using the first virtual representation (e.g., 1132 and/or 134) of the user to represent the user to other people with whom the user is communicating comprises proceeding with using the first virtual representation of the user to represent the user in a spatial communication session that includes one or more other people with whom the user is communicating. In some embodiments, while using the first virtual representation (e.g., 1132 and/or 1134) of the user to represent the user in the spatial communication session, the computer system detects, via the one or more input devices (e.g., 706 and/or 1106), movement by the user (e.g., movement from one location to another (e.g., one location in a room to another location in the room) and/or movement of the user's body) (e.g., electronic device 700 and/or HMD X700 detects movement by the user of electronic device 700 and/or HMD X700, and/or electronic device 1100 and/or HMD X700 detects movement by the user of electronic device 1100 and/or HMD X700). In response to detecting the movement by the user, the computer system causes the first virtual representation (e.g., 1132 and/or 1134) of the user to move within a three-dimensional environment (e.g., 709 and/or 1108) (e.g., a passthrough environment (e.g., virtual and/or optical passthrough) and/or a virtual three-dimensional environment) based on the movement by the user (e.g., representation 1132 moves based on detected movement by the user of electronic device 700 and/or HMD X700 and/or representation 1134 moves based on detected movement by the user of electronic device 1100 and/or HMD X700). In some embodiments, movement of the first virtual representation (e.g., 1132 and/or 1134) of the user within the three-dimensional environment (e.g., 709 and/or 1108) is displayed by at least some of one or more external computer systems participating in the spatial communication session. In some embodiments, movement of the first virtual representation of the user is displayed by the computer system (e.g., via the one or more display generation components)). In some embodiments, the spatial communication session includes virtual representations of other participants in the spatial communication session, and the virtual representations of the other participants in the spatial communication session move within the three-dimensional environment based on movements by the other participants. Allowing a first virtual representation of a user to be used in a spatial communication session only if the user is authenticated on the computer system improves privacy and security by ensuring that only authenticated and/or authorized users are able to use the first virtual representation.

In some embodiments, the determination that the user is authenticated on the computer system (e.g., 700, X700, and/or 1100) comprises a determination that the user is biometrically authenticated on the computer system (e.g., a determination that biometric information collected from the user (e.g., one or more eye scans, one or more facial scans, one or more fingerprint scans, and/or one or more scans of one or more portions of the user's body) matches stored and/or known biometric information corresponding to a known user, a registered user, and/or an authorized user) (e.g., electronic device 700 and/or HMD X700 proceeds with using representation 1132 to represent the user of electronic device 700 and/or HMD X700 based on a determination that the user of electronic device 700 and/or HMD X700 has been biometrically authenticated on electronic device 700 and/or HMD X700; and/or electronic device 1100 and/or HMD X700 proceeds with using representation 1134 to represent the user of electronic device 1100 and/or HMD X700 based on a determination that the user of electronic device 1100 and/or HMD X700 has been biometrically authenticated on electronic device 1100 and/or HMD X700). In some embodiments, the determination that the user is not authenticated on the computer system comprises a determination that the user is not biometrically authenticated on the computer system (e.g., a determination that the user has not completed a biometric information and/or that biometric information collected from the user (e.g., one or more eye scans, one or more facial scans, one or more fingerprint scans, and/or one or more scans of one or more portions of the user's body) does not match stored and/or known biometric information corresponding to a known user, a registered user, and/or an authorized user) (e.g., electronic device 700 and/or HMD X700 forgoes using representation 1132 to represent the user of electronic device 700 and/or HMD X700 based on a determination that the user of electronic device 700 and/or HMD X700 has not been biometrically authenticated on electronic device 700 and/or HMD X700; and/or electronic device 1100 and/or HMD X700 forgoes using representation 1134 to represent the user of electronic device 1100 and/or HMD X700 based on a determination that the user of electronic device 1100 and/or HMD X700 has not been biometrically authenticated on electronic device 1100 and/or HMD X700). Allowing a first virtual representation of a user to be used to represent a user only if the user is biometrically authenticated on the computer system improves privacy and security by ensuring that only authenticated and/or authorized users are able to use the first virtual representation.

In some embodiments, the determination that the user is authenticated on the computer system (e.g., 700, X700, and/or 1100) comprises a determination that the user has been authenticated based on iris-based authentication (e.g., a determination that biometric iris information collected from the user (e.g., one or more eye scans and/or iris scans) matches stored and/or known biometric information (e.g., stored and/or known eye scan and/or iris scan information) corresponding to a known user, a registered user, and/or an authorized user) (e.g., electronic device 700 and/or HMD X700 proceeds with using representation 1132 to represent the user of electronic device 700 and/or HMD X700 based on a determination that the user of electronic device 700 and/or HMD X700 has been authenticated using iris-based authentication on electronic device 700 and/or HMD X700; and/or electronic device 1100 and/or HMD X700 proceeds with using representation 1134 to represent the user of electronic device 1100 and/or HMD X700 based on a determination that the user of electronic device 1100 and/or HMD X700 has been authenticated using iris-based authentication on electronic device 1100 and/or HMD X700); and the determination that the user is not authenticated on the computer system (e.g., 700, X700, and/or 1100) comprises a determination that the user not been authenticated based on iris-based authentication (e.g., a determination that the user has not completed biometric iris authentication and/or that biometric iris information collected from the user (e.g., one or more eye scans and/or iris scans) does not match stored and/or known biometric information (e.g., stored and/or known eye scan and/or iris scan information) corresponding to a known user, a registered user, and/or an authorized user) (e.g., electronic device 700 and/or HMD X700 forgoes using representation 1132 to represent the user of electronic device 700 and/or HMD X700 based on a determination that the user of electronic device 700 and/or HMD X700 has not been authenticated using iris-based authentication on electronic device 700 and/or HMD X700; and/or electronic device 1100 and/or HMD X700 forgoes using representation 1134 to represent the user of electronic device 1100 and/or HMD X700 based on a determination that the user of electronic device 1100 and/or HMD X700 has not been authenticated using iris-based authentication on electronic device 1100 and/or HMD X700). Allowing a first virtual representation of a user to be used to represent a user only if the user is biometrically authenticated based on iris-based authentication on the computer system improves privacy and security by ensuring that only authenticated and/or authorized users are able to use the first virtual representation.

In some embodiments, he determination that the user is authenticated on the computer system comprises a determination that passcode information entered by the user matches known passcode information corresponding to an authenticated user (e.g., a determination that a password, passcode, and/or passphrase entered by the user matches stored and/or known password, passcode, and/or passphrase information corresponding to a known user, a registered user, and/or an authorized user) (e.g., electronic device 700 and/or HMD X700 proceeds with using representation 1132 to represent the user of electronic device 700 and/or HMD X700 based on a determination that the user of electronic device 700 and/or HMD X700 has been authenticated using passcode-based authentication on electronic device 700 and/or HMD X700; and/or electronic device 1100 and/or HMD X700 proceeds with using representation 1134 to represent the user of electronic device 1100 and/or HMD X700 based on a determination that the user of electronic device 1100 and/or HMD X700 has been authenticated using passcode-based authentication on electronic device 1100 and/or HMD X700); and the determination that the user is not authenticated on the computer system comprises a determination that passcode information entered by the user does not match known passcode information corresponding to an authenticated user (e.g., a determination that a password, passcode, and/or passphrase entered by the user does not match stored and/or known password, passcode, and/or passphrase information corresponding to a known user, a registered user, and/or an authorized user) (e.g., electronic device 700 and/or HMD X700 forgoes using representation 1132 to represent the user of electronic device 700 and/or HMD X700 based on a determination that the user of electronic device 700 and/or HMD X700 has not been authenticated using passcode-based authentication on electronic device 700 and/or HMD X700; and/or electronic device 1100 and/or HMD X700 forgoes using representation 1134 to represent the user of electronic device 1100 and/or HMD X700 based on a determination that the user of electronic device 1100 and/or HMD X700 has not been authenticated using passcode-based authentication on electronic device 1100 and/or HMD X700). Allowing a first virtual representation of a user to be used to represent a user only if the user enters a password or passcode on the computer system improves privacy and security by ensuring that only authenticated and/or authorized users are able to use the first virtual representation.

In some embodiments, in response to detecting the request (e.g., 1124, 1145, and/or X1145) to use the first virtual representation (e.g., 1132) of the user to represent the user to other people with whom the user is communicating: in accordance with a determination that the user is not authenticated on the computer system, the computer system outputs a first output prompting the user for authentication information (e.g., in response to user input 1124, electronic device 700 and/or HMD X700 displays gaze target 1128*a* prompting biometric information for biometric authentication; and/or in response to user input 1145 and/or X1145, electronic device 700 and/or HMD X700 displays user interface 1150 prompting passcode information) (e.g., displays, via the one or more display generation components, a first visual output prompting the user for authentication information and/or outputting a first audio output prompting the user for authentication information). Automatically outputting a first output prompting the user for authentication information when the user has not yet been authenticated reduces the number of inputs needed to perform this operation and enables this operation to be performed without displaying additional controls. Furthermore, doing so also enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, outputting the first output prompting the user for authentication information comprises outputting a first output prompting the user for biometric authentication information (e.g., displaying gaze target 1128*a*) (e.g., instructing the user to provide biometric information (e.g., one or more eye scans, one or more face scans, and/or one or more fingerprint scans) in order to perform biometric authentication of the user; and/or instructing the user to perform one or more actions (e.g., look at a gaze target, move the user's head, and/or touch a fingerprint sensor) so that the computer system is able to collect biometric information for biometric authentication of the user) (e.g., displaying, via the one or more display generation components, a first visual output (e.g., a first user interface and/or one or more user interface objects) prompting the user to provide biometric authentication information; and/or outputting a first audio output (e.g., a spoken instruction or other audio output) prompting the user to provide biometric authentication information). Outputting a first output prompting the user for biometric authentication information enhances the operability of the system and makes the user-system interface more efficient (e.g., by helping the user to provide proper inputs and reducing errors) which, additionally, reduces power usage and improves battery life of the device by enabling the user to use the system more quickly and efficiently. Furthermore, doing so provides the user with information about a state of the device (e.g., that the device requires biometric authentication of the user before the first virtual representation of the user can be used to represent the user).

In some embodiments, outputting the first output prompting the user for authentication information comprises outputting a first output prompting the user to provide passcode (e.g., passcode, password, and/or passphrase) authentication information (e.g., displaying user interface 1150 prompting the user to enter passcode information) (e.g., instructing the user to enter passcode, password, and/or passphrase information (e.g., using a keyboard and/or keypad (e.g., virtual and/or physical))) (e.g., displaying, via the one or more display generation components, a first visual output (e.g., a first user interface and/or one or more user interface objects) prompting the user to provide passcode authentication information; and/or outputting a first audio output (e.g., a spoken instruction or other audio output) prompting the user to provide passcode authentication information). Outputting a first output prompting the user for passcode authentication information enhances the operability of the system and makes the user-system interface more efficient (e.g., by helping the user to provide proper inputs and reducing errors) which, additionally, reduces power usage and improves battery life of the device by enabling the user to use the system more quickly and efficiently. Furthermore, doing so provides the user with information about a state of the device (e.g., that the device requires passcode-based authentication of the user before the first virtual representation of the user can be used to represent the user).

In some embodiments, in response to detecting the request to use the first virtual representation of the user to represent the user to other people with whom the user is communicating: in accordance with a determination that the user is not authenticated on the computer system, the computer system uses a second virtual representation (e.g., 1136) different from the first virtual representation (e.g., 1132) of the user to represent the user to other people with whom the user is communicating. In some embodiments, the first virtual representation (e.g., 1132) of the user is an image-based representation; an image-based avatar; and/or a virtual avatar that is generated based on an appearance of the user using image-based user information corresponding to the user (e.g., one or more images of the person; one or more facial scans of the person; and/or one or more eye scans of the person). In some embodiments, the second virtual representation (e.g., 1136) is a non-image-based avatar and/or is generated without using image-based user information corresponding to the user (e.g., without using photographs, facial scans, and/or eye scans corresponding to the user) (e.g., a monogram, an animated avatar, and/or an audio representation (e.g., a visual representation (e.g., an audio waveform or other visual representation) that is representative of audio input being captured by and/or sensed by the computer system and/or one or more input devices in communication with the computer system; and/or a visual representation (e.g., an audio waveform or other visual representation) that is representative of audio content being transmitted by the computer system (e.g., into a communication session))). Using a second virtual representation of the user instead of the first virtual representation of the user if the user is not authenticated on the computer system improves privacy and security by ensuring that only authenticated and/or authorized users are able to use the first virtual representation.

In some embodiments, the first virtual representation (e.g., 1132 and/or 1134) is a virtual representation of a first type (e.g., an image-based representation; an image-based avatar; and/or a virtual avatar that is generated based on an appearance of the user using image-based user information corresponding to the user (e.g., one or more images of the person; one or more facial scans of the person; and/or one or more eye scans of the person)). In some embodiments, prior to detecting the request to use the first virtual representation of the user to represent the user to other people with whom the user is communicating (e.g., during a setup process for the computer system and/or during an orientation or tutorial process for the computer system): the computer system outputs a request (e.g., displays a request and/or outputs an audio request) prompting the user to enable user authentication (e.g., prompting the user to enable and/or set up biometric authentication and/or passcode-based authentication) so that the user is able to use virtual representations of the first type (e.g., 1132 and/or 134) to represent the user for one or more functions of the computer system. In some embodiments, a user is required to enable user authentication (e.g., via option 1156*b*) (e.g., biometric authentication and/or passcode-based authentication) in order to use representations of the first type to represent the user. Requiring users to enable user authentication in order to use the first virtual representation improves privacy and security by ensuring that only authenticated and/or authorized users are able to use the first virtual representation.

In some embodiments, prior to detecting the request to use the first virtual representation of the user to represent the user to other people with whom the user is communicating: the computer system detects, via the one or more input devices, a request (e.g., by a user) to create (e.g., generate and/or set up) the first virtual representation (e.g., 1132 and/or 1134) of the user (e.g., in some embodiments, an image-based representation; an image-based avatar; and/or a virtual avatar that is generated based on an appearance of the user using image-based user information corresponding to the user (e.g., one or more images of the person; one or more facial scans of the person; and/or one or more eye scans of the person)). In response to detecting the request to create the first virtual representation of the user: in accordance with a determination that the user is authenticated on the computer system (e.g., in accordance with a determination that the user has been identified and/or authenticated by the computer system based on biometric information collected from the user and/or based on non-biometric authentication information (e.g., username, password, and/or passcode)), the computer system initiates a process for creating the first virtual representation (e.g., 1132 and/or 1134) of the user (in some embodiments, the process for creating the first virtual representation of the user comprises collecting image-based information corresponding to the user (e.g., one or more photographs, one or more videos, and/or one or more facial scans of the user); in some embodiments, the process for creating the first virtual representation of the user comprises displaying a user interface for creating the first virtual representation of the user). In some embodiments, in response to detecting the request to create the first virtual representation (e.g., 1132 and/or 1134) of the user, and in accordance with a determination that the user is not authenticated on the computer system (e.g., 700, X700, and/or 1100) (e.g., in accordance with a determination that the user has not been identified and/or authenticated by the computer system), the computer system forgoes initiating the process for creating the first virtual representation of the user (e.g., forgoes collecting image-based information corresponding to the use for creating the first virtual representation of the user and/or forgoes displaying the user interface for creating the first virtual representation of the user). Requiring authentication of the user in order to create the first virtual representation of the user improves privacy and security by ensuring that only authenticated and/or authorized users are able to create virtual representations.

In some embodiments, the computer system (e.g., 700, X700, and/or 1100) detects, via the one or more input devices, a request (e.g., by a user) to use the first virtual representation (e.g., 1132 and/or 1134) of the user (e.g., a first visual representation and/or a first avatar) to represent the user within a communication session (e.g., a real-time communication session and/or a spatial communication session). In response to detecting the request to use the first virtual representation of the user to represent the user within the communication session: in accordance with a determination that the user is authenticated on the computer system using a first type of authentication (e.g., biometric authentication, eye-based authentication, face-based authentication, and/or fingerprint-based authentication) (e.g., in accordance with a determination that the user has been identified and/or authenticated by the computer system based on and/or using the first type of authentication), the computer system proceeds with (e.g., permitting) using the first virtual representation of the user to represent the user within the communication session (e.g., in FIGS. 11A-11E, in response to user input 1116 (e.g., a request to use representation 1134 to represent the user of electronic device 1100 in a communication session), and based on a determination that the user of electronic device 1100 has been authenticated using the first type of authentication (e.g., biometric authentication), electronic device 1100 proceeds with using representation 1134 to represent the user of electronic device 1100); and in accordance with a determination that the user authenticated on the computer system using a second type of authentication (e.g., passcode-based, password-based, and/or passphrase-based authentication) (e.g., in accordance with a determination that the user has been identified and/or authenticated by the computer system based on and/or using the second type of authentication) different from the first type of authentication, but the user is not authenticated on the computer system using the first type of authentication, forgoing proceeding with using the first virtual representation of the user to represent the user within the communication session (e.g., in some embodiments, in FIGS. 11A-11E, the user of electronic device 700 and/or HMD X700 is authenticated using passcode-based authentication, but is not authenticated using biometric authentication, and in response to user input 1124 (e.g., a request to user representation 1132 to represent the user of electronic device 700 and/or HMD X700 in the communication session) electronic device 700 and/or HMD X700 forgoes using representation 1132 to represent the user of electronic device 700 and/or HMD X700 until the user is authenticated using biometric authentication) (e.g., preventing the first virtual representation of user from being used; forgoing permitting and/or preventing display of the first virtual representation of the user on a first external device separate from the computer system (e.g., a first external device that is participating in the communication session with the computer system and/or participating in a virtual environment); and/or forgoing display of the first virtual representation of the user via the one or more display generation components). Allowing a first virtual representation of a user to be used in a communication session only if the user is authenticated on the computer system using a first type of authentication (e.g., a more secure authentication methodology) improves privacy and security by ensuring that only authenticated and/or authorized users are able to use the first virtual representation.

In some embodiments, the computer system (e.g., 700, X700, and/or 1100) detects, via the one or more input devices, a request (e.g., by a user) to use the first virtual representation (e.g., 1132 and/or 1134) of the user (e.g., a first visual representation and/or a first avatar) to represent the user within a communication session (e.g., a real-time communication session and/or a spatial communication session). In response to detecting the request to use the first virtual representation of the user to represent the user within the communication session, the computer system collects authentication information from the user (e.g., FIG. 11C) (e.g., biometric information from the user to be used in biometric authentication of the user, and/or passcode information from the user to be used in passcode-based authentication of the user) (in some embodiments, the computer system optionally displays a user interface corresponding to collection of authentication information from the user (e.g., a user interface that includes a gaze target for collecting eye-based authentication information, a user interface that includes a virtual keyboard or keypad for a user to enter authentication information, a user interface that includes a passcode entry field for a user to enter authentication information, and/or a user interface that indicates that facial scan and/or fingerprint scan information is being collected from the user)). Subsequent to collecting the authentication information from the user (e.g., in response to collecting the authentication information from the user): in accordance with a determination that the authentication information from the user successfully authenticates the user (e.g., the authentication information from the user matches stored and/or known authentication information corresponding to a known, authenticated, and/or authorized user), the computer system proceeds with (e.g., permits) using the first virtual representation of the user to represent the user within the communication session (e.g., in FIG. 11E, electronic device 700 and/or HMD X700 proceeds with using representation

1132 to represent the user of electronic device 700 and/or HMD X700); and in accordance with a determination that the authentication information from the user does not successfully authenticate the user (e.g., the authentication information from the user does not match stored and/or known authentication information corresponding to a known, authenticated, and/or authorized user), the computer system forgoes proceeding with using the first virtual representation of the user to represent the user within the communication session (e.g., in FIGS. 11F1 and/or 11F2, electronic device 700 and/or HMD X700 forgoes using representation 1132 to represent the user of electronic device 700 and/or HMD X700) (e.g., prevents the first virtual representation of user from being used; forgoes permitting and/or prevents display of the first virtual representation of the user on a first external device separate from the computer system (e.g., a first external device that is participating in the communication session with the computer system and/or participating in a virtual environment); and/or forgoes display of the first virtual representation of the user via the one or more display generation components). In some embodiments, subsequent to collecting the authentication information from the user and in accordance with a determination that the authentication information from the user does not successfully authenticate the user, the computer system outputs (e.g., displays and/or outputs audio output) an alert and/or a suggestion that indicates how the user can use the first virtual representation to represent the user within the communication session (e.g., an alert and/or suggestion indicating that the user must provide biometric authentication information corresponding to a known and/or registered user (e.g., the user must be successfully biometrically authenticated) and/or an alert and/or suggestion indicating that the user must provide valid authentication information (e.g., keyphrase and/or passcode information)). In some embodiments, a user is required to provide authentication information when the user requests to use the first virtual representation of the user to represent the user within the communication session and/or in order for the user to use the first virtual representation of the user to represent the user within the communication session. Requiring that a user provide authentication information when the user requests to use the first virtual representation of the user within a communication session improves privacy and security by ensuring that only authenticated and/or authorized users are able to use the first virtual representation.

In some embodiments, detecting the request to use the first virtual representation of the user to represent the user within the communication session comprises detecting a request to accept an invitation to join the communication session (e.g., user input 1124) (e.g., a user input accepting another user's invitation to join the communication session). Requiring that a user provide authentication information when the user requests to accept an invitation to join a communication session (and to use the first virtual representation to represent the user within the communication session) improves privacy and security by ensuring that only authenticated and/or authorized users are able to use the first virtual representation (e.g., a representation that represents personal visual characteristics of a registered user).

In some embodiments, detecting the request to use the first virtual representation of the user to represent the user within the communication session comprises detecting a request to initiate a new communication session (e.g., user input 1116) (e.g., a user input corresponding to a request to create and/or initiate a new communication session, and/or to use the first virtual representation of the user to represent the user within the new communication session). Requiring that a user provide authentication information when the user requests to initiate a new communication session (and to use the first virtual representation to represent the user within the communication session) improves privacy and security by ensuring that only authenticated and/or authorized users are able to use the first virtual representation.

In some embodiments, detecting the request to use the first virtual representation of the user to represent the user within the communication session comprises, while the user is participating in the communication session (e.g., while the user is being represented in the communication session by an initial representation different from the first virtual representation of the user), detecting a request to turn on the first virtual representation of the user (e.g., user input 1145 and/or X1145) (e.g., within the communication session) (e.g., a request to switch from having an initial representation (e.g., 1136) of the user represent the user within the communication session to having the first virtual representation (e.g., 1132) of the user represent the user within the communication session; and/or a request to start having the first virtual representation of the user represent the user within the communication session). In some embodiments, the request to turn on the first virtual representation of the user (e.g., within the communication session) represents a request to display the first virtual representation of the user (e.g., to represent the user) via one or more external devices corresponding to one or more other participants of the communication session. In some embodiments, the request to turn on the first virtual representation of the user (e.g., within the communication session) represents a request to display the first virtual representation of the user (e.g., to represent the user) via one or more external devices corresponding to one or more other participants of the communication session without displaying the first virtual representation of the user on the computer system (e.g., via the one or more display generation components that are in communication with the computer system). In some embodiments, when the first virtual representation of the user is being used to represent the user within the communication session, the first virtual representation of the user is visible to one or more other participants in the communication session (e.g., is displayed by one or more external devices corresponding to the one or more other participants and/or one or more display generation components that are in communication with the one or more external devices). In some embodiments, when the first virtual representation of the user is being used to represent the user within the communication session, the first virtual representation of the user is not visible to the user (e.g., is not displayed by the computer system and/or is not displayed via the one or more display generation components that are in communication with the computer system). Requiring that a user provide authentication information when the user requests to turn on the first virtual representation of the user while the user is participating in a communication session improves privacy and security by ensuring that only authenticated and/or authorized users are able to use the first virtual representation.

In some embodiments, the computer system detects, via the one or more input devices, a request to disable biometric authentication (e.g., user input 1158 and/or selection of option 1162a) (e.g., for the user (e.g., so that the user cannot be authenticated using biometric authentication), and/or for the computer system (e.g., so that the computer system cannot perform biometric authentication)) (e.g., a request to remove and/or delete biometric authentication information corresponding to the user and/or other users of the computer system; and/or a request to disable biometric authentication to authenticate the user and/or other users of the computer system); and in response to detecting the request to disable biometric authentication: the computer system disabled biometric authentication (e.g., for the user and/or for the computer system); and deletes the first virtual representation (e.g., 1132) of the user (e.g., in FIG. 11I, the user is warned that disabling biometric authentication will cause deletion of the user's image-based avatar) (e.g., removes the first virtual representation of the user from the computer system and/or makes the first virtual representation of the user inaccessible on the computer system). In some embodiments, when a user disables biometric authentication and/or removes biometric authentication from the computer system, the computer system also deletes the first virtual representation of the user (e.g., because, in some embodiments, the computer system requires that a user be biometrically authenticated in order to use the first virtual representation). In some embodiments, when the computer system deletes a visual representation of a first type that corresponds to a user (e.g., is representative of the user) and/or when the computer system does not have stored a visual representation of the first type corresponding to the user, the user is prohibited from and/or prevented from using the first type of visual representation (e.g., in some embodiments, an image-based representation; an image-based avatar; a virtual avatar that is generated based on an appearance of the user of the computer system using image-based user information corresponding to the user of the computer system; and/or a first type of representation that moves based on physical movements made by the user of the computer system) to represent the user during real-time communication sessions. In some embodiments, in order to use the first type of visual representation to represent the user within a real-time communication session, the user is required to re-create and/or re-enroll a new visual representation of the first type. For example, in some embodiments, the visual representation of the first type is an image-based representation that is generated based on an appearance of the user using image-based user information corresponding to the user. In some such embodiments, the user is required to provide image-based user information (e.g., one or more photographs, one or more videos, one or more facial scans, one or more head scans, and/or one or more eye scans) in order to create a new visual representation of the first type that can be used to represent the user within real-time communications sessions. Automatically deleting the first virtual representation of the user in response to a user request to disable biometric authentication reduces the number of inputs needed to perform this operation. Doing so also enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, prior to disabling biometric authentication and deleting the first virtual representation of the user (and, in some embodiments, prior to detecting the request to disable biometric authentication), the computer system outputs a first warning (e.g., user interface 1161) (e.g., displays, via the one or more display generation components, a visual warning; and/or outputs an audio warning) indicating that disabling biometric authentication will also result in deletion of the first virtual representation of the user. In some embodiments, the first warning is output in response to an initial user request (e.g., user input 1158)

to disable biometric authentication, and the biometric authentication is disabled and the first virtual representation of the user is deleted in response to a subsequent user request (e.g., selection of option 1162a) (e.g., a confirmation user request) to disable biometric authentication. Outputting the first warning indicating that disabling biometric authentication will also result in deletion of the first virtual representation of the user enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, while the user is participating in a communication session (e.g., while the user is being represented in the communication session by an initial representation different from the first virtual representation of the user), the computer system detects a request (e.g., user input 1145 and/or X1145) to turn on the first virtual representation (e.g., 1132) of the user (e.g., within the communication session) (e.g., a request to switch from having an initial representation (e.g., 1136) of the user represent the user within the communication session to having the first virtual representation (e.g., 1132) of the user represent the user within the communication session; and/or a request to start having the first virtual representation of the user represent the user within the communication session). In response to detecting the request to turn on the first virtual representation of the user: the computer system displays, via the one or more display generation components, a passcode entry user interface (e.g., 1150) that includes one or more objects (e.g., 1152) that are selectable by a user to provide passcode-based authentication information for passcode-based authentication of the user. In some embodiments, while displaying the passcode entry user interface, the computer system receives passcode-based authentication information from the user. In response to receiving the passcode-based authentication information from the user: in accordance with a determination that the passcode-based authentication information successfully authenticates the user, the computer system proceeds with (e.g., permits) using the first virtual representation of the user (e.g., 1132) to represent the user within the communication session; and in accordance with a determination that the passcode-based authentication information does not successfully authenticate the user, the computer system forgoes proceeding with using the first virtual representation (e.g., 1132) of the user to represent the user within the communication session. In some embodiments, when the first virtual representation of the user is used to represent the user within the communication session, the first virtual representation of the user moves based on physical movements made by the user of the computer system (e.g., movement of the user's hands causes movement of a first portion of the first virtual representation; movement of the user's face causes movement of a second portion of the first virtual representation; movement of the user's head causes movement of a third portion of the first virtual representation; movement of the user's torso causes movement of a fourth portion of the first virtual representation; and/or movement of the user's legs causes movement of a fifth portion of the first virtual representation). In some embodiments, the first virtual representation of the user copies and/or mirrors movements made by the user. Requiring that a user provide authentication information when the user requests to turn on the first virtual representation of the user while the user is participating in a communication session improves privacy and security by ensuring that only authenticated and/or authorized users are able to use the first virtual representation.

In some embodiments, the computer system detects, via the one or more input devices, a request (e.g., a user request) to initiate a communication session (e.g., user input 1116 and/or user input 1124) (e.g., with one or more external users and/or external computer systems) (e.g., a user request to join a communication session in response to an invitation from an external user; and/or a user request to create a new communication session). In response to detecting the request to initiate the communication session: in accordance with a determination that the first virtual representation of the user (e.g., 1132 and/or 1134) is secured using a first type of authentication (e.g., biometric authentication, eye-based authentication, face-based authentication, and/or fingerprint-based authentication) (e.g., in accordance with a determination that the user has selected the first type of authentication for securing the first virtual representation of the user), the computer system initiates the communication session with the first virtual representation (e.g., 1132 and/or 1134) of the user representing the user within the communication session (in some embodiments, the communication session is initiated with the first representation of the user representing the user within the communication session based on a determination and/or in accordance with a determination that the user has been authenticated using the first type of authentication); and in accordance with a determination that the first virtual representation of the user is secured using a second type of authentication (e.g., passcode-based, password-based, and/or passphrase-based authentication) (e.g., in accordance with a determination that the user has been identified and/or authenticated by the computer system based on and/or using the second type of authentication) different from the first type of authentication: the computer system initiates the communication session without the first virtual representation of the user representing the user within the communication session (e.g., using representation 1136 instead of representation 1132 in FIGS. 11F1 and/or 11F2) (e.g., in some embodiments, initiating the communication session with a different virtual representation of the user representing the user within the communication session); and displays a first selectable object (e.g., 1146d in FIGS. 11F1 and/or 11F2) that is selectable to initiate a process for having the first virtual representation of the user represent the user within the communication session. While the first virtual representation of the user is secured using the second type of authentication, while the user is not represented by the first virtual representation of the user within the communication session, and while displaying the first selectable object (e.g., 1146d in FIGS. 11F1 and/or 11F2), the computer system detects, via the one or more input devices, a user input (e.g., 1145 and/or X1145) corresponding to selection of the first selectable object (e.g., 1146d in FIGS. 11F1 and/or 11F2). In response to detecting the user input (e.g., 1145 and/or X1145) corresponding to selection of the first selectable object (e.g., 1146d in FIGS. 11F1 and/or 11F2), the computer system displays, via the one or more display generation components, a passcode authentication user interface (e.g., 1150) that includes one or more selectable objects (e.g., 1152) that are selectable by a user to enter passcode authentication information. While displaying the passcode authentication user interface (e.g., 1150), the computer system receives passcode authentication information from the user. In response to receiving the passcode authentication information from the user: in accordance with a determination that the passcode authentication information from the user successfully authenticates the user (e.g., the passcode authentication information matches known and/or stored passcode authentication information), the computer system proceeds with (e.g., permitting) using the first virtual representation (e.g., 1132) of the user to represent the user in the communication session. Providing the user with a selectable object that is selectable to initiate a process for having the first virtual representation of the user represent the user within the communication session reduces the number of inputs required to perform this operation.

In some embodiments, aspects/operations of methods 800, 1000, 1200, 1400, and/or 1600 may be interchanged, substituted, and/or added between these methods. For example, in some embodiments, enrolling the one or more eyes of a person in method 800 can be performed in order to perform eye-based biometric authentication of the person in methods 1000, 1200, and/or 1400; and/or in some embodiments, the spatial transition animation in method 1600 is performed in response to user authentication (e.g., as recited in methods 1000 and/or 1400). For brevity, these details are not repeated here.

FIGS. 13A-13H illustrate examples of user authentication. FIG. 14 is a flow diagram of an exemplary method 1400 for user authentication. The user interfaces in FIGS. 13A-13H are used to illustrate the processes described below, including the processes in FIG. 14.

Figures 13A, 13B:
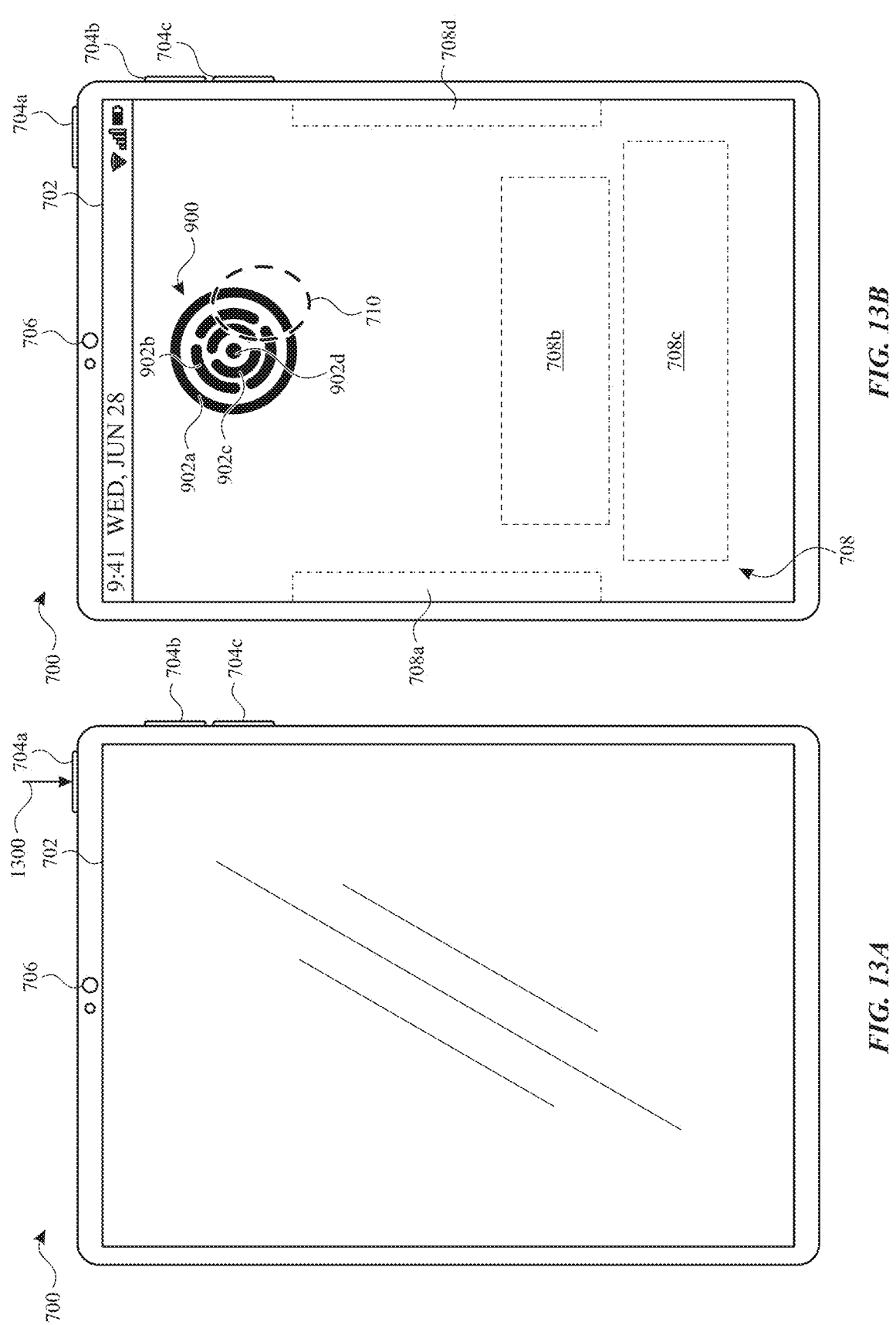

FIG. 13A depicts electronic device 700, which is a tablet that includes touch-sensitive display 702, buttons 704a-704c, and one or more input sensors 706 (e.g., one or more cameras, eye gaze trackers, hand movement trackers, and/or head movement trackers). In some embodiments described below, electronic device 700 is a tablet. In some embodiments, electronic device 700 is a smartphone, a wearable device, a wearable smartwatch device, a head-mounted system (e.g., headset), or other computer system that includes and/or is in communication with one or more display devices (e.g., display screens and/or projection devices). In some embodiments in which electronic device 700 is a head-mounted system, electronic device 700 optionally includes two displays (e.g., one for each eye of a user), with each display displaying respective various content, to enable a user of electronic device 700 to perceive the various depths of the various content (e.g., physical objects and/or virtual objects) of three-dimensional environments. Electronic device 700 is a computer system (e.g., computer system 101 in FIG. 1A).

At FIG. 13A, electronic device 700 is in an inactive state in which content is not displayed via display 702. At FIG. 13A, electronic device 700 detects user input 1300, which is a press of button 704a, and corresponds to a user request to transition electronic device 700 from the inactive state to an active state (e.g., a state in which content is displayed via display 702 and/or a state in which more content is displayed via display 702 than when electronic device 700 is in the inactive state). In FIG. 13A, user input 1300 is a button press of button 704a. However, in some embodiments, user input 1300 is a different type of user input, such as a gesture or other action taken by a user. For example, in some embodiments, electronic device 700 is a head-mounted system, and detecting user input 1300 includes, for example, detecting that a user has worn electronic device 700 (e.g., detecting that the user has worn electronic device 700 on his or her head), detecting a user performing a gesture (e.g., an air gesture (e.g., an air tap gesture and/or an air pinch gesture)) while electronic device 700 is worn, detecting a button press while electronic device 700 is worn, detecting rotation of a rotatable input mechanism while electronic device 700 is worn, detecting a gaze-based gesture (e.g., detecting the user looking at an object and/or moving his or her gaze in a particular manner), and/or any combination of the foregoing (e.g., detecting a gaze at object 714c in conjunction with an air pinch gesture).

In some embodiments, when electronic device 700 is transitioned from the inactive state to the active state, electronic device 700 is in a locked state. Furthermore, in some embodiments, electronic device 700 transitions from the locked state to an unlocked state when electronic device 700 successfully authenticates a user of electronic device 700. In some embodiments, electronic device 700 is configured to perform at least two different types of authentication to authenticate a user, such as biometric authentication and non-biometric authentication (e.g., passcode-based authentication and/or gesture-based authentication). However, in some embodiments, electronic device 700 is not permitted to perform biometric authentication when certain authentication criteria are satisfied (e.g., enhanced authentication criteria where additional authentication steps are required as compared to standard or reduced authentication criteria that are available in circumstances where the electronic device has recently been used by an authorized user). For example, in some embodiments, electronic device 700 is not permitted to perform biometric authentication (e.g., electronic device 700 is only able to authenticate a user using passcode-based authentication or other non-biometric authentication) when electronic device 700 has not yet been unlocked since the last time it was turned on. In another example, in some embodiments, electronic device 700 is not permitted to perform biometric authentication (e.g., electronic device 700 is only able to authenticate a user using passcode-based authentication or other non-biometric authentication) when greater than a threshold amount of time has passed since electronic device 700 was last unlocked. In yet another example, in some embodiments, electronic device 700 is not permitted to perform biometric authentication (e.g., electronic device 700 is only able to authenticate a user using passcode-based authentication or other non-biometric authentication) when greater than a threshold number of failed biometric authentication attempts have been performed since electronic device 700 was last successfully unlocked. However, in various embodiments described in greater detail below, even when electronic device 700 satisfies the authentication criteria and is not permitted to perform biometric authentication, a user is able to re-activate and/or enable biometric authentication on electronic device 700 using a companion device separate from electronic device 700.

In some embodiments, when the authentication criteria are satisfied, and/or when biometric authentication is disabled and/or not permitted on electronic device 700, electronic device 700 is also not permitted to access and/or apply user-specific input configurations (e.g., user-specific input profiles). For example, in some embodiments, electronic device 700 is a head-mounted system that is able to receive gaze-based user inputs and air gesture user inputs. In some embodiments, electronic device 700 maintains user-specific gaze-based input configurations and/or user-specific air gesture input configurations in order to improve the accuracy and precision of gaze-based user inputs and air gesture user inputs for specific users. However, in scenarios in which electronic device 700 is not permitted to access these user-specific input configurations, electronic device 700 may not be as precise or accurate in its responses to gaze-based user inputs and/or air gesture user inputs, which can lead to a frustrating user experience when the user tries to enter a passcode or perform another action to unlock electronic device 700. Accordingly, in some embodiments, it may be preferable for a user to unlock electronic device 700 using a different companion device that has a touch-sensitive display or on which biometric authentication can be performed.

FIG. 13B depicts a first scenario in which electronic device 700 does not satisfy the authentication criteria and, therefore, is permitted to perform biometric authentication. FIGS. 13C-13H depict alternative scenarios in which electronic device 700 satisfies the authentication criteria (e.g., the enhanced authentication criteria) and, therefore, is not permitted to perform biometric authentication of a user.

At FIG. 13B, in response to detecting user input 1300, and based on a determination that electronic device 700 does not satisfy the authentication criteria (and, therefore, is permitted to perform biometric authentication), electronic device 700 displays gaze target 900 overlaid on three-dimensional environment 708. As discussed above with reference to FIGS. 9A-9M, gaze target 900 includes multiple concentric circles 902a-902d, and is displayed as part of a biometric authentication process for biometric authentication of a user. In the depicted embodiments, gaze target 900 is depicted as multiple concentric circles 902a-902d. In some embodiments, gaze target 900 includes two or more concentric shapes (e.g., two or more concentric circles) inside of an outline of a representation of a biometric feature (e.g., a representation of an eye and/or other biometric feature). For example, in some embodiments, outermost shape 902a is representative of an eye (e.g., is in the shape of an eye), and two or more concentric shapes (e.g., circles 902-902d) are positioned within the representation of the eye (e.g., 902a). In some embodiments, a first set of the two or more concentric shapes (e.g., one or more of the two or more concentric shapes) (e.g., 902b-902d) represent an iris of the eye. In some embodiments, a second set of the two or more concentric shapes (e.g., one or more of the two or more concentric shapes) (e.g., 902b-902d) represent a pupil of the eye. For example, in some embodiments, circle 902b and/or circle 902c represent an iris of the eye, and in some embodiments, circle 902c and/or circle 902d represent a pupil of the eye. In the depicted scenario, three-dimensional environment 708 includes objects 708a-708d. In some embodiments, three-dimensional environment 708 is displayed by a display (e.g., display 702, as depicted in FIG. 13B). In some embodiments, three-dimensional environment 708 includes a virtual environment or an image (or video) of a physical environment captured by one or more cameras (e.g., one or more cameras that are part of input sensors 706 and/or one or more external cameras). For example, in some embodiments, object 708a is a virtual object that is representative of a physical object that has been captured by one or more cameras and/or detected by one or more sensors; and object 708b is a virtual object that is representative of a second physical object that has been captured by one or more cameras and/or detected by one or more sensors, and so forth. In some embodiments, three-dimensional environment 708 is visible to a user behind gaze target 900, but is not displayed by a display. For example, in some embodiments, three-dimensional environment 708 is a physical environment (and, for example, objects 708a-708d are physical objects) that is visible to a user (e.g., through one or more transparent displays 702) behind gaze target 900 without being displayed by a display.

In some embodiments, gaze target 900 and/or three-dimensional environment 708 are part of an extended reality experience.

At FIG. 13B, electronic device 700 performs biometric authentication of the user, as discussed above with reference to FIGS. 9A-9M. When the user is successfully authenticated using biometric authentication, electronic device 700 transitions from the locked state to the unlocked state. For example, FIG. 13H displays an example embodiment of electronic device 700 in the unlocked state. In FIG. 13H, electronic device 700 displays user interface 1331 and user interface 1333 which includes one or more features (e.g., applications and/or functions) that are not accessible when electronic device 700 is in the locked state, as described in greater detail below. When the user is not successfully authenticated using biometric authentication, electronic device 700 is maintained in the locked state.

Figures 13C, 13D:
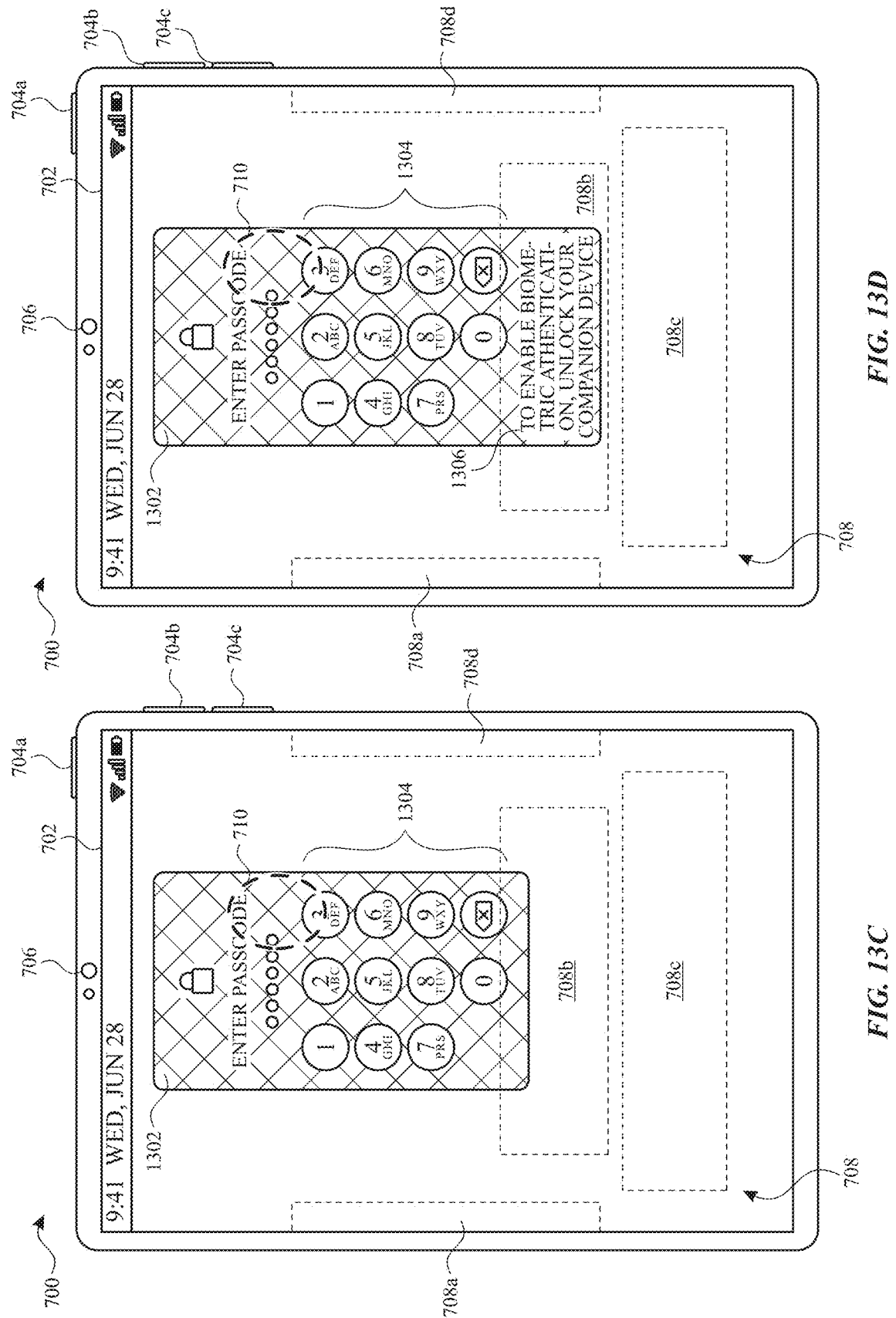

At FIG. 13C, in response to detecting user input 1300 in FIG. 13A, and based on a determination that electronic device 700 satisfies the authentication criteria (and, therefore, is not permitted to perform biometric authentication), electronic device 700 displays user interface 1302 overlaid on three-dimensional environment 708. User interface 1302 includes keypad 1304 that a user is able to use to enter passcode-based biometric authentication information.

At FIG. 13D, based on a determination that the user has not interacted with user interface 1302 for a threshold duration of time, electronic device 700 displays prompt 1306, which informs the user that the user can enable biometric authentication on electronic device 700 by unlocking a companion device separate from electronic device 700.

At FIG. 13E1, while electronic device 700 continues to satisfy the authentication criteria (and, therefore, is not permitted to perform biometric authentication), electronic device 700 detects a nearby companion device 1310 (e.g., a companion device that is within a threshold proximity (e.g., based on signal strength information and/or based on device position information)). In the depicted scenario, electronic device 700 also displays representation 708c, which is representative of companion device 1310. In some embodiments, companion device 1310 is visible via display 702 (e.g., as represented by representation 708c). For example, as described above, in some embodiments, electronic device 700 is a head-mounted system, and three-dimensional environment 708 is visible as either a virtual passthrough environment or an optical passthrough environment via display 702. In some embodiments, companion device 1310, when brought into the proximity of electronic device 700, becomes part of three-dimensional environment 708, and is also visible via display 702 (e.g., is displayed by display 702 and/or is visible through transparent display 702) (e.g., as represented by object 708e in FIG. 13E1).

In the depicted embodiment, companion device 1310 is a smartphone that includes touch-sensitive display 1312 and buttons 1314a-1314c. However, in other embodiments, companion device 1310 is a different type of device, such as a wearable device, a wearable smartwatch device, a tablet, or other computer system that includes and/or is in communication with one or more display devices (e.g., display screens and/or projection devices). In FIG. 13E1, companion device 1310 displays user interface 1318, which includes dock 1322 and application icons 1320. In some embodiments, user interface 1318 is indicative of companion device 1310 being in an unlocked state. In some embodiments, companion device 1310 has been transitioned from its locked state to its unlocked state based on biometric authentication and/or based non-biometric authentication (e.g., passcode-based authentication and/or gesture-based authentication). In some embodiments, companion device 1310 and electronic device 700 are associated with the same user and/or the same user account. For example, companion device 1310 is logged into a first user account, and electronic device 700 is logged into the same user account and/or is attempting to log in to the same user account. In FIG. 13E1, based on a determination that companion device 1310 is within a threshold proximity of electronic device 700, and that companion device 1310 satisfies unlock criteria, biometric authentication is enabled on electronic device 700, and electronic device 700 displays gaze target 900 to perform biometric authentication of a user. In some embodiments, companion device 1310 satisfies unlock criteria when companion device 1310 is in an unlocked state (e.g., as shown in FIG. 13E1). In some embodiments, companion device 1310 satisfies unlock criteria even when companion device 1310 is in a locked state, but less than a threshold duration of time has passed since companion device 1310 was last in an unlocked state (e.g., companion device 1310 was in an unlocked state less than 1 minute ago, 2 minutes ago, or 5 minutes ago).

In some embodiments, the techniques and user interface(s) described in FIGS. 13A-13H are provided by one or more of the devices described in FIGS. 1A-IP. For example, FIG. 13E2 illustrates an embodiment in which gaze target 900 (e.g., as described in FIGS. 9A-9M and 13A-13D) is displayed on display module X702 of head-mounted device (HMD) X700. In some embodiments, HMD X700 includes a pair of display modules that provide stereoscopic content to different eyes of the same user. For example, HMD X700 includes display module X702 (which provides content to a left eye of the user) and a second display module (which provides content to a right eye of the user). In some embodiments, the second display module displays a slightly different image than display module X702 to generate the illusion of stereoscopic depth.

At FIG. 13E2, while HMD X700 continues to satisfy the authentication criteria (and, therefore, is not permitted to perform biometric authentication), HMD X700 detects a nearby companion device 1310 (e.g., a companion device that is within a threshold proximity (e.g., based on signal strength information and/or based on device position information)). In the depicted scenario, HMD X700 also displays representation 708e, which is representative of companion device 1310. In some embodiments, companion device 1310 is visible via display X702 (e.g., as represented by representation 708e). For example, as described above, in some embodiments, HMD X700 is a head-mounted system, and three-dimensional environment 708 is visible as either a virtual passthrough environment or an optical passthrough environment via display X702. In some embodiments, companion device 1310, when brought into the proximity of HMD X700, becomes part of three-dimensional environment 708, and is also visible via display X702 (e.g., is displayed by display X702 and/or is visible through transparent display X702) (e.g., as represented by object 708e in FIG. 13E2).

In the depicted embodiment, companion device 1310 is a smartphone that includes touch-sensitive display 1312 and buttons 1314a-1314c. However, in other embodiments, companion device 1310 is a different type of device, such as a wearable device, a wearable smartwatch device, a tablet, or other computer system that includes and/or is in communication with one or more display devices (e.g., display screens and/or projection devices). In FIG. 13E2, companion device 1310 displays user interface 1318, which includes dock 1322 and application icons 1320. In some embodiments, user interface 1318 is indicative of companion device 1310 being in an unlocked state. In some embodiments, companion device 1310 has been transitioned from its locked state to its unlocked state based on biometric authentication and/or based non-biometric authentication (e.g., passcode-based authentication and/or gesture-based authentication). In some embodiments, companion device 1310 and HMD X700 are associated with the same user and/or the same user account. For example, companion device 1310 is logged into a first user account, and HMD X700 is logged into the same user account and/or is attempting to log in to the same user account. In FIG. 13E2, based on a determination that companion device 1310 is within a threshold proximity of HMD X700, and that companion device 1310 satisfies unlock criteria, biometric authentication is enabled on HMD X700, and HMD X700 displays gaze target 900 to perform biometric authentication of a user. In some embodiments, companion device 1310 satisfies unlock criteria when companion device 1310 is in an unlocked state (e.g., as shown in FIG. 13E2). In some embodiments, companion device 1310 satisfies unlock criteria even when companion device 1310 is in a locked state, but less than a threshold duration of time has passed since companion device 1310 was last in an unlocked state (e.g., companion device 1310 was in an unlocked state less than 1 minute ago, 2 minutes ago, or 5 minutes ago).

Any of the features, components, and/or parts, including the arrangements and configurations thereof shown in FIGS. 1B-1P can be included, either alone or in any combination, in HMD X700. For example, in some embodiments, HMD X700 includes any of the features, components, and/or parts of HMD 1-100, 1-200, 3-100, 6-100, 6-200, 6-300, 6-400, 11.1.1-100, and/or 11.1.2-100, either alone or in any combination. In some embodiments, display module X702 includes any of the features, components, and/or parts of display unit 1-102, display unit 1-202, display unit 1-306, display unit 1-406, display generation component 120, display screens 1-122a-b, first and second rear-facing display screens 1-322a, 1-322b, display 11.3.2-104, first and second display assemblies 1-120a, 1-120b, display assembly 1-320, display assembly 1-421, first and second display sub-assemblies 1-420a, 1-420b, display assembly 3-108, display assembly 11.3.2-204, first and second optical modules 11.1.1-104a and 11.1.1-104b, optical module 11.3.2-100, optical module 11.3.2-200, lenticular lens array 3-110, display region or area 6-232, and/or display/display region 6-334, either alone or in any combination. In some embodiments, HMD X700 includes a sensor that includes any of the features, components, and/or parts of any of sensors 190, sensors 306, image sensors 314, image sensors 404, sensor assembly 1-356, sensor assembly 1-456, sensor system 6-102, sensor system 6-202, sensors 6-203, sensor system 6-302, sensors 6-303, sensor system 6-402, and/or sensors 11.1.2-110a-f, either alone or in any combination. In some embodiments, HMD X700 includes one or more input devices, which can include any of the features, components, and/or parts of any of first button 1-128, button 11.1.1-114, second button 1-132, and or dial or button 1-328, either alone or in any combination. In some embodiments, HMD X700 includes one or more audio output components (e.g., electronic component 1-112) for generating audio feedback (e.g., audio output), optionally generated based on detected events and/or user inputs detected by the HMD X700.

Figure 13F:
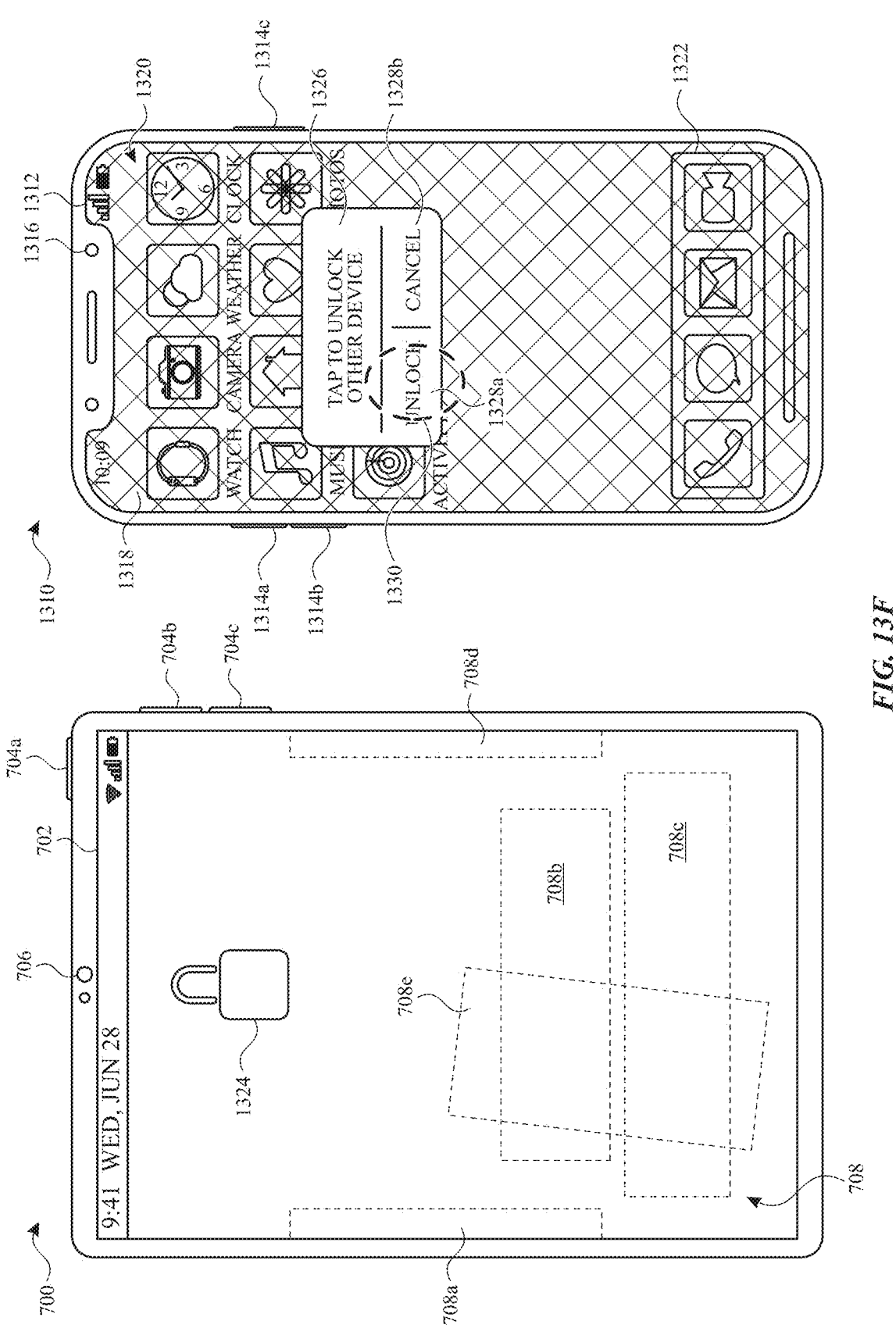

FIG. 13F depicts an example in which electronic device 700 is in the locked state (e.g., as indicated by indication 1324), and satisfies the authentication criteria (and, therefore, is not permitted to perform biometric authentication). While electronic device 700 satisfies the authentication criteria, electronic device 700 detects nearby companion device 1310 (e.g., detects that companion device 1310 is within a threshold proximity), and that companion device 1310 is in an unlocked state. Based on a determination that companion device 1310 is within a threshold proximity of electronic device 700, and that electronic device 700 satisfies the authentication criteria, companion device 1310 displays user interface 1326, which includes option 1328a and option 1328b. Option 1328a is selectable to unlock electronic device 700, and option 1328b is selectable to cease display of user interface 1326 without unlocking electronic device 700. In some embodiments, option 1328a is selectable to enable biometric authentication on electronic device 700. In some such embodiments, selection of option 1328a enables biometric authentication on electronic device 700, and electronic device 700 performs biometric authentication of the user. When electronic device 700 is able to successfully biometrically authenticate the user, electronic device 700 transitions to an unlocked state (e.g., FIG. 13H), and when electronic device 700 is not able to successfully biometrically authenticate the user, electronic device 700 is maintained in the locked state. In some embodiments, user interface 1326 is displayed by companion device 1310 even when companion device 1310 is in a locked state (e.g., based on a determination that companion device 1310 is within a threshold proximity of electronic device 700 and/or based on a determination that companion device 1310 and electronic device 700 correspond to the same user and/or the same user account). At FIG. 13F, companion device 1310 detects user input 1330 (e.g., a tap input via touch-sensitive display 1312), corresponding to selection of option 1328a.

Figure 13G:
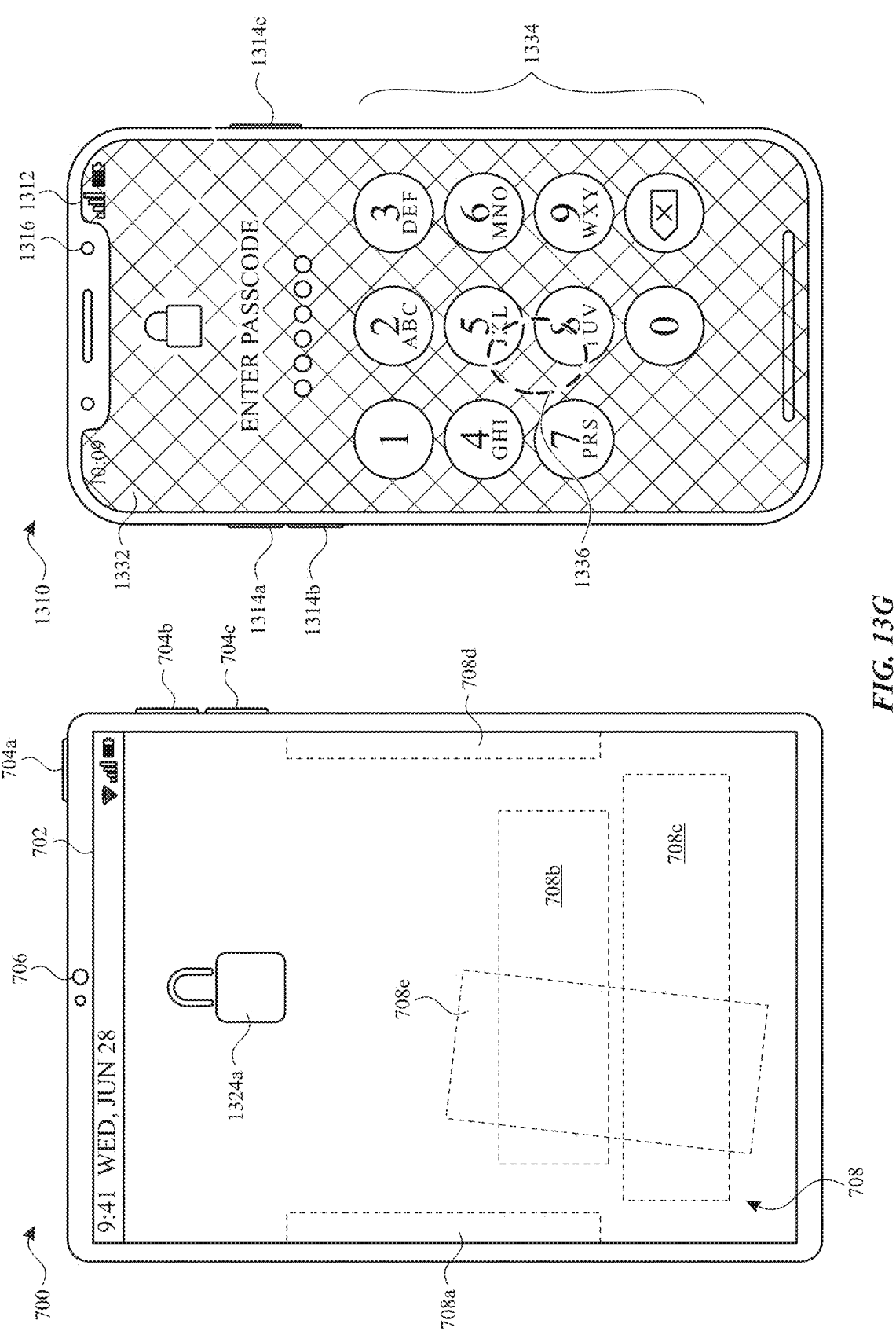
Figure 13H:
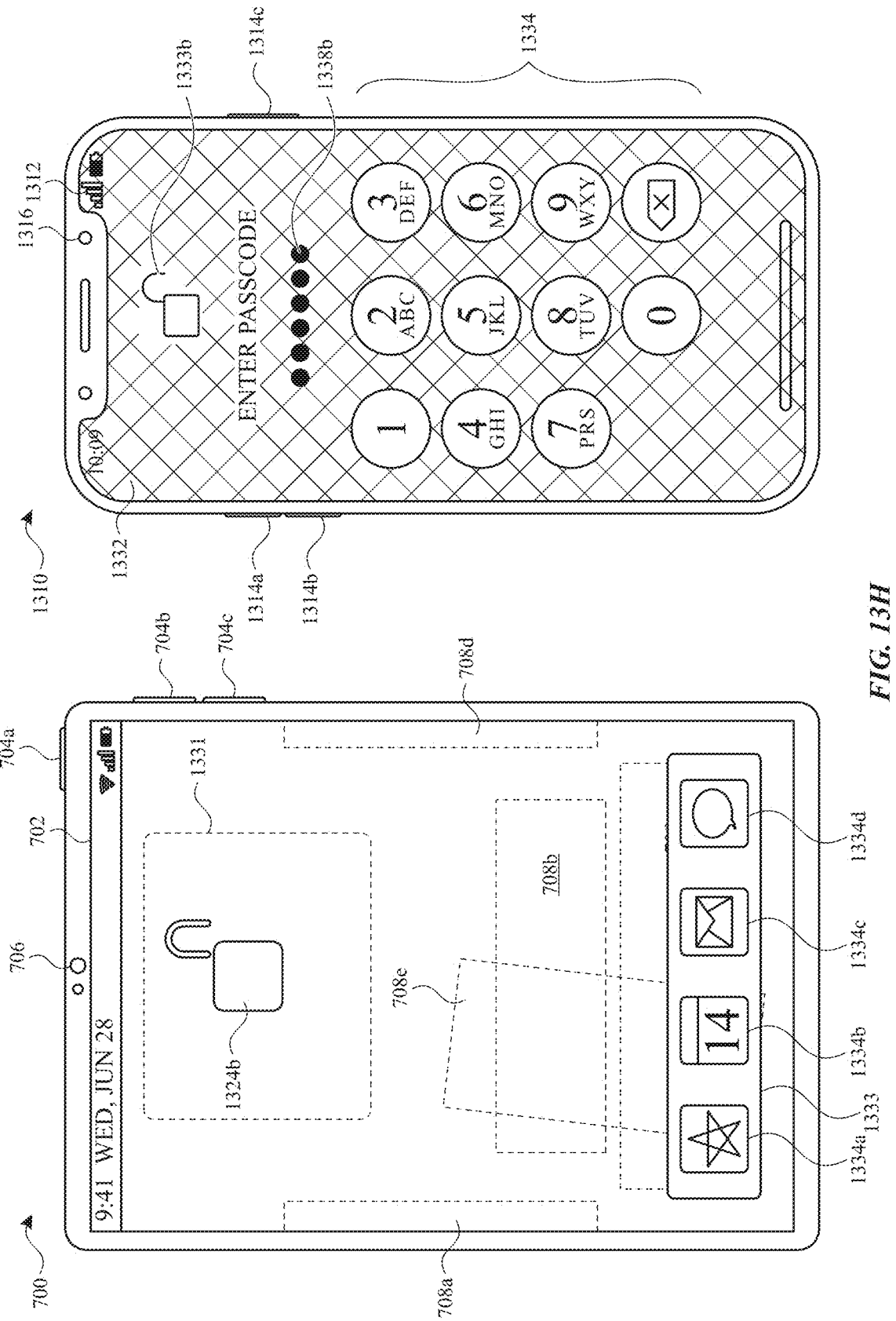

At FIG. 13G, in response to detecting user input 1330, companion device 1310 displays user interface 1332, which includes keypad 1334. As discussed above, in some embodiments, when electronic device 700 satisfies authentication criteria, electronic device 700 is not permitted to access and/or apply user-specific input configurations. In such scenarios, it can be difficult or awkward for a user to try to enter passcode information using electronic device 700. Accordingly, in some scenarios, it can be easier for a user to enter passcode information using companion device 1310. In FIG. 13G, companion device 1310 detects one or more user inputs 1336 (e.g., one or more touch inputs via touch-sensitive display 1312).

At FIG. 13H, in response to user input 1336, and based on a determination that the user has entered recognized passcode information, companion device 1310 updates user interface 1332 to indicate that the user has entered recognized passcode information, and companion device 1310 causes electronic device 700 to transition into an unlocked state (e.g., as indicated by indication 1324b). In FIG. 13H, electronic device 700 displays user interface 1331 and user interface 1333, indicating that electronic device 700 is in the unlocked state. User interface 1331 and/or user interface 1333 include one or more features and/or functions that are not accessible when electronic device 700 is in the locked state. For example, user interface 1333 includes application icons 1334a-1334d that are each selectable to open a respective application and, in some embodiments, application icons 1334a-1334d and/or their respective applications are not accessible while electronic device 700 is in the locked state.

Additional descriptions regarding FIGS. 13A-13H are provided below in reference to method 1400 described with respect to FIG. 14.

FIG. 14 is a flow diagram of an exemplary method 1400 for user authentication, in some embodiments. In some embodiments, method 1400 is performed at a computer system (e.g., computer system 101 in FIG. 1A, 700, and/or X700) (e.g., a smart phone, a smart watch, a tablet, a laptop, a desktop, a wearable device, and/or head-mounted device) that is in communication with one or more display generation components (e.g., display generation component 120 in FIGS. 1, 3, and 4 702 and/or X702) (e.g., a heads-up display, a display, a touchscreen, and/or a projector) (e.g., a visual output device, a 3D display, a display having at least a portion that is transparent or translucent on which images can be projected (e.g., a sec-through display), a projector, a heads-up display, and/or a display controller) and one or more input devices (e.g., 702, 704a-c, and/or 706) (e.g., a touch-sensitive surface (e.g., a touch-sensitive display); a mouse; a keyboard; a remote control; a visual input device (e.g., one or more cameras (e.g., an infrared camera, a depth camera, a visible light camera, and/or a gaze tracking camera)); an audio input device; a biometric sensor (e.g., a fingerprint sensor, a face identification sensor, a gaze tracking sensor, and/or an iris identification sensor) and/or one or more mechanical input devices (e.g., a depressible input mechanism; a button; a rotatable input mechanism; a crown; and/or a dial)). In some embodiments, method 1400 is governed by instructions that are stored in a non-transitory (or transitory) computer-readable storage medium and that are executed by one or more processors of a computer system, such as the one or more processors 202 of computer system 101 (e.g., control 110 in FIG. 1A). Some operations in method 1400 are, optionally, combined and/or the order of some operations is, optionally, changed.

In some embodiments, while the computer system (e.g., 700 and/or X700) is in a locked state (1402) (e.g., a state in which one or more features and/or one or more sets of content are unavailable to a user), the computer system detects (1404), via the one or more input devices (e.g., 702, 704a-704c, and/or 706), a request (e.g., detects that the computer system has been worn by a user; and/or detects one or more user inputs by a user (e.g., one or more gestures, one or more button presses, and/or one or more touch-screen inputs) corresponding to a request to unlock the computer system) to transition the computer system from the locked state to an unlocked state (e.g., user input 1300) (e.g., a state in which at least some of the one or more features and/or the one or more sets of content are available to the user). In response to detecting the request to transition the computer system from the locked state to the unlocked state (1406): in accordance with a determination that the computer system satisfies a first set of criteria related to unlocking (e.g., FIGS. 13C-13H) (in some embodiments, the first set of criteria related to unlocking includes a first criterion that is satisfied when the computer system has not been unlocked after it was most recently powered on; in some embodiments, the first set of criteria related to unlocking includes a second criterion that is satisfied when the computer system has not been unlocked (e.g., has not been in the unlocked state and/or has not transitioned from the locked state to the unlocked state) for a threshold duration of time (e.g., has not been in the unlocked state in the previous 30 minutes, one hour, two hours, six hours, ten hours, or twenty-four hours and/or has not transitioned from the locked state to the unlocked state in the previous 30 minutes, one hour, two hours, six hours, ten hours, and/or twenty-four hours); and in some embodiments, the first set of criteria related to unlocking includes a third criterion that is satisfied when the computer system has performed a threshold number of failed biometric authentication attempts since the last successful biometric authentication (e.g., three or more consecutive failed biometric authentication attempts)) and that the computer system has detected a companion device (e.g., 1310) (e.g., an electronic device, a computer system, and/or a computer system that is associated with a user and/or a user account that is also associated with the computer system (e.g., a computer system that is logged into the same user account as the computer system)) separate from the computer system (e.g., 700 and/or X700) that satisfies distance threshold criteria relative to the computer system (e.g., the companion device is within a threshold distance of the computer system and/or signal strength information received from the companion device indicates that the companion device is within a threshold distance of the computer system) and satisfies unlock criteria (1408) (e.g., the companion device is in an unlocked state; the companion device was transitioned from a locked state to an unlocked state within a threshold period of time (e.g., within the last 1 minutes, within the last 15 minutes, within the last hour, within the last 6 hours, within the last 12 hours, or within the last 24 hours); and/or the companion device successfully authenticated a user within a threshold period of time (e.g., within the last 1 minutes, within the last 15 minutes, within the last hour, within the last 6 hours, within the last 12 hours, or within the last 24 hours)), the computer system attempts (1410), using the one or more input devices, biometric authentication of a user (e.g., electronic device 700 in FIG. 13E1 and/or HMD X700 in FIG. 13E2) (e.g., collects biometric information corresponding to the user and/or collects biometric information from the user; and/or compares the biometric information corresponding to the user and/or collected from the user to stored (e.g., known) biometric information); and in accordance with a determination that the computer system (e.g., 700 and/or X700) satisfies the first set of criteria related to unlocking (e.g., FIGS. 13C-13H) and that the computer system has not detected a companion device separate from the computer system that satisfies both the distance threshold criteria relative to the computer system and the unlock criteria (1412) (e.g., there is no companion device that is within a threshold distance of the computer system and that also satisfies the unlock criteria), the computer system forgoes attempting (1414), using the one or more input devices, biometric authentication of a user (e.g., electronic device 700 in FIGS. 13C-13D and/or HMD X700) (e.g., forgoes collecting biometric information corresponding to the user and/or forgoes collecting biometric information from the user; and/or forgoes comparing biometric information corresponding to the user and/or collected from the user to stored (e.g., known) biometric information). In some embodiments, in response to detecting the request to transition the computer system from the locked state to the unlocked state, in accordance with a determination that the computer system does not satisfy the first set of criteria related to unlocking (e.g., electronic device 700 in FIG. 13B and/or HMD X700), the computer system attempts biometric authentication of the user (e.g., electronic device 700 in FIG. 13B and/or HMD X700). In some embodiments, the computer system is in a locked state or an unlocked state. In the locked state, the computer system is powered on and operational but is prevented from performing a predefined set of operations in response to user input. The predefined set of operations optionally includes navigation between user interfaces, activation or deactivation of a predefined set of functions, and activation or deactivation of certain applications. The locked state can be used to prevent unintentional or unauthorized use of some functionality of the computer system or activation or deactivation of some functions on the computer system. In some embodiments, in the unlocked state, the computer system is powered on and operational and is not prevented from performing at least a portion of the predefined set of operations that cannot be performed while in the locked state. When the computer system is in the locked state, the computer system is said to be locked. When the computer system is in the unlocked state, the computer system is said to be unlocked. In some embodiments, the computer system in the locked state optionally responds to a limited set of user inputs, including input that corresponds to an attempt to transition the computer system to the unlocked state or input that corresponds to powering the computer system off. Forgoing attempting biometric authentication of a user when there is not a companion device that satisfies both the distance threshold criteria and the unlock criteria improves privacy and security by ensuring that only authenticated and/or authorized users are able to access sensitive and/or private information. Furthermore, attempting biometric authentication of a user when the computer system detects a companion device that satisfies distance threshold criteria relative to the computer system and that satisfies unlock criteria reduces the number of inputs required to perform this operation, and also improves security by encouraging users to use biometric authentication, which is generally more secure than non-biometric authentication. Additionally, allowing a user to use a companion device to enable biometric authentication enhances the operability of the system and makes the user-system interface more efficient (e.g., by minimizing the number of instances and/or scenarios in which a user must provide inputs while user-specific input calibration information is unavailable and/or not applied to the device) which, additionally, reduces power usage and improves battery life of the device by enabling the user to use the system more quickly and efficiently.

In some embodiments, in response to detecting the request to transition the computer system from the locked state to the unlocked state (e.g., user input 1300): in accordance with a determination that the computer system (e.g., 700 and/or X700) does not satisfy the first set of criteria related to unlocking (e.g., electronic device 700 in FIG. 13B and/or HMD X700) (e.g., in accordance with a determination that the computer has been unlocked after it was most recently powered on (e.g., using biometric authentication and/or passcode-based authentication); in accordance with a determination that the computer system has been unlocked within a threshold duration of time (e.g., within the last 30 minutes, the last hour, the last two hours, the last six hours, the last twelve hours, or the last twenty-four hours); and/or in accordance with a determination that the computer system has not performed a threshold number of failed biometric authentication attempts since the last successful biometric authentication attempt (e.g., less than three consecutive failed biometric authentication attempts)), the computer system (e.g., 700 and/or X700) attempts, using the one or more input devices, biometric authentication of the user (e.g., electronic device 700 in FIG. 13B and/or HMD X700). Attempting biometric authentication of a user when the computer system detects that the computer system does not satisfy the first set of criteria related to unlocking reduces the number of inputs required to perform this operation, and also improves security by encouraging users to use biometric authentication, which is generally more secure than non-biometric authentication.

In some embodiments, in response to attempting biometric authentication of the user: in accordance with a determination that biometric authentication of the user is successful (e.g., in accordance with a determination that biometric information collected from the user matches known and/or stored biometric information corresponding to a known user, a registered user, and/or an authorized user), the computer system transitions the computer system (e.g., 700 and/or X700) from the locked state to the unlocked state (e.g., when biometric authentication in FIG. 13B, FIG. 13E1, and/or FIG. 13E2 is successful, electronic device transitions to an unlocked state, as shown in FIG. 13H); and in accordance with a determination that biometric authentication of the user is not successful (e.g., in accordance with a determination that biometric information collected from the user does not match known and/or stored biometric information corresponding to a known user, a registered user, and/or an authorized user), the computer system (e.g., 700 and/or X700) maintains the computer system in the locked state (e.g., when biometric authentication in FIG. 13B, FIG. 13E1, and/or FIG. 13E2 is unsuccessful, electronic device 700 is maintained in a locked state). Maintaining the computer system in the locked state when biometric authentication of the user is not successful improves privacy and security by ensuring that only authenticated and/or authorized users are able to access sensitive or private information.

In some embodiments, the first set of criteria related to unlocking includes a device restart criterion that pertains to restarting the computer system (e.g., 700 and/or X700). In some embodiments, the first set of criteria related to unlocking includes a device restart criterion that is satisfied when the computer system has not been unlocked after it was most recently powered on. Forgoing attempting biometric authentication of a user (e.g., disabling biometric authentication) based on restarting of the computer system improves privacy and security by ensuring that only authenticated and/or authorized users are able to access sensitive and/or private information.

In some embodiments, the first set of criteria related to unlocking includes a timeout criterion that pertains to how much time has elapsed since the computer system (e.g., 700 and/or X700) was last successfully transitioned from the locked state to the unlocked state (e.g., how recently the computer system was last unlocked). In some embodiments, the first set of criteria related to unlocking includes a timeout criterion that is satisfied when the computer system has not been unlocked (e.g., has not been in the unlocked state, has been in the locked state, and/or has not transitioned from the locked state to the unlocked state) for a threshold duration of time (e.g., has not been in the unlocked state in the previous 30 minutes, one hour, two hours, six hours, ten hours, or twenty-four hours; has been in the locked state for the previous 30 minutes, one hour, two hours, six hours, ten hours, or twenty-four hours; and/or has not transitioned from the locked state to the unlocked state in the previous 30 minutes, one hour, two hours, six hours, ten hours, or twenty-four hours). Forgoing attempting biometric authentication of a user (e.g., disabling biometric authentication) based on when the computer system was last unlocked improves privacy and security by ensuring that only authenticated and/or authorized users are able to access sensitive and/or private information.

In some embodiments, the first set of criteria related to unlocking includes a failure threshold criterion that pertains to how many times the computer system (e.g., 700 and/or X700) has detected a failed biometric authentication attempt since the computer system was last successfully transitioned from the locked state to the unlocked state (e.g., since the last time a user was successfully authenticated). In some embodiments, the first set of criteria related to unlocking includes a failed threshold criterion that is satisfied when the computer system has detected a threshold number of failed biometric authentication attempts since the last successful biometric authentication (e.g., three or more consecutive failed biometric authentication attempts) and/or since the computer system was last successfully transitioned from the locked state to the unlocked state (e.g., since the last time a user was successfully authentication). Forgoing attempting biometric authentication of a user (e.g., disabling biometric authentication) based on the computer system having detected a threshold number of failed biometric authentication attempts since the computer system was last successfully unlocked improves privacy and security by ensuring that only authenticated and/or authorized users are able to access sensitive and/or private information.

In some embodiments, in response to detecting the request to transition the computer system from the locked state to the unlocked state (e.g., user input 1300): in accordance with a determination that the computer system (e.g., 700 and/or X700) satisfies the first set of criteria related to unlocking and that the computer system has not detected a companion device separate from the computer system that satisfies both the distance threshold criteria relative to the computer system and the unlock criteria, the computer system outputs a prompt (e.g., 1302 and/or 1304) (e.g., displays, via the one or more display generation components, a prompt; and/or outputs an audio prompt) that requests that the user enter passcode-based authentication information (e.g., a passcode, a password, a PIN, and/or a passphrase) (e.g., in order to transition the computer system from the locked state to the unlocked state). Having a user enter passcode-based authentication information when biometric authentication is disabled improves privacy and security by ensuring that only authenticated and/or authorized users are able to access sensitive and/or private information.

In some embodiments, in response to attempting biometric authentication of the user: in accordance with a determination that biometric authentication of the user is not successful (e.g., in accordance with a determination that biometric information collected from the user does not match known and/or stored biometric information corresponding to a known user, a registered user, and/or an authorized user), the computer system (e.g., 700 and/or X700) outputs a prompt (e.g., displaying, via the one or more display generation components, a prompt; and/or outputting an audio prompt) that requests that the user enter passcode-based authentication information (e.g., electronic device 700 displays user interface 918 in FIG. 9L) (e.g., a passcode, a password, a PIN, and/or a passphrase) (e.g., in order to transition the computer system from the locked state to the unlocked state). In some embodiments, in response to attempting biometric authentication of the user: in accordance with a determination that biometric authentication of the user is successful (e.g., in accordance with a determination that biometric information collected from the user matches known and/or stored biometric information corresponding to a known user, a registered user, and/or an authorized user), the computer system forgoes outputting the prompt that requests that the user enter passcode-based authentication information (e.g., electronic device 700 forgoes displaying user interface 918 in FIG. 9I based on successful biometric authentication of the user). Having a user enter passcode-based authentication information when biometric authentication is not successful improves privacy and security by ensuring that only authenticated and/or authorized users are able to access sensitive or private information.

In some embodiments, subsequent to detecting the request to transition the computer system from the locked state to the unlocked state, the computer system detects, via the one or more input devices, a second request to transition the computer system from the locked state to the unlocked state (e.g., user input 1300). In response to detecting the second request to transition the computer system from the locked state to the unlocked state: in accordance with a determination that the computer system has, within a threshold duration of time (e.g., within the last 30 minutes, within the last hour, within the last four hours, within the last twelve hours, or within the last twenty hours; and/or since the computer system was last powered on), been previously transitioned from the locked state to the unlocked state using passcode-based authentication information provided by the user, the computer system attempts biometric authentication of the user (e.g., regardless of whether the computer system detects a companion device that satisfies the distance threshold criteria relative to the computer system and the unlock criteria) (e.g., in FIG. 13B, based on a determination that electronic device 700 does not satisfy authentication criteria (e.g., based on a determination that electronic device 700 has been previously transitioned from the locked state to the unlocked state within a threshold duration of time), electronic device 700 attempts biometric authentication of the user). In some embodiments, successful authentication of a user using passcode-based authentication enables and/or re-enabled biometric authentication. Automatically re-enabling biometric authentication when the user performed passcode-based authentication allows for these operations to be performed with fewer user inputs, and also improves security by encouraging users to use biometric authentication, which is generally more secure than non-biometric authentication.

In some embodiments, the determination that the computer system (e.g., 700 and/or X700) has detected a companion device (e.g., 1310) separate from the computer system that satisfies the unlock criteria comprises a determination that the computer system (e.g., 700 and/or X700) has detected a companion device (e.g., 1310) separate from the computer system that satisfies the unlock criteria while the companion device is in a locked state of the companion device (e.g., in some embodiments, companion device 1310 satisfies the unlock criteria even when companion device 1310 is in a locked state) (e.g., a state in which one or more features and/or one or more sets of content are unavailable to a user; and/or a state in which the companion device is powered on and operational but is prevented from performing a predefined set of operations in response to user input). In some embodiments, the unlock criteria are able to be satisfied even when the companion device is in a locked state. In some embodiments, the companion device is in a locked state or an unlocked state. In the locked state, the companion device is powered on and operational but is prevented from performing a predefined set of operations in response to user input. The predefined set of operations optionally includes navigation between user interfaces, activation or deactivation of a predefined set of functions, and activation or deactivation of certain applications. The locked state can be used to prevent unintentional or unauthorized use of some functionality of the companion device or activation or deactivation of some functions on the companion device. In some embodiments, in the unlocked state, the companion device is powered on and operational and is not prevented from performing at least a portion of the predefined set of operations that cannot be performed while in the locked state. When the companion device is in the locked state, the companion device is said to be locked. When the companion device is in the unlocked state, the companion device is said to be unlocked. In some embodiments, the companion device in the locked state optionally responds to a limited set of user inputs, including input that corresponds to an attempt to transition the companion device to the unlocked state or input that corresponds to powering the companion device off. Allowing for unlock criteria to be satisfied even when the companion device is in a locked state enhances the operability of the system and makes the user-system interface more efficient (e.g., by helping the user to provide proper inputs and reducing errors) which, additionally, reduces power usage and improves battery life of the device by enabling the user to use the system more quickly and efficiently. Furthermore, doing so also improves security by encouraging users to use biometric authentication, which is generally more secure than non-biometric authentication.

In some embodiments, the determination that the computer system (e.g., 700 and/or X700) has detected a companion device (e.g., 1310) separate from the computer system that satisfies the unlock criteria while the companion device is in the locked state of the companion device comprises a determination that the companion device has been in the locked state of the companion device for less than a threshold duration of time (e.g., less than 5 minutes, less than 15 minutes, less than 30 minutes, or less than an hour). In some embodiments, when the companion device has been in the locked state for greater than the threshold duration of time, the companion device does not satisfy the unlock criteria. Requiring that the companion device be in the locked state for less than a threshold duration of time in order for the companion device to meet the unlock criteria improves privacy and security by ensuring that only authenticated and/or authorized users are able to access sensitive or private information.

In some embodiments, the determination that the companion device (e.g., 1310) has been in the locked state of the companion device for less than the threshold duration of time does not account for the state of the computer system (e.g., 700 and/or X700) during the threshold duration of time (e.g., the threshold duration of time stays the same and/or is unchanged even if the computer system was off and/or was not being used (e.g., was not being worn) during the threshold duration of time). Requiring that the companion device be in the locked state for less than a threshold duration of time in order for the companion device to meet the unlock criteria improves privacy and security by ensuring that only authenticated and/or authorized users are able to access sensitive or private information.

In some embodiments, the determination that the computer system (e.g., 700 and/or X700) has detected a companion device (e.g., 1310) separate from the computer system that satisfies the unlock criteria while the companion device is in the locked state of the companion device comprises a determination that the companion device (e.g., 1310) was previously in an unlocked state of the companion device (e.g., a state in which the companion device is powered on and operational and is not prevent from performing at least a portion of a predefined set of operations that cannot be performed while the companion device is in a companion device locked state) (e.g., within a threshold duration of time (e.g., in the last 5 minutes, in the last 10 minutes, in the last 15 minutes, in the last 30 minutes, or in the last hour)) while the companion device was within a first threshold distance of the computer system (e.g., 700 and/or X700) (e.g., within 6 feet, within 10 feet, within 15 feet, or within 20 feet). Requiring that the companion device have been previously in the unlocked state while within a threshold distance of the computer system in order for the companion device to meet the unlock criteria improves privacy and security by ensuring that only authenticated and/or authorized users are able to access sensitive or private information.

In some embodiments, the determination that the computer system (e.g., 700 and/or X700) has detected a companion device (e.g., 1310) separate from the computer system that satisfies the unlock criteria while the companion device is in the locked state of the companion device comprises a determination that the companion device is a wearable device (e.g., in some embodiments, companion device 1310 is a wearable device) that has not been removed from the body of the user after the last instance in which the user was authenticated on (e.g., by and/or using) the companion device (e.g., the user was authenticated on the companion device (e.g., based on biometric authentication and/or passcode-based authentication) while the user was wearing the companion device, and the user has not removed the companion device from his or her body after being authenticated on the companion device) (e.g., in some embodiments, a determination that the companion device is a wearable device that has not been removed from the body of the user after the last instance in which the companion device was in the unlocked state of the companion device). Requiring that the companion device be continuously worn by the user since the last time the user was authenticated on the companion device and/or the last time the companion device was in the unlocked state in order for the companion device to meet the unlock criteria improves privacy and security by ensuring that only authenticated and/or authorized users are able to access sensitive or private information.

In some embodiments, the determination that the computer system (e.g., 700 and/or X700) has detected a companion device (e.g., 1310) separate from the computer system that satisfies the unlock criteria comprises a determination that the computer system has detected a companion device separate from the computer system that is in an unlocked state of the companion device (e.g., companion device 1310 in FIGS. 13E1 and/or 13E2) (e.g., a state in which the companion device is powered on and operational and is not prevent from performing at least a portion of a predefined set of operations that cannot be performed while the companion device is in a companion device locked state). Requiring that the companion device be in an unlocked state in order for the companion device to meet the unlock criteria improves privacy and security by ensuring that only authenticated and/or authorized users are able to access sensitive or private information.

In some embodiments, the unlock criteria includes a first unlock criterion that is satisfied when the companion device (e.g., 1310) belongs to a first set of device types (e.g., a phone, a watch, a tablet, a wearable device, a laptop, and/or a desktop computer) and that is not satisfied when the companion device belongs to a second set of device types (e.g., a phone, a watch, a tablet, a wearable device, a laptop, and/or a desktop computer) (e.g., the companion device does not belong to the first set of device types) different from the first set of device types (e.g., certain types of devices meet the first unlock criterion while other types of devices do not meet the first unlock criterion (e.g., phones satisfy the first unlock criterion but desktop computers do not satisfy the first unlock criterion)). In some embodiments, when the first unlock criterion is not satisfied, the unlock criteria are not satisfied. Requiring that the companion device be a particular type of device in order to meet the unlock criteria improves privacy and security by ensuring that only authenticated and/or authorized users are able to access sensitive or private information.

In some embodiments, the computer system (e.g., 700 and/or X700) displays, via the one or more display generation components (e.g., 702 and/or X702), while the computer system is in the locked state, an authentication user interface (e.g., 1302) that includes one or more selectable objects (e.g., 1304) for a user to enter passcode-based authentication information (e.g., passcode-based authentication information to transition the computer system from the locked state to the unlocked state) (e.g., an authentication user interface that includes a virtual keyboard and/or keyboard; and/or an authentication user interface that includes a passcode field and/or a submit passcode button). While the computer system (e.g., 700 and/or X700) is displaying the authentication user interface (e.g., 1302) and is in the locked state, the computer system is prohibited from accessing (e.g., is restricted from accessing and/or is not permitted to access) input enrollment data (e.g., input enrollment data corresponding to the user (e.g., corresponding uniquely to the user)) that is used in detecting user inputs by the user while the computer system in the unlocked state (e.g., a gaze input enrollment profile (e.g., corresponding to the user (e.g., corresponding uniquely to the user)) and/or a hand enrollment profile (e.g., corresponding to the user (e.g., corresponding uniquely to the user))). In some embodiments, the input enrollment data is generated and/or created during an enrollment process in which the user is instructed to perform one or more inputs (e.g., one or more gaze inputs and/or one or more hand inputs) and the input enrollment data (e.g., an input enrollment profile corresponding to the user) is generated based on the one or more inputs by the user. Prohibiting and/or restricting the computer system from accessing the input enrollment data while the computer system is in the locked state improves privacy and security by ensuring that only authenticated and/or authorized users are able to access sensitive or private information.

In some embodiments, the computer system (e.g., 700 and/or X700) display, via the one or more display generation components (e.g., 702 and/or X702), while the computer system is in the locked state, an authentication user interface (e.g., 1302) that includes one or more selectable objects (e.g., 1304) for the user to enter passcode-based authentication information (e.g., passcode-based authentication information to transition the computer system from the locked state to the unlocked state) (e.g., an authentication user interface that includes a virtual keyboard and/or keyboard; and/or an authentication user interface that includes a passcode field and/or a submit passcode button). While displaying the authentication user interface (e.g., 1302) and while the computer system is in the locked state, the computer system determines that the authentication user interface (e.g., 1302) has been displayed for a threshold amount of time (e.g., more than 5 seconds, more than 10 seconds, more than 30 seconds, or more than 1 minute) (or, optionally, in some embodiments, the authentication user interface has been displayed for a threshold amount of time without user input). In response to determining that the authentication user interface has been displayed for the threshold amount of time, the computer system displays, via the one or more display generation components, a prompt (e.g., 1306) (e.g., a text prompt and/or a visual prompt) (optionally, in some embodiments, within the authentication user interface and/or while maintaining display of the authentication user interface) to unlock a companion device separate from the computer system in order to enable biometric authentication on the computer system (e.g., in order to perform biometric authentication on the computer system). In some embodiments, displaying the prompt to unlock the companion device in order to enable biometric authentication on the computer system is performed in accordance with a determination that the computer system has detected a companion device separate from the computer system that satisfies the distance threshold criteria relative to the computer system. In some embodiments, displaying the prompt to unlock the companion device in order to enable biometric authentication on the computer system is performed in accordance with a determination that the computer system has detected a companion device separate from the computer system that satisfies the distance threshold criteria relative to the computer system but does not satisfy the unlock criteria. Displaying a prompt that instructs the user to unlock the companion device in order to enable biometric authentication on the computer system enhances the operability of the system and makes the user-system interface more efficient (e.g., by helping the user to provide proper inputs and reducing errors) which, additionally, reduces power usage and improves battery life of the device by enabling the user to use the system more quickly and efficiently. Furthermore, doing so also provides the user with feedback about the state of the device (e.g., biometric authentication is currently disabled on the device and can be re-enabled by unlocking a companion device).

In some embodiments, in response to detecting the request to transition the computer system from the locked state to the unlocked state (e.g., user input 1300): in accordance with a determination that the computer system (e.g., 700 and/or X700) satisfies the first set of criteria related to unlocking and that the computer system has detected a companion device (e.g., 1310) separate from the computer system that satisfies the distance threshold criteria relative to the computer system and does not satisfy the unlock criteria (e.g., companion device 1310 is in a locked state and/or companion device 1310 has been in a locked state for greater than a threshold amount of time), the computer system forgoes attempting biometric authentication of the user (e.g., electronic device 700 in FIGS. 13C-13D). Subsequent to forgoing attempting biometric authentication of the user (and, optionally, while the computer system is in the locked state), the computer system (e.g., 700 and/or X700) detects that the companion device (e.g., 1310) now satisfies the unlock criteria while the companion device continues to satisfy the distance threshold criteria relative to the computer system (and, in some embodiments, while the computer system continues to satisfy the first set of criteria related to unlocking) (e.g., in FIG. 13C and/or FIG. 13D, electronic device 700 detects that companion device 1310 satisfies distance threshold criteria, but does not satisfy the unlock criteria; and then in FIGS. 13E1 and/or 13E2, electronic device 700 and/or HMD X700 detects that companion device 1310 now satisfies both the distance threshold criteria and the unlock criteria). In response to detecting that the companion device (e.g., 1310) separate from the computer system now satisfies the unlock criteria while the companion device continues to satisfy the distance threshold criteria relative to the computer system (and, in some embodiments, while the computer system continues to satisfy the first set of criteria related to unlocking) (and, optionally, while the computer system is in the locked state), the computer system attempts, using the one or more input devices, biometric authentication of the user (e.g., electronic device 700 in FIG. 13E1 and/or HMD X700 in FIG. 13E2). In some embodiments, the companion device transitioning from a locked state to an unlocked state causes biometric authentication to be enabled and/or performed on the computer system. Attempting biometric authentication of a user when the computer system detects a companion device that satisfies distance threshold criteria relative to the computer system and that satisfies unlock criteria reduces the number of inputs required to perform this operation, and also improves security by encouraging users to use biometric authentication, which is generally more secure than non-biometric authentication.

In some embodiments, a companion device (e.g., 1310) separate from the computer system (e.g., 700 and/or X700) displays, via one or more display generation components of the companion device (e.g., 1312), a wake screen user interface indicative of the companion device having transitioned from a sleep state (e.g., a state in which the companion device displays no content and/or a state in which the companion device displays less content than when the companion device is in a wake state) to a wake state (e.g., a state in which the companion device displays content and/or a state in which the companion device displays more content than when the companion device is in the sleep state) (e.g., companion device 1310 in FIG. 13F) (in some embodiments, user interface 1318 in FIG. 13F is indicative of companion device 1310 being in an unlocked state; in some embodiments, companion device 1310 displays user interface 1326 while also displaying at least a portion of a locked user interface indicative of companion device 1310 being in a locked state). In some embodiments, the companion device (e.g., 1310) displays, via the one or more display generation components of the companion device (e.g., 1312), within the wake screen user interface, a first object (e.g., 1328a) (e.g., a virtual object and/or a user interface object) that is selectable (e.g., via a touch input, a tap input, and/or a different input) to initiate a process for transitioning the computer system from the locked state to the unlocked state. In some embodiments, the companion device displays the first object within the wake screen user interface in accordance with a determination that the companion device satisfies the distance threshold criteria relative to the computer system. In some embodiments, the first object (e.g., 1326 and/or 1328a) includes a prompt (e.g., a text prompt or other visual prompt) that indicates that the first object is selectable to transition the computer system from the locked state to the unlocked state. Displaying the first object that is selectable to initiate a process for transitioning the computer system from the locked state to the unlocked state enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, selection of the first object (e.g., 1328a) causes the companion device (e.g., 1310) to display, via the one or more display generation components of the companion device (e.g., 1312), a passcode-based authentication user interface (e.g., 1332) that includes one or more selectable objects (e.g., 1334) for the user to enter passcode-based authentication information (e.g., to transition the companion device from a locked state of the companion device to an unlocked state of the companion device) (e.g., an authentication user interface that includes a virtual keyboard and/or keyboard; and/or an authentication user interface that includes a passcode field and/or a submit passcode button). Displaying the first object that is selectable to cause the companion device to display the passcode-based authentication user interface enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, in accordance with a determination that the wake screen user interface includes the first object (e.g., 1328a), the companion device (e.g., 1310) maintains display of the wake screen user interface after it transitions from a locked state of the companion device to an unlocked state of the companion device (e.g., in some embodiments, in FIG. 13F, rather than displaying user interface 1318, companion device 1310 displays user interface 1326 overlaid on a lock screen user interface indicative of companion device 1310 being in a locked state; and after the user enters passcode information in FIGS. 13G-13H, companion device 1310 maintains display of the lock screen user interface). In some embodiments, when the wake screen user interface does not include the first object (e.g., when the companion device does not satisfy the distance threshold criteria relative to the computer system), the companion device ceases display of the wake screen user interface when the companion device transitions from the locked state of the companion device to the unlocked state of the companion device. Maintaining display of the wake screen user interface and the first object when the companion device transitions from the locked state of the companion device to the unlocked state of the companion device enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, a first companion device (e.g., 1310) separate from the computer system (e.g., 700 and/or X700) is visible via the one or more display generation components (e.g., 702 and/or X702) (e.g., representation 708e, representative of companion device 1310, is visible via display 702 and/or X702) (e.g., is displayed by the one or more display generation components and/or is visible through one or more transparent portions of the one or more display generation components) (e.g., a first companion device that satisfies the distance threshold criteria relative to the computer system and, optionally, satisfies the unlock criteria). Allowing a user to view the first companion device via the one or more display generation components enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, aspects/operations of methods 800, 1000, 1200, 1400, and/or 1600 may be interchanged, substituted, and/or added between these methods. For example, in some embodiments, enrolling the one or more eyes of a person in method 800 can be performed in order to perform eye-based biometric authentication of the person in methods 1000, 1200, and/or 1400; and/or in some embodiments, the spatial transition animation in method 1600 is performed in response to user authentication (e.g., as recited in methods 1000 and/or 1400). For brevity, these details are not repeated here.

FIGS. 15A-15N illustrate examples of transitioning a device. FIG. 16 is a flow diagram of an exemplary method 1600 for transitioning a device. The user interfaces in FIGS. 15A-15N are used to illustrate the processes described below, including the processes in FIG. 16.

FIG. 15A depicts electronic device 700, which is a tablet that includes touch-sensitive display 702, buttons 704a-704c, and one or more input sensors 706 (e.g., one or more cameras, eye gaze trackers, hand movement trackers, and/or head movement trackers). In some embodiments described below, electronic device 700 is a tablet. In some embodiments, electronic device 700 is a smartphone, a wearable device, a wearable smartwatch device, a head-mounted system (e.g., headset), or other computer system that includes and/or is in communication with one or more display devices (e.g., display screens and/or projection devices). In some embodiments in which electronic device 700 is a head-mounted system, electronic device 700 optionally includes two displays (e.g., one for each eye of a user), with each display displaying respective various content, to enable a user of electronic device 700 to perceive the various depths of the various content (e.g., physical objects and/or virtual objects) of three-dimensional environments. Electronic device 700 is a computer system (e.g., computer system 101 in FIG. 1A).

At FIG. 15A, electronic device 700 is in an off state in which electronic device 700 is powered off. At FIG. 15A, electronic device 700 detects user input 1500, which is a press of button 704a, and corresponds to a user request to transition electronic device 700 from the off state to an on state in which electronic device 700 is powered on. In FIG. 15A, user input 1500 is a button press of button 704a. However, in some embodiments, user input 1500 is a different type of user input, such as a gesture or other action taken by a user. For example, in some embodiments, electronic device 700 is a head-mounted system, and detecting user input 1500 includes, for example, detecting that a user has worn electronic device 700 (e.g., detecting that the user has worn electronic device 700 on his or her head), detecting a user performing a gesture (e.g., an air gesture (e.g., an air tap gesture and/or an air pinch gesture)) while electronic device 700 is worn, detecting a button press while electronic device 700 is worn, detecting rotation of a rotatable input mechanism while electronic device 700 is worn, detecting a gaze-based gesture (e.g., detecting the user looking at an object and/or moving his or her gaze in a particular manner), and/or any combination of the foregoing (e.g., detecting a gaze at object 714c in conjunction with an air pinch gesture).

Figure 15B:
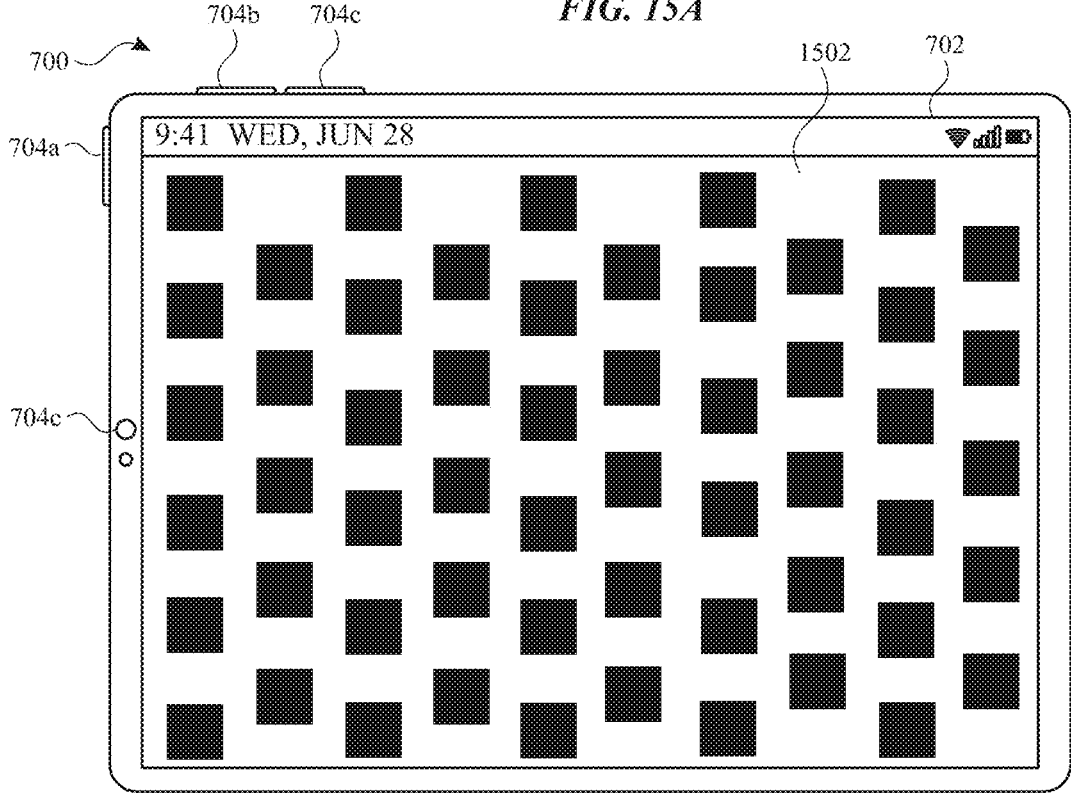

At FIG. 15B, in response to detecting user input 1500, electronic device 700 displays user interface 1502. In some embodiments, user interface 1502 indicates that electronic device 700 is powering on.

FIGS. 15C-15L illustrate example embodiments of a spatial transition animation that is displayed by electronic device 700 when electronic device 700 is powered on, according to various embodiments. The spatial transition animation gradually reveals a three-dimensional environment (e.g., three-dimensional environment 1510) over time via display 702. In some embodiments, the spatial transition animation progressively reveals objects in the three-dimensional environment that are positioned in front of the user in a direction that moves toward the viewpoint of the user and, in some embodiments, gradually reveals objects that are behind the user in a direction that moves away from the viewpoint of the user. In some embodiments, electronic device 700 is a head-mounted system, and the three-dimensional environment is a physical environment that surrounds the user and/or electronic device 700 (e.g., an optical pass-through environment) and/or is representative of the physical environment that surrounds the user and/or electronic device 700 (e.g., a virtual passthrough environment).

In FIGS. 15C-15K, the top half of the figure depicts the state of electronic device 700, while the bottom half of the figure demonstrates user 1512 within three-dimensional environment 1510 to provide additional details of an example embodiment of how the spatial transition animation is carried out. Three-dimensional environment 1510 includes objects 1518a-1518c. In some embodiments, three-dimensional environment 1510 is a physical environment within which user 1512 and electronic device 700 are located. In some embodiments, electronic device 700 is a head-mounted system, and is worn by user 1512 while user 1512 is located within physical three-dimensional environment 1510.

At FIG. 15C, after displaying user interface 1502 in FIG. 15B, electronic device 700 initiates the spatial transition animation by displaying user interface object 1504 and also outputs audio output 1506a corresponding to the spatial transition animation. In some embodiments, user interface object 1504 is displayed based on a determination that a first set of criteria is satisfied, and is not displayed when the first set of criteria is not satisfied. For example, in some embodiments, the first set of criteria is satisfied the first time electronic device 700 is powered on and/or booted up, and is not satisfied in subsequent instances of electronic device 700 being powered on and/or booted up. In some embodiments, user interface object 1504 is displayed overlaid on and/or positioned within three-dimensional environment 1510. However, in FIG. 15C, three-dimensional environment 1510 (including objects 1518a-1518c) is obscured and/or hidden. In some embodiments, electronic device 700 visually obscures and/or hides three-dimensional environment 1510 by displaying three-dimensional object 1516 that hides and/or obscures any portion of three-dimensional environment 1510 that is between user 1512 (and/or electronic device 700) and three-dimensional object 1516. In the depicted embodiment, three-dimensional object 1516 is a sphere. In some embodiments, three-dimensional object 1516 is centered on user 1512 and/or electronic device 700. In some embodiments, the spatial transition animation gradually reveals three-dimensional environment 1510 by creating an opening in three-dimensional object 1516 that gradually expands, such that any portions of three-dimensional environment 1510 that are positioned between user 1512 (and/or electronic device 700) and the opening are made visible (e.g., are no longer masked and/or obscured and/or are displayed by display 702), as will be described in greater detail below. For example, in the depicted embodiments, an opening is created in three-dimensional object 1516 and is gradually expanded by gradually moving plane 1513 in a direction that moves toward user 1512, as will be shown in subsequent figures. In some embodiments, electronic device 700 is a head-mounted system, and user 1512 looks through one or more transparent display generation components (e.g., display 702) out into physical three-dimensional environment 1510. In some embodiments, electronic device 700 obscures three-dimensional environment 1510 by selectively masking and/or displaying content (e.g., displaying a solid color) in various regions of display 702 through which the user would be able to see objects 1518a-

1518e. In some embodiments, electronic device 700 is a head-mounted system, and a virtual representation of physical three-dimensional environment 1510 is displayed by display 702, and electronic device 700 obscures three-dimensional environment 1510 by selectively displaying and/or not displaying objects 1518a-1518c and/or portions of objects 1518a-1518c.

In some embodiments, user interface object 1504 is displayed at a position within three-dimensional environment 1510 that corresponds to (e.g., is positioned along) a direction that user 1512 is looking (and/or a position that electronic device 700 is pointed) when the spatial transition animation begins. For example, it can be seen by arrow 1514 that user 1512 is looking in a first direction within three-dimensional environment 1510, and user interface object 1504 is displayed at a position in three-dimensional environment 1510 that is positioned along the direction user 1512 is looking. Had the user been looking in a different direction, user interface object 1504 would have been displayed at a different position within three-dimensional environment 1510. In some embodiments, user interface object 1504 is an environment-locked object. In other embodiments, user interface object 1504 is a viewpoint-locked object that moves as the viewpoint of user 1512 and/or the viewpoint of electronic device 700 moves. In some embodiments, user interface object 1504 is a viewpoint-locked object that is locked in at least one axis. For example, in some embodiments, user interface object 1504 is able to move horizontally (e.g., left and right) based on changes in the viewpoint of the user, but user interface object 1504 is not able to move vertically (e.g., up and down). In some embodiments, user interface object 1504 is a viewpoint-locked object that is locked in at least one axis when certain criteria are met, such as upon a first boot up and/or powering on of electronic device 700, and user interface object 1504 is a viewpoint-locked object that is not locked in any axis when the criteria are not met (e.g., all subsequent instances in which electronic device 700 is powered on).

At FIG. 15D1, electronic device 700 continues to display the spatial transition animation by creating opening 1515 in three-dimensional object 1516. In some embodiments, electronic device 700 creates opening 1515 based on the direction that user 1512 is looking (and/or based on the direction electronic device 700 is directed) when the spatial transition animation begins. For example, in some embodiments, electronic device 700 creates opening 1515 at a point along the outer surface of three-dimensional object 1516 at which user 1512 is looking when the spatial transition animation begins (e.g., identified as point 1511 in FIG. 15C). In the depicted embodiments, opening 1515 is created and gradually made larger by identifying a point along the outer surface of three-dimensional object 1516 that corresponds to the direction user 1512 is looking when the spatial transition animation begins (e.g., identified as point 1511 in FIG. 15C); defining planar surface 1513 that is tangential to three-dimensional object 1516 at point 1511; moving planar surface 1513 towards the direction of user 1512; and creating and/or enlarging opening 1515 by removing any portion of three-dimensional object 1516 that intersects planar surface 1513 as it gradually moves in the direction of user 1512. In FIG. 15D1, opening 1515 and viewpoint lines 1517a, 1517b define a cone-shaped visible region 1519. In some embodiments, visible region 1519 has a different shape, such as a cylinder or a frustum. Furthermore, while the depicted embodiments are one possible method for decreasing the size of three-dimensional object 1516 and/or increase the size of visible region 1519 over time, other embodiments are possible. For example, in some embodiments, the volume of three-dimensional object 1516 is decreased by decreasing the radius of three-dimensional object 1516 gradually over time and the spatial transition animation includes displaying objects as they fall outside of three-dimensional object 1516.

In FIG. 15D1, planar surface 1513 has moved towards user 1512, thereby expanding opening 1515. Accordingly, electronic device 700 now displays a portion of object 1518*c* within visible region 1519. However, objects 1518*a*, 1518*b*, 1518*d*, and 1518*e* and a portion of object 1518*c* remain within three-dimensional object 1516 and/or outside of visible region 1519 and, accordingly, are not displayed by electronic device 700. In some embodiments, rather than displaying the portion of object 1518*c* within visible region 1519, electronic device 700 makes the portion of object 1518*c* visible by, for example, removing masking and/or ceasing to obscure the portion of object 1518*c*. Similarly, in some embodiments, rather than forgoing display of objects 1518*a*, 1518*b*, 1518*d*, and/or 1518*e*, electronic device 700 visually obscures objects 1518*a*, 1518*b*, 1518*d*, and/or 1518*c* (e.g., via masking). At FIG. 15D1, electronic device 700 outputs audio output 1506*b*. In some embodiments, audio output 1506*b* is different from audio output 1506*a*. In some embodiments, audio output 1506*b* is a modification of and/or a progression of audio output 1506*a*. For example, in some embodiments, audio output 1506*b* has a higher volume or a lower volume than audio output 1506*a*; audio output 1506*b* has a higher pitch or a lower pitch than audio output 1506*a*; audio output 1506*b* adds one or more notes and/or tones to audio output 1506*a*; and/or audio output 1506*b* removes one or more notes and/or tones from audio output 1506*a*.

In some embodiments, the techniques and user interface(s) described in FIGS. 15A-15N are provided by one or more of the devices described in FIGS. 1A-IP. For example, FIG. 15D2 illustrates an embodiment in which visible region 1519 (e.g., as described in FIG. 15D1) is displayed on display module X702 of head-mounted device (HMD) X700. In some embodiments, HMD X700 includes a pair of display modules that provide stereoscopic content to different eyes of the same user. For example, HMD X700 includes display module X702 (which provides content to a left eye of the user) and a second display module (which provides content to a right eye of the user). In some embodiments, the second display module displays a slightly different image than display module X702 to generate the illusion of stereoscopic depth.

At FIG. 15D2, HMD X700 continues to display the spatial transition animation by creating opening 1515 in three-dimensional object 1516. In some embodiments, HMD X700 creates opening 1515 based on the direction that user 1512 is looking (and/or based on the direction HMD X700 is directed) when the spatial transition animation begins. For example, in some embodiments, HMD X700 creates opening 1515 at a point along the outer surface of three-dimensional object 1516 at which user 1512 is looking when the spatial transition animation begins (e.g., identified as point 1511 in FIG. 15C). In the depicted embodiments, opening 1515 is created and gradually made larger by identifying a point along the outer surface of three-dimensional object 1516 that corresponds to the direction user 1512 is looking when the spatial transition animation begins (e.g., identified as point 1511 in FIG. 15C); defining planar surface 1513 that is tangential to three-dimensional object 1516 at point 1511; moving planar surface 1513 towards the direction of user 1512; and creating and/or enlarging opening 1515 by removing any portion of three-dimensional object 1516 that intersects planar surface 1513 as it gradually moves in the direction of user 1512. In FIG. 15D2, opening 1515 and viewpoint lines 1517*a*, 1517*b* define a cone-shaped visible region 1519. In some embodiments, visible region 1519 has a different shape, such as a cylinder or a frustum. Furthermore, while the depicted embodiments are one possible method for decreasing the size of three-dimensional object 1516 and/or increase the size of visible region 1519 over time, other embodiments are possible. For example, in some embodiments, the volume of three-dimensional object 1516 is decreased by decreasing the radius of three-dimensional object 1516 gradually over time and the spatial transition animation includes displaying objects as they fall outside of three-dimensional object 1516.

In FIG. 15D2, planar surface 1513 has moved towards user 1512, thereby expanding opening 1515. Accordingly, HMD X700 now displays a portion of object 1518*c* within visible region 1519. However, objects 1518*a*, 1518*b*, 1518*d*, and 1518*e* and a portion of object 1518*c* remain within three-dimensional object 1516 and/or outside of visible region 1519 and, accordingly, are not displayed by HMD X700. In some embodiments, rather than displaying the portion of object 1518*c* within visible region 1519, HMD X700 makes the portion of object 1518*c* visible by, for example, removing masking and/or ceasing to obscure the portion of object 1518*c*. Similarly, in some embodiments, rather than forgoing display of objects 1518*a*, 1518*b*, 1518*d*, and/or 1518*c*, HMD X700 visually obscures objects 1518*a*, 1518*b*, 1518*d*, and/or 1518*c* (e.g., via masking). At FIG. 15D2, HMD X700 outputs audio output X1506*b*. In some embodiments, audio output X1506*b* is different from audio output 1506*a*. In some embodiments, audio output X1506*b* is a modification of and/or a progression of audio output 1506*a*. For example, in some embodiments, audio output X1506*b* has a higher volume or a lower volume than audio output 1506*a*; audio output X1506*b* has a higher pitch or a lower pitch than audio output 1506*a*; audio output X1506*b* adds one or more notes and/or tones to audio output 1506*a*; and/or audio output X1506*b* removes one or more notes and/or tones from audio output 1506*a*.

Any of the features, components, and/or parts, including the arrangements and configurations thereof shown in FIGS. 1B-1P can be included, either alone or in any combination, in HMD X700. For example, in some embodiments, HMD X700 includes any of the features, components, and/or parts of HMD 1-100, 1-200, 3-100, 6-100, 6-200, 6-300, 6-400, 11.1.1-100, and/or 11.1.2-100, either alone or in any combination. In some embodiments, display module X702 includes any of the features, components, and/or parts of display unit 1-102, display unit 1-202, display unit 1-306, display unit 1-406, display generation component 120, display screens 1-122*a-b*, first and second rear-facing display screens 1-322*a*, 1-322*b*, display 11.3.2-104, first and second display assemblies 1-120*a*, 1-120*b*, display assembly 1-320, display assembly 1-421, first and second display sub-assemblies 1-420*a*, 1-420*b*, display assembly 3-108, display assembly 11.3.2-204, first and second optical modules 11.1.1-104*a* and 11.1.1-104*b*, optical module 11.3.2-100, optical module 11.3.2-200, lenticular lens array 3-110, display region or area 6-232, and/or display/display region 6-334, either alone or in any combination. In some embodiments, HMD X700 includes a sensor that includes any of the features, components, and/or parts of any of sensors 190, sensors 306, image sensors 314, image sensors 404, sensor assembly 1-356, sensor assembly 1-456, sensor system 6-102, sensor system 6-202, sensors 6-203, sensor system 6-302, sensors 6-303, sensor system 6-402, and/or sensors

11.1.2-110*a-f*, either alone or in any combination. In some embodiments, HMD X700 includes one or more input devices, which can include any of the features, components, and/or parts of any of first button 1-128, button 11.1.1-114, second button 1-132, and or dial or button 1-328, either alone or in any combination. In some embodiments, HMD X700 includes one or more audio output components (e.g., electronic component 1-112) for generating audio feedback (e.g., audio output X1506*b*), optionally generated based on detected events and/or user inputs detected by the HMD X700.

In FIG. 15E, the spatial transition animation continues and planar surface 1513 continues its movement towards user 1512 such that three-dimensional object 1516 continues to decrease in size, opening 1515 increases in size, and visible region 1519 also increases in size. Accordingly, electronic device 700 now displays a greater portion of object 1518*c*. However, objects 1518*a*, 1518*b*, 1518*d*, and 1518*e*, and a portion of object 1518*c* remain within three-dimensional object 1516 and outside of visible region 1519 and, accordingly, are not displayed by electronic device 700. In some embodiments, rather than displaying the portion of object 1518*c* within visible region 1519, electronic device 700 makes the portion of object 1518*c* visible by, for example, removing masking and/or ceasing to obscure the portion of object 1518*c*. Similarly, in some embodiments, rather than forgoing display of objects 1518*a*, 1518*b*, 1518*d*, and/or 1518*c*, electronic device 700 visually obscures objects 1518*a*, 1518*b*, 1518*d*, and/or 1518*c* (e.g., via masking). At FIG. 15E, electronic device 700 outputs audio output 1506*c*. In some embodiments, audio output 1506*c* is different from audio output 1506*a* and/or audio output 1506*b*. In some embodiments, audio output 1506*c* is a modification of and/or a progression of audio output 1506*b*. For example, in some embodiments, audio output 1506*c* has a higher volume or a lower volume than audio output 1506*b*; audio output 1506*c* has a higher pitch or a lower pitch than audio output 1506*b*; audio output 1506*c* adds one or more notes and/or tones to audio output 1506*b*; and/or audio output 1506*c* removes one or more notes and/or tones from audio output 1506*b*.

In FIG. 15F, the spatial transition animation continues and planar surface 1513 continues its movement towards user 1512 such that three-dimensional object 1516 continues to decrease in size, opening 1515 increases in size, and visible region 1519 also increases in size. Accordingly, electronic device 700 now displays almost the entirety of object 1518*c*. However, objects 1518*a*, 1518*b*, 1518*d*, and 1518*e* remain within three-dimensional object 1516 and outside of visible region 1519 and, accordingly, are not displayed by electronic device 700. In some embodiments, rather than displaying object 1518*c* within visible region 1519, electronic device 700 makes object 1518*c* visible by, for example, removing masking and/or ceasing to obscure object 1518*c*. Similarly, in some embodiments, rather than forgoing display of objects 1518*a*, 1518*b*, 1518*d*, and/or 1518*e*, electronic device 700 visually obscures objects 1518*a*, 1518*b*, 1518*d*, and/or 1518*e* (e.g., via masking). At FIG. 15F, electronic device 700 outputs audio output 1506*d*. In some embodiments, audio output 1506*d* is different from audio output 1506*a*, audio output 1506*b*, and/or audio output 1506*c*. In some embodiments, audio output 1506*d* is a modification of and/or a progression of audio output 1506*c*. For example, in some embodiments, audio output 1506*d* has a higher volume or a lower volume than audio output 1506*c*; audio output 1506*d* has a higher pitch or a lower pitch than audio output 1506*c*; audio output 1506*d* adds one or more notes and/or tones to audio output 1506*c*; and/or audio output 1506*d* removes one or more notes and/or tones from audio output 1506*c*.

In FIG. 15G, the spatial transition animation continues and planar surface 1513 continues its movement towards user 1512 such that three-dimensional object 1516 continues to decrease in size, opening 1515 continues to increase in size, and visible region 1519 also continues to increase in size. Accordingly, electronic device 700 now displays object 1518*a*, object 1518*b*, object 1518*c*, object 1518*d*, and object 1518*e*. In some embodiments, rather than displaying objects 1518*a*-1518*e* within visible region 1519, electronic device 700 makes these objects visible by, for example, removing masking and/or ceasing to obscure these objects. In FIG. 15G, a portion of object 1518*a* and a portion of object 1518*b* remain outside of visible region 1519 and are not yet displayed. At FIG. 15G, electronic device 700 outputs audio output 1506*e*. In some embodiments, audio output 1506*e* is different from audio output 1506*a*, audio output 1506*b*, audio output 1506*c*, and/or audio output 1506*d*. In some embodiments, audio output 1506*e* is a modification of and/or a progression of audio output 1506*d*. For example, in some embodiments, audio output 1506*e* has a higher volume or a lower volume than audio output 1506*d*; audio output 1506*e* has a higher pitch or a lower pitch than audio output 1506*d*; audio output 1506*e* adds one or more notes and/or tones to audio output 1506*d*; and/or audio output 1506*e* removes one or more notes and/or tones from audio output 1506*d*.

In FIG. 15H, the spatial transition animation continues and planar surface 1513 continues its movement toward user 1512 such that three-dimensional object 1516 continues to decrease in size, opening 1515 continues to increase in size, and visible region 1519 continues to increase in size. In FIG. 15H, the entirety of objects 1518*a*-1518*e* are now within visible region 1519 and are displayed by display 702 and/or made visible to the user (e.g., by removing masking and/or ceasing to obscure these objects). At FIG. 15H, electronic device 700 outputs audio output 1506*f*. In some embodiments, audio output 1506*f* is different from audio output 1506*a*, audio output 1506*b*, audio output 1506*c*, audio output 1506*d*, and/or audio output 1506*e*. In some embodiments, audio output 1506*f* is a modification of and/or a progression of audio output 1506*c*. For example, in some embodiments, audio output 1506*f* has a higher volume or a lower volume than audio output 1506*e*; audio output 1506*f* has a higher pitch or a lower pitch than audio output 1506*e*; audio output 1506*f* adds one or more notes and/or tones to audio output 1506*e*; and/or audio output 1506*f* removes one or more notes and/or tones from audio output 1506*c*.

In FIG. 15I, the spatial transition animation continues and planar surface 1513 continues its movement in the same direction such that three-dimensional object 1516 continues to decrease in size and visible region 1519 continues to increase in size. In FIG. 15I, planar surface 1513 has now reached user 1512, such that visible region 1519 now includes everything that is in front of user 1512 and everything in front of user 1512 is made visible (e.g., is displayed by electronic device 700, is able to be displayed by electronic device 700, and/or is no longer visually obscured by electronic device 700). For example, in FIG. 15I, were the user to look around physical environment 1510 and change his or her viewpoint (and/or were the user to move the position of electronic device 700 to change the viewpoint of one or more cameras of electronic device 700), electronic device 700 would now be able to display and/or make visible certain objects in physical environment 1510 that are above and/or below the user. At FIG. 15I, electronic device 700 outputs audio output 1506g. In some embodiments, audio output 1506g is different from audio output 1506a, audio output 1506b, audio output 1506c, audio output 1506d, audio output 1506e, and/or audio output 1506f. In some embodiments, audio output 1506g is a modification of and/or a progression of audio output 1506f. For example, in some embodiments, audio output 1506g has a higher volume or a lower volume than audio output 1506f; audio output 1506g has a higher pitch or a lower pitch than audio output 1506f; audio output 1506g adds one or more notes and/or tones to audio output 1506f; and/or audio output 1506g removes one or more notes and/or tones from audio output 1506f.

In FIG. 15J, the spatial transition animation continues and planar surface 1513 continues its movement in the same direction such that three-dimensional object 1516 continues to decrease in size and visible region 1519 continues to increase in size. In FIG. 15J, planar surface 1513 has now moved past user 1512, such that visible region 1519 now includes everything that is in front of user 1512 as well as certain objects and/or portions of physical environment 1510 that are behind user 1512. In FIG. 15J, were the user to look around physical environment 1510 and change his or her viewpoint, electronic device 700 would now make visible (e.g., display and/or allow the user to see without visual obscurement) certain objects in physical environment 1510 that are behind the user that would not have previously been visible via display 702. At FIG. 15J, electronic device 700 outputs audio output 1506h. In some embodiments, audio output 1506h is different from audio output 1506a, audio output 1506b, audio output 1506c, audio output 1506d, audio output 1506e, audio output 1506f, and/or audio output 1506g. In some embodiments, audio output 1506h is a modification of and/or a progression of audio output 1506g. For example, in some embodiments, audio output 1506h has a higher volume or a lower volume than audio output 1506g; audio output 1506h has a higher pitch or a lower pitch than audio output 1506g; audio output 1506h adds one or more notes and/or tones to audio output 1506g; and/or audio output 1506h removes one or more notes and/or tones from audio output 1506g.

In FIG. 15K, the spatial transition animation concludes once planar surface 1513 has moved so far that three-dimensional object 1516 no longer has any volume and/or size. At this point, nothing in three-dimensional environment 1510 is obscured and/or hidden because three-dimensional object 1516 is no longer displayed and visible region 1519 includes the entirety of three-dimensional environment 1510. In some embodiments, if the user 1512 maintains his or her view forward (e.g., as indicated by arrow 1514) in FIGS. 15J and 15K, the user would not see any changes to what is presented to the user, as the spatial transition animation would be taking place behind the viewpoint of the user. However, if the user was to turn around, the user would see the spatial transition animation continue behind the user. In FIG. 15K, electronic device 700 displays object 1520 indicating that the spatial transition animation has concluded. In some embodiments, object 1520 is a viewpoint-locked object. In some embodiments, object 1520 is a viewpoint-locked object that is constrained in at least one axis (e.g., is able to follow the viewpoint of the user left and right, but is locked vertically such that it cannot move up or down). At FIG. 15K, electronic device 700 outputs audio output 1506i. In some embodiments, audio output 1506i is different from audio output 1506a, audio output 1506b, audio output 1506c, audio output 1506d, audio output

1506e, audio output 1506f, audio output 1506g, and/or audio output 1506h. In some embodiments, audio output 1506i is a modification of and/or a progression of audio output 1506h. For example, in some embodiments, audio output 1506i has a higher volume or a lower volume than audio output 1506h; audio output 1506i has a higher pitch or a lower pitch than audio output 1506h; audio output 1506i adds one or more notes and/or tones to audio output 1506h; and/or audio output 1506i removes one or more notes and/or tones from audio output 1506h. In some embodiments, audio output 1506i is indicative of the spatial transition animation having concluded.

Figures 15L, 15M:
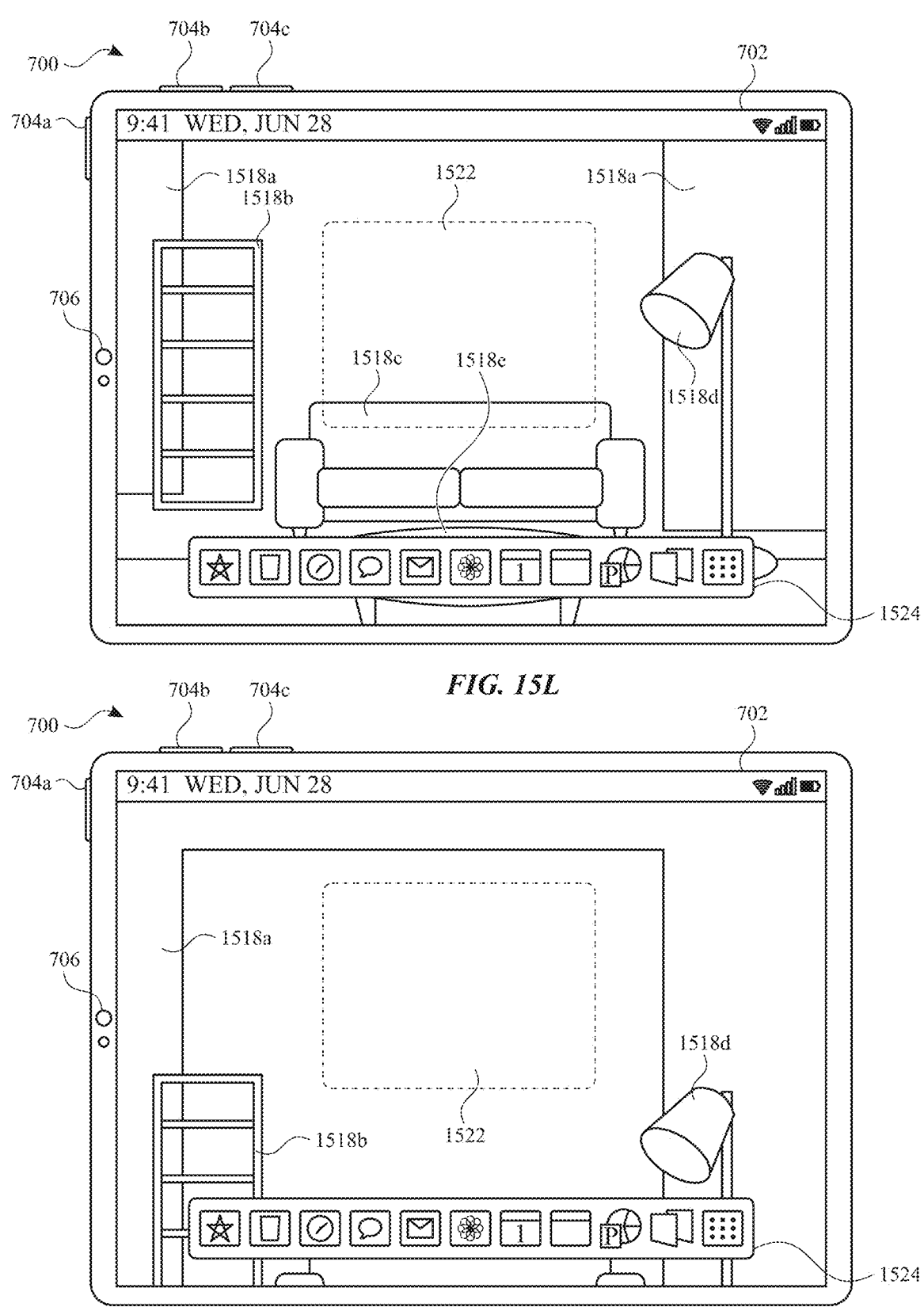
Figure 15N:
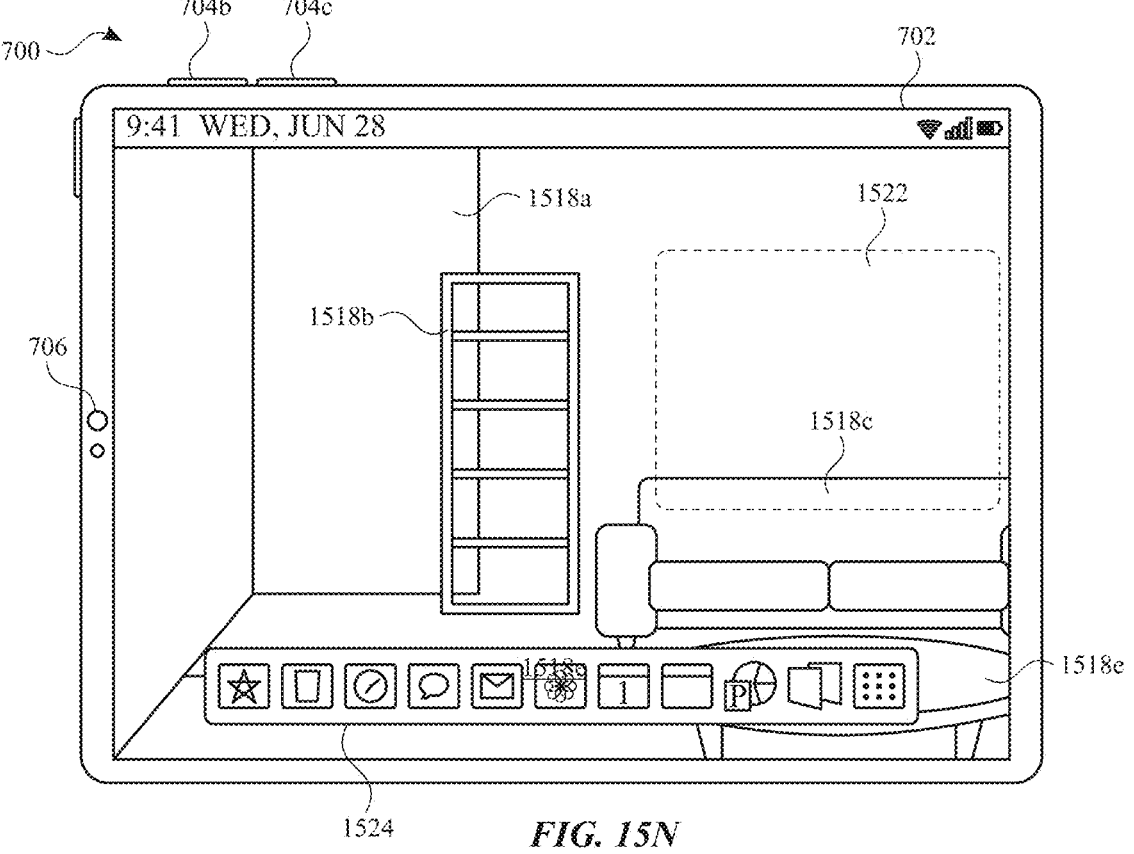

At FIG. 15L, upon conclusion of the spatial transition animation, electronic device 700 now displays user interface 1522 overlaid on three-dimensional environment 1510. In some embodiments, user interface 1522 is indicative of electronic device 700 being in an active and/or booted state.

In some embodiments, user interface 1522 is a viewpoint-locked object. FIG. 15M depicts an embodiment in which user interface 1522 is a viewpoint-locked object. In FIG. 15M, the viewpoint of electronic device 700 has changed, as can be seen by movement of objects 1518a-1518c. In some embodiments, electronic device 700 is a head-mounted system, and the viewpoint of electronic device 700 has changed based on movement of the user's head while the user wears electronic device 700 on his or her head (e.g., from FIG. 15L to FIG. 15M, the user has looked up slightly). User interface 1522 moves within three-dimensional environment 1510 to remain centered on the viewpoint of the user and/or the viewpoint of electronic device 700.

In some embodiments, user interface 1522 is an environment-locked object. FIG. 15N depicts an embodiment in which user interface 1522 is an environment-locked object. In FIG. 15N, the viewpoint of electronic device 700 has changed from FIG. 15L, as can be seen by movement of objects 1518a-1518e. In some embodiments, electronic device 700 is a head-mounted system, and the viewpoint of electronic device 700 has changed based on movement of the user's head while the user wears electronic device 700 on his or her head (e.g., from FIG. 15L to FIG. 15N, the user has turned his or her head to the left). User interface 1522 remains in a fixed position within three-dimensional environment 1510.

Additional descriptions regarding FIGS. 15A-15N are provided below in reference to method 1600 described with respect to FIG. 16.

FIG. 16 is a flow diagram of an exemplary method 1600 for transitioning a device, in some embodiments. In some embodiments, method 1600 is performed at a computer system (e.g., computer system 101 in FIG. 1A, 700, and/or X700) (e.g., a smart phone, a smart watch, a tablet, a laptop, a desktop, a wearable device, and/or head-mounted device) that is in communication with one or more display generation components (e.g., display generation component 120 in FIGS. 1, 3, and 4, 702, and/or X702) (e.g., a heads-up display, a display, a touchscreen, and/or a projector) (e.g., a visual output device, a 3D display, a display having at least a portion that is transparent or translucent on which images can be projected (e.g., a sec-through display), a projector, a heads-up display, and/or a display controller) and one or more input devices (e.g., 702, 704a-704c, and/or 706) (e.g., a touch-sensitive surface (e.g., a touch-sensitive display); a mouse; a keyboard; a remote control; a visual input device (e.g., one or more cameras (e.g., an infrared camera, a depth camera, a visible light camera, and/or a gaze tracking camera)); an audio input device; a biometric sensor (e.g., a fingerprint sensor, a face identification sensor, a gaze tracking sensor, and/or an iris identification sensor) and/or one or more mechanical input devices (e.g., a depressible input mechanism; a button; a rotatable input mechanism; a crown; and/or a dial)). In some embodiments, method 1600 is governed by instructions that are stored in a non-transitory (or transitory) computer-readable storage medium and that are executed by one or more processors of a computer system, such as the one or more processors 202 of computer system 101 (e.g., control 110 in FIG. 1A). Some operations in method 1600 are, optionally, combined and/or the order of some operations is, optionally, changed.

In some embodiments, the computer system (e.g., 700 and/or X700) detects (1602), via the one or more input devices (e.g., 702, 704a-704c, and/or 706), a user request (e.g., user input 1500) (e.g., detects that the user has worn the computer system (e.g., on his or her head and/or on his or her body), detects that the user has pressed a button, detects that the user has provided an input on a touch-sensitive surface, and/or detects that the user has provided a physical input (e.g., a rotation and/or a depression) on a physical input mechanism (e.g., a dial and/or a button)) to transition the computer system (e.g., 700 and/or X700) from a first state in which a three dimensional environment (e.g., 1510 and/or 1518a-1518e) is not visible via the one or more display generation components (e.g., 702 and/or X702) (e.g., an inactive state, an unused state, a rest state, a low power state (e.g., a state in which the computer system is using less power than in a high power state), and/or a state in which content is not displayed by the one or more display generation components) (e.g., FIG. 15A, FIG. 15B, and/or FIG. 15C) to a second state in which the three dimensional environment (e.g., 1510 and/or 1518a-1518c) is visible via the one or more display generation components (e.g., 702 and/or X702) (e.g., FIG. 15K, FIG. 15L, FIG. 15M, and/or FIG. 15N) (e.g., an active state, a use state, a powered state and/or a high power state (e.g., a state in which the computer system uses more power than in a low power state), and/or a state in which content is displayed by the one or more display generation components) different from the first state (in some embodiments, the user request to transition the computer system from the first state to the second state comprises a user request to initiate a session of using the computer system). In response to detecting the user request (e.g., user input 1500) to transition the computer system from the first state to the second state (1604), the computer system (e.g., 700 and/or X700) displays (1606), via the one or more display generation components (e.g., 702 and/or X702), a spatial transition animation that progressively reveals the three-dimensional environment (e.g., 1510 and/or 1518a-1518e) (e.g., a physical environment that surrounds the computer system and/or the user, a passthrough environment, a virtual passthrough environment, and/or an optical passthrough environment) over time. In some embodiments, the three-dimensional environment (e.g., 1510 and/or 1518a-1518e) comprises (1608): a first set of objects (e.g., 1518a-1518e) (e.g., a first set of virtual objects and/or a first set of physical objects), and a second set of objects (e.g., 1518a-1518e) (e.g., a second set of virtual objects and/or a second set of physical objects) different from the first set of objects and that are closer to a viewpoint of a user of the computer system (e.g., closer to a viewpoint of the user within a virtual space and/or closer to a viewpoint of the user within a physical space) than the first set of objects. In some embodiments, displaying the spatial transition animation comprises (1610): at a first time (1612), displaying a user interface in which the first set of objects and the second set of objects are both visually obscured (e.g., electronic device 700 in FIG. 15C) (e.g., displaying a user interface in which the first set of objects and the second set of objects are not displayed; displaying a user interface in which the first set of objects and the second set of objects are masked; and/or causing the first set of objects and the second set of objects to not be visible and/or to be visually obscured) (in some embodiments, at the first time, all objects in the three-dimensional environment are visually obscured); at a second time subsequent to the first time (1614), displaying a user interface in which the first set of objects are no longer visually obscured (e.g., displaying a user interface in which the first set of objects are visible, are displayed, and/or are no longer masked; causing the first set of objects to be visible; and/or removing masking of the first set of objects) while the second set of objects continue to be visually obscured (e.g., electronic device 700 in FIGS. 15D1-15F, where object 1518c is visible but objects 1518d-1518e remain visually obscured) (e.g., maintaining masking of the second set of objects; continuing to forgo display of the second set of objects; and/or continuing to cause the second set of objects to not be visible) (e.g., based on a determination that the first set of objects are farther from the viewpoint of the user of the computer system than the second set of objects); and at a third time subsequent to the second time (1616), displaying a user interface in which both the second set of objects (e.g., displaying a user interface in which the second set of objects are visible, are displayed, and/or are no longer masked; displaying the second set of objects; and/or causing the second set of objects to be visible; and/or removing masking of the second set of objects) and the first set of objects are no longer visually obscured (e.g., FIGS. 15G-15K, in which objects 1518c-1518e are all no longer visually obscured) (e.g., while continuing to display the first set of objects; while continuing to cause the first set of objects to be visible; and/or while continuing to not mask the first set of objects). In some embodiments, the three-dimensional environment (e.g., 1510 and/or 1518a-1518e) comprises a third set of objects (e.g., 1518a-1518e) (e.g., a third set of virtual objects and/or a third set of physical objects) different from the first set of objects and the second set of objects, and the third set of objects is closer to the viewpoint of the user of the computer system than the first set of objects and the second set of objects. In some embodiments, displaying the spatial transition animation further comprises: at the first time, displaying a user interface in which the first set of objects, the second set of objects, and the third set of objects are all visually obscured (e.g., FIG. 15C); at the second time subsequent to the first time, displaying a user interface in which the first set of objects are no longer visually obscured while the second set of objects and the third set of objects continue to be visually obscured (e.g., FIGS. 15D1-15F); at the third time subsequent to the second time, displaying a user interface in which the first set of objects and the second set of objects are no longer visually obscured and the third set of objects continues to be visually obscured; and at a fourth time subsequent to the third time, displaying a user interface in which the first set of objects, the second set of objects, and the third set of objects are no longer visually obscured (e.g., FIGS. 15G-15K). In some embodiments, the spatial transition animation gradually reveals portions of the three-dimensional environment (e.g., 1510 and/or 1518a-1518e) that are further away from the viewpoint of the user (e.g., 1512) before revealing portions of the three-dimensional environment that are closer to the viewpoint of the user. Gradually transitioning the computer system from a state in which a three-dimensional environment is not visible to a state in which the three-dimensional environment is visible enhances the operability of the system and makes the user-system interface more efficient (e.g., by helping the user to provide proper inputs and reducing errors) which, additionally, reduces power usage and improves battery life of the device by enabling the user to use the system more quickly and efficiently. Furthermore, doing so also provides the user with feedback about a state of the device (e.g., that the device is ready to be used and/or that the device has detected one or more characteristics about the three-dimensional environment (e.g., that certain objects are further from the user than others). Additionally, transitioning the computer system in this manner improves power efficiency and produces fewer visual artifacts than a depth-based transition.

In some embodiments, detecting the user request to transition the computer system (e.g., 700 and/or X700) from the first state to the second state comprises detecting that a user has worn the computer system (e.g., on the user's head and/or on the user's body). In some embodiments, detecting that the user has worn the computer system is performed based on detecting on or more eyes of the user. Automatically transitioning the computer system from the first state to the second state in response to the user wearing the computer system reduces the number of inputs required to perform this operation, and allows for this operation to be performed without displaying additional controls.

In some embodiments, detecting the user request to transition the computer system (e.g., 700 and/or X700) from the first state to the second state comprises detecting a user request to turn the computer system on (e.g., user input 1500) (e.g., transition the computer system from an off state (e.g., an unpowered state and/or a state in which no content is displayed) to an on state (e.g., a powered state and/or a state in which content is displayed)). Automatically transitioning the computer system from the first state to the second state in response to a user request to turn the computer system on reduces the number of inputs required to perform this operation, and allows for this operation to be performed without displaying additional controls.

In some embodiments, in response to detecting the user request (e.g., user input 1500) to transition the computer system from the first state to the second state: prior to displaying the spatial transition animation (e.g., before the spatial transition animation is started and/or before the spatial transition animation is completed), the computer system displays, via the one or more display generation components (e.g., 702 and/or X702), an initial user interface (e.g., 1502) (e.g., without displaying the three-dimensional environment, while the three-dimensional environment is not visible, and/or while the three-dimensional environment is visually obscured) (e.g., an initial user interface different from the user interface in which the first set of objects and the second set of objects are both visually obscured; an initial user interface different from the user interface in which the first set of objects are no longer visually obscured while the second set of objects continue to be visually obscured; and/or an initial user interface different from the user interface in which both the second set of objects and the first set of objects are no longer visually obscured). In some embodiments, subsequent to displaying the initial user interface (e.g., 1502) (e.g., displaying concurrently with the initial user interface and/or after display of the initial user interface), the computer system displays, via the one or more display generation components (e.g., 702 and/or X702), a first graphical object (e.g., 1504) (e.g., without displaying the three-dimensional environment, while the three-dimensional environment is not visible, and/or while the three-dimensional environment is visually obscured) (e.g., a first graphical object different from the initial user interface; a first graphical object different from the user interface in which the first set of objects and the second set of objects are both visually obscured; a first graphical object different from the user interface in which the first set of objects are no longer visually obscured while the second set of objects continue to be visually obscured; and/or a first graphical object different from the user interface in which both the second set of objects and the first set of objects are no longer visually obscured). Automatically displaying the initial user interface and the first graphical object in response to detecting the user request to transition the computer system from the first state to the second state reduces the number of inputs required to perform this operation.

In some embodiments, the initial user interface (e.g., 1502) is a solid color or a repeating pattern (e.g., a repeating visual pattern). Automatically displaying the initial user interface and the first graphical object in response to detecting the user request to transition the computer system from the first state to the second state reduces the number of inputs required to perform this operation.

In some embodiments, displaying the spatial animation comprises progressively decreasing, over time, the size of a three-dimensional object (e.g., 1516) that visually obscures the three-dimensional environment (e.g., 1510 and/or 1518*a*-1518*e*). In some embodiments, displaying the user interface in which the first set of objects and the second set of objects are both visually obscured comprises displaying the three-dimensional object (e.g., 1516) at a first size that visually obscures the first set of objects and the second set of objects (e.g., 1516 in FIG. 15C); displaying the user interface in which the first set of objects are no longer visually obscured while the second set of objects continue to be visually obscured comprises displaying the three-dimensional object (e.g., 1516) at a second size (e.g., a second size different from the first size; and/or a second size smaller than the first size) that visually obscures the second set of objects without visually obscuring the first set of objects (e.g., 1516 in FIGS. 15D1 and/or 15D2); and displaying the user interface in which both the second set of objects and the first set of objects are no longer visually obscured comprises displaying the three-dimensional object (e.g., 1516) at a third size (e.g., a third size different from the first size and/or the second size; and/or a third size that is smaller than the first size and/or the second size) that does not visually obscure the second set of objects and the first set of objects (e.g., 1516 in FIGS. 15G-15K) (in some embodiments, displaying the user interface in which both the second set of objects and the first set of objects are no longer visually obscured comprises ceasing display of the three-dimensional object). Automatically decreasing the size of the three-dimensional object to gradually reveal more of the three-dimensional environment in response to a user request to transition the computer system from the first state to the second state reduces the number of inputs required to perform this operation and allows for this operation to be performed without displaying additional controls.

In some embodiments, the three-dimensional object (e.g., 1516) is a sphere. Automatically decreasing the size of the three-dimensional object to gradually reveal more of the three-dimensional environment in response to a user request to transition the computer system from the first state to the second state reduces the number of inputs required to perform this operation and allows for this operation to be performed without displaying additional controls.

In some embodiments, the first size (e.g., 1516 in FIG. 15C) is a size that is greater than a size of the three-dimensional environment (e.g., 1510 and/or 1518a-1518e) (e.g., the first size is larger enough such that the three-dimensional object surrounds and/or encapsulates the three-dimensional environment). Automatically decreasing the size of the three-dimensional object to gradually reveal more of the three-dimensional environment in response to a user request to transition the computer system from the first state to the second state reduces the number of inputs required to perform this operation and allows for this operation to be performed without displaying additional controls.

In some embodiments, while the three-dimensional object (e.g., 1516) is displayed at the first size (e.g., 1516 in FIG. 15C), the viewpoint of the user (e.g., 1512) of the computer system (e.g., 700 and/or X700) is located inside of the three-dimensional object (e.g., 1516). In some embodiments, while the three-dimensional object (e.g., 1516) is displayed (e.g., at any size, at the first size, at the second size, and/or at the third size), the viewpoint of the user (e.g., 1512) of the computer system (e.g., 700 and/or X700) is located inside of the three-dimensional object. Automatically decreasing the size of the three-dimensional object to gradually reveal more of the three-dimensional environment in response to a user request to transition the computer system from the first state to the second state reduces the number of inputs required to perform this operation and allows for this operation to be performed without displaying additional controls.

In some embodiments, the three-dimensional object (e.g., 1516) is an environment-locked object. Displaying the three-dimensional object as an environment-locked object enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, displaying the spatial transition animation comprises starting the spatial transition animation from a point (e.g., 1511) in the three-dimensional environment (e.g., 1510) relative to the viewpoint of the user (e.g., 1512) of the computer system (e.g., 700 and/or X700) that is further from the viewpoint of the user than a majority (or, optionally all) of the points in the three-dimensional environment (e.g., 1510 and/or 1518a-1518e) from the user (e.g., 1512) (e.g., the first object in the three-dimensional environment to become no longer visually obscured is the furthest object in the three-dimensional environment relative to the viewpoint of the user of the computer system). Gradually transitioning the computer system from a state in which a three-dimensional environment is not visible to a state in which the three-dimensional environment is visible enhances the operability of the system and makes the user-system interface more efficient (e.g., by helping the user to provide proper inputs and reducing errors) which, additionally, reduces power usage and improves battery life of the device by enabling the user to use the system more quickly and efficiently. Furthermore, doing so also provides the user with feedback about a state of the device (e.g., that the device is ready to be used and/or that the device has detected one or more characteristics about the three-dimensional environment (e.g., that certain objects are further from the user than others)).

In some embodiments, the furthest point (e.g., 1511) in the three-dimensional environment (e.g., 1510) relative to the viewpoint of the user (e.g., 1512) is automatically determined by the computer system (e.g., 700 and/or X700) (e.g., using one or more sensors (e.g., radar, lidar, and/or cameras) of the computer system (e.g., one or more sensors in communication with the computer system)). Gradually transitioning the computer system from a state in which a three-dimensional environment is not visible to a state in which the three-dimensional environment is visible enhances the operability of the system and makes the user-system interface more efficient (e.g. by helping the user to provide proper inputs and reducing errors) which, additionally, reduces power usage and improves battery life of the device by enabling the user to use the system more quickly and efficiently. Furthermore, doing so also provides the user with feedback about a state of the device (e.g., that the device is ready to be used and/or that the device has detected one or more characteristics about the three-dimensional environment (e.g., that certain objects are further from the user than others)).

In some embodiments, the spatial transition animation is displayed based on a geometry of a physical three-dimensional environment (e.g., 1510) that surrounds the computer system (e.g., 700 and/or X700) (e.g., the physical three-dimensional environment within which the computer system is located and/or positioned) (e.g., in some embodiments, the spatial transition animation gradually, over time, reveals the physical three-dimensional environment, with objects further from the computer system being revealed before objects closer to the computer system). Gradually transitioning the computer system from a state in which a three-dimensional environment is not visible to a state in which the three-dimensional environment is visible enhances the operability of the system and makes the user-system interface more efficient (e.g., by helping the user to provide proper inputs and reducing errors) which, additionally, reduces power usage and improves battery life of the device by enabling the user to use the system more quickly and efficiently. Furthermore, doing so also provides the user with feedback about a state of the device (e.g., that the device is ready to be used and/or that the device has detected one or more characteristics about the three-dimensional environment (e.g., that certain objects are further from the user than others)).

In some embodiments, the first set of objects (e.g., 1518c) is a first set of physical objects in the physical three-dimensional environment (e.g., 1510); and the second set of objects (e.g., 1518d) is a second set of physical objects in the physical three-dimensional environment (e.g., 1510) different from the first set of physical objects (e.g., 1518c) and that are physically closer to the user (e.g., 1512) of the computer system than the first set of physical objects (e.g., 1518c). Gradually transitioning the computer system from a state in which a physical three-dimensional environment is not visible to a state in which the physical three-dimensional environment is visible enhances the operability of the system and makes the user-system interface more efficient (e.g., by helping the user to provide proper inputs and reducing errors) which, additionally, reduces power usage and improves battery life of the device by enabling the user to use the system more quickly and efficiently. Furthermore, doing so also provides the user with feedback about a state of the device (e.g., that the device is ready to be used and/or that the device has detected one or more characteristics about the physical three-dimensional environment (e.g., that certain physical objects are further from the user than others)).

In some embodiments, displaying the spatial transition animation further comprises: determining a first direction (e.g., 1514) that the head of the user (e.g., 1512) is directed (e.g., a first direction in which the user is looking) at the start of the spatial transition animation (e.g., at the first time) (e.g., 1514 in FIG. 15C); initiating the spatial transition animation from the first direction (e.g., from point 1511, which lies along direction 1514) (e.g., objects in the three-dimensional environment become visible and/or stop being visually obscured based on the first direction; and/or a graphical object corresponding to the spatial transition animation (e.g., that is part of the spatial transition animation) is displayed at a position along the first direction). In some embodiments, initiating the spatial transition animation comprises displaying a graphical object (e.g., 1504) at a position along the first direction. Automatically determining where the user is looking at the start of the spatial transition animation and then animating the spatial transition animation from the first direction enhances the operability of the system and makes the user-system interface more efficient (e.g., by helping the user to provide proper inputs and reducing errors) which, additionally, reduces power usage and improves battery life of the device by enabling the user to use the system more quickly and efficiently. Furthermore, doing so also provides the user with feedback about a state of the device (e.g., that the device is ready to be used and/or that the device has detected one or more characteristics about the three-dimensional environment (e.g., that certain objects are further from the user than others)).

In some embodiments, in response to detecting the user request (e.g., user input 1500) to transition the computer system from the first state to the second state: prior to the second time (e.g., at the first time, before the spatial transition animation is started, before the spatial transition animation is completed, and/or before any portion of the three-dimensional environment becomes visible), the computer system displays, via the one or more display generation components, a first object (e.g., 1504) (e.g., without displaying the three-dimensional environment, while the three-dimensional environment is not visible, and/or while the three-dimensional environment is visually obscured) as a viewpoint-locked object. Automatically displaying the first object in response to detecting the user request to transition the computer system from the first state to the second state reduces the number of inputs required to perform this operation.

In some embodiments, while displaying the spatial transition animation, the computer system maintains display of the first object (e.g., 1504) as a viewpoint-locked object (e.g., object 1504 is displayed throughout the spatial transition animation in FIGS. 15C-15G). In some embodiments, while displaying the spatial transition animation, the computer system detects movement of the viewpoint of the user (e.g., detects movement of the user's body and/or head); and in response to detecting the movement of the viewpoint of the user, the computer system displays the first object moving within the three-dimensional environment based on the movement of the viewpoint of the user. Automatically displaying the first object in response to detecting the user request to transition the computer system from the first state to the second state reduces the number of inputs required to perform this operation.

In some embodiments, displaying the first object (e.g., 1504) as a viewpoint-locked object comprises: in accordance with a determination that a first set of criteria is satisfied (e.g., in accordance with a determination that the computer system is being used for the first time; in accordance with a determination that the computer system has been turned on for the first time; and/or in accordance with a determination that the computer system is operating in a first state (e.g., a setup mode and/or a setup state)), displaying the first object (e.g., 1504) as a viewpoint-locked object that is constrained in a respective axis (e.g., an object that moves based on movement of the viewpoint of the user, but does not move and/or is constrained from moving in at least one axis (e.g., moves horizontally based on movement of the viewpoint of the user but does not move vertically)); and in accordance with a determination that the first set of criteria is not satisfied (e.g., in accordance with a determination that the computer system is not being used for the first time; in accordance with a determination that the computer system has not been turned on for the first time; and/or in accordance with a determination that the computer system is not operating in the first state (e.g., a setup mode and/or a setup state)), displaying the first object (e.g., 1504) as a viewpoint-locked object that is not constrained in the respective axis (e.g., an object that moves based on movement of the viewpoint of the user without any restrictions). Automatically displaying the first object as a viewpoint-locked object that is constrained in at least one axis when the first set of criteria is satisfied allows for this operation to be performed without further user input.

In some embodiments, prior to displaying the spatial transition animation (e.g., before the spatial transition animation is started and/or before the spatial transition animation is completed), the computer system displays, via the one or more display generation components, a first displayed object (e.g., 1504) (e.g., without displaying the three-dimensional environment, while the three-dimensional environment is not visible, and/or while the three-dimensional environment is visually obscured) as a viewpoint-locked object that is constrained in a respective axis (e.g., an object that moves based on movement of the viewpoint of the user, but does not move in at least one axis (e.g., moves horizontally based on movement of the viewpoint of the user but does not move vertically)) (in some embodiments, the initial object is displayed while the spatial transition animation progresses and/or during the spatial transition animation) (in some embodiments, the first displayed object is locked to the horizon of the three-dimensional environment). In some embodiments, subsequent to displaying the spatial transition animation (e.g., after completion of the spatial transition animation and/or during the spatial transition animation), the computer system displays, via the one or more display generation components, a second displayed object (e.g., 1520) (e.g., concurrently with the three-dimensional environment (e.g., 1510 and/or 1518a-1518c) and/or while the three-dimensional environment is visible) as a viewpoint-locked object that is constrained in the respective axis (e.g., an object that moves based on movement of the viewpoint of the user, but does not move in at least one axis (e.g., moves horizontally based on movement of the viewpoint of the user but does not move vertically)) (in some embodiments, the initial object is displayed while the spatial transition animation progresses and/or during the spatial transition animation) (in some embodiments, the first displayed object is locked to the horizon of the three-dimensional environment). Subsequent to displaying the second displayed object (e.g., 1520), the computer system displays, via the one or more display generation components, a home user interface (e.g., 1522) (e.g., a user interface that is indicative of the spatial transition animation being completed and/or a user interface that is indicative of the computer system being in an unlocked state) as a viewpoint-locked object that is not constrained in the respective axis (e.g., that is not constrained in any axis). Displaying the first displayed object and the second displayed object as viewpoint-locked objects that are constrained in at least one axis, and displaying the home user interface as a viewpoint-locked object that is not constrained in the least one axis, enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, in response to detecting the user request (e.g., user input 1500) to transition the computer system from the first state to the second state, the computer system displays, via the one or more display generation components, a transition point object (e.g., 1504) (e.g., a graphical object and/or a virtual object) (in some embodiments, the transition point object is a logo, a device identifier (e.g., a visual identifier that is indicative of a particular device, a text-based identifier that is indicative of a particular device, and/or an image-based identifier that is indicative of a particular device), a company identifier (e.g., a visual identifier that is indicative of a particular company, a text-based identifier that is indicative of a particular company, and/or an image-based identifier that is indicative of a particular company), and/or a product identifier (e.g., a visual identifier that is indicative of a particular product, a text-based identifier that is indicative of a particular product, and/or an image-based identifier that is indicative of a particular product)) that is displayed at a first position within the three-dimensional environment (e.g., 1510) based on a viewpoint of the user (e.g., 1512) (e.g., a viewpoint of the user at the time the transition point object is displayed and/or the viewpoint of the user at the time the spatial transition animation is started and/or initiated), wherein: during display of the spatial transition animation (e.g., FIGS. 15C-15K), the transition point object is displayed as an environment-locked object at the first position within the three-dimensional environment (e.g., 1510). In some embodiments, the transition point object is initially displayed as a viewpoint-locked object (and/or a viewpoint-locked object that is constrained in at least one axis), and then the transition point object is displayed as an environment-locked object at a later time (e.g., once the spatial transition animation starts and/or once a set of criteria are satisfied). Automatically displaying the transition point object as an environment-locked object in response to detecting the user request to transition the computer system from the first state to the second state allows for this operation to be performed without further user input.

In some embodiments, at the first time (e.g., at a time when the spatial transition animation starts and/or begins) (e.g., FIG. 15C), the viewpoint of the user is directed in a first direction (e.g., 1514) in the three-dimensional environment (e.g., 1510). In some embodiments, the computer system (e.g., 700 and/or X700) displays, via the one or more display generation components (e.g., 702 and/or X702), introductory visual content (e.g., 1520) (e.g., a message, text, and/or a visual object) at a position along the first direction (e.g., 1514 in FIG. 15C) in the three-dimensional environment (e.g., 1510) (e.g., in some embodiments, object 1520 is displayed at the end of the spatial transition animation along direction 1514, which is the direction of the viewpoint of user 1512 when the spatial transition animation started (e.g., regardless of the viewpoint of the user and/or the direction the user is facing at the time the spatial transition animation completed (e.g., FIG. 15K))). In some embodiments, the visual content is displayed along the first direction in the three-dimensional environment after completion of the spatial transition animation and/or after a threshold amount of the spatial transition animation has completed (e.g., 50%, 75%, or 95% of the spatial transition animation has completed). Automatically displaying the visual content at the position along the first direction in the three-dimensional environment allows for this operation to be performed without further user input.

In some embodiments, during the spatial transition animation, outputting first audio output (e.g., a boot sound, a track, and/or a sound effect) (e.g., audio outputs 1506a-1506i). In some embodiments, the first audio output is indicative of the computer system transitioning from the first state to the second state. In some embodiments, the first audio output is indicative of the computer system booting up. In some embodiments, one or more aspects of the first audio output are synchronized with one or more aspects of the spatial transition animation (e.g., the first audio output is configured to start at a particular point in the spatial transition animation; the first audio output is configured to end at a particular point in the spatial transition animation; and/or the first audio output changes as the spatial transition animation progresses (e.g., increases in volume and/or changes in town)). In some embodiments, the first audio output indicates readiness of the device to accept user input (e.g., user input to launch one or more applications). In some embodiments, completion of the spatial transition animation indicates readiness of the device to accept user input (e.g., to launch one or more applications). Automatically outputting first audio output during the spatial transition animation allows for this operation to be performed without further user input.

In some embodiments, at the first time (e.g., FIG. 15C) (e.g., before any portion of the three-dimensional environment is visible via the one or more display generation components), one or more hands of the user (e.g., physical hands of the user or virtual representations of the hands of the user) are visually obscured (e.g., are not visible via the one or more display generation components); and at the third time (e.g., FIG. 15K and/or upon completion of the spatial transition animation) (e.g., when the three-dimensional environment (e.g., 1510 and/or 1518a-1518c) is visible via the one or more display generation components and/or when the three-dimensional environment is no longer visually obscured), the one or more hands of the user are no longer visually obscured (e.g., are visible via the one or more display generation components), and the one or more hands of the user visually obscure at least a portion of the three-dimensional environment (e.g., the one or more hands of the user at least partially block the user's view of at least a portion of the three-dimensional environment (e.g., the at least a portion of the three-dimensional environment is hidden, and/or has reduced opacity) (e.g., in some embodiments, in FIG. 15K, one or more hands of the user are visible via display 702 (for example, in some embodiments, electronic device 700 is a head-mounted device, and one or more hands of the user wearing the head-mounted device are visible through transparent display generation component(s) 702 and/or are displayed by display generation component(s) 702)). Automatically revealing the hands of the user during the spatial transition animation allows for this operation to be performed without further user input.

In some embodiments, aspects/operations of methods 800, 1000, 1200, 1400, and/or 1600 may be interchanged, substituted, and/or added between these methods. For example, in some embodiments, enrolling the one or more eyes of a person in method 800 can be performed in order to perform eye-based biometric authentication of the person in methods 1000, 1200, and/or 1400; and/or in some embodiments, the spatial transition animation in method 1600 is performed in response to user authentication (e.g., as recited in methods 1000 and/or 1400). For brevity, these details are not repeated here.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

As described above, one aspect of the present technology is the gathering and use of data available from various sources to improve XR experiences of users. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to improve an XR experience of a user. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of XR experiences, the present technology can be configured to allow users to select to "opt in" or "opt out" of participation in the collection of personal information data during registration for services and/or user enrollment or anytime thereafter. In another example, users can select not to provide data for customization of services, user enrollment, and/or user authentication. In yet another example, users can select to limit the length of time data is maintained or entirely prohibit the collection of user biometric information. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, an XR experience can generated by inferring preferences based on non-personal information data or a bare minimum amount of personal information, such as the content being requested by the device associated with a user, other non-personal information available to the service, or publicly available information.

What is claimed is:

1. A computer system configured to communicate with one or more display generation components and one or more input devices, the computer system comprising:
one or more processors; and
memory storing one or more programs configured to be executed by one or more processors, the one or more programs including instructions for:
displaying, via the one or more display generation components, a first user interface object;
while displaying the first user interface object, and while a gaze of one or more eyes detected by the computer system is not directed towards the first user interface object at a first time, displaying, via the one or more display generation components, a first animation of the first user interface object;

while displaying the first animation of the first user interface object, detecting, via the one or more input devices, a gaze of one or more eyes at a second time that is after the first time; and in response to detecting the gaze of the one or more eyes at the second time:

in accordance with a determination that the gaze of the one or more eyes at the second time is not directed towards the first user interface object, maintaining display of the first animation of the first user interface object; and in accordance with a determination that the gaze of the one or more eyes at the second time is directed towards the first user interface object, ceasing display of the first animation of the first user interface object.

2. The computer system of claim 1, the one or more programs further including instructions for:

while displaying the first animation of the first user interface object:

in accordance with a determination that the gaze of the one or more eyes has not been directed towards the first user interface object for a threshold duration of time, displaying, via the one or more display generation components, a visual indication prompting a user to look at the first user interface object.

3. The computer system of claim 2, wherein the visual indication prompting the user to look at the first user interface object includes movement of the first user interface object different from the first animation.

4. The computer system of claim 1, wherein the first animation includes movement of a plurality of concentric rings.

5. The computer system of claim 1, wherein the first animation includes movement of at least a portion of a representation of a human eye.

6. The computer system of claim 1, the one or more programs further including instructions for:

in response to detecting the gaze of the one or more eyes at the second time:

in accordance with a determination that the gaze of the one or more eyes is not directed towards the first user interface object, outputting a first audio output corresponding to the first animation.

7. The computer system of claim 6, wherein the first audio output includes a repeating sound.

8. The computer system of claim 6, the one or more programs further including instructions for:

in response to detecting the gaze of the one or more eyes at the second time:

in accordance with a determination that the gaze of the one or more eyes is directed towards the first user interface object, outputting a second audio output different from the first audio output, wherein:

the second audio output changes over time as the one or more eyes continue to be directed towards the first user interface object.

9. The computer system of claim 6, wherein:

the first audio output includes spatial audio having a location corresponding to the first user interface object.

10. The computer system of claim 1, the one or more programs further including instructions for:

in response to detecting the gaze of the one or more eyes at the second time:

in accordance with a determination that the gaze of the one or more eyes is directed towards the first user interface object, collecting biometric information corresponding to the one or more eyes; and subsequent to collecting the biometric information corresponding to the one or more eyes:

in accordance with a determination that the biometric information corresponding to the one or more eyes satisfies authentication criteria, displaying, via the one or more display generation components, the first user interface object changing in appearance in a first manner; and in accordance with a determination that the biometric information corresponding to the one or more eyes does not satisfy the authentication criteria, displaying, via the one or more display generation components, the first user interface object changing in appearance in a second manner different from the first manner.

11. The computer system of claim 10, wherein displaying the first user interface object changing in appearance in the second manner includes shaking the first user interface object.

12. The computer system of claim 10, the one or more programs further including instructions for:

subsequent to collecting the biometric information corresponding to the one or more eyes, determining that the biometric information corresponding to the one or more eyes does not satisfy the authentication criteria; and in response to determining that the biometric information corresponding to the one or more eyes does not satisfy the authentication criteria:

in accordance with a determination that there are no previous failed authentication attempts of the one or more eyes within a defined period of time, collecting second biometric information corresponding to the one or more eyes to be used in a second authentication attempt of the one or more eyes.

13. The computer system of claim 12, the one or more programs further including instructions for:

in response to determining that the biometric information corresponding to the one or more eyes does not satisfy the authentication criteria:

in accordance with a determination that there have been at least a threshold number of previous failed eye authentication attempts within the defined period of time, displaying, via the one or more display generation components, an authentication user interface that includes one or more selectable objects that are selectable to enter authentication information.

14. The computer system of claim 13, wherein:

the authentication user interface includes a retry object that is selectable to initiate a process for re-attempting biometric authentication of the one or more eyes; and the one or more programs further include instructions for:

while displaying the authentication user interface, receiving, via the one or more input devices, a user input corresponding to selection of the retry object; and in response to receiving the user input corresponding to selection of the retry object, collecting third biometric information corresponding to the one or more eyes to be used in an authentication attempt of the one or more eyes.

15. The computer system of claim 14, the one or more programs further including instructions for:

in response to determining that the biometric information corresponding to the one or more eyes does not satisfy the authentication criteria:

in accordance with a determination that there have been greater than the threshold number of previous failed eye authentication attempts within the defined period of time, displaying, via the one or more display generation components, a second authentication user interface that includes one or more selectable objects that are selectable to enter authentication information, wherein the second authentication user interface does not include the retry object.

16. The computer system of claim 14, wherein the user input corresponding to selection of the retry object includes:

a gaze input corresponding to the retry object; and a selection input.

17. The computer system of claim 1, the one or more programs further including instructions for:

prior to displaying the first user interface object, displaying, via the one or more display generation components, as part of enrolling one or more eyes of a person, an enrollment user interface that includes an enrollment gaze target object;

while displaying the enrollment user interface, in accordance with a determination that the gaze of the one or more eyes of the person is moving away from the enrollment gaze target object, displaying, via the one or more display generation components, a prompt to look at the enrollment gaze target object; and subsequent to displaying the enrollment user interface:

collecting biometric information corresponding to the one or more eyes; and subsequent to collecting the biometric information corresponding to the one or more eyes:

in accordance with a determination that the biometric information corresponding to the one or more eyes does not satisfy authentication criteria, displaying, via the one or more display generation components, a prompt to look at the first user interface object.

18. The computer system of claim 1, wherein displaying the first user interface object comprises:

in accordance with a determination that there are one or more previous failed authentication attempts of the one or more eyes within a defined period of time, displaying the first user interface object with a first platter at least partially surrounding the first user interface object; and in accordance with a determination that there are no previous failed authentication attempts of the one or more eyes within a defined period of time, displaying the first user interface object without displaying the first platter.

19. The computer system of claim 18, wherein the first platter is displayed in a manner that brightens the one or more eyes for subsequent collection of biometric information corresponding to the one or more eyes.

20. The computer system of claim 1, the one or more programs further including instructions for:

subsequent to detecting the gaze of the one or more eyes, and while displaying the first user interface object, collecting biometric information corresponding to the one or more eyes; and subsequent to collecting the biometric information corresponding to the one or more eyes:

in accordance with a determination that the biometric information corresponding to the one or more eyes satisfies authentication criteria, ceasing display of the first user interface object.

21. The computer system of claim 1, the one or more programs further including instructions for:

subsequent to detecting the gaze of the one or more eyes, collecting biometric information corresponding to the one or more eyes; and subsequent to collecting the biometric information corresponding to the one or more eyes:

in accordance with a determination that the biometric information corresponding to the one or more eyes satisfies authentication criteria, displaying, via the one or more display generation components, a success visual feedback.

22. The computer system of claim 21, the one or more programs further including instructions for:

while collecting the biometric information corresponding to the one or more eyes, displaying, via the one or more display generation components, progress animation, wherein:

the first user interface object includes a first plurality of lines;

the progress animation includes movement of the first plurality of lines; and the success visual feedback includes changing the first plurality of lines to a second plurality of lines different from the first plurality of lines.

23. The computer system of claim 22, wherein the second plurality of lines includes a different number of lines from the first plurality of lines.

24. The computer system of claim 22, wherein changing the first plurality of lines to a second plurality of lines comprises merging a first line of the first plurality of lines with a second line of the first plurality of lines.

25. The computer system of claim 22, wherein:

the first plurality of lines includes:

a first subset of lines with a first number of gaps separating the first subset of lines; and a second subset of lines with a second number of gaps separating the second subset of lines, wherein the second number of gaps is different from the first number of gaps; and changing the first plurality of lines to the second plurality of lines comprises modifying at least one of the first subset of lines and the second subset of lines so that the first subset of lines and the second subset of lines includes a third number of gaps; and the one or more programs further include instructions for:

subsequent to changing the first plurality of lines to the second plurality of lines, aligning the third number of gaps in the first subset of lines with the third number of gaps in the second subset of lines.

26. The computer system of claim 22, wherein:

the first plurality of lines includes one or more lines separated by one or more gaps; and changing the first plurality of lines to the second plurality of lines comprises combining at least some of the one or more lines to remove the one or more gaps.

27. The computer system of claim 21, wherein displaying the success visual feedback includes shrinking the size of the first user interface object.

28. The computer system of claim 21, wherein displaying the success visual feedback includes displaying an animation that includes movement that is representative of an eye blinking.

29. The computer system of claim 1, wherein, while the first user interface object is displayed, an augmented reality passthrough environment is visible via the one or more display generation components concurrently with the first user interface object.

30. The computer system of claim 1, the one or more programs further including instructions for:

while displaying the first user interface object, an augmented reality passthrough environment is not visible via the one or more display generation components; and subsequent to displaying the first user interface object, the augmented reality passthrough environment is visible via the one or more display generation components.

31. A non-transitory computer-readable storage medium storing one or more programs configured to be executed by one or more processors of a computer system that is in communication with one or more display generation components and one or more input devices, the one or more programs including instructions for:

displaying, via the one or more display generation components, a first user interface object;

while displaying the first user interface object, and while a gaze of one or more eyes detected by the computer system is not directed towards the first user interface object at a first time, displaying, via the one or more display generation components, a first animation of the first user interface object;

while displaying the first animation of the first user interface object, detecting, via the one or more input devices, a gaze of one or more eyes at a second time that is after the first time; and in response to detecting the gaze of the one or more eyes at the second time:

in accordance with a determination that the gaze of the one or more eyes at the second time is not directed towards the first user interface object, maintaining display of the first animation of the first user interface object; and in accordance with a determination that the gaze of the one or more eyes at the second time is directed towards the first user interface object, ceasing display of the first animation of the first user interface object.

32. The non-transitory computer-readable storage medium of claim 31, the one or more programs further including instructions for:

while displaying the first animation of the first user interface object:

in accordance with a determination that the gaze of the one or more eyes has not been directed towards the first user interface object for a threshold duration of time, displaying, via the one or more display generation components, a visual indication prompting a user to look at the first user interface object.

33. The non-transitory computer-readable storage medium of claim 31, the one or more programs further including instructions for:

in response to detecting the gaze of the one or more eyes at the second time:

in accordance with a determination that the gaze of the one or more eyes is not directed towards the first user interface object, outputting a first audio output corresponding to the first animation.

34. The non-transitory computer-readable storage medium of claim 33, wherein:

the first audio output includes spatial audio having a location corresponding to the first user interface object.

35. The non-transitory computer-readable storage medium of claim 31, the one or more programs further including instructions for:

in response to detecting the gaze of the one or more eyes at the second time:

in accordance with a determination that the gaze of the one or more eyes is directed towards the first user interface object, collecting biometric information corresponding to the one or more eyes; and subsequent to collecting the biometric information corresponding to the one or more eyes:

in accordance with a determination that the biometric information corresponding to the one or more eyes satisfies authentication criteria, displaying, via the one or more display generation components, the first user interface object changing in appearance in a first manner; and in accordance with a determination that the biometric information corresponding to the one or more eyes does not satisfy the authentication criteria, displaying, via the one or more display generation components, the first user interface object changing in appearance in a second manner different from the first manner.

36. The non-transitory computer-readable storage medium of claim 35, wherein displaying the first user interface object changing in appearance in the second manner includes shaking the first user interface object.

37. The non-transitory computer-readable storage medium of claim 35, the one or more programs further including instructions for:

subsequent to collecting the biometric information corresponding to the one or more eyes, determining that the biometric information corresponding to the one or more eyes does not satisfy the authentication criteria; and in response to determining that the biometric information corresponding to the one or more eyes does not satisfy the authentication criteria:

in accordance with a determination that there are no previous failed authentication attempts of the one or more eyes within a defined period of time, collecting second biometric information corresponding to the one or more eyes to be used in a second authentication attempt of the one or more eyes.

38. The non-transitory computer-readable storage medium of claim 37, the one or more programs further including instructions for:

in response to determining that the biometric information corresponding to the one or more eyes does not satisfy the authentication criteria:

in accordance with a determination that there have been at least a threshold number of previous failed eye authentication attempts within the defined period of time, displaying, via the one or more display generation components, an authentication user interface that includes one or more selectable objects that are selectable to enter authentication information.

39. The non-transitory computer-readable storage medium of claim 38, wherein:

the authentication user interface includes a retry object that is selectable to initiate a process for re-attempting biometric authentication of the one or more eyes; and the one or more programs further include instructions for:

while displaying the authentication user interface, receiving, via the one or more input devices, a user input corresponding to selection of the retry object; and in response to receiving the user input corresponding to selection of the retry object, collecting third biometric information corresponding to the one or more eyes to be used in an authentication attempt of the one or more eyes.

40. The non-transitory computer-readable storage medium of claim 39, wherein the user input corresponding to selection of the retry object includes:
a gaze input corresponding to the retry object; and
a selection input.

41. The non-transitory computer-readable storage medium of claim 31, the one or more programs further including instructions for:
subsequent to detecting the gaze of the one or more eyes, and while displaying the first user interface object, collecting biometric information corresponding to the one or more eyes; and
subsequent to collecting the biometric information corresponding to the one or more eyes:
in accordance with a determination that the biometric information corresponding to the one or more eyes satisfies authentication criteria, ceasing display of the first user interface object.

42. The non-transitory computer-readable storage medium of claim 31, the one or more programs further including instructions for:
subsequent to detecting the gaze of the one or more eyes, collecting biometric information corresponding to the one or more eyes; and
subsequent to collecting the biometric information corresponding to the one or more eyes:
in accordance with a determination that the biometric information corresponding to the one or more eyes satisfies authentication criteria, displaying, via the one or more display generation components, a success visual feedback.

43. The non-transitory computer-readable storage medium of claim 42, the one or more programs further including instructions for:
while collecting the biometric information corresponding to the one or more eyes, displaying, via the one or more display generation components, progress animation, wherein:
the first user interface object includes a first plurality of lines;
the progress animation includes movement of the first plurality of lines; and
the success visual feedback includes changing the first plurality of lines to a second plurality of lines different from the first plurality of lines.

44. The non-transitory computer-readable storage medium of claim 43, wherein changing the first plurality of lines to a second plurality of lines comprises merging a first line of the first plurality of lines with a second line of the first plurality of lines.

45. A method, comprising:
at a computer system that is in communication with one or more display generation components and one or more input devices:
displaying, via the one or more display generation components, a first user interface object;
while displaying the first user interface object, and while a gaze of one or more eyes detected by the computer system is not directed towards the first user interface object at a first time, displaying, via the one or more display generation components, a first animation of the first user interface object;
while displaying the first animation of the first user interface object, detecting, via the one or more input devices, a gaze of one or more eyes at a second time that is after the first time; and
in response to detecting the gaze of the one or more eyes at the second time:
in accordance with a determination that the gaze of the one or more eyes at the second time is not directed towards the first user interface object, maintaining display of the first animation of the first user interface object; and
in accordance with a determination that the gaze of the one or more eyes at the second time is directed towards the first user interface object, ceasing display of the first animation of the first user interface object.

46. The method of claim 45, further comprising:
while displaying the first animation of the first user interface object:
in accordance with a determination that the gaze of the one or more eyes has not been directed towards the first user interface object for a threshold duration of time, displaying, via the one or more display generation components, a visual indication prompting a user to look at the first user interface object.

47. The method of claim 45, further comprising:
in response to detecting the gaze of the one or more eyes at the second time:
in accordance with a determination that the gaze of the one or more eyes is not directed towards the first user interface object, outputting a first audio output corresponding to the first animation.

48. The method of claim 47, wherein:
the first audio output includes spatial audio having a location corresponding to the first user interface object.

49. The method of claim 45, further comprising:
in response to detecting the gaze of the one or more eyes at the second time:
in accordance with a determination that the gaze of the one or more eyes is directed towards the first user interface object, collecting biometric information corresponding to the one or more eyes; and
subsequent to collecting the biometric information corresponding to the one or more eyes:
in accordance with a determination that the biometric information corresponding to the one or more eyes satisfies authentication criteria, displaying, via the one or more display generation components, the first user interface object changing in appearance in a first manner; and
in accordance with a determination that the biometric information corresponding to the one or more eyes does not satisfy the authentication criteria, displaying, via the one or more display generation components, the first user interface object changing in appearance in a second manner different from the first manner.

50. The method of claim 49, wherein displaying the first user interface object changing in appearance in the second manner includes shaking the first user interface object.

51. The method of claim 49, further comprising:
subsequent to collecting the biometric information corresponding to the one or more eyes, determining that the biometric information corresponding to the one or more eyes does not satisfy the authentication criteria; and in response to determining that the biometric information corresponding to the one or more eyes does not satisfy the authentication criteria:

in accordance with a determination that there are no previous failed authentication attempts of the one or more eyes within a defined period of time, collecting second biometric information corresponding to the one or more eyes to be used in a second authentication attempt of the one or more eyes.

52. The method of claim 51, further comprising:

in response to determining that the biometric information corresponding to the one or more eyes does not satisfy the authentication criteria:

in accordance with a determination that there have been at least a threshold number of previous failed eye authentication attempts within the defined period of time, displaying, via the one or more display generation components, an authentication user interface that includes one or more selectable objects that are selectable to enter authentication information.

53. The method of claim 52, wherein:

the authentication user interface includes a retry object that is selectable to initiate a process for re-attempting biometric authentication of the one or more eyes; and the method further comprises:

while displaying the authentication user interface, receiving, via the one or more input devices, a user input corresponding to selection of the retry object; and in response to receiving the user input corresponding to selection of the retry object, collecting third biometric information corresponding to the one or more eyes to be used in an authentication attempt of the one or more eyes.

54. The method of claim 53, wherein the user input corresponding to selection of the retry object includes:

a gaze input corresponding to the retry object; and a selection input.

55. The method of claim 45, further comprising:

subsequent to detecting the gaze of the one or more eyes, and while displaying the first user interface object, collecting biometric information corresponding to the one or more eyes; and subsequent to collecting the biometric information corresponding to the one or more eyes:

in accordance with a determination that the biometric information corresponding to the one or more eyes satisfies authentication criteria, ceasing display of the first user interface object.

56. The method of claim 45, further comprising:

subsequent to detecting the gaze of the one or more eyes, collecting biometric information corresponding to the one or more eyes; and subsequent to collecting the biometric information corresponding to the one or more eyes:

in accordance with a determination that the biometric information corresponding to the one or more eyes satisfies authentication criteria, displaying, via the one or more display generation components, a success visual feedback.

57. The method of claim 56, further comprising:

while collecting the biometric information corresponding to the one or more eyes, displaying, via the one or more display generation components, progress animation, wherein:

the first user interface object includes a first plurality of lines;

the progress animation includes movement of the first plurality of lines; and the success visual feedback includes changing the first plurality of lines to a second plurality of lines different from the first plurality of lines.

58. The method of claim 57, wherein changing the first plurality of lines to a second plurality of lines comprises merging a first line of the first plurality of lines with a second line of the first plurality of lines.

* * * * *